United States Patent
Gong et al.

(10) Patent No.: US 9,870,566 B2
(45) Date of Patent: Jan. 16, 2018

(54) AUTHENTICATION SYSTEMS AND METHODS FOR GENERATING FLIGHT REGULATIONS

(71) Applicant: SZ DJI TECHNOLOGY CO., LTD, Shenzhen (CN)

(72) Inventors: Ming Gong, Shenzhen (CN); Jin Dai, Shenzhen (CN); Hao Cui, Shenzhen (CN); Xiaodong Wang, Shenzhen (CN); Han Huang, Shenzhen (CN); Jun Wu, Shenzhen (CN); Wei Fan, Shenzhen (CN); Ning Ma, Shenzhen (CN); Xinhua Rong, Shenzhen (CN); Xingsen Lin, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/942,936

(22) Filed: Nov. 16, 2015

(65) Prior Publication Data
US 2016/0288905 A1    Oct. 6, 2016

Related U.S. Application Data

(63) Continuation of application No. PCT/CN2015/075626, filed on Mar. 31, 2015.

(51) Int. Cl.
*G01C 23/00*    (2006.01)
*G06Q 30/00*    (2012.01)
(Continued)

(52) U.S. Cl.
CPC ......... *G06Q 30/018* (2013.01); *B64C 39/024* (2013.01); *G05D 1/0011* (2013.01);
(Continued)

(58) Field of Classification Search
CPC .............. B64C 2201/00; B64C 39/024; B64C 2201/146; G08G 5/006; G08G 5/0039; H04W 4/021; G06Q 30/018
(Continued)

(56) References Cited

U.S. PATENT DOCUMENTS 6,856,894 B1   2/2005 Bodin et al.
6,975,246 B1   12/2005 Trudeau
(Continued)

FOREIGN PATENT DOCUMENTS

CA    2872698 A1    11/2013
CN    1735816 A     2/2006
(Continued)

OTHER PUBLICATIONS

2013 Senate Bill 196.*
(Continued)

*Primary Examiner* — Isaac G Smith
(74) *Attorney, Agent, or Firm* — Anova Law Group, PLLC

(57) ABSTRACT

Systems and methods for UAV safety are provided. An authentication system may be used to confirm UAV and/or user identity and provide secured communications between users and UAVs. The UAVs may operate in accordance with a set of flight regulations. The set of flight regulations may be associated with a geo-fencing device in the vicinity of the UAV.

30 Claims, 45 Drawing Sheets

(51) Int. Cl.

| | | |
|---|---|---|
| *G08G 5/00* | (2006.01) | |
| *G05D 1/00* | (2006.01) | |
| *B64C 39/02* | (2006.01) | |
| *G06F 9/445* | (2006.01) | |
| *G06F 21/31* | (2013.01) | |
| *H04L 29/08* | (2006.01) | |
| *H04L 29/06* | (2006.01) | |
| *G06F 21/44* | (2013.01) | |
| *G06F 21/62* | (2013.01) | |

(52) U.S. Cl.
CPC ............ *G05D 1/0022* (2013.01); *G06F 8/65* (2013.01); *G06F 21/31* (2013.01); *G06F 21/44* (2013.01); *G06F 21/6227* (2013.01); *G08G 5/006* (2013.01); *G08G 5/0008* (2013.01); *G08G 5/0013* (2013.01); *G08G 5/0026* (2013.01); *G08G 5/0034* (2013.01); *G08G 5/0039* (2013.01); *G08G 5/0043* (2013.01); *G08G 5/0052* (2013.01); *G08G 5/0069* (2013.01); *G08G 5/0078* (2013.01); *G08G 5/0082* (2013.01); *G08G 5/0086* (2013.01); *G08G 5/0091* (2013.01); *H04L 63/101* (2013.01); *H04L 67/12* (2013.01); *H04L 67/34* (2013.01); *B64C 2201/143* (2013.01); *B64C 2201/146* (2013.01); *G06F 2221/2117* (2013.01); *G08G 5/0056* (2013.01)

(58) Field of Classification Search
USPC ...................... 701/3, 29.6; 224/189
See application file for complete search history.

(56) References Cited

U.S. PATENT DOCUMENTS

| | | | |
|---|---|---|---|
| 7,107,148 B1 | 9/2006 | Bodin et al. | |
| 7,248,963 B2 | 7/2007 | Baiada et al. | |
| 7,299,130 B2 | 11/2007 | Mulligan et al. | |
| 7,581,702 B2* | 9/2009 | Olson ................ | H04W 4/046 244/189 |
| 7,606,115 B1 | 10/2009 | Cline et al. | |
| 7,706,979 B1 | 4/2010 | Herwitz | |
| 7,843,375 B1 | 11/2010 | Rennie et al. | |
| 8,355,834 B2 | 1/2013 | Duggan et al. | |
| 8,412,597 B1 | 4/2013 | Mixdorf et al. | |
| 8,521,339 B2 | 8/2013 | Gariepy et al. | |
| 8,521,340 B2 | 8/2013 | Coulmeau | |
| 8,538,673 B2 | 9/2013 | Sislak et al. | |
| 8,543,255 B2 | 9/2013 | Wood et al. | |
| 8,626,361 B2 | 1/2014 | Gerlock | |
| 8,656,162 B2 | 2/2014 | Roy et al. | |
| 8,718,838 B2 | 5/2014 | Kokkeby et al. | |
| 8,755,950 B2 | 6/2014 | Johansson | |
| 8,788,118 B2 | 7/2014 | Matos | |
| 8,825,226 B1* | 9/2014 | Worley, III ............ | A63J 1/00 180/170 |
| 8,838,289 B2 | 9/2014 | Margolin | |
| 8,973,101 B1 | 3/2015 | Sampigethaya et al. | |
| 9,051,043 B1 | 6/2015 | Peeters et al. | |
| 9,056,676 B1 | 6/2015 | Wang | |
| 9,087,451 B1 | 7/2015 | Jarrell | |
| 9,221,557 B1 | 12/2015 | Friesel | |
| 9,256,994 B2 | 2/2016 | Downey et al. | |
| 9,412,278 B1 | 8/2016 | Gong et al. | |
| 9,594,372 B1 | 3/2017 | Sills et al. | |
| 9,645,581 B1 | 5/2017 | Yang et al. | |
| 9,651,944 B2 | 5/2017 | Arwine | |
| 2003/0079141 A1 | 4/2003 | Eitel et al. | |
| 2003/0225489 A1 | 12/2003 | Tsao | |
| 2004/0086121 A1 | 5/2004 | Viggiano et al. | |
| 2004/0193334 A1 | 9/2004 | Carlsson et al. | |
| 2004/0249519 A1 | 12/2004 | Frink | |
| 2005/0090945 A1 | 4/2005 | Bodin et al. | |
| 2005/0114025 A1 | 5/2005 | Brant et al. | |
| 2005/0165886 A1 | 7/2005 | Tuer et al. | |
| 2005/0286452 A1 | 12/2005 | Hardgrave et al. | |
| 2007/0018881 A1 | 1/2007 | King | |
| 2007/0115101 A1 | 5/2007 | Creekbaum et al. | |
| 2007/0143749 A1 | 6/2007 | Date et al. | |
| 2008/0072284 A1 | 3/2008 | Horvitz et al. | |
| 2008/0186222 A1 | 8/2008 | Rolfe | |
| 2008/0243372 A1 | 10/2008 | Bodin et al. | |
| 2008/0255711 A1 | 10/2008 | Matos | |
| 2009/0012661 A1 | 1/2009 | Louis | |
| 2009/0219393 A1 | 9/2009 | Vian et al. | |
| 2010/0004802 A1* | 1/2010 | Bodin .................. | G05D 1/0094 701/11 |
| 2010/0084513 A1 | 4/2010 | Gariepy et al. | |
| 2010/0094500 A1 | 4/2010 | Jin | |
| 2010/0201505 A1 | 8/2010 | Honary et al. | |
| 2010/0225457 A1 | 9/2010 | Aguirre | |
| 2010/0318475 A1 | 12/2010 | Abrahamson | |
| 2011/0019558 A1 | 1/2011 | Rowe et al. | |
| 2011/0050461 A1 | 3/2011 | Pixley et al. | |
| 2011/0114119 A1 | 5/2011 | Yang et al. | |
| 2011/0118981 A1 | 5/2011 | Chamlou | |
| 2011/0160950 A1 | 6/2011 | Naderhirn et al. | |
| 2011/0241926 A1 | 10/2011 | Laufer | |
| 2012/0007769 A1 | 1/2012 | Markin | |
| 2012/0022719 A1* | 1/2012 | Matos .................. | B64C 39/024 701/2 |
| 2012/0143482 A1 | 6/2012 | Goossen | |
| 2012/0221175 A1 | 8/2012 | Spinelli | |
| 2012/0237028 A1 | 9/2012 | Khazan et al. | |
| 2012/0271491 A1 | 10/2012 | Spata | |
| 2012/0299751 A1 | 11/2012 | Verna et al. | |
| 2012/0319871 A1 | 12/2012 | Wise | |
| 2013/0060405 A1 | 3/2013 | Komatsuzaki et al. | |
| 2013/0085629 A1 | 4/2013 | Washington et al. | |
| 2013/0162822 A1 | 6/2013 | Lee et al. | |
| 2013/0305238 A1 | 11/2013 | Frayssignes et al. | |
| 2013/0314502 A1 | 11/2013 | Urbach et al. | |
| 2013/0317667 A1 | 11/2013 | Kruglick | |
| 2013/0345919 A1 | 12/2013 | Mach et al. | |
| 2014/0018976 A1 | 1/2014 | Goossen et al. | |
| 2014/0018979 A1 | 1/2014 | Goossen et al. | |
| 2014/0032034 A1 | 1/2014 | Raptopoulos et al. | |
| 2014/0056438 A1* | 2/2014 | Baalu .................. | G10K 15/02 381/86 |
| 2014/0162692 A1 | 6/2014 | Li et al. | |
| 2014/0163852 A1 | 6/2014 | Borri et al. | |
| 2014/0172194 A1 | 6/2014 | Levien et al. | |
| 2014/0192193 A1 | 7/2014 | Zufferey et al. | |
| 2014/0222248 A1 | 8/2014 | Levien et al. | |
| 2014/0231590 A1 | 8/2014 | Trowbridge et al. | |
| 2014/0249693 A1 | 9/2014 | Stark et al. | |
| 2014/0277854 A1 | 9/2014 | Jones et al. | |
| 2014/0372018 A1 | 12/2014 | Srinivasan et al. | |
| 2014/0379173 A1 | 12/2014 | Knapp et al. | |
| 2015/0066248 A1 | 3/2015 | Arbeit et al. | |
| 2015/0142211 A1 | 5/2015 | Shehata et al. | |
| 2015/0169311 A1 | 6/2015 | Dickerson et al. | |
| 2015/0254988 A1 | 9/2015 | Wang et al. | |
| 2015/0325064 A1 | 11/2015 | Downey et al. | |
| 2015/0336668 A1 | 11/2015 | Pasko et al. | |
| 2015/0353195 A1 | 12/2015 | Peeters et al. | |
| 2015/0379874 A1 | 12/2015 | Ubhi et al. | |
| 2016/0023760 A1 | 1/2016 | Goodrich | |
| 2016/0140851 A1 | 5/2016 | Levy et al. | |
| 2016/0219252 A1* | 7/2016 | Blanco ................ | G05B 19/048 |
| 2016/0225264 A1* | 8/2016 | Taveira ................ | B64C 39/024 |
| 2016/0240087 A1 | 8/2016 | Kube et al. | |
| 2016/0253908 A1 | 9/2016 | Chambers et al. | |
| 2016/0285863 A1 | 9/2016 | Canavor et al. | |
| 2016/0292403 A1 | 10/2016 | Gong et al. | |
| 2016/0292696 A1 | 10/2016 | Gong et al. | |
| 2016/0357192 A1 | 12/2016 | McGrew et al. | |
| 2017/0004662 A1 | 1/2017 | Gong et al. | |
| 2017/0012697 A1 | 1/2017 | Gong et al. | |
| 2017/0132937 A1 | 5/2017 | Zeng et al. | |

(56) References Cited

U.S. PATENT DOCUMENTS

| | | | |
|---|---|---|---|
| 2017/0162059 | A1 | 6/2017 | Jarrell |
| 2017/0169713 | A1 | 6/2017 | Gong et al. |

FOREIGN PATENT DOCUMENTS

| | | | |
|---|---|---|---|
| CN | 1934562 | A | 3/2007 |
| CN | 101093617 | A | 12/2007 |
| CN | 101592955 | A | 12/2009 |
| CN | 101593437 | A | 12/2009 |
| CN | 101833870 | A | 9/2010 |
| CN | 201655045 | U | 11/2010 |
| CN | 102496312 | A | 6/2012 |
| CN | 102620736 | A | 8/2012 |
| CN | 102637023 | A | 8/2012 |
| CN | 102650883 | A | 8/2012 |
| CN | 202694152 | U | 1/2013 |
| CN | 102929288 | A | 2/2013 |
| CN | 102930107 | A | 2/2013 |
| CN | 103177609 | A | 6/2013 |
| CN | 103267528 | A | 8/2013 |
| CN | 103411609 | A | 11/2013 |
| CN | 203278900 | U | 11/2013 |
| CN | 103822635 | A | 5/2014 |
| CN | 104025474 | A | 9/2014 |
| CN | 104049641 | A | 9/2014 |
| CN | 104053127 | A | 9/2014 |
| CN | 104062979 | A | 9/2014 |
| CN | 104114978 | A | 10/2014 |
| CN | 204178240 | U | 2/2015 |
| EP | 2199206 | A1 | 6/2010 |
| EP | 2375299 | A1 | 10/2011 |
| EP | 1984622 | B1 | 7/2013 |
| EP | 2685336 | A1 | 1/2014 |
| EP | 2787319 | A1 | 10/2014 |
| EP | 2818958 | A2 | 12/2014 |
| JP | 2007237873 | A | 9/2007 |
| JP | 5382793 | B2 | 1/2014 |
| WO | WO-2007069890 | A1 | 6/2007 |
| WO | WO-2008051236 | A2 | 5/2008 |
| WO | WO-2009054937 | A2 | 4/2009 |
| WO | WO 2009/091431 | A1 | 7/2009 |
| WO | WO-2013064637 | A1 | 5/2013 |
| WO | WO 2013/163746 | A1 | 11/2013 |
| WO | WO2014071465 | * | 5/2014 |
| WO | WO-2014078098 | A1 | 5/2014 |
| WO | WO 2016154936 | A1 | 10/2016 |
| WO | WO-2016154939 | A1 | 10/2016 |
| WO | WO 2016154940 | A1 | 10/2016 |
| WO | WO-2016154941 | A1 | 10/2016 |
| WO | WO-2016154942 | A1 | 10/2016 |
| WO | WO-2016154943 | A1 | 10/2016 |
| WO | WO-2016154944 | A1 | 10/2016 |
| WO | WO-2016154945 | A1 | 10/2016 |
| WO | WO-2016154946 | A1 | 10/2016 |
| WO | WO-2016154947 | A1 | 10/2016 |
| WO | WO-2016154948 | A1 | 10/2016 |
| WO | WO-2016154949 | A1 | 10/2016 |

OTHER PUBLICATIONS

U.S. Appl. No. 14/942,913, filed Nov. 16, 2015, Gong et al.
U.S. Appl. No. 14/942,925, filed Nov. 16, 2015, Gong et al.
U.S. Appl. No. 14/942,994, filed Nov. 16, 2015, Gong et al.
iRobot Create owner's guide. 2006. www.irobot.com.
LATAS. Low Altitude Tracking and Avoidance System. Homepage. Accessed Jan. 27, 2015. http://flylatas.com/#.
Niemi, et al. UMTS Security. John Wiley & Sons, Feb. 8, 2006. 286 pages.
PrecisionHawk introduces new low-altitude tracking and avoidance system. Aiforce-technology.com. Jan. 13, 2015. http://www.airforce-technology.com/news/newsprecisionhawk-introduces-new-low-altitude-tracking-and-avoidance-system-4487669/.
International search report and written opinion dated Aug. 18, 2015 for PCT/CN2015/075620.
U.S. Appl. No. 15/215,515, filed Jul. 20, 2016, Gong et al.
International search report dated Jan. 4, 2016 for PCT/CN2015/075626.
International search report dated Aug. 26, 2015 for PCT/CN2015/075625.
Lacher, et al. A New Paradigm for Small UAS. AUVSI-NA 2012. 14 pages. https://www.mitre.org/sites/default/files/pdf/12_2840.pdf.
Notice of allowance dated Jun. 7, 2016 for U.S. Appl. No. 14/942,913.
Office action dated Feb. 17, 2016 for U.S. Appl. No. 14/942,913.
Office action dated Apr. 6, 2016 for U.S. Appl. No. 14/942,994.
Office action dated Apr. 18, 2016 for U.S. Appl. No. 14/942,925.
Notice of allowance dated Dec. 7, 2016 for U.S. Appl. No. 14/942,925.
Office action dated Nov. 17, 2016 for U.S. Appl. No. 14/942,994.
Co-pending U.S. Appl. No. 15/415,666, filed Jan. 25, 2017.
Notice of allowance dated Apr. 4, 2017 for U.S. Appl. No. 14/942,925.
International search report and written opinion dated Jan. 6, 2016 for PCT Application No. PCT/CN2015/075617.
International search report and written opinion dated Dec. 24, 2015 for PCT Application No. PCT/CN2015/075619.
International search report and written opinion dated Dec. 30, 2015 for PCT Application No. PCT/CN2015/075613.
International search report and written opinion dated Dec. 31, 2015 for PCT Application No. PCT/CN2015/075616.
International search report and written opinion dated Dec. 31, 2015 for PCT Application No. PCT/CN2015/075618.
International search report and written opinion dated Jan. 7, 2016 for PCT Application No. PCT/CN2015/075622.
International search report and written opinion dated Jan. 11, 2016 for PCT Application No. PCT/CN2015/075623.
International search report and written opinion dated Dec. 24, 2015 for PCT Application No. PCT/CN2015/075624.
International search report and written opinion dated Dec. 28, 2015 for PCT Application No. PCT/CN2015/075621.
Co-pending U.S. Appl. No. 15/620,497, filed Jun. 12, 2017.
European search report and search opinion dated Jun. 30, 2017 for EP Application No. 15871322.2.
European search report and search opinion dated Jun. 30, 2017 for EP Application No. 15874384.9.
European search report and search opinion dated Jun. 30, 2017 for EP Application No. 15874386.4.
European search report and search opinion dated Jun. 30, 2017 for EP Application No. 15874404.5.
European search report and search opinion dated Jun. 30, 2017 for EP Application No. 15874405.2.
European search report and search opinion dated Jun. 30, 2017 for EP Application No. 15874408.6.
European search report and search opinion dated Jun. 30, 2017 for EP Application No. EP15871320.6.
European search report and search opinion dated Jul. 7, 2017 for EP Application No. 15874415.1.
European search report and search opinion dated Jul. 10, 2017 for EP Application No. 15874407.8.
European search report and search opinion dated Jul. 20, 2017 for EP Application No. 15874406.
Menezes, et al. Chapter 10: Identification and Entity Authentication ED—Menezes A J; Van Oorschot P C; Vanstone S A, Handbook of Applied Cryptography; [CRC Press Series on Discrete Mathematices and Its Applications], CRC Press, Boca Raton, FL, US, pp. 385-424.
Notice of allowance dated Jan. 18, 2017 for U.S. Appl. No. 14/942,925.
Notice of allowance dated Apr. 24, 2017 for U.S. Appl. No. 14/942,925.
Notice of allowance dated May 19, 2017 for U.S. Appl. No. 15/215,515.
Notice of allowance dated Jun. 8, 2017 for U.S. Appl. No. 15/215,515.

(56) References Cited

OTHER PUBLICATIONS

Notice of allowance dated Jun. 14, 2017 for U.S. Appl. No. 14/942,925.
Notice of allowance dated Jun. 30, 2017 for U.S. Appl. No. 14/942,994.

* cited by examiner

| COMMUNICATION | only receive signal from UAV | only send signal to UAV | both send and receive signal |
|---|---|---|---|
| online (e.g., connected to authentication center) | indirect (signal to UAV) | direct | direct indirect |
| offline (e.g., not connected to authentication center) | indirect (record presence of UAV) | direct | direct indirect |

FIG. 39

AUTHENTICATION SYSTEMS AND METHODS FOR GENERATING FLIGHT REGULATIONS

CROSS-REFERENCE

This application is a continuation application of International Application No. PCT/CN2015/075626, filed on Mar. 31, 2015, the content of which is hereby incorporated by reference in its entirety.

BACKGROUND OF THE INVENTION

Unmanned vehicles, such as unmanned aerial vehicles (UAVs) have been developed for use in a variety of fields, including consumer and industry applications. For instance, UAVs may be flown for recreation, photography/videography, surveillance, delivery, or other applications.

UAVs have expanded a dimension of individuals' lives. However, as the use of UAVs has become more prevalent, safety issues and challenges arise. For instance, when flight of UAVs is unrestricted, UAVs may fly over areas where flight is or ought to be prohibited. This may occur intentionally or unintentionally. In some instances, novice users may lose control of UAVs or be unfamiliar with flight aviation rules. Risks also exist for potential hijacking or hacking of UAV control.

SUMMARY OF THE INVENTION

Safety systems and methods described herein improve flight safety of unmanned aerial vehicles (UAVs). Flight control and authentication systems and methods may be provided which may aid in tracking UAV usage. The systems may uniquely identify various parties that are interacting (e.g., users, remote controllers, UAVs, geo-fencing devices). In some instances, an authentication process may occur and only authorized parties may be permitted to operate the UAV. Flight regulations may be imposed on UAV operation, and may override user manual controls. In some instances, geo-fencing devices may be used to provide information regarding flight regulations or help with the flight regulation process.

An aspect of the invention is directed to a system for controlling an unmanned aerial vehicle (UAV), said system comprising: a first communication module; and one or more processors operably coupled to the first communication module and configured to individually or collectively: receive a user identifier indicative of a user type using the first communication module or a second communication module; generate a set of flight regulations for the UAV based on the user identifier; and transmit the set of flight regulations to the UAV using the first communication module or the second communication module.

Additionally, aspects of the invention may provide a method for controlling an unmanned aerial vehicle (UAV), said method comprising: receiving a user identifier indicative of a user type; generating, with aid of one or more processors, a set of a flight regulations for the UAV based on the user identifier; and transmitting, with aid of a communication module, the set of flight regulations to the UAV.

A non-transitory computer readable medium containing program instructions for controlling an unmanned aerial vehicle (UAV) may be provided in accordance with aspects of the invention, said computer readable medium comprising: program instructions for receiving a user identifier indicative of a user type; program instructions for generating a set of a flight regulations for the UAV based on the user identifier; and program instructions for generating a signal to transmit, with aid of a communication module, the set of flight regulations to the UAV.

Furthermore, aspects of the invention may be directed to an unmanned aerial vehicle (UAV). The UAV may comprise: one or more propulsion units that effect flight of the UAV; a communication module configured to receive one or more flight commands from a remote user; and a flight control unit configured to generate flight control signals that are delivered to the one or more propulsion units, wherein the flight control signals are generated in accordance with a set of flight regulations for the UAV, wherein the flight regulations are generated based on a user identifier indicative of user type of the remote user.

Aspects of the invention may also comprise a system for controlling an unmanned aerial vehicle (UAV), said system comprising: a first communication module; and one or more processors operably coupled to the first communication module and configured to individually or collectively: receive a UAV identifier indicative of a UAV type using the first communication module or a second communication module; generate a set of flight regulations for the UAV based on the UAV identifier; and transmit the set of flight regulations to the UAV using the first communication module or a second communication module.

A method for controlling an unmanned aerial vehicle (UAV) may be provided in accordance with further aspects of the invention, said method comprising: receiving a UAV identifier indicative of a UAV type; generating, with aid of one or more processors, a set of a flight regulations for the UAV based on the UAV identifier; and transmitting, with aid of a communication module, the set of flight regulations to the UAV.

Moreover, aspects of the invention may be directed to a non-transitory computer readable medium containing program instructions for controlling an unmanned aerial vehicle (UAV), said computer readable medium comprising: program instructions for receiving a UAV identifier indicative of a UAV type; program instructions for generating a set of a flight regulations for the UAV based on the UAV identifier; and program instructions for generating a signal to transmit, with aid of a communication module, the set of flight regulations to the UAV.

An aspect of the invention may be directed to an unmanned aerial vehicle (UAV) comprising: one or more propulsion units that effect flight of the UAV; a communication module configured to receive one or more flight commands from a remote user; and a flight control unit configured to generate flight control signals that are delivered to the one or more propulsion units, wherein the flight control signals are generated in accordance with a set of flight regulations for the UAV, wherein the flight regulations are generated based on a UAV identifier indicative of UAV type of the remote user.

Further aspects of the invention may be directed to an unmanned aerial vehicle (UAV), comprising: a flight control unit configured to control operation of the UAV; and an identification module integrated into said flight control unit, wherein the identification module uniquely identifies the UAV from other UAVs.

Additionally, aspects of the invention may provide a method of identifying an unmanned aerial vehicle (UAV), said method comprising: controlling operation of the UAV using a flight control unit; and uniquely identifying the UAV from other UAVs using an identification module integrated into said flight control unit.

In accordance with some aspects of the invention an unmanned aerial vehicle (UAV), may comprise: a flight control unit configured to control operation of the UAV, wherein the flight control unit comprises an identification module and a chip, wherein the identification module is configured to (1) uniquely identify the UAV from other UAVs, (2) comprise an initial record of the chip, and (3) gather information about the chip subsequent to comprising the initial record of the chip, wherein the identification module is configured to undergo a self-examination procedure that compares the gathered information about the chip with the initial record of the chip, and wherein the identification module is configured to provide an alert when the gathered information about the chip is inconsistent with the initial record of the chip.

Aspects of the invention may also be directed to a method of identifying an unmanned aerial vehicle (UAV), said method comprising: controlling operation of the UAV using a flight control unit, wherein the flight control unit comprises an identification module and a chip; uniquely identifying the UAV from other UAVs using the identification module, wherein the identification module comprises an initial record of the chip; gathering information about the chip subsequent to comprising the initial record of the chip; comparing, using the identification module, the gathered information about the chip with the initial record of the chip, thereby undergoing a self-examination procedure; and providing an alert when the gathered information about the chip is inconsistent with the initial record of the chip.

An unmanned aerial vehicle (UAV) payload control system may be provided in accordance with further aspects of the invention. The system may comprise: a first communication module; and one or more processors operably coupled to the first communication module and configured to individually or collectively: receive a signal indicative of a location-dependent payload usage parameter using the first communication module or a second communication module; and generate one or more UAV operation signals that effects operation of a payload in compliance with the payload usage parameter.

Furthermore, aspects of the invention may be directed to a method for constraining payload usage for an unmanned aerial vehicle (UAV), said method comprising: receiving a signal indicative of a location-dependent payload usage parameter; and generating, with aid of one or more processors, one or more UAV operation signals that effects operation of a payload in compliance with the payload usage parameter.

Additional aspects of the invention may provide a non-transitory computer readable medium containing program instructions for constraining payload usage for an unmanned aerial vehicle (UAV), said computer readable medium comprising: program instructions receiving a signal indicative of a location-dependent payload usage parameter; and program instructions for generating one or more UAV operation signals that effects operation of a payload in compliance with the payload usage parameter.

An unmanned aerial vehicle (UAV) may be provided in accordance with an aspect of the invention, said UAV comprising: a payload; a communication module configured to receive one or more payload commands from a remote user; and a flight control unit configured to generate payload control signals that are delivered to the payload or a carrier supporting the payload, wherein the payload control signals are generated in accordance with one or more UAV operation signals, wherein the UAV operation signals are generated based on a location-dependent payload usage parameter.

Aspects of the invention may be directed to an unmanned aerial vehicle (UAV) communication control system, comprising: a first communication module; and one or more processors operably coupled to the first communication module and configured to individually or collectively: receive a signal indicative of a location-dependent communication usage parameter using the first communication module or a second communication module; and generate one or more UAV operation signal that effects operation of a UAV communication unit in compliance with the communication usage parameter.

Moreover, aspects of the invention may comprise a method for constraining wireless communication for an unmanned aerial vehicle (UAV), said method comprising: receiving a signal indicative of a location-dependent communication usage parameter; and generating, with aid of one or more processors, one or more UAV operation signals that effects operation of a communication unit in compliance with the communication usage parameter.

A non-transitory computer readable medium containing program instructions for constraining wireless communication for an unmanned aerial vehicle (UAV) may be provided in accordance with additional aspects of the invention, said computer readable medium comprising: program instructions receiving a signal indicative of a location-dependent communication usage parameter; and program instructions for generating one or more UAV operation signals that effects operation of a communication unit in compliance with the communication usage parameter.

Aspects of the invention may also be directed to an unmanned aerial vehicle (UAV) comprising: a communication unit configured to receive or transmit wireless communications; and a flight control unit configured to generate communication control signals that are delivered to the communication unit to effect operation of the communication unit, wherein the communication control signals are generated in accordance with one or more UAV operation signals, wherein the UAV operation signals are generated based on a location-dependent communication usage parameter.

Further aspects of the invention may be directed to a method of operating an unmanned aerial vehicle (UAV), said method comprising: receiving a UAV identifier that uniquely identifies the UAV from other UAVs; receiving a user identifier that uniquely identifies the user from other users; assessing, with aid of one or more processors, whether the user identified by the user identifier is authorized to operate the UAV identified by the UAV identifier; and permitting operation of the UAV by the user when the user is authorized to operate the UAV.

In accordance with aspects of the invention, a non-transitory computer readable medium containing program instructions for operating an unmanned aerial vehicle (UAV) may be provided. The non-transitory computer readable medium may comprise: program instructions for receiving a UAV identifier that uniquely identifies the UAV from other UAVs; program instructions for receiving a user identifier that uniquely identifies the user from other users; program instructions for assessing whether the user identified by the user identifier is authorized to operate the UAV identified by the UAV identifier; and program instructions for permitting operation of the UAV by the user when the user is authorized to operate the UAV.

An aspect of the invention may provide an unmanned aerial vehicle (UAV) authorization system, comprising: one or more processors configured to individually or collectively: receive a UAV identifier that uniquely identifies the UAV from other UAVs; receive a user identifier that uniquely identifies the user from other users; assess whether the user identified by the user identifier is authorized to operate the UAV identified by the UAV identifier; and transmit a signal to permit operation of the UAV by the user when the user is authorized to operate the UAV.

Furthermore, aspects of the invention may be directed to a method of operating an unmanned aerial vehicle (UAV), said method comprising: authenticating an identity of a UAV, wherein the identity of the UAV is uniquely distinguishable from other UAVs; authenticating an identity of a user, wherein the identity of the user is uniquely distinguishable from other users; assessing, with aid of one or more processors, whether the user is authorized to operate the UAV; and permitting operation of the UAV by the user when the user is authorized to operate the UAV, and both the UAV and the user are authenticated.

Additionally, a non-transitory computer readable medium containing program instructions for operating an unmanned aerial vehicle (UAV) may be provided in accordance with aspects of the invention, said computer readable medium comprising: program instructions for authenticating an identity of a UAV, wherein the identity of the UAV is uniquely distinguishable from other UAVs; program instructions for authenticating an identity of a user, wherein the identity of the user is uniquely distinguishable from other users; program instructions for assessing, with aid of one or more processors, whether the user is authorized to operate the UAV; and program instructions for permitting operation of the UAV by the user when the user is authorized to operate the UAV, and both the UAV and the user are authenticated.

An aspect of the invention may also be directed to an unmanned aerial vehicle (UAV) authentication system, comprising: one or more processors configured to individually or collectively: authenticate an identity of a UAV, wherein the identity of the UAV is uniquely distinguishable from other UAVs; authenticate an identity of a user, wherein the identity of the user is uniquely distinguishable from other users; assess whether the user is authorized to operate the UAV; and transmit a signal to permit operation of the UAV by the user when the user is authorized to operate the UAV, and both the UAV and the user are authenticated.

Moreover, aspects of the invention may be directed to a method of determining a level of authentication for operation of an unmanned aerial vehicle (UAV), said method comprising: receiving contextual information regarding the UAV; assessing, using one or more processors, a degree of authentication of the UAV or a user of the UAV based on the contextual information; effecting authentication of the UAV or the user in accordance with the degree of authentication; and permitting operation of the UAV by the user when the degree of authentication is completed.

A non-transitory computer readable medium containing program instructions for determining a level of authentication for operating an unmanned aerial vehicle (UAV) may be provided in accordance with aspects of the invention, said computer readable medium comprising: program instructions for receiving contextual information regarding the UAV; program instructions for assessing a degree of authentication of the UAV or a user of the UAV based on the contextual information; program instructions for effecting authentication of the UAV or the user in accordance with the degree of authentication; and program instructions for providing a signal that permits operation of the UAV by the user when the degree of authentication is completed.

Additionally, aspects of the invention may be directed to an unmanned aerial vehicle (UAV) authentication system, comprising: one or more processors configured to individually or collectively: receive contextual information regarding the UAV; assess a degree of authentication of the UAV or a user of the UAV based on the contextual information; and effect authentication of the UAV or the user in accordance with the degree of authentication.

In accordance with aspects of the invention, a method of determining a level of flight regulation for operation of an unmanned aerial vehicle (UAV) may be provided, said method comprising: assessing, using one or more processors, a degree of authentication of the UAV or a user of the UAV; effecting authentication of the UAV or the user in accordance with the degree of authentication; generating a set of flight regulations based on the degree of authentication; and effecting operation of the UAV in accordance with the set of flight regulations.

Further aspects of the invention may be directed to a non-transitory computer readable medium containing program instructions for determining a level of flight regulation for an unmanned aerial vehicle (UAV), said computer readable medium comprising: program instructions for assessing a degree of authentication of the UAV or a user of the UAV; program instructions for effecting authentication of the UAV or the user in accordance with the degree of authentication; program instructions for generating a set of flight regulations based on the degree of authentication; and program instructions for providing a signal that permits operation of the UAV in accordance with the set of flight regulations.

Additionally, aspects of the invention may provide an unmanned aerial vehicle (UAV) authentication system, comprising: one or more processors configured to individually or collectively: assess a degree of authentication of the UAV or a user of the UAV; effect authentication of the UAV or the user in accordance with the degree of authentication; and generate a set of flight regulations based on the degree of authentication.

A method of alerting a user when operation of an unmanned aerial vehicle (UAV) is compromised may be provided in accordance with an aspect of the invention. Said method may comprise: authenticating a user to effect operation of the UAV; receiving one or more commands from a remote controller that receives user inputs to effect the operation of UAV; detecting an unauthorized communication that interferes with the one or more commands from the user; and alerting the user, via the remote controller, about the unauthorized communication.

Aspects of the invention may also comprise non-transitory computer readable medium containing program instructions for alerting a user when operation of an unmanned aerial vehicle (UAV) is compromised, said computer readable medium comprising: program instructions for authenticating a user to effect operation of the UAV; program instructions for receiving one or more commands from a remote controller that receives user inputs to effect the operation of UAV; and program instructions for generating an alert to be provided to the user, via the remote controller, about a detected unauthorized communication that interferes with the one or more commands from the user.

Furthermore, an aspect of the invention may be directed to an unmanned aerial vehicle (UAV) alert system, comprising: one or more processors configured to individually or collectively: authenticate a user to effect operation of the UAV; receive one or more commands from a remote controller that receives user inputs to effect the operation of UAV; detect an unauthorized communication that interferes with the one or more commands from the user; and generate a signal to alert the user, via the remote controller, about the unauthorized communication.

A method of detecting flight deviations of an unmanned aerial vehicle (UAV) may be provided in accordance with additional aspects of the invention, said method comprising: receiving one or more flight commands provided by a user from a remote controller; calculating, with aid of one or more processors, a predicted location of the UAV based on the one or more flight commands; detecting an actual location of the UAV with aid of one or more sensors; comparing the predicted location with the actual location to determine deviations in UAV behavior; and providing an indication of a risk that the UAV is not operating in accordance with the one or more flight commands based on the deviations in UAV behavior.

In accordance with some aspects of the invention, a non-transitory computer readable medium containing program instructions for detecting flight deviations of an unmanned aerial vehicle (UAV) may be provided, said computer readable medium comprising: program instructions for calculating a predicted location of the UAV based on one or more flight commands provided by a user from a remote controller; program instructions for detecting an actual location of the UAV with aid of one or more sensors; program instructions for comparing the predicted location with the actual location to determine deviations in UAV behavior; and program instructions for providing an indication of a risk that the UAV is not operating in accordance with the one or more flight commands based on the deviations in UAV behavior.

An aspect of the invention may be directed to an unmanned aerial vehicle (UAV) flight deviation detection system, comprising: one or more processors configured to individually or collectively: receive one or more flight commands provided by a user from a remote controller; calculate a predicted location of the UAV based on the one or more flight commands; detect an actual location of the UAV with aid of one or more sensors; compare the predicted location with the actual location to determine deviations in UAV behavior; and generate a signal to provide an indication of a risk that the UAV is not operating in accordance with the one or more flight commands based on the deviations in UAV behavior.

Moreover, an aspect of the invention may be directed to a method of recording unmanned aerial vehicle (UAV) behavior, said method comprising: receiving a UAV identifier that uniquely identifies the UAV from other UAVs; receiving a user identifier that uniquely identifies the user from other users, wherein the user provides one or more commands to effect operation of the UAV via a remote controller; and recording, in one or more memory storage units, the one or more commands, the user identifier associated with the one or more commands, and the UAV identifier associated with the one or more commands.

A non-transitory computer readable medium containing program instructions for recording unmanned aerial vehicle (UAV) behavior may be provided in accordance with aspects of the invention, said computer readable medium comprising: program instructions for associating a user identifier with one or more commands from a user, wherein the user identifier that uniquely identifies the user from other users, and wherein the user provides one or more commands to effect operation of the UAV via a remote controller; program instructions for associating a UAV identifier with the one or more commands, wherein the UAV identifier uniquely identifies the UAV from other UAVs; and program instructions for recording, in one or more memory storage units, the one or more commands, the user identifier associated with the one or more commands, and the UAV identifier associated with the one or more commands.

Aspects of the invention may comprise an unmanned aerial vehicle (UAV) behavior recordation system, comprising: one or more memory storage units; and one or more processors operably coupled to the one or more memory storage units and configured to individually or collectively: receive a UAV identifier that uniquely identifies the UAV from other UAVs; receive a user identifier that uniquely identifies the user from other users, wherein the user provides one or more commands to effect operation of the UAV via a remote controller; and record, in the one or more memory storage units, the one or more commands, the user identifier associated with the one or more commands, and the UAV identifier associated with the one or more commands.

In accordance with aspects of the invention, a system for operating an unmanned aerial vehicle (UAV) may be provided, said system comprising: an identification registration database configured to store one or more UAV identifiers that uniquely identify UAVs with respect to one another, and one or more user identifiers that uniquely identify users with respect to one another; an authentication center configured to authenticate an identity of a UAV and an identity of a user; and an air control system configured to receive a UAV identifier for the authenticated UAV and a user identifier for the authenticated user and provide a set of flight regulations based on at least one of: the authenticated UAV identifier and the authenticated user identifier.

Further aspects of the invention may provide a method of determining a location of an unmanned aerial vehicle (UAV), said method comprising: receiving, at a plurality of recorders, one or more messages from the UAV; time-stamping, at the plurality of recorders, the one or more messages from the UAV; and calculating, with aid of one or more processors, the location of the UAV based on the time-stamping of the one or more messages.

In some aspects of the invention, a non-transitory computer readable medium containing program instructions for determining a location of an unmanned aerial vehicle (UAV) may be provided, said computer readable medium comprising: program instructions for receiving, at a plurality of recorders, one or more messages from the UAV; program instructions for time-stamping, at the plurality of recorders, the one or more messages from the UAV; and program instructions for calculating the location of the UAV based on the time-stamping of the one or more messages.

An unmanned aerial vehicle (UAV) communication location system in accordance with further aspects of the invention, said system comprising: a communication module; and one or more processors operably coupled to the communication module and configured to, individually or collectively, calculate a location of the UAV based on time-stamps of one or more messages sent from the UAV and received at a plurality of recorders remote to the UAV.

A method of authenticating an unmanned aerial vehicle (UAV) may be provided in accordance with aspects of the invention, said method comprising: receiving an authentication request from a UAV, wherein the authentication request comprises a UAV identifier; retrieving information that corresponds to the UAV identifier; generating authentication vectors based on the retrieved information, wherein the authentication vectors comprise at least an authentication token; transmitting the authentication token and a key evaluation reference to the UAV, wherein the UAV authenticates the authentication vector based on a message authentication code generated based on the authentication token, the key evaluation reference, and a key encoded on the UAV; receiving a response from the UAV, wherein the response is based on the key evaluation reference and the key encoded on the UAV; and verifying the authentication request based on the response received from the UAV.

Additional aspects of the invention may provide a system of authenticating an unmanned aerial vehicle (UAV), said system comprising: an authentication module; a communication module; and one or more processors operably coupled to the authentication module and the communication module and configured to individually or collectively: receive an authentication request from a UAV, wherein the authentication request comprises a UAV identifier; retrieve information that corresponds to the UAV identifier; generate authentication vectors based on the retrieved information, wherein the authentication vectors comprise at least an authentication token; transmit the authentication token and a key evaluation reference to the UAV, wherein the UAV authenticates the authentication vector based on a message authentication code generated based on the authentication token, the key evaluation reference, and a key encoded on the UAV; receive a response from the UAV, wherein the response is based on the key evaluation reference and the key encoded on the UAV; and verify the authentication request based on the response received from the UAV.

Furthermore, aspects of the invention may be directed to a non-transitory computer readable medium containing program instructions for authenticating an unmanned aerial vehicle (UAV), said computer readable medium comprising: program instructions for receiving an authentication request from a UAV, wherein the authentication request comprises a UAV identifier; program instructions for retrieving information that corresponds to the UAV identifier; program instructions for generating authentication vectors based on the retrieved information, wherein the authentication vectors comprise at least an authentication token; program instructions for transmitting the authentication token and a key evaluation reference to the UAV, wherein the UAV authenticates the authentication vector based on a message authentication code generated based on the authentication token, the key evaluation reference, and a key encoded on the UAV; program instructions for receiving a response from the UAV, wherein the response is based on the key evaluation reference and the key encoded on the UAV; and program instructions for verifying the authentication request based on the response received from the UAV.

In accordance with some aspects of the invention, a method of authenticating an authentication center may be provided, said method comprising: providing an authentication request from a UAV to an authentication center, wherein the authentication request comprises a UAV identifier; receiving authentication vectors from the authentication center, wherein the authentication vectors comprise an authentication token and a key evaluation reference, and wherein the authentication token is generated based on retrieved information that corresponds to the UAV identifier; calculating an authentication sequence number based on the authentication token; generating an authentication key based on the key evaluation reference and a key encoded on the UAV; determining a message authentication code based on the authentication token, the authentication sequence number, and the authentication key; and authenticating the authentication center based on at least one of the authentication sequence number and the message authentication code determined from the authentication vectors received from the authentication center.

A system of authenticating an authentication center may be provided in accordance with aspects of the invention, said system comprising: an authentication module; a communication module; and one or more processors operably coupled to the authentication module and the communication module and configured to individually or collectively: provide an authentication request from a UAV to an authentication center, wherein the authentication request comprises a UAV identifier; receive authentication vectors from the authentication center, wherein the authentication vectors comprise an authentication token and a key evaluation reference, and wherein the authentication token is generated based on retrieved information that corresponds to the UAV identifier; calculate an authentication sequence number based on the authentication token; generate an authentication key based on the key evaluation reference and a key encoded on the UAV; determine a message authentication code based on the authentication token, the authentication sequence number, and the authentication key; and authenticate the authentication center based on at least one of the authentication sequence number and the message authentication code determined from the authentication vectors received from the authentication center.

Aspects of the invention may also be directed to a non-transitory computer readable medium containing program instructions for authenticating an authentication center, said computer readable medium comprising: program instructions for providing an authentication request from a UAV to an authentication center, wherein the authentication request comprises a UAV identifier; program instructions for receiving authentication vectors from the authentication center, wherein the authentication vectors comprise an authentication token and a key evaluation reference, and wherein the authentication token is generated based on retrieved information that corresponds to the UAV identifier; program instructions for calculating an authentication sequence number based on the authentication token; program instructions for generating an authentication key based on the key evaluation reference and a key encoded on the UAV; program instructions for determining a message authentication code based on the authentication token, the authentication sequence number, and the authentication key; and program instructions for authenticating the authentication center based on at least one of the authentication sequence number and the message authentication code determined from the authentication vectors received from the authentication center.

Furthermore, aspects of the invention may be directed to a method of alerting a user when operation of an unmanned aerial vehicle (UAV) is compromised, said method comprising: authenticating a user to effect operation of the UAV; receiving one or more commands from a remote controller that receives user inputs to effect the operation of UAV; detecting an unauthorized communication that interferes with the one or more commands from the user; and causing the UAV to fly to a predetermined home point while ignoring the unauthorized communication, in response to the detection of the unauthorized communication.

A non-transitory computer readable medium containing program instructions for alerting a user when operation of an unmanned aerial vehicle (UAV) is compromised may be provided in accordance with aspects of the invention, said computer readable medium comprising: program instructions for authenticating a user to effect operation of the UAV;

program instructions for receiving one or more commands from a remote controller that receives user inputs to effect the operation of UAV; and program instructions for causing the UAV to fly to a predetermined home point while ignoring the unauthorized communication, in response to the detection of the unauthorized communication.

In accordance with further aspects of the invention, an unmanned aerial vehicle (UAV) alert system may be provided, comprising: one or more processors configured to individually or collectively: authenticate a user to effect operation of the UAV; receive one or more commands from a remote controller that receives user inputs to effect the operation of UAV; detect an unauthorized communication that interferes with the one or more commands from the user; and cause the UAV to fly to a predetermined home point while ignoring the unauthorized communication, in response to the detection of the unauthorized communication.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 39 shows different types of communications between UAVs and geo-fencing devices, in accordance with an embodiment of the invention.

DETAILED DESCRIPTION OF THE INVENTION

Figure 1:
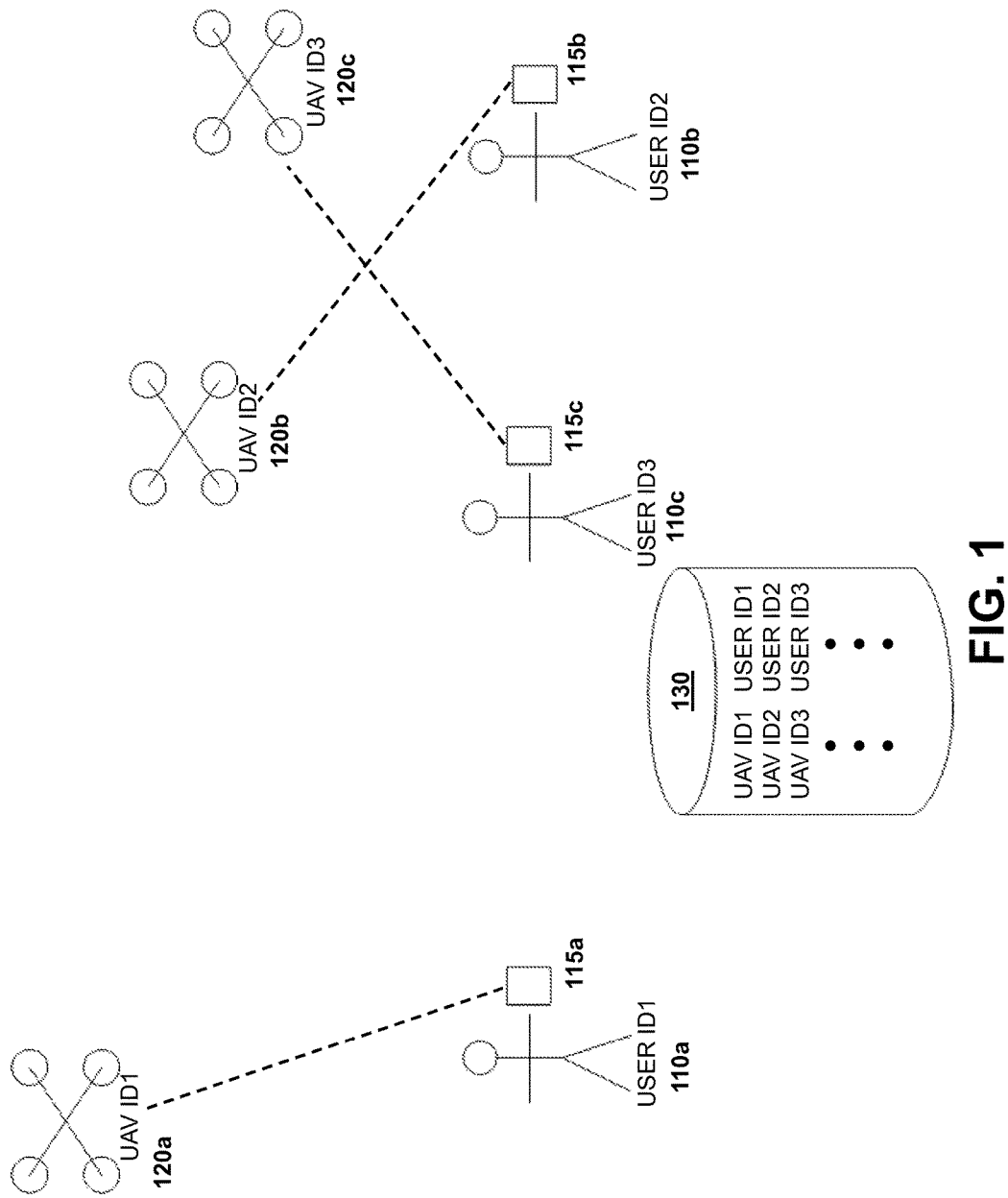
FIG. 1 shows an example of interactions between one or more users and one or more UAVs in accordance with an embodiment of the invention.

Unmanned vehicles, such as unmanned aerial vehicles (UAVs) may be operated in accordance with a safety system for improving flight safety the unmanned vehicles. Any description herein of UAVs may apply to any type of unmanned vehicle (e.g., air-based vehicles, land-based vehicles, water-based vehicles, or space-based vehicles). Flight control and authentication systems and methods may be provided which may aid in monitoring and controlling UAV usage. The systems may uniquely identify various parties that are interacting (e.g., users, remote controllers, UAVs, geo-fencing devices). In some instances, an authentication process may occur and only authorized parties may be permitted to operate the UAV. Flight regulations may be imposed on UAV operation, and may override user manual controls. Geo-fencing devices may be used to provide information regarding flight regulations or help with the flight regulation process. Geo-fencing devices may provide a physical reference for one or more geo-fencing boundaries which may be associated with a corresponding set of flight regulations.

Flight safety challenges during use of UAVs may arise in a number of different forms. For example, traditionally, the flight of UAVs is not restricted (e.g., UAVs may fly over somewhere it should be prohibited). For instance, UAVs may fly to sensitive areas without authorization, (e.g., airport, military base). Furthermore, UAVs may fly into the course of other aircrafts without authorization. UAVs may fly to the territory of enterprise or individual without authorization, causing noise pollution, personal injury and property damage. In some instances, UAVs may fly to a public area without authorization, and may cause personal injury and property damage. Systems and methods provided herein may provide a set of flight regulations which may impose the necessary restrictions on the UAVs, which may be geographically based, temporal based, and/or activity based. A UAV may automatically comply with the flight regulations without requiring input from a user. In some instances, controls may be generated for the UAV based on flight regulations that may override manual input from a user.

Flight of UAVs may be controlled by a user with aid of one or more remote controllers. In some instances, there is a potential risk of the flight being hijacked. A hijacker may interfere with instructions to the UAV from the authorized user. If a UAV receives and accepts counterfeit instructions, it may perform an uncontrolled task and bring adverse consequences. Systems and methods provided herein may identify when hijacking is occurring. The systems and methods may alert a user when the hijacking occurs. The systems and methods may also cause the UAV to take an action in response to the detected hijacking, and may override the hijacker controls.

UAVs may carry various sensors onboard which may be used to acquire data. Hackers may attempt to steal the acquired data. For instance, the data of UAVs may be intercepted, or the data transmitted to ground though remote wireless link may be monitored. Systems and methods provided herein may provide encryption and authentication so that only authorized users can receive the data.

In another example of UAV flight safety challenges, UAVs may be misused. Traditionally, there are no warning measures, identifying measures or stopping measures for violations, particularly when UAV operators are intentionally misusing the UAVs. For example, UAVs may be used for illegal advertisements, unauthorized attack, or invading privacy (e.g., unauthorized candid photography). Systems and methods provided herein may monitor usage, which may aid in identifying when misuse of a UAV is occurring. The data may also be used to forensically track the parties involved in the misuse or any related data. Systems and methods may also be provided that may warn a user or other entity when misuse is occurring and/or override any controls that enable misuse.

While in operation, UAVs may be wirelessly transmitting or receiving data. In some instances, UAVs may misuse wireless resources and/or aerial resources, which may result in a waste of public resource. For instance, UAVs may interfere with authorized communications, or steal bandwidth from other communications. The systems and methods provided herein may identify when such activities occur, and may provide an alert or prevent such interference from occurring.

Generally, a challenge exists in supervising operation of UAVs. As UAVs of different types become more common-place for different types of usage, there traditionally is not an authorization system for UAV's flight. It is difficult to differentiate abnormal flight from normal flight; to detect small scale UAVs; to visually detect UAVs in night flight; to track and punish anonymous flight; and/or to associate a flight of UAV with its user or owner in an undeniable way. Systems and methods described herein may perform one or more of these objectives. Identification data may be collected and authentication may occur of one or more identifiers. While traditionally it may be difficult to provide safe control to lack of one or more of the following: safe channel between supervisor and owners or users of UAVs, direct warning or alerting mechanism, legal mechanism for a supervisor to take control over, mechanism for UAV to differentiate supervisors from hijackers, and measures to forcibly stop illegal behavior of UAVs, systems and methods provided herein may provide one or more of these functions.

Similarly, a need exists for evaluation or rating mechanism for UAV's performance, capacity and permission. A further need exists for evaluation or examination mechanism for a UAV user's operation skills and records. Systems and methods provided herein may advantageously provide such types of evaluation. Optionally flight regulations may be generated and implemented in accordance with the evaluation.

As described, traditional UAV systems do not have a security mechanism on fight safety for UAVs. For instance, there is no warning mechanism for flight safety; no information sharing mechanism for flight environment; or emergency rescue mechanism. Flight safety systems and methods described may perform one or more of the aforementioned functions.

System Overview

FIG. 1 shows an example of interactions between one or more users 110a, 110b, 110c and one or more UAVs 120a, 120b, 120c. A user may interact with a UAV with aid of a remote controller 115a, 115b, 115c. An authentication system may include memory storage 130 that may store information about the users, remote controllers, and/or the UAVs.

A user 110a, 110b, 110c may be an individual associated with a UAV. The user may be an operator of the UAV. The user may be an individual that is authorized to operate the UAV. The user may provide input to control the UAV. A user may provide input to control the UAV with a remote controller 115a, 115b, 115c. A user may provide user input that controls flight of the UAV, operation of a payload of a UAV, a state of a payload relative to the UAV, operation of one or more sensors of the UAV, operation of UAV communication, or other functions of the UAV. The user may receive data from the UAV. Data acquired using one or more sensors of the UAV may be provided to the user, optionally via the remote controller. The user may be an owner of the UAV. The user may be a registered owner of the UAV. A user may be registered as being authorized to operate the UAV. The user may be a human operator. The user may be an adult or a child. The user may or may not have line-of-sight with the UAV while operating the UAV. The user may directly communicate with the UAV using the remote controller. Alternatively, the user may indirectly communicate with the UAV (optionally, using the remote controller) over a network.

A user may have a user identifier (e.g., USER ID1, USER ID2, USER ID3, . . . ) that identifies the user. The user identifier may be unique to the user. Other users may have different identifiers from user. A user identifier may uniquely differentiate and/or distinguish the user from other individuals. Each user may only be assigned a single user identifier. Alternatively, a user may be able to register multiple user identifiers. In some instances, a single user identifier may be assigned to only a single user. Alternatively, a single user identifier may be shared by multiple users. In preferable embodiments a one-to-one correspondence may be provided between a user and a corresponding user identifier.

Optionally, a user may be authenticated as being an authorized user for the user identifier. An authentication process may include a verification of the user's identity. Examples of authentication processes are described in greater detail elsewhere herein.

The UAV 120a, 120b, 120c may be operable when powered on. The UAV may be in flight, or may be in a landed state. The UAV may collect data using one or more sensors (optionally, the payload may be a sensor). The UAV may operate in response to controls from the user (e.g., manually through a remote controller), autonomously (e.g., without requiring user input), or semi-autonomously (e.g., may include some user input but may also include aspects that do not rely on user input). The UAV may be capable of responding to commands from a remote controller 115a, 115b, 115c. The remote controller may be not connected to the UAV, the remote controller may communicate with the UAV wirelessly from a distance. The remote controller may accept and/or detect user input. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. The UAV may switch between being operated manually, autonomously, and/or semi-autonomously. In some instances, the activities of the UAV may be governed by one or more sets of flight regulations.

The UAV can have one or more sensors. The UAV may comprise one or more vision sensors such as an image sensor. For example, an image sensor may be a monocular camera, stereo vision camera, radar, sonar, or an infrared camera. The UAV may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors.

Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Sensors may be used for surveillance of an environment or a subject of interest. Sensors may be used to recognize a target object. The target object may be distinguished from other objects in the environment.

The UAV may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms. In another example, the UAV may include one or more arms that may include one or more additional support members, which may have one, two, three or more rotors attached thereon. For example, T-bar configurations may be used to support rotors.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output may be provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV may be of small dimensions. The UAV may be capable of being lifted and/or carried by a human. The UAV may be capable of being carried by a human in one hand.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

A UAV may have a UAV identifier (e.g., UAV ID1, UAV ID2, UAV ID3, . . . ) that identifies the UAV. The UAV identifier may be unique to the UAV. Other UAVs may have different identifiers from the UAV. A UAV identifier may uniquely differentiate and/or distinguish the UAV from other UAVs. Each UAV only be assigned a single UAV identifier. Alternatively, multiple UAV identifiers may be registered for a single UAV. In some instances, a single UAV identifier may be assigned to only a single UAV. Alternatively, a single UAV identifier may be shared by multiple UAVs. In preferable embodiments a one-to-one correspondence may be provided between a UAV and a corresponding UAV identifier.

Optionally, a UAV may be authenticated as being an authorized UAV for the UAV identifier. An authentication process may include a verification of the UAV's identity. Examples of authentication processes are described in greater detail elsewhere herein.

In some embodiments, a remote controller may have a remote controller identifier that identifies the remote controller. The remote controller identifier may be unique to the remote controller. Other remote controllers may have different identifiers from the remote controller. A remote controller identifier may uniquely differentiate and/or distinguish the remote controller from other remote controllers. Each remote controller may only be assigned a single remote controller identifier. Alternatively, multiple remote controller identifiers may be registered for a single remote controller. In some instances, a single remote controller identifier may be assigned to only a single remote controller. Alternatively, a single remote controller identifier may be shared by multiple remote controllers. In preferable embodiments a one-to-one correspondence may be provided between a remote controller and a corresponding remote controller identifier. Remote controller identifiers may or may not be associated with a corresponding user identifier.

Optionally, a remote controller may be authenticated as being an authorized remote controller for the remote controller identifier. An authentication process may include a verification of the remote controller's identity. Examples of authentication processes are described in greater detail elsewhere herein.

A remote controller may be any type of device. The device may be a computer (e.g., personal computer, laptop computer, server), mobile device (e.g., smartphone, cellular phone, tablet, personal digital assistant), or any other type of device. The device may be a network device capable of communicating over a network. The device comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein. The remote controller may be handheld. The remote controller may accept inputs from a user via any user interactive mechanism. In one example, the device may have a touchscreen that may register a user input when the user touches the screen, or swipes the screen. The device may have any other type user interactive component, such as a button, mouse, joystick, trackball, touchpad, pen, inertial sensors, image capturing device, motion capture device, or microphone. The device may sense when the device is tilted, which may affect operation of the UAV. The remote controller may be a single piece configured to perform the various functions of the remote controller described elsewhere herein. Alternatively, the remote controller may be provided as multiple pieces or components that may individually or collectively perform the various functions of the remote controller as provided elsewhere herein.

An authentication system may include memory storage 130 that may store information about the users, remote controllers, and/or the UAVs. The memory storage may include one or more memory storage units. The one or more memory storage units may be provided together or may distributed over a network and/or at different locations. In some instances, the memory storage may be a cloud storage system. The memory storage may include one or more databases storing the information.

The information may include identification information about the users, remote controllers, and/or the UAVs. For example, the identification may include user identifiers (e.g., USER ID1, USER ID2, USER ID3, . . . ) and/or UAV identifiers (e.g., UAV ID1, UAV ID2, UAV ID3, . . . ). Remote controller identifiers may optionally be stored as well. The information may be stored in long-term memory storage, or may only be stored for a short period. The information may be received and buffered.

FIG. 1 shows a scenario where various users 110a, 110b, 110c may be controlling corresponding UAVs 120a, 120b, 120c. For instance, a first user 110a may control a first UAV 120a with aid of a remote controller. A second user 110b may control a second UAV 120b with aid of a remote controller. A third user 110c may control a third UAV 120c with aid of a remote controller. The users may be remote to one another. Alternatively, the users may operate the UAVs in the same region. The users may operate their corresponding UAVs at the same time, or may operate them at different times. The times of use may overlap. The users and UAVs may be individually identifiable so that instructions from each user may only be accepted by the corresponding UAV, and not accepted by other UAVs. This may reduce the likelihood of interfering signals when multiple UAVs are in operation at the same time.

Each user may control the corresponding user's UAV. The user may be pre-registered with the UAV so that only the authorized user can control the corresponding UAV. The UAV may be pre-registered so the user can only control the authorized UAV. The relationship and/or association between the user and UAV may be known. Optionally, the relationship and/or association between the UAV may be stored in memory storage 130. The user identifier may be associated with the corresponding UAV's UAV identifier.

The memory storage unit may keep track of commands from the user to the UAV. The stored commands may be associated with a corresponding user identifier of the user and/or UAV identifier of the UAV. Optionally, an identifier for a corresponding remote controller may be stored as well.

The identities of the device or parties involved in the operation of the UAV may be authenticated. For example an identity of the user may be authenticated. The user may be verified as the user associated with the user identifier. The identity of the UAV may be authenticated. The UAV may be verified as the UAV associated with the UAV identifier. The identity of the remote controller may optionally be authenticated. The remote controller may be verified as the remote controller associated with a remote controller identifier.

Figure 2:
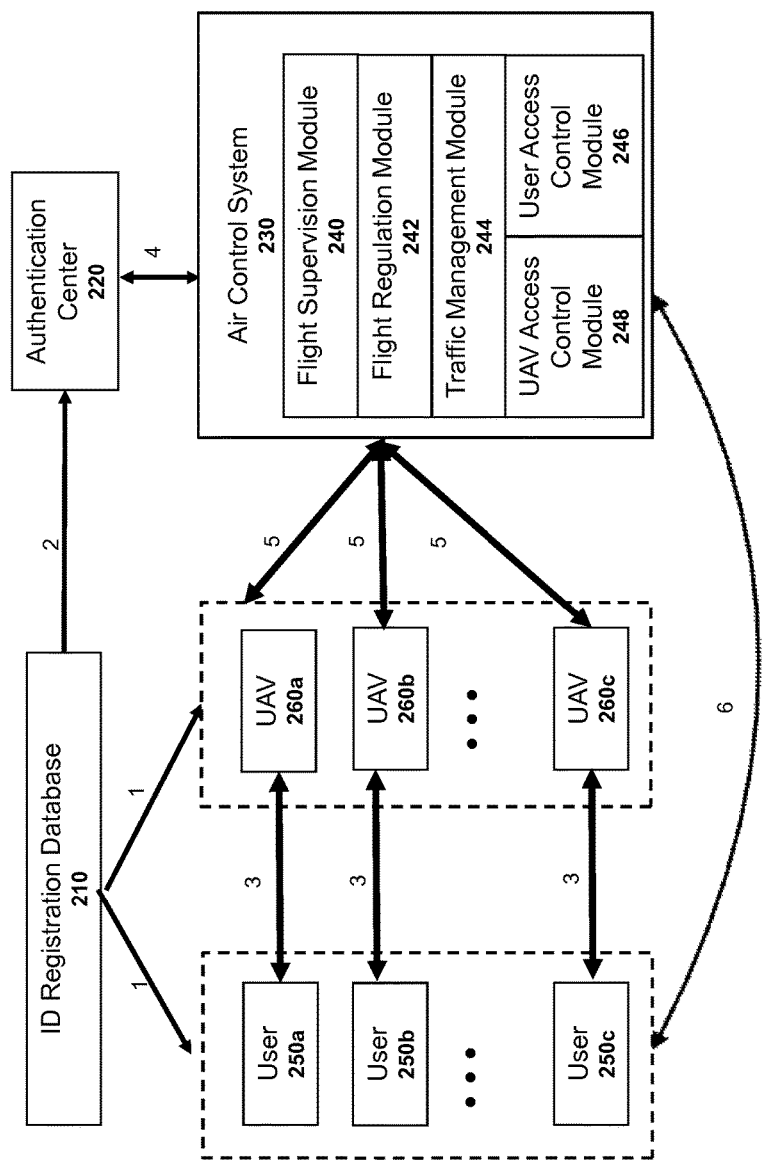
FIG. 2 shows an example of an authentication system in accordance with an embodiment of the invention.

FIG. 2 shows an example of an authentication system in accordance with an embodiment of the invention. The authentication system may be a UAV safety system or may operate as part of a UAV safety system. The authentication system may provide improved UAV safety. The authentication system may authenticate a user, a UAV, a remote controller, and/or a geo-fencing device.

The authentication system may include an identification (ID) registration database 210. The ID registration database may in communication with an authentication center 220. The authentication system may be in communication with an air control system 230 that may include a flight supervision module 240, flight regulation module 242, traffic management module 244, user access control module 246, and UAV access control module 248.

The ID registration database 210 may maintain identity information for a user 250a, 250b, 250c and a UAV 260a, 260b, 260c. The ID registration database may assign a unique identifier to each user and each UAV (Connection 1). The unique identifier may optionally be a randomly generated alphanumeric string, or any other type of identifier that may uniquely identifier a user from other users, or a UAV from other UAVs. The unique identifier may be generated by the ID registration database or may be selected from a list of possible identifiers that remain unassigned. The ID registration database may optionally assign a unique identifier for a geo-fencing device and/or remote controller, or any other device that may be involved in the UAV safety system. The identifiers may be used to authenticate the user, UAV, and/or the other device. The ID registration database may or may not interact with one or more users, or one or more UAVs.

The authentication center 220 may provide authentication of an identity of a user 250a, 250b, 250c or a UAV 260a, 260b, 260c. The authentication center may optionally authentication an identity of a geo-fencing device and/or remote controller, or any other device that may be involved in the UAV safety system. The authentication center may obtain information about the user and the UAV (and/or any other devices involved in the UAV safety system) from the ID registration database 210 (Connection 2). Further details about the authentication process are provided elsewhere herein.

An air control system 230 may interact with the authentication center 220. The air control system may obtain information, about the user and the UAV (and/or any other devices involved in the UAV safety system) from the authentication center (Connection 4). The information may include the user identifier and the UAV identifier. The information may relate to confirmation or identification of the user and/or UAV identity. The air control system may be a management cluster that may include one or more subsystems, such as a flight supervision module 240, flight regulation module 242, traffic management module 244, user access control module 246, and UAV access control module 248. The one or more subsystems may be used for flight control, air traffic control, relevant authorization, user and UAV access management, and other functions.

In one example, a flight supervision module/subsystem 240 may be used to monitor flight of UAVs within an allocated airspace. The flight supervision module may be configured to detect when one or more UAVs deviate from a predetermined course. The flight supervision module may detect when one or more UAVs perform an unauthorized action, or an action that was not inputted by the user. The flight supervision module may also detect when one or more unauthorized UAVs enter an allocated airspace. The flight supervision module may issue a warning or alert to the unauthorized UAVs. The alert may be provided to a remote controller of a user operating the unauthorized UAV. The alert may be issued in a visual manner, auditory manner, or tactile manner.

The flight supervision module may utilize data collected by one or more sensors on-board the UAV. The flight supervision module may utilize data collected by one or more sensors off-board the UAV. The data may be collected by radar, photoelectric sensors, or acoustic sensors that ma monitor UAVs or other activity within an allocated airspace. The data may be collected by one or more base stations, docks, battery stations, geo-fencing devices, or networks. The data may be collected by stationary devices. The stationary devices may or may not be configured to physically interact with the UAVs (e.g., restore energy to the UAV, accept a delivery from a UAV, or provide repairs to the UAV). The data may be provided from wired or wireless communications.

The air control system may further include a flight regulation module/subsystem 242. The flight regulation module may be configured to generate and store one or more sets of flight regulations. Air traffic management may be regulated based on a set of flight regulations. Generation of the flight regulations may include the creation of flight regulations from scratch, or may include selecting one or more sets of flight regulations from a plurality of sets of flight regulations. The generation of flight regulations may include combining selected sets of flight regulations.

A UAV may operate in accordance with one or more sets of imposed flight regulations. The flight regulations may regulate any aspect of operation of the UAV (e.g., flight, sensors, communications, payload, navigation, power usage, items carried). For instance, the flight regulations may dictate where the UAV may or may not fly. The flight regulations may dictate when the UAVs may or may not fly in particular regions. The flight regulations may dictate when data may be collected, transmitted and/or recorded by one or more sensors on-board the UAV. The flight regulations may dictate when a payload may be operational. For example, a payload may be an image capturing device, and the flight regulations may dictate when and when the image capturing device may be capturing images, transmitting the images, and/or storing the images. The flight regulations may dictate how communications may occur (e.g., channels or methods that may be used) or what types of communications may occur.

The flight regulation module may include one or more databases storing information pertaining to the flight regulations. For example the one or more databases may store one or more locations where flight of a UAV is restricted. The flight regulation module may store sets of flight regulations for multiple types of UAVs, and the sets of flight regulations may be associated with particular UAVs. It may be possible to access a set of flight regulations associated with a specific type of UAV from multiple types of UAVs.

The flight regulation module may approve or reject one or more flight plans of a UAV. In some instances, a flight plan including a proposed flight path for a UAV may be designated. The flight path may be provided in relation to the UAV and/or the environment. The flight path may be entirely defined (all points along the path are defined), semi-defined (e.g., may include one or more waypoints but the paths to get to the waypoints may be variable), or not very defined (e.g., may include an end destination or other parameter, but the path to get there may not be defined). The flight regulation module may receive the flight plans and may approve or reject the flight plans. The flight regulation module may reject the flight plans if they are in contradiction to a set of flight regulations for the UAV. The flight regulation module may suggest modifications to the flight plans that may put them in compliance with the set of flight regulations. The flight regulation module may generate or suggest a set of flight plans for the UAV that may comply with the set of flight regulations. A user may enter one or more parameters or goals for a UAV mission, and the flight regulation modules may generate or suggest a set of flight plans that may meet the one or more parameters while complying with the set of flight regulations. Examples of parameters or goals for a UAV mission may include a destination, one or more waypoints, timing requirements (e.g., overall time limit, time to be at certain locations), maximum speeds, maximum accelerations, type of data to be collected, type of image to be captured, any other parameter or goal.

A traffic management module/subsystem 244 may be provided for the air control system. The traffic management module may be configured to receive a request for a resource from a user. Examples of resources may include, but are not limited to, wireless resources (e.g., bandwidth, access to communication devices), locations or space (e.g., for a flight plan), time (e.g., for a flight plan), access to base stations, access to docking stations, access to battery stations, access to delivery or pick-up points, or any other type of resource. The traffic management module may be configured to plan a flight course for a UAV in response to the request. The flight course may make use of the allocated resources. The traffic management module may be configured to plan a mission for the UAV, which may optionally include a flight course as well as operation of any sensors or other devices on-board the UAV. The mission may utilize any of the allocated resources.

The traffic management module may be configured to adjust a mission based on detected conditions in the allocated airspace. For instance, the traffic management module may adjust a predetermined flight path based on the detected conditions. Adjusting the flight path may include adjusting an entirely predetermined flight path, adjusting a way-point of a semi-defined flight path, or adjusting a destination of a flight path. The detected conditions may include climate, changes in available airspace, accidents, establishment of geo-fencing devices, or changes in flight regulations. The traffic management module may inform a user of the adjustment to the mission, such as an adjustment to the flight path.

A user 250a, 250b, 250c may be an individual associated with the UAV 260a, 260b, 260c, such as a person operating the UAV. Examples of users and UAVs are described elsewhere herein. A communication channel may be provided between a user and a corresponding UAV that may be user to control operation of the UAV (Connection 3). Controlling operation of the UAV may include controlling flight of the UAV, or any other portions of the UAV as described elsewhere herein.

A communication channel (Connection 5) may be provided between the UAVs and the air control system, as the air control system may identify a condition, warn a user about the condition, and/or take over the UAV to ameliorate the condition. The communication channel may also be useful for identity authentication when a user and/or UAV are undergoing to the authentication process. Optionally, a communication channel may be established between the air control system and a remote controller of a user, and may provide some of the similar functionality. In systems including geo-fencing devices, communication channels may be provided between the geo-fencing devices for identification/authentication and/or condition identification, alert and/or takeover.

A communication channel (Connection 6) may be provided between the users and the air control system, as the air control system may identify a condition, warn a user about the condition, and/or take over the UAV to ameliorate the condition. The communication channel may also be useful for identity authentication when a user and/or UAV are undergoing to the authentication process.

Optionally, Connection 1 may be a logic channel. Connection 2 and Connection 4 may be a network connection. For instance, Connection 2 and Connection 4 may be provided over a location area network (LAN), wide area network (WAN) such as the Internet, a telecommunications network, a data network, a cellular network, or any other type of network. Connection 2 and Connection 4 may be provided through indirect communications (e.g., over a network). Alternatively, they may be provided through a direct communication channel. Connection 3, Connection 5, and Connection 6 may be a network connection, a mobile access network connection, provided via a remote controller or ground station, or any other type of connection. They may be provided via indirect communication channels or direct communication channels.

An authorized third party (such as an air control system, a geo-fencing system, etc.) can identify a corresponding UAV through the authentication center according to its UAV identifier (ID) and obtain relevant information (such as the UAV's configuration, its capacity level and security level). The security system may be able to handle UAVs of different types. UAVs of different types may have different physical characteristics (e.g., models, shapes, sizes, engine power, ranges, battery life, sensors, performance capabilities, payload, payload ratings or capacity) or may be used to perform different missions (e.g., surveillance, videography, communications, delivery). The UAVs of different types may have different security levels or priorities. For example, UAVs of different types may be authorized to perform different activities. For instance, a UAV of a first authorization type may be authorized to enter a region that a UAV of a second authorization type may be not be authorized to enter. UAV types may include different UAV types created by the same manufacturer or designer, or by different manufacturers or designers.

An authorized third party (such as an air control system, a geo-fencing system, etc.) can identify a corresponding user through the authentication center according to a user identifier (ID) and obtain relevant information. The security system may be able to handle users of different types. Users of different types may have different skill levels, amounts of experience, associations with different types of UAVs, authorization levels, or different demographic information. For examples, users with different levels of skills may be considered users of different types. The users may undergo certification or testing to verify the user skill level. One or more other users may vouch for or verify the user's skill level. For instance, an instructor of the user may verify the user's skill level. The user may alternatively self-identify the user skill level. Users with different degrees of experience may be considered users of different types. For instance, the user may log or certify certain number of hours of operation of a UAV, or number of missions flown using the UAV. Other users may verify or vouch for the degree of experience of the user. The user may self-identify the amount of experience for the user. The user type may be indicative of a level of training of the user. The skill level and/or experience of the user may be general to UAVs. Alternatively, the skill level and/or experience of the user may be specific to UAV type. For example, a user may have a high skill level or great amount of experience with a first type of UAV while having a low skill level or not much experience with a second type of UAV. Different users of different types may include users of different authorization types. Different authorization types may mean different sets of flight regulations may be imposed on different users. In some instances, some users may have higher security levels than other users which may mean fewer flight regulations or restrictions are placed on the users. In some instances, regular users may be differentiated from administrative users who may be able to takeover control from regular users. Regular users may be differentiated from control entity users (e.g., members of government agencies, members of emergency services, such as law enforcement). In some embodiments, administrative users may be control entity users or may be differentiated from control entity users. In another example a parent may be able to take over flight control from the parent's child, or an instructor may be able to take over flight control from a student. User type may be indicative of a class or category of a user in operating one or more types of UAVs. Other user type information may be based on user demographics (e.g., location, age, etc.).

Similarly, any other device or party involved in the safety system may have its own type. For example, a geo-fencing identifier may be indicative of a geo-fencing device type, or a remote controller identifier may be indicative of a remote controller type.

A UAV in operation within the safety system may be assigned a UAV ID and a key. The ID and key may be assigned from the ID registration database. The ID and key may be globally unique and may optionally not be copied. A user operating a UAV within the safety system may be assigned a user ID and a key. The ID and key may be assigned from the ID registration database. The ID and key may be globally unique and may optionally not be copied.

A UAV and an air control system may have mutual authentication using the ID and the key, thereby permitting operation of the UAV. In some instances, the authentication may include obtaining a permit to fly in a restricted area. A user and an air control system may have mutual authentication using the ID and the key, thereby permitting the user to operate the UAV.

The key may be provided in various forms. In some embodiments, a UAV key may be inseparable from the UAV. The key may be designed to prevent the key from being stolen. The key may be implemented by a write-once memory which is not externally readable (e.g., encrypted chips), or by a cured universal subscriber identity module (USIM). In some instances, a user key or a remote controller key may be inseparable from the user's remote controller. The key may be used by the authentication center to authenticate the UAV, the user, and/or any other device.

The authentication system, as provided herein, may comprise an identification registration database configured to store one or more UAV identifiers that uniquely identify UAVs with respect to one another, and one or more user identifiers that uniquely identify users with respect to one another; an authentication center configured to authenticate an identity of a UAV and an identity of a user; and an air control system configured to receive a UAV identifier for the authenticated UAV and a user identifier for the authenticated user and provide a set of flight regulations based on at least one of: the authenticated UAV identifier and the authenticated user identifier.

The authentication system may be implemented using any hardware configuration or set up known or later developed in the art. For instance, the ID registration database, the authentication center, and/or the air control system may be individually or collectively operated using one or more servers. One or more subsystems of the air control system, such as the flight supervision module, flight regulation module, traffic management module, user access control module, UAV access control module or any other module may be implemented using one or more servers individually or collectively. Any description of servers may apply to any other type of device. The device may be a computer (e.g., personal computer, laptop computer, server), mobile device (e.g., smartphone, cellular phone, tablet, personal digital assistant), or any other type of device. The device may be a network device capable of communicating over a network. The device comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein.

The various components, such as the ID registration database, the authentication center, and/or the air control system may be implemented on hardware at the same location or may be implemented at different locations. The authentication system components may be implemented using the same device or multiple devices. In some instances, a cloud-computing infrastructure may be implemented in providing the authentication system. Optionally, peer-to-peer (P2P) relationships may be utilized by the authentication system.

The components may be provided off-board the UAV, on-board the UAV, or some combination thereof. The components may be provided off-board a remote controller, on-board a remote controller, or some combination thereof. In some preferable embodiments, the components may be provided off-board the UAV and off-board the remote controller, and may communicate with the UAV (and/or other UAVs) and the remote controller (and/or other remote controllers). The components may communicate directly or indirectly with the UAV. In some instances, the communications may be relayed via another device. The other device may be a remote controller, or another UAV.

Flight Regulations

Activity of a UAV may be governed in accordance with a set of flight regulations. A set of flight regulations may include one or more flight regulations. Various types and examples of flight regulations are described herein.

Flight regulations may govern physical disposition of the UAV. For instance, the flight regulation may govern flight of the UAV, take-off of the UAV, and/or landing of the UAV. The flight regulation may indicate areas of the surface over which the UAV may or may not fly, or volumes in space where the UAV may or may not fly. The flight regulations may relate to position of the UAV (e.g., where the UAV is located in space or over the underlying surface) and/or orientation of the UAV. In some examples, the flight regulations may prevent the UAV from flying within an allocated volume (e.g., airspace) and/or over an allocated region (e.g., underlying ground or water). The flight regulations may comprise one or boundaries within which the UAV is not permitted to fly. In other examples, the flight regulations may only permit the UAV the fly within an allocated volume and/or over an allocated region. The flight regulations may comprise one or more boundaries within which the UAV is permitted to fly. Optionally, the flight regulations may prevent the UAV from flying above an altitude ceiling that may be fixed or variable. In another instance, the flight regulations may prevent the UAV from flying beneath an altitude floor that may be fixed or variable. The UAV may be required to fly at an altitude between the altitude floor and the altitude ceiling. In another example, the UAV may not be able to fly within one or more ranges of altitude. For instance, the flight regulations may permit only a certain range of orientations of the UAV, or may not permit certain range of orientations of the UAV. The range of orientations of the UAV may be with respect to one, two, or three axes. The axes may be orthogonal axes, such as yaw, pitch, or roll axes.

The flight regulations may govern movement of the UAV. For instance, the flight regulations may govern translational speed of the UAV, translational acceleration of the UAV, angular speed of the UAV (e.g., about one, two, or three axes), or angular acceleration of the UAV (e.g., about one, two, or three axes). The flight regulations may set a maximum limit for the UAV translational speed, UAV translational acceleration, UAV angular speed, or UAV angular acceleration. Thus, the set of flight regulations may comprise limiting flight speed and/or flight acceleration of the UAV. The flight regulations may set a minimum threshold for UAV translational speed, UAV translational acceleration, UAV angular speed, or UAV angular acceleration. The flight regulations may require that the UAV move between the minimum threshold and the maximum limit. Alternatively, the flight regulations may prevent the UAV from moving within one or more translational speed ranges, translational acceleration ranges, angular speed ranges, or angular acceleration ranges. In one example, a UAV may not be permitted to hover within a designated airspace. The UAV may be required to fly above a minimum translational speed of 0 mph. In another example, a UAV may not be permitted to fly too quickly (e.g., fly beneath a maximum speed limit of 40 mph). The movement of the UAV may be governed with respect to an allocated volume and/or over an allocated region.

The flight regulations may govern take-off and/or landing procedures for the UAV. For instance, the UAV may be permitted to fly, but not land in an allocated region. In another example, a UAV may only be able to take-off in a certain manner or at a certain speed from an allocated region. In another example, manual take-off or landing may not be permitted, and an autonomous landing or take-off process must be used within an allocated region. The flight regulations may govern whether take-off is allowed, whether landing is allowed, any rules that the take-off or landing must comply with (e.g., speed, acceleration, direction, orientation, flight modes). In some embodiments, only automated sequences for taking off and/or landing are permitted without permitting manual landing or take-off, or vice versa. The take-off and/or landing procedures of the UAV may be governed with respect to an allocated volume and/or over an allocated region.

In some instances, the flight regulations may govern operation of a payload of a UAV. The payload of the UAV may be a sensor, emitter, or any other object that may be carried by the UAV. The payload may be powered on or off. The payload may be rendered operational (e.g., powered on) or inoperational (e.g., powered off). Flight regulations may comprise conditions under which the UAV is not permitted to operate a payload. For example, in an allocated airspace, the flight regulations may require that the payload be powered off. The payload may emit a signal and the flight regulations may govern the nature of the signal, a magnitude of the signal, a range of the signal, a direction of signal, or any mode of operation. For example, if the payload is a light source, the flight regulations may require that the light not be brighter than a threshold intensity within an allocated airspace. In another example, if the payload is a speaker for projecting sound, the flight regulations may require that the speaker not transmit any noise outside an allocated airspace. The payload may be a sensor that collects information, and the flight regulations may govern a mode in which the information is collected, a mode about how information is pre-processed or processed, a resolution at which the information is collected, a frequency or sampling rate at which the information is collected, a range from which the information is collected, or a direction from which the information is collected. For example, the payload may be an image capturing device. The image capturing device may be capable of capturing static images (e.g., still images) or dynamic images (e.g., video). The flight regulations may govern a zoom of the image capturing device, a resolution of images captured by the image capturing device, a sampling rate of the image capturing device, a shutter speed of the image capturing device, an aperture of the image capturing device, whether a flash is used, a mode (e.g., lighting mode, color mode, still vs. video mode) of the image capturing device, or a focus of the image capturing device. In one example, a camera may not be permitted to capture images in over an allocated region. In another example, a camera may be permitted to capture images, but not capture sound over an allocated region. In another example, a camera may only be permitted to capture high-resolution photos within an allocated region and only be permitted to take low-resolution photos outside the allocated region. In another example, the payload may be an audio capturing device. The flight regulations may govern whether the audio capture device is permitted to be powered on, sensitivity of the audio capture device, decibel ranges the audio capture device is able to pick up, directionality of the audio capture device (e.g., for a parabolic microphone), or any other quality of the audio capture device. In one example, the audio capture device may or may not be permitted to capture sound within an allocated region. In another example, the audio capture device may only be permitted to capture sounds within a particular frequency range while within an allocated region. The operation of the payload may be governed with respect to an allocated volume and/or over an allocated region.

The flight regulations may govern whether a payload can transmit or store information. For instance, if the payload is an image capturing device, the flight regulations may govern whether images (still or dynamic) may be recorded. The flight regulations may govern whether the images can be recorded into an on-board memory of the image capture device or a memory on-board the UAV. For instance, an image capturing device may be permitted to be powered on and showing captured images on a local display, but may not be permitted to record any of the images. The flight regulations may govern whether images can be streamed off-board the image capture device or off-board the UAV. For instance, flight regulations may dictate that an image capture device on-board the UAV may be permitted to stream video down to a terminal off-board the UAV while the UAV is within an allocated airspace, and may not be able to stream video down when outside the allocated airspace. Similarly, if the payload is an audio capture device, the flight regulations may govern whether sounds may be recorded into an on-board memory of the audio capture device or a memory on-board the UAV. For instance, the audio capture device may be permitted to be powered on and play back captured sound on a local speaker, but may not be permitted to record any of the sounds. The flight regulations may govern whether the images can be streamed off-board the audio capture device, or any other payload. The storage and/or transmission of collected data may be governed with respect to an allocated volume and/or over an allocated region.

In some instances, the payload may be an item carried by the UAV, and the flight regulations may dictate the characteristics of the payload. Examples of characteristics of the payload may include dimensions of the payload (e.g., height, width, length, diameter, diagonal), weight of the payload, stability of the payload, materials of the payload, fragility of the payload, or type of payload. For instance, the flight regulations may dictate that the UAV may carry the package of no more than 3 lbs while flying over an allocated region. In another example, the flight regulations may permit the UAV to carry a package having a dimension greater than 1 foot only within an allocated volume. Another flight regulation may permit a UAV to only fly for 5 minutes when carrying a package of 1 lb or greater within an allocated volume, and may cause the UAV to automatically land if the UAV has not left the allocated volume within the 5 minutes. Restrictions may be provided on the type of payloads themselves. For example, unstable or potentially explosive payloads may not be carried by the UAV. Flight restrictions may prevent the carrying of fragile objects by the UAV. The characteristics of the payload may be regulated with respect to an allocated volume and/or over an allocated region.

Flight regulations may also dictate activities that may be performed with respect to the item carried by the UAV. For instance, flight regulations may dictate whether an item may be dropped off within an allocated region. Similarly flight regulations may dictate whether an item may be picked up from an allocated region. A UAV may have a robotic arm or other mechanical structure that may aid in dropping off or picking up an item. The UAV may have a carrying compartment that may permit the UAV to carry the item. Activities relating to the payload may be regulated with respect to an allocated volume and/or allocated region.

Positioning of a payload relative to the UAV may be governed by flight regulations. The position of a payload relative to the UAV may be adjustable. Translational position of the payload relative to the UAV and/or orientation of the payload relative to the UAV may be adjustable. Translational position may be adjustable with respect to one, two, or three orthogonal axes. Orientation of the payload may be adjustable with respect to one, two, or three orthogonal axes (e.g., pitch axis, yaw axis, or roll axis). In some embodiments, the payload may be connected to the UAV with a carrier that may control positioning of the payload relative to the UAV. The carrier may support the weight of the payload on the UAV. The carrier may optionally be a gimbaled platform that may permit rotation of the payload with respect to one, two, or three axes relative to the UAV. One or more frame components and one or more actuators may be provided that may effect adjustment of the positioning of the payload. The flight regulations may control the carrier or any other mechanism that adjusts the position of the payload relative to the UAV. In one example, flight regulations may not permit a payload to be oriented facing downward while flying over an allocated region. For instance, the region may have sensitive data that it may not be desirable for the payload to capture. In another example, the flight regulations may cause the payload to move translationally downward relative to the UAV while within an allocated airspace volume, which may permit a wider field of view, such as panoramic image capture. The positioning of the payload may be governed with respect to an allocated volume and/or over an allocated region.

The flight regulations may govern the operation of one or more sensors of an unmanned aerial vehicle. For instance, the flight regulations may govern whether the sensors are turned on or off (or which sensors are turned on or off), a mode in which information is collected, a mode about how information is pre-processed or processed, a resolution at which the information is collected, a frequency or sampling rate at which the information is collected, a range from which the information is collected, or a direction from which the information is collected. The flight regulations may govern whether the sensors can store or transmit information. In one example, a GPS sensor may be turned off while a UAV is within an allocated volume while vision sensors or inertial sensors are turned on for navigation purposes. In another example, audio sensors of the UAV may be turned off while flying over an allocated region. The operation of the one or more sensors may be governed with respect to an allocated volume and/or over an allocated region.

Communications of the UAV may be controlled in accordance with one or more flight regulations. For instance, the UAV may be capable of remote communication with one or more remote devices. Examples of remote devices may include a remote controller that may control operation of the UAV, payload, carrier, sensors, or any other component of the UAV, a display terminal that may show information received by the UAV, a database that may collect information from the UAV, or any other external device. The remote communications may be wireless communications. The communications may be direct communications between the UAV and the remote device. Examples of direct communications may include WiFi, WiMax, radiofrequency, infrared, visual, or other types of direct communications. The communications may be indirect communications between the UAV and the remote device which may include one or more intermediary device or network. Examples of indirect communications may include 3G, 4G, LTE, satellite, or other types of communications. The flight regulations may dictate whether remote communications are turned on or off. Flight regulations may comprise conditions under which the UAV is not permitted to communicate under one or more wireless conditions. For example, communications may not be permitted while the UAV is within an allocated airspace volume. The flight regulations may dictate a communication mode that may or may not be permitted. For instance, the flight regulations may dictate whether a direct communication mode is permitted, whether an indirect communication mode is permitted, or whether a preference is established between the direct communication mode and the indirect communication mode. In one example, only direct communications are permitted within an allocated volume. In another example, over an allocated region, a preference for direct communications may be established as long as it is available, otherwise indirect communications may be used, while outside the allocated region, no communications are permitted. The flight regulations may dictate characteristics of the communications, such as bandwidth used, frequencies used, protocols used, encryptions used, devices that aid in the communication that may be used. For example, the flight regulations may only permit existing networks to be utilized for communications when the UAV is within a predetermined volume. The flight regulations may govern communications of the UAV with respect to an allocated volume and/or over an allocated region.

Other functions of the UAV, such as navigation, power usage and monitoring, may be governed in accordance with flight regulations. Examples of power usage and monitoring may include the amount of flight time remaining based on the battery and power usage information, the state of charge of the battery, or the remaining amount of estimated distance based on the battery and power usage information. For instance, the flight regulations may require that a UAV in operation within an allocated volume have a remaining battery life of at least 3 hours. In another example, the flight regulations may require that the UAV be at least at a 50% state of charge when outside an allocated region. Such additional functions may be governed by flight regulations with respect to an allocated volume and/or over an allocated region.

The allocated volume and/or allocated region may be static for a set of flight regulations. For instance, boundaries for the allocated volume and/or allocated region may remain the same over time for the set of flight regulations. Alternatively, the boundaries may change over time. For instance, an allocated region may be a school, and the boundaries for the allocated region may encompass the school during school hours. After school hours, the boundaries may shrink or the allocated region may be removed. An allocated region at a nearby park where children participate in after-school activities may be created during the hours after school. The rules with respect to the allocated volume and/or allocated region may remain the same over time, or may change over time for the set of flight regulations. Changes may be dictated by time of day, day of the week, week of the month, month, quarter, season, year, or any other time-related factor. Information from a clock which may provide time of day, date, or other time-related information may be used in effecting the changes in the boundaries or the rules. A set of flight regulations may have dynamic components in response to other factors, in addition to time. Examples of other factors may include climate, temperature, detected light level, detected presence of individuals or machines, environmental complexity, physical traffic (e.g., land-bound traffic, pedestrian traffic, aerial vehicle traffic), wireless or network traffic, detected degree of noise, detected movements, detected heat signatures, or any other factor.

The allocated volume and/or allocated region may or may not be associated with a geo-fencing device. A geo-fencing device may be a reference point for an allocated volume and/or allocated region. A location of the allocated volume and/or allocated region may be provided based on a location of the geo-fencing device, as described elsewhere herein. Alternatively, the allocated volume and/or region may be provided without requiring a presence of a geo-fencing device. For example, a known coordinate for an airport may be provided, and used as a reference for the allocated volume and/or allocated region without requiring a physical geo-fencing device at the airport. Any combination of allocated volumes and/or regions, some of which may rely on geo-fencing devices and some of which may not, may be provided.

The flight regulations may elicit any type of flight response measure by the UAV. For instance, the UAV may change course. The UAV may automatically enter an autonomous or semi-autonomous flight control mode from a manual mode, or may not respond to certain user inputs. The UAV may permit another user to take over control of the UAV. The UAV may automatically land or take-off. The UAV may send an alert to a user. The UAV may automatically slow down or speed up. The UAV may adjust operation (which may include ceasing operation, or changing parameter of operation of) of a payload, carrier, sensor, communication unit, navigation unit, power regulation unit. The flight response measure may happen instantaneously, or may occur after a period of time (e.g., 1 minute, 3 minutes, 5 minutes, 10 minutes, 15 minutes, 30 minutes). The period of time may be a grace period for the user to react and exercise some control over the UAV before the flight response measures kick in. For instance, if the user is approaching a flight restricted zone, the user may be alerted and may change course of the UAV to exit the flight restricted zone. If the user does not respond within the grace period, the UAV may be automatically landed within the flight restricted zone. A UAV may normally operate in accordance with one or more flight commands from a remote controller operated by a remote user. The flight response measures may override the one or more flight commands when the set of flight regulations and the one or more flight commands conflict. For example, if the user instructs the UAV to enter a no-fly zone, the UAV may automatically alter course avoid the no-fly zone.

The set of flight regulations may include information about one or more of the following: (1) an allocated volume and/or region over which the set of flight regulations may apply, (2) one or more rules (e.g., UAV, payload, carrier, sensor, communication module, navigation unit, power unit operation) (3) one or more flight response measures (e.g., response by the UAV, payload, carrier, sensor, communication module, navigation unit, power unit) to cause the UAV to conform with the rules, or (4) time or any other factor that may affect the allocated volume and/or region, the rule, or the flight response measure. The set of flight regulations may include a single flight regulation, which may include information about (1), (2), (3), and/or (4). The set of flight regulations may include multiple flight regulations which may each include information about (1), (2), (3), and/or (4). Any types of flight regulations may be combined, and any combination of flight response measures may occur in accordance with the flight regulations. One or more allocated volumes and/or regions may be provided for a set of flight regulations. For example, a set of flight regulations may be provided for a UAV, where the set of flight regulations does not permit the UAV to fly within a first allocated volume, does permit the UAV to fly within the second allocated volume under an altitude ceiling but does not permit operation of a camera on-board the UAV, and only permits the UAV to record audio data within a third allocated volume. The UAV may have flight response measures that may cause the UAV to comply with the flight regulations. Manual operation of the UAV may be overridden to cause the UAV to comply with rules of the flight regulations. One or more flight response measures may automatically occur to override manual input by the user.

A set of flight regulations may be generated for a UAV. Generation of the set of flight regulations may include creating the flight regulations from scratch. Generation of the set of flight regulations may include selecting a set of flight regulations from a plurality of available sets of flight regulations. Generation of the set of flight regulations may include combining features of one or more sets of flight regulations. For instance, generation of a set of flight regulations may include determining elements, such as determining an allocated volume and/or region, determining one or more rules, determining one or more flight response measures, and/or determining any factors that may cause any of the elements to be dynamic. These elements may be generated from scratch or may be selected from one or more pre-existing element options. In some instances, flight regulations may be manually selected by a user. Alternatively, the flight regulations may be selected automatically with aid of one or more processors, without requiring human intervention. In some instances, some user input may be provided, but one or more processors may make the final determination of the flight regulations in compliance with the user input.

Figure 3:
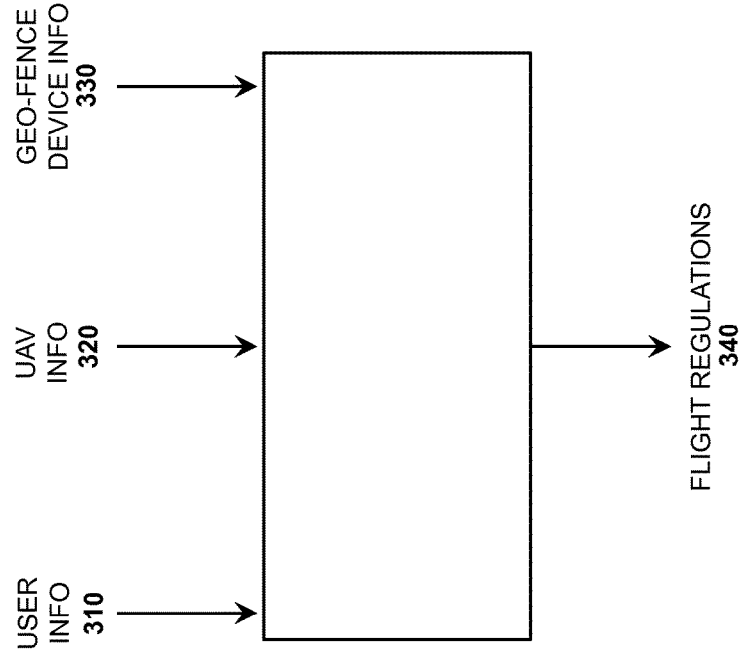
FIG. 3 shows an example of one or more factors that may go into generation of a set of flight regulations, in accordance with an embodiment of the invention.

FIG. 3 shows an example of one or more factors that may go into generation of a set of flight regulations. For instance, user information 310, UAV information 320, and/or geo-fencing device information 330 may go into generation of a set of flight regulations 340. In some instances, only user information is considered, only UAV information is considered, only geo-fencing information is considered, only remote-control information is considered, or any number or combination of these factors are considered in generating the set of flight regulations.

Additional factors may be considered in generating the set of flight regulations. These may include information about a local environment (e.g., environmental complexity, urban vs. rural, traffic information, climate information), information from one or more third party sources (e.g., government sources, such as the FAA), time-related information, user-inputted preferences, or any other factors.

In some embodiments, a set of flight regulations relating to a particular geography (e.g., allocated volume, allocated region) may be the same, regardless of user information, UAV information, geo-fencing device information, or any other information. For instance, all users may receive the same set of flight regulations. In another instance, all UAVs may receive the same set of flight regulations.

Alternatively, the set of flight regulations relating to a particularly geography (e.g., allocated volume, allocated region) may be different based on user information, UAV information, and/or geo-fencing device information. User information may include information specific to an individual user (e.g., user flight history, records of previous user flights) and/or may include user type (e.g., user skill category, user experience category), as described elsewhere herein. UAV information may include information specific to an individual UAV (e.g., UAV flight history, record of maintenance or accidents, unique serial number) and/or may include UAV type (e.g., UAV model, characteristics), as described elsewhere herein.

A set of flight regulations may be generated based on a user identifier indicative of user type. A system for controlling an unmanned aerial vehicle (UAV) may be provided. The system may comprise: a first communication module; one or more processors operably coupled to the first communication module and configured to individually or collectively: receive a user identifier indicative of a user type using the first communication module or a second communication module; generate a set of flight regulations for the UAV based on the user identifier; and transmit the set of flight regulations to the UAV using the first communication module or the second communication module.

A method for controlling an unmanned aerial vehicle (UAV) may comprise: receiving a user identifier indicative of a user type; generating, with aid of one or more processors, a set of a flight regulations for the UAV based on the user identifier; and transmitting, with aid of a communication module, the set of flight regulations to the UAV. Similarly, a non-transitory computer readable medium containing program instructions for controlling an unmanned aerial vehicle (UAV) may be provided, said computer readable medium comprising: program instructions for receiving a user identifier indicative of a user type; program instructions for generating a set of a flight regulations for the UAV based on the user identifier; and program instructions for generating a signal to transmit, with aid of a communication module, the set of flight regulations to the UAV.

A UAV may comprise: one or more propulsion units that effect flight of the UAV; a communication module configured to receive one or more flight commands from a remote user; and a flight control unit configured to generate flight control signals that are delivered to the one or more propulsion units, wherein the flight control signals are generated in accordance with a set of flight regulations for the UAV, wherein the flight regulations are generated based on a user identifier indicative of user type of the remote user.

The user type may have any characteristic as described elsewhere herein. For instance, the user type may be indicative of a level of experience of a user in operating the UAV, a level of training or certification of the user in operating the UAV, or a class of a user in operating one or more types of UAVs. The user identifier may uniquely identify the user from other users. The user identifier may be received from a remote controller remote to the UAV.

The set of flight regulations is generated by selecting the set of flight regulations from a plurality of sets of flight regulations based on the user identifier. The set of flight regulations is generated by an air control system off-board the UAV. The UAV may communicate with the air control system via a direct communication channel. The UAV may communicate with the air control system by being relayed through a user or a remote controller operated by the user. The UAV may communicate with the air control system by being relayed through one or more other UAVs.

A set of flight regulations may be generated based on a UAV identifier indicative of UAV type. A system for controlling an unmanned aerial vehicle (UAV) may be provided. The system may comprise: a first communication module; one or more processors operably coupled to the first communication module and configured to individually or collectively: receive a UAV identifier indicative of a UAV type using the first communication module or a second communication module; generate a set of flight regulations for the UAV based on the UAV identifier; and transmit the set of flight regulations to the UAV using the first communication module or a second communication module.

In some embodiments, a method for controlling an unmanned aerial vehicle (UAV may comprise: receiving a UAV identifier indicative of a UAV type; generating, with aid of one or more processors, a set of a flight regulations for the UAV based on the UAV identifier; and transmitting, with aid of a communication module, the set of flight regulations to the UAV. Similarly, a non-transitory computer readable medium containing program instructions for controlling an unmanned aerial vehicle (UAV) may comprise: program instructions for receiving a UAV identifier indicative of a UAV type; program instructions for generating a set of a flight regulations for the UAV based on the UAV identifier; and program instructions for generating a signal to transmit, with aid of a communication module, the set of flight regulations to the UAV.

An unmanned aerial vehicle (UAV) may be provided, comprising: one or more propulsion units that effect flight of the UAV; a communication module configured to receive one or more flight commands from a remote user; and a flight control unit configured to generate flight control signals that are delivered to the one or more propulsion units, wherein the flight control signals are generated in accordance with a set of flight regulations for the UAV, wherein the flight regulations are generated based on a UAV identifier indicative of UAV type of the remote user.

The UAV type may have any characteristic as described elsewhere herein. For instance, the UAV type may be indicative of a model of the UAV, a performance capability of the UAV, or a payload of the UAV. The UAV identifier may uniquely identify the UAV from other UAVs. The user identifier may be received from a remote controller remote to the UAV.

The set of flight regulations may be generated based to encompass one or more factors additional factors, such as those described elsewhere herein. For example, environmental conditions may be considered. For instance, a more restrictions may be provided if an environmental complexity is high, while fewer restrictions may be provided if an environmental complexity is low. More restrictions may be provided if a population density is high, while fewer restrictions may be provided if a population density is low. More restrictions may be provided if there is a higher degree of traffic (e.g., air traffic or surface-based traffic), while fewer restrictions may be provided if there is a lower degree of traffic. In some embodiments, more restrictions may be provided if an environmental climate has extreme temperatures, is windy, includes precipitation, or a potential for lightning than if the environmental climate has more moderate temperatures, has less wind, does not have precipitation, or little or no potential for lightning.

The set of flight regulations is generated by selecting the set of flight regulations from a plurality of sets of flight regulations based on the UAV identifier. The set of flight regulations is generated by an air control system off-board the UAV. The UAV may communicate with the air control system via a direct communication channel. The UAV may communicate with the air control system by being relayed through a user or a remote controller operated by the user. The UAV may communicate with the air control system by being relayed through one or more other UAVs.

As previously described, various types of flight regulations may be provided in a set of flight regulations. The flight regulations may be specific to a UAV or user, or need not be specific to the UAV and/or user.

Figure 7:
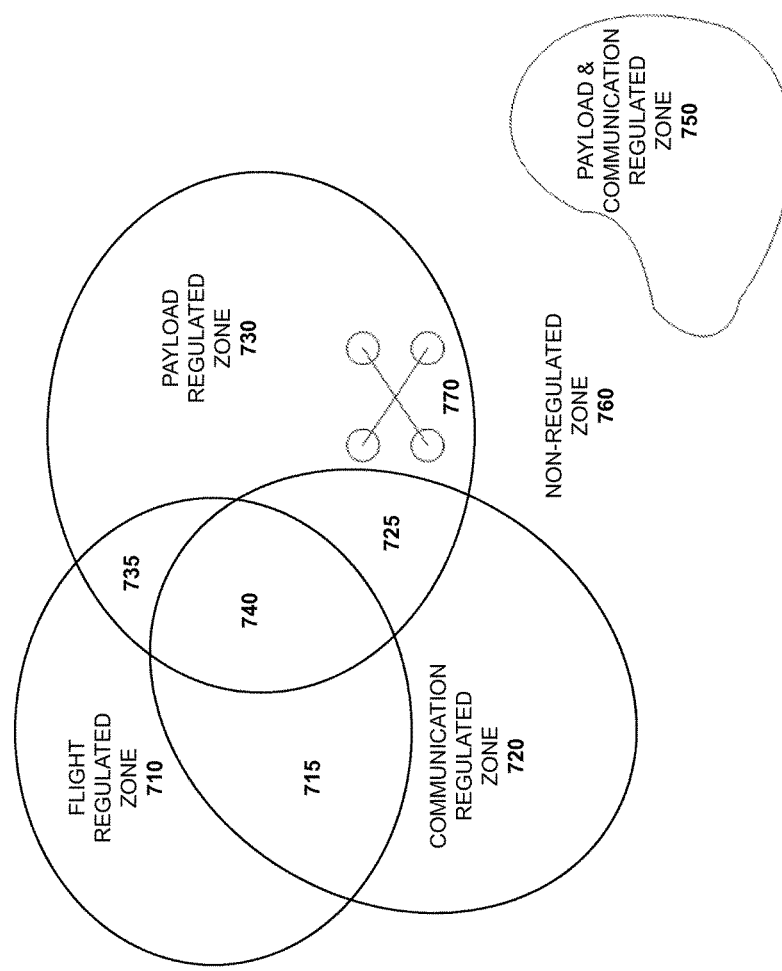
FIG. 7 shows an illustration of a scenario incorporating multiple types of flight regulations, in accordance with an embodiment of the invention.

FIG. 7 shows an illustration of a scenario incorporating multiple types of flight regulations. Various regions may be provided. Boundaries may be provided to define the regions. A set of flight regulations may impact one or more regions (e.g., the airspace above a two-dimensional surface region, or an airspace volume). The set of flight regulations may include one or more rules associated with one or zones.

In one example, a flight regulated zone 710 may be provided, a communication regulated zone 720 may be provided, and a payload regulate zone 730 may be provided. A payload and communication regulated zone 750 may be provided, as well as a non-regulated zone 760. The zones may have boundaries of any shape or dimension. For example, a zone may have a regular shape, such as a circle, ellipse, oval, square, rectangle, any type of quadrilateral, triangle, pentagon, hexagon, octagon, strip, curve, or so forth. The zone may have an irregular shape, which may include convex or concave components.

A flight regulated zone 710 may impose one or more rules pertaining to the disposition or movement of the UAV. The flight regulated zone may impose a flight response measure that may affect the flight of the UAV. For example, the UAV may only be able to fly at an altitude between an altitude floor and an altitude ceiling while within the flight regulated zone, while flight restrictions are not imposed outside the flight regulated zone.

A payload regulation zone 720 may impose one or more rules pertaining to operation or positioning of the payload of the UAV. The payload regulated zone may impose a flight response measure that may affect the payload of the UAV. For example, the UAV may not be able to capture images using an image capturing device payload while within the payload regulated zone, while the payload restrictions are not imposed outside the payload regulated zone.

A communication regulated zone 730 may impose one or more rules pertaining to operation of a communication unit of the UAV. The communication regulation zone may impose a flight response measure that affects operation of a communication unit of the UAV. For example, the UAV may not be able to transmit captured data but may be permitted to receive flight control signals while in the communication regulated zone, while the communication restrictions are not imposed outside the communication regulated zone.

A payload and communication regulated zone 750 may impose one or more rules pertaining to operation/positioning of the payload of the UAV and the communication unit of the UAV. For example, the UAV may not be able to store images captured by an image capturing device payload on-board the UAV, and may also not be able to stream or transmit the images off-board the UAV while within the payload and communication regulated region, while such restrictions are not imposed outside the payload and communication regulated region.

One or more non-regulated zones may be provided. The non-regulated zones may be outside one or more boundaries, or may be within one or more boundaries. While within a non-regulated zone, a user may retain control over the UAV without automatic initiation of one or more flight response measures. The user may be able to freely operate the UAV within the physical limitations of the UAV.

One or more of the zones may overlap. For instance, a flight regulated zone may overlap with a communication regulated zone 715. In another example, a communication regulated zone may overlap with a payload regulated zone 725. In another example, a flight regulated zone may overlap with the payload regulated zone 735. In some instances, the flight regulated zone, the communication regulated zone, and the payload regulated zone may all overlap 740.

When multiple zones overlap, the rules from the multiple zones may remain in place. For example, both the flight restrictions and the communication restrictions may remain in place in the overlapping zone. In some instances, the rules from the multiple zones may remain in place as long as they are not conflicting with one another.

If there are conflicts between the rules, various rule responses may be imposed. For instance, the most restrictive set of rules may apply. For example, if a first zone requires that a UAV fly beneath 400 feet in altitude, and a second zone requires that a UAV fly beneath 200 feet in altitude, in the overlapping zone, the rule about flying beneath 200 feet in altitude may apply. This may include mixing and matching a set of rules to form the most restrictive set. For example, if a first zone requires that a UAV fly above 100 feet and beneath 400 feet, and a second zone requires that a UAV fly above 50 feet and beneath 200 feet, the UAV may use the flight floor from the first zone and the flight ceiling from the second zone to fly between 100 feet and 200 feet while in the overlapping zone.

In another instance, hierarchy may be provided to the zones. The rules from the zone higher up in the hierarchy may prevail, regardless of whether they are more or less restrictive than the rules in the zone lower in the hierarchy. The hierarchy may be dictated according to type of regulation. For example, UAV positional flight regulations may rank higher than communication regulations, which may rank higher than payload regulations. In other instances, rules about whether the UAV is not permitted to fly within a particular zone may trump other regulations for that zone.

The hierarchy may be preselected or pre-entered. In some instances, a user providing a set of rules for the zones may indicate which zones are higher in the hierarchy than other zones. For example, a first zone may require that a UAV fly beneath 400 feet and that the payload be turned off. A second zone may require that the UAV fly beneath 200 feet and have no payload restrictions. If the first zone is higher in the hierarchy, the rules from the first zone may be imposed, without imposing any of the rules from the second zone. For instance, the UAV may fly beneath 400 feet and have the payload turned off. If the second zone is higher in the hierarchy, the rules from the second zone may be imposed, without imposing any of the rules from the first zone. For instance, the UAV may fly beneath 200 feet and not have any payload restrictions.

As previously described, a set of flight regulations may impose different types of rules to the UAV while the UAV is in a zone. This may include constraining payload usage based on the UAV location, or constraining wireless communication based on the UAV location.

Aspects of the invention may be directed to a UAV payload control system, comprising: a first communication module; and one or more processors operably coupled to the first communication module and configured to individually or collectively: receive a signal indicative of a location-dependent payload usage parameter using the first communication module or a second communication module; and generate one or more UAV operation signals that effects operation of a payload in compliance with the payload usage parameter.

A method for constraining payload usage for a UAV, said method comprising: receiving a signal indicative of a location-dependent payload usage parameter; and generating, with aid of one or more processors, one or more UAV operation signals that effects operation of a payload in compliance with the payload usage parameter. Similarly, a non-transitory computer readable medium containing program instructions for constraining payload usage for a UAV may be provided, said computer readable medium comprising: program instructions receiving a signal indicative of a location-dependent payload usage parameter; and program instructions for generating one or more UAV operation signals that effects operation of a payload in compliance with the payload usage parameter.

A UAV, in accordance with embodiments of the system, may comprise: a payload; a communication module configured to receive one or more payload commands from a remote user; and a flight control unit configured to generate payload control signals that are delivered to the payload or a carrier supporting the payload, wherein the payload control signals are generated in accordance with one or more UAV operation signals, wherein the UAV operation signals are generated based on a location-dependent payload usage parameter.

The payload usage parameter may restrict payload usage at one or more predetermined locations. As previously described, the payload may be an image capture device, and the payload usage parameter can restrict operation of the image capture device at one or more predetermined locations. The payload usage parameter may restrict recordation of one or more images using the image capture device at one or more predetermined locations. The payload usage parameter may restrict transmission of one or more images using the image capture device at one or more predetermined locations. In other embodiments, the payload may be an audio capture device, and the payload usage parameter restricts operation of the audio capture device at the one or more predetermined locations.

Alternatively or in combination, the payload usage parameter may permit payload usage at one or more predetermined locations. When the payload is an image capture device, and the payload usage parameter may permits operation of the image capture device at one or more predetermined locations. The payload usage parameter may permit recordation of one or more images using the image capture device at one or more predetermined locations. The payload usage parameter may permit transmission of one or more images using the image capture device at one or more predetermined locations. The payload may be an audio capture device, and the payload usage parameter may permit operation of the audio capture device at the one or more predetermined locations.

The one or more processors may be further configured to individually or collectively: receive a signal indicative of a location of the UAV using the first communication module or a second communication module; and compare the location of the UAV with the location-dependent payload usage parameter and determine whether the UAV is located at a location that restricts or permits operation of the payload. The location may be a flight-restricted zone. The flight-restricted zone may be determined by regulators. The flight-restricted zone may be within a predetermined distance from an airport, a public gathering place, government property, military property, a school, a private residence, a power plant, or any other area that may be designated as a flight restricted zone. The location may remain stationary over time, or may change over time.

The signal indicative of the location-dependent payload usage parameter may be received from a control entity. The control entity is a regulator, international organization, or a corporation, or any other type of control entity as described elsewhere herein. The control entity may be a global agency, such as any of the agencies and organizations described elsewhere herein. The control entity may be a source off-board or on-board the UAV. The control entity may be an air control system off-board the UAV, or any other portion of an authentication system off-board the UAV. The control entity may be a database, which is stored in a memory of the UAV, or may be stored off-board the UAV. The database may be configured to be updatable. The control entity may be a transmitting device, which is positioned at a location that restricts or permits operation of the payload. In some instances, the control entity may be a geo-fencing device, as described elsewhere herein. In some embodiments, the signal may be sent based on a user identifier indicative of a user of said UAV, and/or a UAV identifier indicative of said UAV type.

An aspect of the invention may be directed to a UAV communication control system, comprising: a first communication module; and one or more processors operably coupled to the first communication module and configured to individually or collectively: receive a signal indicative of a location-dependent communication usage parameter using the first communication module or a second communication module; and generate one or more UAV operation signal that effects operation of a UAV communication unit in compliance with the communication usage parameter.

Furthermore, methods for constraining wireless communication for a UAV is provided, comprising: receiving a signal indicative of a location-dependent communication usage parameter; and generating, with aid of one or more processors, one or more UAV operation signals that effects operation of a communication unit in compliance with the communication usage parameter. Similarly a non-transitory computer readable medium containing program instructions for constraining wireless communication for an unmanned aerial vehicle (UAV) may be provided, said computer readable medium comprising: program instructions receiving a signal indicative of a location-dependent communication usage parameter; and program instructions for generating one or more UAV operation signals that effects operation of a communication unit in compliance with the communication usage parameter.

Additional aspects of the invention may include a UAV comprising: a communication unit configured to receive or transmit wireless communications; and a flight control unit configured to generate communication control signals that are delivered to the communication unit to effect operation of the communication unit, wherein the communication control signals are generated in accordance with one or more UAV operation signals, wherein the UAV operation signals are generated based on a location-dependent communication usage parameter.

The communication usage parameter may restrict wireless communication usage at one or more predetermined locations. The wireless communications may be direct communications. The wireless communications may comprise radiofrequency communications, WiFi communications, Bluetooth communications, or infrared communications. The wireless communications may be indirect communications. The wireless communications may comprise 3G, 4G, or LTE communications. The communication usage may be restricted by not permitting any wireless communications. The communication usage may be restricted by permitting wireless communication usage only within selected frequency bands. The communication usage may be restricted by permitting wireless communication usage only when it does not interference with higher priority communications. In some instances, all other pre-existing wireless communications may be of higher priority than the UAV communications. For instance, if the UAV is in flight within a neighborhood, the various wireless communications occurring within the neighborhood may be considered of higher priority. In some instances, certain types of communications may be considered communications of higher priority—e.g., emergency service communications, government or official communications, medical device or service communications, etc. Alternatively or in combination, the communication usage parameter may permit wireless communication usage at one or more predetermined locations. For example, indirect communications may be permitted within a specified region, while direct communications are not permitted.

The one or more processors may be further configured to individually or collectively: receive a signal indicative of a location of the UAV using the first communication module or a second communication module; and compare the location of the UAV with the location-dependent communication usage parameter and determine whether the UAV is located at a location that restricts or permits operation of the communication unit. The location may be a communications-restricted zone. The communications-restricted zone may be determined by regulators or by private individuals. The flight-restricted zone may be within a predetermined distance from a private residence, an airport, a public gathering place, government property, military property, a school, a power plant, or any other area that may be designated as a flight restricted zone. The location may remain stationary over time, or may change over time.

The location may depend on existing wireless communications within a region. For instance, if operation of the communication unit would interfere with one or more existing wireless communications within a particular region, the region may be identified as a communication-restricted region. The operation of a UAV communication unit in compliance with the communication usage parameter may reduce electromagnetic or audio interference. For instance, if surrounding electronics are being used, certain operations of the UAV communication unit may interfere with them, e.g., interfere with their wireless signals. The operation of the UAV communication unit in compliance with the communication sage parameter may reduce or remove interference. For instance, the operation of the UAV communication unit within a limited frequency band may not interfere with surrounding electronic device operations or communications. In another instance, the ceasing of operation of the UAV communication unit within a region may prevent interference with surrounding electronic device operations or communications.

The signal indicative of the location-dependent communication usage parameter may be received from a control entity. The control entity is a regulator, international organization, or a corporation, or any other type of control entity as described elsewhere herein. The control entity may be a global agency, such as any of the agencies and organizations described elsewhere herein. The control entity may be a source off-board or on-board the UAV. The control entity may be an air control system off-board the UAV, or any other portion of an authentication system off-board the UAV. The control entity may be a database, which is stored in a memory of the UAV, or may be stored off-board the UAV. The database may be configured to be updatable. The control entity may be a transmitting device, which is positioned at a location that restricts or permits operation of the payload. In some instances, the control entity may be a geo-fencing device, as described elsewhere herein. In some embodiments, the signal may be sent based on a user identifier indicative of a user of said UAV, and/or a UAV identifier indicative of said UAV type.

Identification Module

A UAV may include one or more propulsion units that may propel the UAV. In some instances, the propulsion units may include rotor assemblies, which may include one or more motors driving rotation of one or more rotor blades. A UAV may be multi-rotor UAV which may include a plurality of rotor assemblies. The rotor blades, when rotating, may provide a propulsive force, such as lift, to the UAV. Various rotor blades of the UAV may rotate at the same speed or at different speeds. Operation of the rotor blades may be used to control flight of the UAV. Operation of the rotor blades may be used to control take-off and/or landing of the UAV. Operation of the rotor blades may be used to control maneuvering of the UAV in an airspace.

A UAV may include a flight control unit. The flight control unit may generate one or more signals that may control operation of the rotor assemblies. The flight control unit may generate one or more signals that control operation of one or more motors of the rotor assemblies, which may in turn affect the speed of rotation of the rotor blades. The flight control unit may receive data from one or more sensors. The data from the sensors may be used to generate the one or more flight control signals to the rotor assemblies. Examples of sensors may include, but are not limit to, GPS units, inertial sensors, vision sensors, ultrasonic sensors, heat sensors, magnetometers, or other types of sensors. The flight control unit may receive data from a communication unit. The data from the communication unit may include commands from a user. The commands from the user may be inputted via a remote controller that may be transmitted to the UAV. The data from the communication unit and/or sensors may include detection of a geo-fencing device or information transmitted from a geo-fencing device. The data from the communication unit may be used to generate the one or more flight control signals to the rotor assemblies.

In some embodiments, a flight control unit may control other functions of the UAV instead of, or in addition to, flight. The flight control unit may control operation of the payload on-board the UAV. For example, the payload may be an image capturing device, and the flight control unit may control operation of the image capturing device. The flight control unit may control positioning of a payload on-board the UAV. For example, a carrier may support a payload, such as an image capturing device. The flight control unit may control operation of the carrier to control positioning of the payload. The flight control unit may control operation of one or more sensors on-board the UAV. This may include any of the sensors described elsewhere herein. The flight control unit may control communications of the UAV, navigation of the UAV, power usage of the UAV, or any other function on-board the UAV.

Figure 4:
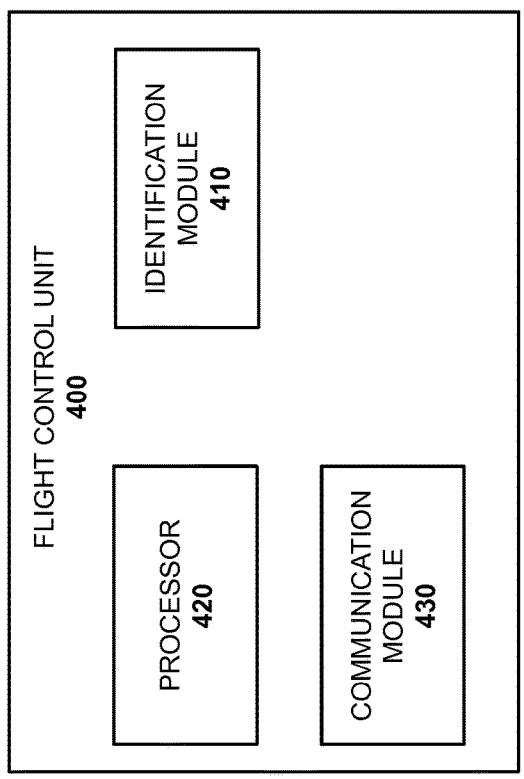
FIG. 4 shows an example of a flight control unit, in accordance with an embodiment of the invention.

FIG. 4 shows an example of a flight control unit, in accordance with an embodiment of the invention. The flight control module 400 may include an identification module 410, one or more processors 420, and one or more communication modules 430. In some embodiments, the flight control module of a UAV may be a circuit board which may comprise one or more chips, such as one or more identification chips, one or more processor chips, and/or one or more communication chips.

The identification module 410 may be unique to the UAV. The identification module may be able to uniquely identify and differentiate the UAV from other UAVs. The identity module may comprise a UAV identifier and a key of the UAV.

The UAV identifier stored in the identification module may not be altered. The UAV identifier may be stored in the identification module in an unalterable state. The identification module may be a hardware component that stores a unique UAV identifier for the UAV in a manner that prevents a user from altering the unique identifier.

The UAV key may be configured to provide authentication verification of the UAV. The UAV key may be unique to the UAV. The UAV key may be an alphanumeric string that may be unique to the UAV, and may be stored in the identification module. The UAV key may be randomly generated.

The UAV identifier and the UAV key may be used in combination to authenticate the UAV and permit operation of the UAV. The UAV identifier and the UAV key may be authenticated using an authentication center. The authentication center may be off-board the UAV. The authentication center may be part of authentication system as described elsewhere herein (e.g., authentication center 220 in FIG. 2).

The UAV identifier and the UAV key may be issued by an ID registration database, as described elsewhere herein (e.g., ID registration module 210 in FIG. 2). The ID registration database may be off-board the UAV. The identification module may be configured to receive the UAV identifier and UAV key once, and not alter either after the initial receipt. Thus, the UAV identifier and the UAV key may be inalterable once it has been determined. In other instances, the UAV identifier and the key may be fixed upon receipt, and may never be written. Alternatively, the UAV identifier and the UAV key may only be modified by an authorized party. A regular operator of the UAV may not be able to alter or modify the UAV identifier and the UAV key in the identification module.

In some instances, the ID registration database may issue identification module itself, which may be manufactured into the UAV. The ID registration database may issue the identifiers prior to, or concurrently with manufacture of the UAV. The ID registration database may issue the identifiers before the UAVs are sold or distributed.

The identification module may be implemented as a USIM. The identification module may be a write-once memory. The identification module may optionally not be externally readable.

The identification module 410 may be inseparable from the flight control unit 400. The identification module may not be removed from the rest of the flight control unit without damaging a function of the flight control unit. The identification module may not be removed from the rest of the flight control unit by an unaided hand. An individually may not manually remove the identification module from the flight control unit.

A UAV may comprise a flight control unit configured to control operation of the UAV; and an identification module integrated into said flight control unit, wherein the identification module uniquely identifies the UAV from other UAVs. A method of identifying a UAV may be provided, said method comprising: controlling operation of the UAV using a flight control unit; and uniquely identifying the UAV from other UAVs using an identification module integrated into said flight control unit.

The identification module may be physically joined or attached to the flight control unit. The identification module may be integrated into the flight control unit. For instance, the identification module may be a chip welded onto a circuit board of the flight control unit. Various physical technologies may be employed to prevent separation of the identification module from the rest of the flight control unit.

System-in-package (SIP) technology may be employed. For instance, multiple functional chips, including the processor, communication module, and/or identification module may be integrated in one package, thereby performing a complete function. If an identification module is to be divided out, other modules in the package will be destroyed, leading to a UAV that is disabled.

Figure 5:
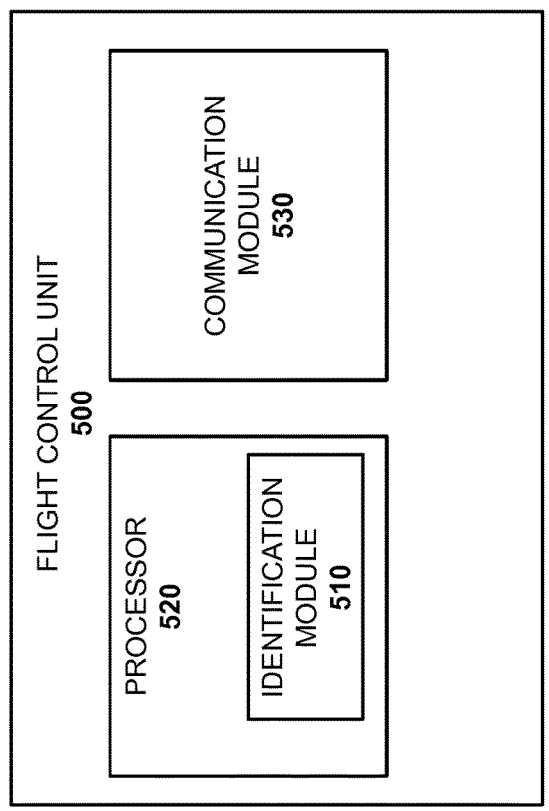
FIG. 5 shows an additional example of a flight control unit, in accordance with an embodiment of the invention.

FIG. 5 shows an additional example of a flight control unit 500, in accordance with an embodiment of the invention. A possible configuration utilizing SIP technology is illustrated. An identification module 510 and a processor 520 may be packaged in the same chip. The identification module may not be separated from the processor, and any attempt to remove the identification module would result in removal or damage of the processor, which would result in damage of the flight control unit. The identification module may be integrated with one or more other components of the flight control unit within one package in the same chip. In other examples, the identification module may be packaged in the same chip as the communication module 530. In some instances, the identification module, processor, and communication module may all be packaged within one chip.

Chip-on-board (COB) packaging may be employed. Naked chips may be adhered to an interconnection substrate with conductive or non-conductive adhesive. Then, wire bonding may be performed to achieve their electrical connection, also known as soft encapsulation. The identification module may be welded onto a circuit board of the flight control unit. After COB packaging, once an identification module is welded on a circuit board, it can not be taken out as a whole. Attempts to physically remove the identification module will result in damage to the circuit board or other portions of the flight control unit.

Software may be used to make sure that the identification module is inseparable from the rest of the flight control unit of the UAV. For example, each UAV may be implemented with a software version corresponding to its identification module. In other words, there may be a one to one correspondence between software versions and identification modules. The software version may be unique or substantially unique to the UAV. Regular operation of the software may require obtaining the UAV key stored in the identification module. The software version may not operate without the corresponding UAV key. If the identification module is altered or removed, then the software of the UAV cannot operate properly.

In some embodiments, the identification module may be issued by a control entity. A control entity may be any entity that exercises some form of authority for identifying the UAVs or over the UAVs. In some instances, the control entity may be a government agency or an operator authorized by the government. The government may be a national government, state/province government, city government, or any form of regional government. The control entity may be a government agency, such as the Federal Aviation Administration (FAA), Federal Trade Commission (FTC), Federal Communications Commission (FCC), National Telecommunications and Information Administration (NTIA), Department of Transportation (DoT), or Department of Defense (DoD). The control entity may be a regulator. The control entity may be a national or an international organization or corporation. The control entity may be a manufacturer of the UAV or a distributor of the UAV.

Figure 6:
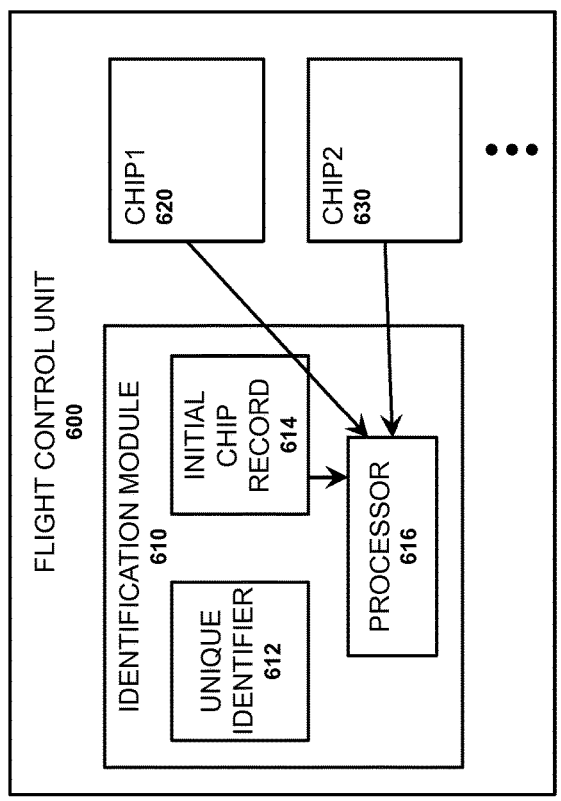
FIG. 6 shows an example of a flight control unit which tracks identification of chips on the flight control unit, in accordance with an embodiment of the invention.

FIG. 6 shows an example of a flight control unit which tracks identification of chips on the flight control unit, in accordance with embodiments of the invention. The flight control unit 600 may have an identification module 610 and one or more other chips (e.g., chip1 620, chip2 630, . . . ). The identification module may have a unique UAV identifier 612, a chip record 614 and one or more processors 616.

The identification module 610 may be inseparable from the rest of the flight control unit 600. Alternatively, the identification module may be removable from the flight control unit. The identification module may uniquely identify the UAV from other UAVs through the unique UAV identifier 612.

The identification module may include a chip record 614 that may store records of the one or more surrounding chips 620, 630. Examples of other chips may include one or more processing chips, communication chips, or any other types of chips. The chip record may store any type of data about the one or more surrounding chips, such as types of surrounding chips (e.g., model), information about the chip manufacturer, serial number for the chips, performance characteristics of the chips, or any other data about the chips. The records may be unique to the particular chip, unique to the type of chip, and/or may include parameters that are not necessarily unique to the chip or types of chip. The chip record may be a memory unit.

When a UAV is started, the identification module may start a self-examination, which may gather information about the surrounding chips and compare the gathered information with the information stored in the chip record. One or more processors 616 of the identification module may be used to perform the comparison. The identification module may check whether or not the surrounding chips are consistent with its internal chip record, thereby distinguishing if it has been transplanted. For instance, if the currently collected information during the self-examination matches the initial chip record, then there is a high likelihood that the identification module has not been transplanted. If the currently collected information during the self-examination procedure does not match the initial chip record, then there is a high likelihood that the identification module has been transplanted. An indication whether the identification module has been transplanted, or the likelihood that a transplant has occurred, may be provided to a user or another device. For instance, an alert may be sent to a user device, or to a control entity, when the initial chip record does not match the surrounding chip information upon self-examination.

In some embodiments, the chip record information may not be changed. The chip record information may be a write-once memory. The chip record may include information about the surrounding one or more chips that were collected the very first time the UAV was turned on. The information about the surrounding chips may be hard-wired into the chip record. The information about the surrounding chips may be provided by the manufacturer and built into the chip record. In some instances, the chip record may be externally unreadable.

In alternative embodiments, the chip record information may be changed. The chip record information may be updated whenever a self-examination procedure occurs. For instance, information about the surrounding chips may be used to supplant or supplement the existing records about the surrounding chips. A comparison may be made between the initial chip record and chip information gathered during self-examination. If no change is detected, then there is a high likelihood that the identification module has not been transplanted. If a change is detected, then there is a high likelihood that the identification module has been transplanted. Similarly, an indication may be provided whether a transplant has occurred.

For example, an initial chip record may include records that show two surrounding chips, one which is Model X with Serial No. ABCD123, and another which is Model Y with Serial Number DCBA321. A self-examination procedure may occur. During the self-examination procedure, information may be gathered about surrounding chips, which may show two chips, one of which is Model X with Serial No. 12345FG, and another which is Model S with Serial No. HIJK987. Since the data does not match, a high likelihood may be provided that the identification module has been transplanted. The initial identification module, which would have recorded Model X with Serial No. 12345FG and Model S with Serial No. HIJK987 in the chip record may have been removed. The initial identification module may have been supplanted by a new identification module, which was taken from a different UAV, where the flight control unit of the different UAV had chips that were Model X with Serial No. ABCD123, and Model Y with Serial Number DCBA321. The initial chip record may include record of the surrounding chips from the UAV from initial manufacturer or configuration of the UAV, or from the previous operation of the UAV. Either way, a disparity may be indicative that the identification module has been transplanted for that UAV since the initial manufacture or configuration, or since the previous operation.

Accordingly, a UAV may be provided comprising: a flight control unit configured to control operation of the UAV, wherein the flight control unit comprises an identification module and a chip, wherein the identification module is configured to (1) uniquely identify the UAV from other UAVs, (2) comprise an initial record of the chip, and (3)

gather information about the chip subsequent to comprising the initial record of the chip, wherein the identification module is configured to undergo a self-examination procedure that compares the gathered information about the chip with the initial record of the chip, and wherein the identification module is configured to provide an alert when the gathered information about the chip is inconsistent with the initial record of the chip.

A method of identifying a UAV may comprise: controlling operation of the UAV using a flight control unit, wherein the flight control unit comprises an identification module and a chip; uniquely identifying the UAV from other UAVs using the identification module, wherein the identification module comprises an initial record of the chip; gathering information about the chip subsequent to comprising the initial record of the chip; comparing, using the identification module, the gathered information about the chip with the initial record of the chip, thereby undergoing a self-examination procedure; and providing an alert when the gathered information about the chip is inconsistent with the initial record of the chip.

The chip record may be an integral part of the identification module. The chip record may be inseparable from the rest of the identification module. In some instances, the chip record can not be removed from the identification module without damaging the identification module and/or the rest of the flight control unit.

Self-examination may automatically occur without any user input. The self-examination procedure may be automatically initiated when the UAV is powered on. For instance, once the UAV is turned on, the self-examination procedure may take place. The self-examination procedure may be automatically initiated when the UAV starts flight. The self-examination procedure may be automatically initiated when the UAV is powering down. The self-examination procedure may be automatically initiated periodically during operation of the UAV (e.g., at regular or irregular time intervals). The self-examination procedure may also occur in response to a detected event, or in response to user input.

In some embodiments, an authentication system may be involved in issuing an identification module. The authentication system may issue the physical identification module, or data that may be provided in the identification module. The ID registration module and/or the authentication center may be involved in issuing the identification module. A control agency may be involved in implementing the authentication system. A control entity may be involved in issuing the identification module. The control entity may be a specific governmental agency or an operator authorized by the government, or any other type of control entity as described elsewhere herein.

In order to prevent the UAV from being illegally refitted (e.g., with a new identification module or a new identifier), the authentication system (e.g., authentication center) may require the UAV to be examined periodically. Once the UAV has qualified and no tampering is detected, the authentication process may continue. The authentication process may uniquely identify the UAV and confirm that the UAV is the actual UAV that is identified by the identifier.

Identification for Operation

A user of a UAV may be uniquely identified. The user may be uniquely identified with aid of a user identifier. The user identifier may uniquely identify the user and may differentiate the user from other users. A user may be an operator of the UAV. A user may be an individual controlling the UAV. The user may be controlling flight of the UAV, controlling a payload operation and/or placement of the UAV, controlling communications of the UAV, controlling one or more sensors of the UAV, controlling navigation of the UAV, controlling power usage of the UAV, or controlling any other function of the UAV.

A UAV may be uniquely identified. The UAV may be identified with aid of a UAV identifier. The UAV identifier may uniquely identify the UAV and may differentiate the UAV from other UAVs.

In some instances, users may be authorized to operate the UAV. One or more individual users may need to be identified prior to being able to operate the UAV. In some instances, all users, when identified, may be authorized to operate the UAV. Optionally, only a select group of users, when identified, may be authorized to operate the UAV. Some users may not be authorized to operate the UAV.

Figure 8:
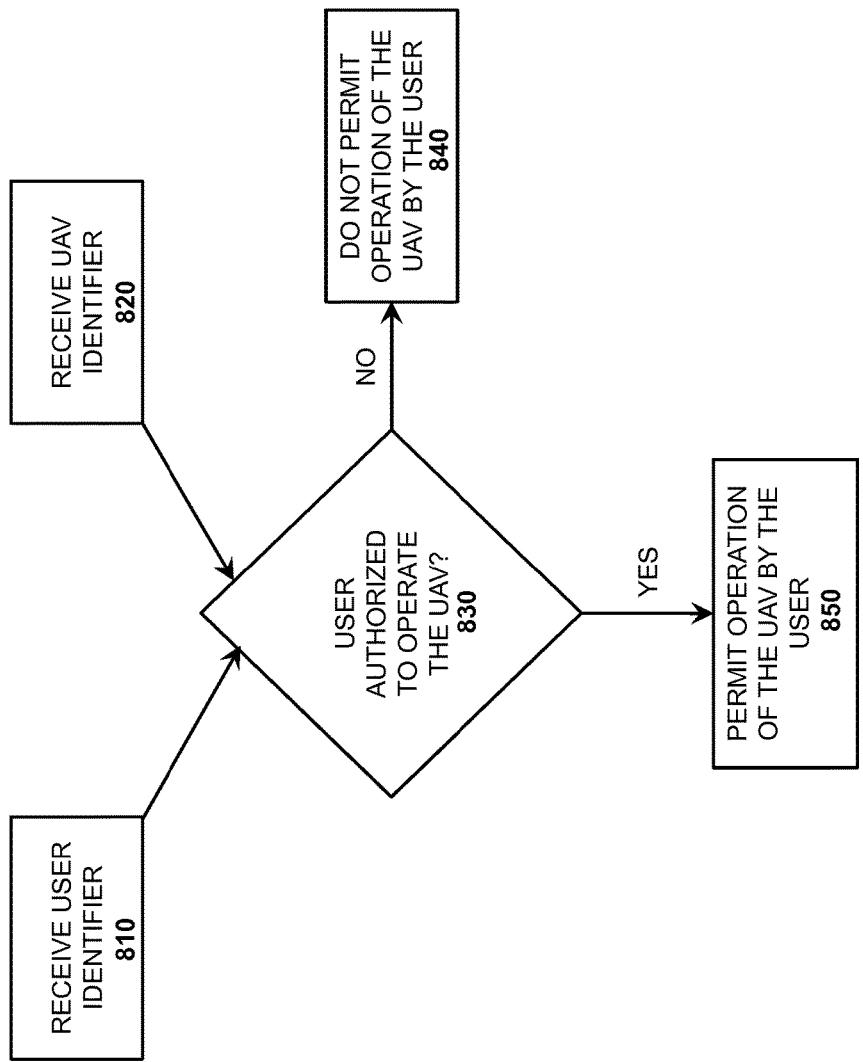
FIG. 8 shows a process of considering whether a user is authorized to operate a UAV, in accordance with an embodiment of the invention.

FIG. 8 shows a process of considering whether a user is authorized to operate a UAV before permitting operation of the UAV by the user. The process may include receiving a user identifier 810 and receiving a UAV identifier 820. A determination may be made whether the user is authorized to operate the UAV 830. If the user is not authorized to operate the UAV, the user is not permitted to operate the UAV 840. If the user is authorized to operate the UAV, the user is permitted to operate the UAV 850.

A user identifier may be received 810. The user identifier may be received from a remote controller. The user identifier may be received from a user input. The user identifier may be pulled from a memory based on the user input. The user input may optionally be provided to the remote controller, or another device. A user may log-in or undergo any authentication procedure in providing the user identifier. A user may manually enter a user identifier. The user identifier may be stored on a user device. The user identifier may be stored from memory without requiring the user to manually enter the user identifier.

A UAV identifier may be received 820. The user identifier may be received from a UAV. The UAV identifier may be received from a user input. The UAV identifier may be pulled from a memory based on the user input. The user input may optionally be provided to the remote controller, or another device. A user may undergo an authentication procedure in providing the UAV identifier. Alternatively, the UAV may automatically undergo a self-identification or self-authentication procedure. The UAV identifier may be stored on the UAV or on a user device. The UAV identifier may be stored from memory without requiring the user to manually enter the UAV identifier. The UAV identifier may be stored on an identification module of the UAV. The UAV identifier for the UAV may optionally be unalterable.

A UAV may broadcast the UAV identifier during operation. The UAV identifier may be broadcasted continuously. Alternatively, the UAV identifier may be broadcasted upon request. The UAV identifier may be broadcasted upon request of an air control system off-board the UAV, an authentication system off-board the UAV, or any other device. The UAV identifier may be broadcasted when a communication between the UAV and the air control system may be encrypted or authenticated. In some instances, the UAV identifier may be broadcasted in response to an event. For example, when a UAV is turned on, the UAV identifier may be automatically broadcasted. The UAV identifier may be broadcasted during an initialization procedure. The UAV identifier may be broadcasted during an authentication procedure. Optionally, the UAV identifier may be broadcasted via a wireless signal (e.g., radio signal, optical signal, or an acoustical signal). The identifier may be broadcast using direct communications. Alternatively, the identifier may be broadcast using indirect communications.

The user identifier and/or the UAV identifier may be received by an authentication system. The user identifier and/or the UAV identifier may be received at an authentication center or an air control system of the authentication system. The user identifier and/or the UAV identifier may be received by the UAV and/or remote controller of the UAV. The user identifier and/or UAV identifier may be received at one or more processors that may determine whether the user is authorized to operate the UAV.

The determination of whether the user is authorized to operate the UAV 830 may be made with aid of one or more processors. The determination may be made on-board the UAV or off-board the UAV. The determination may be made on-board a remote controller of a user or off-board the remote controller of the user. The determination may be made at a separate device from the UAV and/or the remote controller. In some instances the determination may be made at a component of an authentication system. The determination may be made at an authentication center of an authentication system (e.g., authentication center 220 as illustrated in FIG. 2) or an air control system of the authentication system (e.g., air control system 230 as illustrated in FIG. 2).

The determination may be made at a device or system that may generate one or more sets of flight regulations. For example, the determination may be made at an air control system that may generate one or more sets of flight regulations under which the UAV is to operate. The one or more sets of flight regulations may depend on a location of the UAV or any other factor pertaining to the UAV. The one or more sets of flight regulations may be generated based on the user identifier and/or the UAV identifier.

When determining whether a user is authorized to operate the UAV, the user identifier and the UAV identifier may be considered. In some instances, the user identifiers and the UAV identifiers may be considered alone. Alternatively, additional information may be considered. Information about a user may be associated with a user identifier. For example, information about the user type (e.g., skill level, experience level, certifications, licenses, training) may be associated with the user identifier. Flight history of the user (e.g., where the user has flown, types of UAVs the user has flown, whether the user has gotten into any accidents) may be associated with the user identifier. Information about a UAV may be associated with a UAV identifier. For example, information about the UAV type (e.g., model, manufacturer, characteristics, performance parameters, level of difficulty in operation) may be associated with the UAV identifier. Flight history of the UAV (e.g., where the UAV has flown, users who have previously interacted with the UAV) may also be associated with a UAV identifier. Information associated with the user identifiers and/or the UAV identifiers may be considered in determining whether the user is authorized to operate the UAV. In some instances, additional factors may be considered such as geographical factors, timing factors, environmental factors, or any other types of factors.

Optionally, only a single user is authorized to operate a corresponding UAV. A one-to-one correspondence may be provided between an authorized user and a corresponding UAV. Alternatively, multiple users may be authorized to operate a UAV. A many-to-one correspondence may be provided between authorized users and a corresponding UAV. A user may only be authorized to operate a single corresponding UAV. Alternatively, a user may be authorized to operate multiple UAVs. A one-to-many correspondence may be provided between an authorized user and multiple corresponding UAVs. Multiple users may be authorized to operate multiple corresponding UAVs. A many-to-many correspondence may be provided between authorized users and multiple corresponding UAVs.

In some instances, a user may be pre-registered to operate the UAV. For instance, only users pre-registered to operate the UAV may be authorized to operate the UAV. The users may be a registered owner of the UAV. When a user purchases or receives the UAV, the user may register as an owner and/or operator of the UAV. In some instances, multiple users may be able to register as an owner and/or operator of the UAV. Alternatively, only a single user may be able to register as an owner and/or operator of the UAV. The single user may be able to designate one or more other users that are permitted to operate the UAV. In some instances, only users who have user identifiers that have been registered to operate the UAV may be authorized to operate the UAV. One or more registration databases may store information about registered users that are permitted to operate the UAV. The registration database may be on-board the UAV or off-board the UAV. The user identifier may be compared with the information in the registration database and the user may only be permitted to operate the UAV if the user identifier matches a user identifier associated with the UAV in the registration database. The registration database may be specific to a UAV. For example, a first user may be pre-registered to operate UAV1, but may not be pre-registered to operate UAV2. The user may then be permitted to operate UAV1, but may not be permitted operate UAV2. In some instances, the registration database may be specific to a type of UAV (e.g., all UAVs of a particular model).

In other instances, the registration database may be open, regardless of UAVs. For instance, users may be pre-registered as operators of UAVs. The users may be permitted to fly any UAV, as long as those specific UAVs don't have any other requirements for authorization.

Alternatively, a UAV may default to permitting all users to operate the UAV. All users may be authorized to operate the UAV. In some instances, all users who are not on a 'blacklist' may be authorized to operate the UAV. Thus, when determining whether a user is authorized to operate the UAV, a user may be authorized to operate the UAV as long as the user is not on a blacklist. One or more blacklist databases may store information about users that are not permitted to operate the UAV. The blacklist database may store users identifiers of users not permitted to operate the UAV. The blacklist database may be on-board the UAV or off-board the UAV. The user identifier may be compared with the information in the blacklist database, and the user may only be permitted to operate the UAV if the user identifier does not match a user identifier in the blacklist database. The blacklist registration may be specific to a UAV or a type of UAV. For example, users may be blacklisted from flying a first UAV, but may not be blacklisted from flying a second UAV. The blacklist registration may be specific to a UAV type. For instance, users may not be permitted to fly a UAV of a particular module, while the users are permitted to fly UAVs of other models. Alternatively, the blacklist registration need not be specific to a UAV or UAV type. The blacklist registration may be applicable to all UAVs. For example, if a user is banned from operating any UAV, then regardless of the UAV identity or type, the user may not be authorized to operate the UAV, and operation of the UAV may not be permitted.

The pre-registration or blacklist registration may also apply to other factors in addition to UAV or UAV type. For instance, the pre-registration or blacklist registration may apply to particular locations or jurisdictions. For instance, a user may be pre-registered to operate a UAV within a first jurisdiction while not being pre-registered to operate a UAV within a second jurisdiction. This may or may not be agnostic to the identity or type of the UAV itself. In another example, the pre-registration or backlist registration may apply to particular climate conditions. For instance, a user may be blacklisted from operating a UAV when wind speeds exceed 30 mph. In another example, other environmental conditions, such as environmental complexity, population density, or air traffic may be considered.

Additional considerations of whether a user is authorized to operate a UAV may depend on user type. For example, user skill or experience level may be considered in determining whether the user is authorized to operate the UAV. Information about a user, such as user type, may be associated with a user identifier. When considering whether the user is authorized to operate the UAV, information about the user may be considered, such as user type. In one example, a user may only be authorized to operate the UAV if the user has met a threshold skill level. For instance, the user may be authorized to operate the UAV if the user has undergone training for UAV flight. In another example, the user may be authorized to operate the UAV if the user has undergone certification that the user has certain flight skills. In another example, the user may only be authorized to operate the UAV if the user has met a threshold experience level. For instance, the user may be authorized to operate the UAV if the user has logged at least a certain threshold number of units of time in flight. In some instances, the threshold number may apply to units of time in flight to any UAV, or only UAVs of the type matching the UAV. Information about the user may include demographic information about the user. For example, the user may only be authorized to operate the UAV if the user has reached a threshold age (e.g., is an adult). The information about the user and/or the UAV may be pulled and may be considered with aid of one or more processors in determining whether the user is authorized to operate the UAV. One or more considerations may be made in accordance with non-transitory computer readable media in determining whether the user is authorized to operate the UAV.

As previously described, additional factors may be considered in determining whether a user is authorized to operate the UAV, such as geographic factors, time factors, or environmental factors. For instance, only some users may be authorized as operating the UAV during the night, while other users may be authorized to operate the UAV during the day only. In one example, a user who has undergone night flight training may be authorized to operate the UAV during both the day and the night, while a user show has not undergone night flight training may only be authorized to operate the UAV during the day.

In some instances, different modes of UAV authorization may be provided. For example, in a pre-registration mode, only pre-registered users may be authorized to fly the UAV. In an open mode, all users may be authorized to fly the UAV. In a skill-based mode, only users that have exhibited a certain level of skill or experience may be permitted to fly the UAV. In some instances, a single mode may be provided for user authorization. In other instances, a user may be to switch between modes of user operation. For example, an owner of the UAV may switch the authorization mode under which the UAV is to function. In some instances, other factors, such as location of the UAV, time, level of air traffic, environmental conditions, may determine the authorization mode under which the UAV is to function. For example, if the environmental conditions are very windy or difficult in which to fly, the UAV may automatically only permit users that are authorized under a skill mode to fly the UAV.

When a user is not authorized to operate a UAV, the user is not permitted to operate the UAV 840. In some instances, this may result in the UAV not responding to a command from the user and/or a remote controller of the user. The user may not be able to cause the UAV to fly, or control flight of the UAV. The user may not be able to control any other component of the UAV, such as payload, carrier, sensors, communication unit, navigation unit, or power unit. The user may or may not be able to power the UAV on. In some instances, the user may power a UAV on, but the UAV may not respond to the user. If the user is not authorized, the UAV may optionally power itself off. In some instances, an alert or message may be provided to the user that the user is not authorized to operate the UAV. A reason the user is not authorized may or may not be provided. Optionally, an alert or message may be provided to a second user that the user is not authorized to operate the UAV, or that an attempt has been made by the user to operate the UAV. The second user may be an owner or operator of the UAV. The second user may be an individual who is authorized to operate the UAV. The second user may be an individual that exercises control over the UAV.

In some alternative embodiments, when a user is not authorized to operate a UAV, the user may only be permitted to operate the UAV in a restricted manner. This may include geographic restrictions, time restrictions, speed restrictions, restrictions on use of one or more additional components (e.g., payload, carrier, sensor, communication unit, navigation unit, power unit, etc.). This may include a mode of operation. In one example, when a user is not authorized to operate a UAV, the user may not operate the UAV at selected locations. In another example, a when a user is not authorized to operate a UAV, the user may only operate the UAV at selected locations.

When a user is authorized to operate a UAV, the user may be permitted to operate the UAV 850. The UAV may respond to a command from the user and/or remote controller of the user. The user may be able to control flight of the UAV, or any other component of the UAV. The user may manually control the UAV through user inputs via a remote controller. In some instances, the UAV may automatically override a user input to comply with a set of flight regulations. The set of flight regulations may be pre-established, or may be received on-the fly. In some instances, one or more geofencing device may be used in establishing or providing the set of flight regulations.

Aspects of the invention may be directed to a method of operating a UAV. The method may comprise: receiving a UAV identifier that uniquely identifies the UAV from other UAVs; receiving a user identifier that uniquely identifies the user from other users; assessing, with aid of one or more processors, whether the user identified by the user identifier is authorized to operate the UAV identified by the UAV identifier; and permitting operation of the UAV by the user when the user is authorized to operate the UAV. Similarly, a non-transitory computer readable medium containing program instructions for operating a UAV may be provided, said computer readable medium comprising: program instructions for receiving a UAV identifier that uniquely identifies the UAV from other UAVs; program instructions for receiving a user identifier that uniquely identifies the user from other users; program instructions for assessing whether the user identified by the user identifier is authorized to operate the UAV identified by the UAV identifier; and program instructions for permitting operation of the UAV by the user when the user is authorized to operate the UAV.

Additionally, a UAV authorization system may be provided, comprising: a first communication module; and one or more processors operably coupled to the first communication module and configured to individually or collectively: receive a UAV identifier that uniquely identifies the UAV from other UAVs; receive a user identifier that uniquely identifies the user from other users; assess whether the user identified by the user identifier is authorized to operate the UAV identified by the UAV identifier; and transmit a signal to permit operation of the UAV by the user when the user is authorized to operate the UAV. An unmanned aerial vehicle (UAV) authorization module may comprise: one or more processors configured to individually or collectively: receive a UAV identifier that uniquely identifies the UAV from other UAVs; receive a user identifier that uniquely identifies the user from other users; assess whether the user identified by the user identifier is authorized to operate the UAV identified by the UAV identifier; and transmit a signal to permit operation of the UAV by the user when the user is authorized to operate the UAV.

A second user may be able to take over control of the UAV from the first user. In some instances, both the first user and the second user may be authorized to operate the UAV. Alternatively, only the second user is authorized to operate the UAV. The first user may be authorized to operate the UAV in a more restricted fashion than the second user. The second user may be authorized to operate the UAV in a less restricted fashion than the first user. One or more operational levels may be provided. A higher operational level may be indicative of a priority in which a user may operate a vehicle. For instance, a user at a higher operational level may have priority over a user at a lower operational level in operating a UAV. The user at the higher operational level may be able to take over control of the UAV from a user at a lower operational level. In some instances, the second user may be at a higher operational level than the first user. A user at a higher operational level may optionally be authorized to operate the UAV in a less restricted fashion than a user at a lower operational level. A user at a lower operational level may optionally be authorized to operate the UAV in a more restricted fashion than a user at a higher operational level. Operation of a UAV may be taken over by the second user from the first user, when the second user is authorized to operate the UV and is of a higher operational level than the first user.

Operation of the UAV by the second user may be permitted when the UAV authenticates a privilege of the second user to operate the UAV. The authentication may occur with aid of a digital signature and/or digital certificate that verifies the identity of the second user. Authentication of the second user and/or the first user may occur using any authentication procedure as described elsewhere herein.

In some embodiments, the second user that may take over control may be part of emergency services. For instance, the second user may be part of law enforcement, fire services, medical services, or disaster relief services. The second user may be an electronic police. In some instances, the second user may be part of a government agency, such as an agency that may regulate air traffic or other types of traffic. The second user may be an air control system operator. The user may be a member or administrator of an authentication system. The second user may be a member of a defense force or a quasi-defense force. For instance, the second user may be a member of the Air Force, Coast Guard, National Guard, China Armed Police Force (CAPF), or any other type of defense force or equivalent in any jurisdiction of the world.

The first user may be notified when the second user takes over control. For instance, an alert or message may be provided to the first user. The alert or message may be provided via a remote controller of the first user. The alert may be visibly displayed, or may be audible or tactilely discernible. In some embodiments, a second user may make a request to take over control of the UAV from the first user. The first user may choose to accept or deny the request. Alternatively, the second user may be able to take over control without requiring acceptance or permission from the first user. In some embodiments, there may be some lag time between when the first user is alerted that the second user is taking over control and when the second user takes over control. Alternatively, little or no lag time is provided, so that the second user may be able to take over instantaneously. A second user may be able to take over control within less than 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of making the attempt to take over control.

The second user may take over control from the first user in response to any scenario. In some embodiments, the second user may take over control when the UAV enters a restricted region. Control may be returned to the first user when the UAV exits the restricted region. The second user may operate the UAV while the UAV is within the restricted region. In another instance, the second user may be able to take over control of the UAV at any time. In some instances, when a safety or security threat is ascertained, the second user may be able to take over control of the UAV. For example, if it is detected that a UAV is heading on a collision course with an aircraft, the second user may be able to take over control to avoid the UAV collision with the air craft.

Authentication

A user of a UAV may be authenticated. The user may be uniquely identified with aid of a user identifier. The user identifier may be authenticated to verify that the user is actually the user associated with the user identifier. For example if a user self-identifies using a user identifier that is associated with Bob Smith, the user may be authenticated to confirm the user is actually Bob Smith.

A UAV may be authenticated. The UAV may be uniquely identified with aid of a UAV identifier. The UAV identifier may be authenticated to verify that the UAV is actually the UAV associated with the UAV identifier. For example, if a UAV self-identifies using a UAV identifier that is associated with UAV ABCD1234, the UAV may be authenticated to confirm the UAV is actually UAV ABCD1234.

In some instances, a user may be authorized to operate the UAV. One or more individual users may need to be identified prior to being able to operate the UAV. The identity of the users may need to be authenticated as being the individual the users claim to be in order to permit the user to operate the UAV. The user identity must first be authenticated and confirmed that the authenticated identity is authorized to operate the UAV before the user is permitted to operate the UAV.

Figure 9:
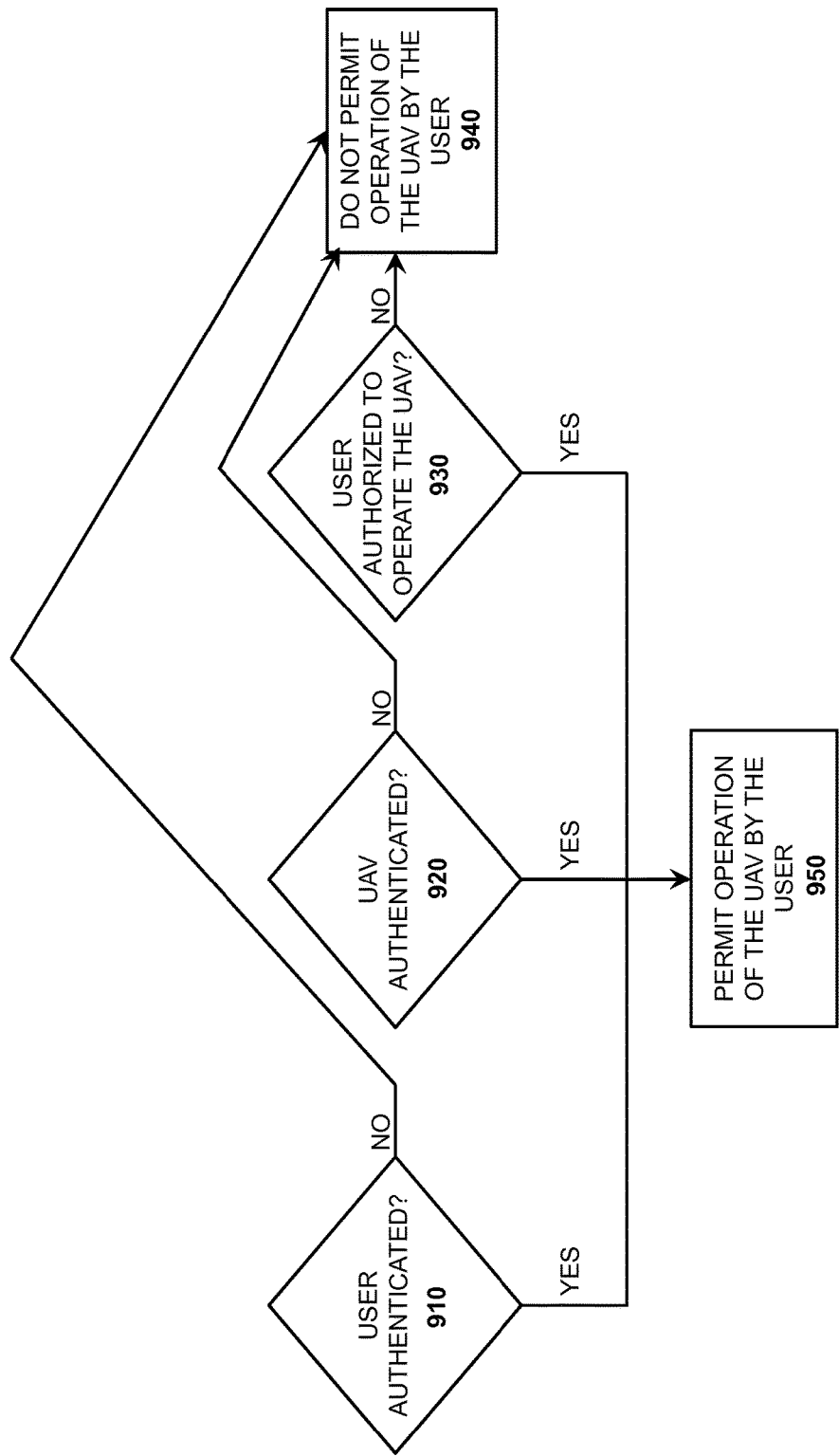
FIG. 9 shows a process of determining whether to permit operation of a UAV by a user, in accordance with an embodiment of the invention.

FIG. 9 shows a process of determining whether to permit operation of a UAV by a user, in accordance with an embodiment of the invention. The process may include authenticating a user 910 and authenticating a UAV 920. If the user does not pass the authentication process, the user may not be permitted to operate the UAV 940. If the UAV does not pass the authentication process, the user may not be permitted to operate the UAV 940. A determination may be made whether the user is authorized to operate the UAV 930. If the user is not authorized to operate the UAV, then the user may not be permitted to operate the UAV 940. If the user does pass the authentication process, the user may be permitted to operate the UAV 950. If the UAV does pass authentication process, the user may be permitted to operate the UAV 950. If the user is authorized to operate the UAV, the user may be permitted to operate the UAV 950. In some instances, both the user and the UAV must pass the authentication process before the user is permitted to operate the UAV 950. Optionally, the user and the UAV must both pass the authentication process and the user must be authorized to operate the UAV before the user is permitted to operate the UAV 950.

In some instances, permission to operate the UAV may apply to any circumstance, or may only apply within one or more allocated volumes or regions. For instance, a user/UAV may need to pass authentication to operate the UAV at all. In other instances, a user may normally be able to operate the UAV, but may need to be authenticated to operate the UAV within a selected airspace, such as a restricted region.

An aspect of the invention may be directed to a method of operating a UAV, said method comprising: authenticating an identity of a UAV, wherein the identity of the UAV is uniquely distinguishable from other UAVs; authenticating an identity of a user, wherein the identity of the user is uniquely distinguishable from other users; assessing, with aid of one or more processors, whether the user is authorized to operate the UAV; and permitting operation of the UAV by the user when the user is authorized to operate the UAV, and both the UAV and the user are authenticated. Similarly, a non-transitory computer readable medium containing program instructions for operating a UAV may be provided, said computer readable medium comprising: program instructions for authenticating an identity of a UAV, wherein the identity of the UAV is uniquely distinguishable from other UAVs; program instructions for authenticating an identity of a user, wherein the identity of the user is uniquely distinguishable from other users; program instructions for assessing, with aid of one or more processors, whether the user is authorized to operate the UAV; and program instructions for permitting operation of the UAV by the user when the user is authorized to operate the UAV, and both the UAV and the user are authenticated.

Moreover, systems and methods provided herein may include a UAV authentication system, comprising: a first communication module; and one or more processors operably coupled to the first communication module and configured to individually or collectively: authenticate an identity of a UAV, wherein the identity of the UAV is uniquely distinguishable from other UAVs; authenticate an identity of a user, wherein the identity of the user is uniquely distinguishable from other users; assess whether the user is authorized to operate the UAV; and transmit a signal to permit operation of the UAV by the user when the user is authorized to operate the UAV, and both the UAV and the user are authenticated. A UAV authentication module may comprise: one or more processors configured to individually or collectively: authenticate an identity of a UAV, wherein the identity of the UAV is uniquely distinguishable from other UAVs; authenticate an identity of a user, wherein the identity of the user is uniquely distinguishable from other users; assess whether the user is authorized to operate the UAV; and transmit a signal to permit operation of the UAV by the user when the user is authorized to operate the UAV, and both the UAV and the user are authenticated.

A user identifier and/or UAV identifier may be gathered in any manner as described elsewhere herein. For example, during flight, a UAV may broadcast its identity information in a continuous manner or whenever necessary. For example, the UAV may broadcast a user identifier when a supervisory instruction from an air control system (e.g., a policeman) is received or when a communication between the UAV and the air control system is to be encrypted and authenticated. The broadcast of identification information may be implemented in various ways, e.g., radio signal, optical signal, acoustical signal, or any other type direct or indirect communication method as described elsewhere herein.

A user and/or UAV may be authenticated using any technique known or later developed in the art. Further details and examples of user and/or UAV authentication are provided elsewhere herein.

UAV

A UAV may be authenticated with aid of a key of the UAV. A UAV may have a unique UAV identifier. The UAV may be authenticated further with aid of the UAV identifier. The UAV identifier and UAV key information may be used in combination to authenticate the UAV. The UAV identifier and/or UAV key may be provided on-board the UAV. The UAV identifier and/or the key may be part of an identification module of the UAV. The identification module may be part of a flight control unit of the UAV. The identification module may be inseparable from the flight control unit, as described elsewhere herein. The UAV identifier and/or the UAV key may not be removable from the UAV. The UAV may not be disassociated from the UAV identifier and the UAV key on-board the UAV. In preferable embodiments, the UAV identifier and/or the UAV key may not be erased or altered.

Further descriptions of UAV authentication are provided elsewhere herein. Further details of how UAV authentication may occur using a UAV identifier and/or a key are provided in greater detail elsewhere herein.

Any UAV without a UAV identifier and a UAV key cannot be authenticated by an authentication center, in accordance with some embodiments of the invention. If the UAV identifier or the UAV key is missing, the UAV cannot access the air control system successfully and cannot conduct any activity within a flight restricted area. In some instances, the user may not be permitted to operate the UAV at all if the UAV identity is not authenticated. Alternatively, the user may not be permitted to operate the UAV within the restricted airspace but may be permitted to operate the UAV in other regions. Any illegal activity of such UAV may be blocked and punished.

Under some specific circumstances, a UAV and a user may start a flight mission directly without the authentication. For example, when no communication connection can be established between the UAV, the user and the authentication center, the user may still be permitted to start the mission. In some instances, during the mission, if communication connections do become established, authentication of the user and/or UAV may occur. If the user and/or UAV do not pass authentication, then a response measure may be taken. For instance, the UAV may land after a predetermined period of time. In another instance, the UAV may return to a starting point of the flight. If the user and/or UAV do pass authentication, then the user may be able to continue operation of the UAV in an uninterrupted fashion. In some instances, even if communication connections do become established during the mission, authentication of the user and/or UAV do not occur.

If a mission has already been initiated without authentication, authentication may occur later in the mission. Depending on whether authentication is passed, a flight response measure may or may not be taken. Alternatively, no authentication occurs later in the mission when it becomes possible for authentication to occur. A determination may be made whether to proceed with authentication during a mission based on any number of factors. For instance, one or more environmental conditions may be considered. For example, environmental climate, topology, population density, air traffic or surface traffic, environmental complexity, or any other environmental condition may be considered. For instance, a UAV may be able to determine (e.g., with the aid of a GPS and a map) that it is located in a city or in the suburbs, and an authentication may not be necessary if it is in the suburbs. Thus, authentication may be required when there is a higher population density, and may not be required when there is a lower population density. Authentication may be required when population density exceeds a population density threshold. In another instance, authentication may be required when there is a high density of air traffic, and may not be required when there is a lower density of air traffic. Authentication may be required when air traffic density exceeds a threshold. Similarly, authentication may be required when environmental complexity (e.g., higher number or density of surrounding objects) is higher and may not be required when the environmental complexity is lower. Authentication may be required when the environmental complexity exceeds a threshold value. Other types of factors, such as geography, time, and any other factor described elsewhere herein may be considered in determining whether authentication is required.

When a UAV flies without authentication, its flight capability may be restricted. A UAV flight may be restricted in accordance with a set of flight regulations. The set of flight regulations may include one or more rules that may impact operation of the UAV. In some embodiments, the UAV may only be restricted in accordance with flight regulations if the UAV flies without authentication, otherwise if the UAV is authenticated no set of flight regulations are imposed. Alternatively, the UAV may be restricted in accordance with a set of flight regulations during normal operation, and may have an additional set of flight regulations imposed if the UAV is not authenticated. In some embodiments, the UAV operation may be restricted in accordance with a set of flight regulations regardless of whether the UAV is authenticated or not, but the set of flight regulations may call for different rules based on when the UAV is authenticated or not. In some instances, the rules may be more restrictive if the UAV is not authenticated. Overall, not authenticating the UAV may result in less freedom to the operator of the UAV to control the UAV in accordance with any aspect of the UAV (e.g., flight, payload operation or positioning, carrier, sensors, communications, navigation, power usage, or any other aspects).

Examples of types of flight capabilities of the UAV that may be restricted may include one or more of the following, or may include other types of restrictions to the UAV as described elsewhere herein. For instance, distance of the UAV flight may be restricted, e.g. it has to be within the visual range of the user. Height and/or speed of the flight may be restricted. Optionally, equipment (such as a camera or other type of payload) carried by the UAV may be required to suspend operations temporarily.

Different restrictions may apply according to the level of the user. For example, for more experienced users, fewer restrictions may apply. For instance, a user with greater experience or skill level may be permitted to perform functions that a novice user may not be permitted to do. A user with greater experience or skill level may be permitted to fly in areas or locations that a novice user may not be permitted to fly. As described elsewhere herein, a set of flight regulations for a UAV may be tailored to user type and/or UAV type.

A UAV may communicate with an authentication system. In some examples, an authentication system may have one or more characteristics as described elsewhere herein (e.g., FIG. 2). A UAV may communicate with an air control system of an authentication system. Any description herein of communications between a UAV and an air control system may apply to any communications between a UAV and any other portion of an authentication system. Any description herein of communications between a UAV and an air control system may apply to communications between a UAV and any other external device or system which may aid in UAV flight safety, security, or regulation.

A UAV may communicate with an air control system in any manner. For instance the UAV may form a direct communication channel with the air control system. Examples of direct communication channels may include radio connections, WiFi, WiMax, infrared, Bluetooth, or any other type of direct communication. A UAV may form an indirect communication channel with the air control system. Communications may be relayed via one or more intermediary device. In one example, communications may be relayed via a user and/or user device, such as a remote controller. Alternatively or in addition, communications may be relayed via a single or multiple other UAVs. Communications may be relayed via a ground station, router, tower, or satellites. A UAV may communicate using a single manner or multiple manners described herein. Any of the manners of communication may be combined. In some instances, different modes of communication may be used simultaneously. Alternatively or additionally, a UAV may switch between different modes of communication.

After mutual authentication of a UAV (possibly together with a user) with an authentication center (or any portion of an authentication system), safe communication connection with the air control system may be obtained. A safe communication connection between the UAV and the user can also be obtained. A UAV can communicate directly with a traffic monitoring server and/or one or more geo-fencing devices of an air control system. A UAV can also communicate with a user and may be relayed via a user to reach an authentication center or the air control system. In some embodiments, direct communication with a traffic monitoring server and/or one or more geo-fencing devices may occur only after authentication of the UAV and/or user have occurred. Alternatively, direct communications may occur even if authentication has not occurred. Communications between the UAV and the user may occur only after authentication of the UAV and/or user in some embodiments. Alternatively, communications between the UAV and the user may occur even if authentication of the UAV and/or user have not occurred.

In some embodiments, a flight plan of a UAV may be pre-registered with an air control system. For instance, a user may need to specify a planned location and/or timing of the flight. The air control system may be able to determine whether the UAV is permitted to fly in accordance with the flight plan. The flight plan may be exact or may be a rough estimate. During a flight, a UAV may be autonomously controlled or semi-autonomously controlled to fly in accordance with a flight plan. Alternatively, a user may have free reign to manually control the UAV, but be supposed to stay within the estimates of the flight plan. In some instances, the flight of the UAV may be monitored, and if the manual control is deviating from the proposed flight plan by too great a margin, the UAV may be forced to under a flight response measure. The flight response measure may include forcing the UAV to go back on course (e.g., takeover flight by a computer or another individual), forcing the UAV to land, forcing the UAV to hover, or forcing the UAV to return to its starting point. In some instances, the air control system may determine whether to permit the UAV to fly in accordance with a flight plan based on flight plans of other UAVs, current monitored air traffic, environmental conditions, any flight restrictions in the area and/or time, or any other factor. In alternative embodiments, pre-registration of a flight plan may not be needed.

After a secure link is established, the UAV may apply for a resource (e.g., an aerial route and a time period, or any other resource described elsewhere herein) with a traffic management module of the air control system. The traffic management module may manage traffic rights. The UAV may accept a set of flight regulations (e.g., distance, height, speed, or any other type of flight regulations describe elsewhere herein) on the flight. The UAV may take off only if permission is received. The flight plan may be recorded in traffic management.

During the flight, the UAV may regularly report its status to a traffic monitoring subsystem of the air control system. The status of the UAV may be conveyed to the traffic monitoring subsystem using any technique. Direct or indirect communications, such as those described elsewhere herein may be used. External sensor data may or may not be used in determining the UAV status and conveying status information to the traffic monitoring subsystem. In some examples, the UAV status information may be broadcasted, or being relayed by ground stations or other intermediary devices to the traffic management subsystem. The UAV may receive the supervision of the traffic management subsystem. The traffic management subsystem may use direct or indirect communication methods, such as those described elsewhere herein, to communicate with the UAV. If the scheduled flight is to be modified, the UAV may submit an application with the traffic management subsystem. The application may be submitted before initiation of the UAV flight, or may occur after the UAV has started the flight. The application may be made while the UAV is flying. The traffic management may have the capacity to monitor the flight of UAV. The traffic management subsystem may monitor the flight of the UAV in accordance with information from the UAV and/or information from one or more sensors external to the UAV.

During flight, a UAV may communicate with other devices (including but not limited to, other UAVs or geo-fencing devices). During flight a UAV may also be able to authenticate (including but not limited to, digital signature+ digital certificate) and/or respond (e.g., responding to an authenticated geo-fencing device).

During flight, a UAV may accept a take-over control from a higher lever user (such as an air control system or an electronic police), as described in greater detail elsewhere herein. The higher lever user may take the control over if the privilege is authenticated by the UAV.

After the flight, a UAV may release the applied resource. If a response to a traffic management subsystem times out, the applied resource may also be released. For instance, the resource may be the location and/or timing of the planned UAV flight. When the flight is completed, a UAV may send a signal to the traffic management subsystem to release the resource. Alternatively, the traffic management subsystem may self-initiate a release of the resource. The traffic management subsystem may self-initiate the release of the resource if the UAV stops communicating with the traffic management subsystem after a predetermined period of time. In some instances, the traffic management subsystem may self-initiate the release of the resource if the time period that was applied for is completed (e.g., if the UAV blocked off a time period from 3:00-4:00 PM for its mission, and 4:00 has passed).

A UAV may respond to an authentication request and/or identity checking request. The request may come from an authentication system. In some instances, the request may come from a traffic monitoring server. The request may occur when the UAV is powered on. The request may occur when the UAV makes a request for a resource. The request may come prior to flight of the UAV. Alternatively, the request may come during flight of the UAV. In some embodiments, a UAV having a security function will respond to an authentication request and/or an identity checking request from a traffic monitoring server. In some implementations, the response may be made under any circumstances, which may include authentication fails.

During a flight, if communication between a UAV and an air control system is interrupted and/or the connection is lost, the UAV may be able to quickly get back to a flight status of relatively limited rights and return rapidly. Thus, if communications between the UAV and the air control system get interrupted, a flight response measure may be taken. In some instances, the flight response measure may be automatic return of the UAV to a starting point. The flight response measure may be automatic flight of the UAV to a position of a user of the UAV. The flight response measure may be automatic return of the UAV to a home location, which may or may not be a starting point of the UAV flight. The flight response measure may be to automatically land. The flight response measure may be to automatically enter an autonomous flight mode were the UAV flies in accordance with a pre-registered flight plan.

User

A user may be an operator of a UAV. Users may be classified according to user type. In one example, users may be classified according to their skill and/or experience levels. An authentication system may issue identifying information for a user. For instance, an authentication center may be responsible for issuing certificate to a user and assigning corresponding user identifier and/or user key. In some instances, an ID registration database may perform one or more of the functions. For instance, the ID registration database may supply a user identifier and/or user key.

A user may be authenticated. The user authentication may occur using any technique known or later developed in the art. The user authentication technique may be similar or different from a UAV authentication technique.

In one example, a user may be authenticated based on information that is supplied by the user. A user may be authenticated based on knowledge that the user may have. In some instances, the knowledge may be known only by the user and not widely known by other users. For example, the user may be authenticated by supplying a correct username and password. A user may be authenticated by submitting a password, passphrase, typing or swiping movement, signature, or any other type of information by the user. The user may be authenticated by responding to one or more query by the system correctly. In some embodiments, a user may apply for a login name and/or password from an authentication center. The user may be able to login in with said login name and password.

A user may be authenticated based on a physical characteristic of the user. Biological information about the UAV may be used to authenticate the user. For example, the user may be authenticated by submitting biometric information. For instance, the user may undergo a fingerprint scan, a palm print scan, an iris scan, a retinal scan, or a scan of any other portion of the user's body. The user may provide a physical sample, such as saliva, blood, fingernail clippings, or hair clippings that may be analyzed to identify the user. In some instances, DNA analysis of a sample from a user may occur. The user may be authenticated by undergoing facial recognition or gait recognition. The user may be authenticated by submitting a voiceprint. A user may submit the user's height and/or weight for analysis.

A user may be authenticated based on a device that may be in the possession of a user. A user may be authenticated based on a memory unit and/or information on the memory unit that may be in the possession of the user. For example, a user may have a memory device issued by an authentication center, other part of the authentication system, or any other source. A memory device may be an external memory device such as a U disk (e.g., USB drive), external hard drive, or any other type of memory device. In some embodiments, the external device may be coupled to a user remote controller. For example, the external device, such as a U disk may be physically connected to the remote controller (e.g., inserted/plugged into the remote controller), or may be in communication with the remote controller (e.g., transmitting a signal that may be picked up by the remote controller). The device may be a physical memory storage device.

A user may be authenticated based on information that may be storable in memory that may be in the possession of the user. A separate physical memory device may or may not be used. For example, a token, such as a digitalized token, may be in the possession of the user. The digitalized token may be stored on a U disc, hard drive or other form of memory. The digitalized token may be stored on a memory of the remote controller. For example, the digitalized token may be received by the remote controller from an authentication center, ID registration database, or any other source. In some embodiments, the digitalized token may not be externally readable from a memory of the remote controller. The digitalized token may or may not be alterable on the memory of the remote controller.

A user may be authenticated with aid of an identification module that may be provided on the remote controller. The identification module may be associated with the user. The identification module may include a user identifier. In some embodiments, the identification module may include a user key information. The data stored in the identification module may or may not be externally readable. The data stored in the identification module may optionally not be alterable. The identification module may optionally not be separable from the remote controller. The identification may optionally not be removed from the remote controller without damaging the flight controller. The identification module may optionally be integrated in the remote controller. The information in the identification module may be put on record via the authentication center. For example, the authentication center may keep records of information from the identification module of the remote controller. In one example, a user identifier and/or user key may be put on record by the authentication center.

The user may be authenticated by undergoing a mutual authentication process. In some instances, the mutual authentication process may be similar to an authentication and key agreement (AKA) process. The user may be authenticated with aid of a key on-board a user terminal used by the user to communicate with the UAV. The terminal may optionally be a remote controller that may send one or more command signals to a UAV. The terminal may be a display device that may show information based on data received from the UAV. Optionally, the key may be part of an identification module of the user terminal and may be integrated into the user terminal. The key may be part of an identification module of a remote controller and may be integrated into the remote controller. The key may be supplied by an authentication system (e.g., ID registration database of the authentication system). Further examples and details of mutual authentication of the user may be provided in greater detail elsewhere herein.

In some embodiments, a user may need to have a software or application to operate a UAV. The software or application itself may be authorized as part of a user authentication process. In one example, a user may have a smart phone app, which may be used to operate a UAV. The smart phone app may itself be authorized directly. When the smart phone app used by the user is authenticated, further user authentication may or may not be used. In some instances, smart phone authorization may be coupled with additional user authentication steps as detailed elsewhere herein. In some instances, smart phone app authorization may be sufficient to authenticate a user.

A user may be authenticated with aid of authentication system. In some instances, the user may be authenticated by an authentication center of an authentication system (e.g., authentication center 220 as illustrated in FIG. 2) or any other component of the authentication system.

The user authentication may take place at any point in time. In some embodiments, user authentication may automatically occur when a UAV is turned on. User authentication may occur automatically when a remote controller is turned on. User authentication may occur when a remote controller and UAV form a communication channel. User authentication may occur when a remote controller and/or UAV form a communication channel with an authentication system. User authentication may occur in response to an input from a user. For example, user authentication may occur when a user attempts to login, or supplies information about the user (e.g., user name, password, biological information). In another example, user authentication may occur when information from a memory device (e.g., U disk) is supplied to an authentication system, or when information (e.g., digitalized token or key) is supplied to the authentication system. The authentication process may thus be pushed from a user or user device. In another example, the user authentication may occur when the authentication is requested from an authentication system or another external source. An authentication center or air control system of the authentication system may request authentication of the user. The authentication center or air control system may request authentication from the user once, or multiple times. The authentication may occur before flight of the UAV and/or during flight of the UAV. In some instances, a user may be authenticated before performing a flight commission using a UAV. A user may be authenticated before a flight plan may be approved. A user may be authenticated before the user is able to exert control over the UAV. A user may be authenticated before a UAV may be permitted to take off. A user may be authenticated after a connection with an authentication system has been lost and/or re-established. A user may be authenticated when one or more events or conditions have been detected (e.g., unusual flying patterns by the UAV). A user may be authenticated when a suspected unauthorized takeover of the UAV has occurred. A user may be authenticated when a suspected communication interference of the UAV has occurred. A user may be authenticated when a UAV deviates from an expected flight plan.

Similarly, UAV authentication may occur at any time, such as the times mentioned above for user authentication. The user and UAV authentication may occur at substantially the same time (e.g., within 5 minutes or less, 4 minutes or less, 3 minutes or less, 2 minutes or less, 1 minute or less, 30 seconds or less, 15 seconds or less, 10 seconds or less, 5 seconds or less, 3 seconds or less, 1 second or less, 0.5 seconds or less, or 0.1 seconds or less of one another). The user and UAV authentication may occur in similar conditions or scenarios. Alternatively they may occur at different times and/or in response to different conditions or scenarios.

Information about the user may be collected after the user has been authenticated. Information about the user may include any information described elsewhere herein. For instance, the information may include user type. The user type may include skill and/or experience level of the user. The information may include past flight data of the user.

Authentication Center

An authentication system may be provided in accordance with an embodiment of the invention. The authentication system may include an authentication center. Any description herein of the authentication center may apply to any component of an authentication system. Any description herein of an authentication system may apply to an external device or entity, or one or more functions of the authentication system may be performed on-board a UAV and/or on-board a remote controller.

An authentication center may be responsible for data pertaining to one or more users and/or UAVs. The data may include associated user identifiers, associated user keys, associated UAV identifiers, and/or associated UAV keys. The authentication center may receive the identity of the user and/or the identity of the UAV. In some embodiments, the authentication system may be responsible for all data pertaining to one or more users and UAVs. Alternatively, the authentication system may be responsible for a subset of all data pertaining to one or more users and UAVs.

A controller of a UAV (e.g., user's remote controller) and the UAV may send out a login request to the air control system. The controller and/or UAV may send out the login request before a flight of the UAV. The controller and/or UAV may send out the login request before flight of the UAV is permitted. The controller and/or UAV may send out the login request when the controller and/or UAV is turned on. The controller and/or UAV may send out the login request when a connection between the controller and the UAV is established, or when a connection between the controller and an external device is established, or when a connection between the UAV and an external device is established. The controller and/or UAV may send out a login request in response to a detected event or condition. The controller and/or UAV may send out a login request when an instruction for authentication is provided. The controller and/or UAV may send out a login request when an instruction for authentication is provided from an external source (e.g., authentication center). The controller and/or UAV may initiate a login request, or the login request may be provided in response to an initiation from outside the controller and/or UAV. The controller and/or UAV may make a request for a login at a single point in time during a UAV session. Alternatively, the controller and/or UAV may make a request for a login at multiple points in time during a UAV session.

The controller and UAV may make a request for login at substantially the same time (e.g., within less than 5 minutes, less than 3 minutes, less than 2 minutes, less than 1 minute, less than 30 seconds, less than 15 seconds, less than 10 seconds, less than 5 seconds, less than 3 seconds, less than 1 second, less than 0.5 seconds, or less than 0.1 seconds of one another). Alternatively, the controller and UAV may make requests for logins at different times. The controller and UAV may make a request for a login in accordance with a detection of the same event or condition. For instance, both the controller and UAV may make a login request when a connection is established between the controller and the UAV. Alternatively, the controller and UAV may make a request for a login in accordance with different events or conditions. Thus, the controller and UAV may make a request for a login independently of one another. For example, a controller may make a request for a login when a controller is powered on, while the UAV may make a request for a login when a UAV is powered on. These events may occur at times independent of one another.

Any description of a login request may apply to any type of authentication, as described elsewhere herein. For example, any description of a login request may apply to providing a username and password. In another example, any description of a login request may apply to initiation of an AKA protocol. In another example, any description of a login request may include provision of physical characteristics of a user. A login request may be an initiation of an authentication process, or request for authentication.

After receiving a login request from a user of a UAV and/or the UAV, an authentication system may initiate an authentication process. In some instances, an air control system may receive the login request and may initiate an authentication process using the authentication center. Alternatively, the authentication center may receive the login request and initiate the authentication process on its own. The login request information may be transmitted to the authentication center, and the authentication center may authenticate the identity information. In some instances, the login request information may include a username and/or password. In some embodiments, the login information may include the user identifier, the user key, the UAV identifier, and/or the UAV key.

A communication connection between an air control system and an authentication center may be safe and reliable. Optionally, the air control system and the authentication center may utilize one or more of the same sets of processors and/or memory storage units. Alternatively, they may not. The air control system and the authentication center may or may not utilize the same set of hardware. The air control system and the authentication center may or may not be provided at the same location. In some instances, a hardwired connection may be provided between the air control system and the authentication center. Alternatively, a wireless communication may be provided between the air control system and the authentication center. Direct communications may be provided between the air control system and the authentication center. Alternatively, indirect communications may be provided between the air control system and the authentication center. Communications between the air control system and authentication center may or may not traverse a network. The communication connection between the air control system and the authentication center may be encrypted.

After authentication of the user and/or UAV at the authentication center, a communication connection between the UAV and an air control system is established. In some embodiments, authentication of both the user and UAV may be required. Alternatively, authentication of the user or authentication of the UAV may be sufficient. A communication connection between the remote controller and the air control system may optionally be established. Alternatively or in addition, a communication connection between the remote controller and the UAV may be established. Further authentication may or may not occur after a communication connection, such as connection described herein, has been established.

The UAV may communicate with the air control system via a direct communication channel. Alternatively, the UAV may communicate with the air control system via an indirect communication channel. The UAV may communicate with the air control system by being relayed through a user or a remote controller operated by the user. The UAV may communicate with the air control system by being relayed through one or more other UAVs. Any other types of communications, such as those described elsewhere herein may be provided.

A remote controller of a user may communicate with the air control system via a direct communication channel. Alternatively, the remote controller may communicate with the air control system via an indirect communication channel. The remote controller may communicate with the air control system by being relayed through a UAV operated by the user. The remote controller may communicate with the air control system by being relayed through one or more other UAVs. Any other types of communications, such as those described elsewhere herein may be provided. In some instances, a communication connection between a remote controller and an air control system need not be provided. In some instances, a communication connection between the remote controller and the UAV may be sufficient. Any type of communication may be provided between the remote controller and the UAV, such as those described elsewhere herein.

After authentication of the user and/or the UAV, the UAV may be permitted to apply for a resource with a traffic management module of the air control system. In some embodiments, authentication of both the user and UAV may be required. Alternatively, authentication of the user or authentication of the UAV may be sufficient.

A resource may comprise an aerial route and/or a time period. A resource may be used in accordance with a flight plan. The resource may include one or more of the following: sense and avoid assistance, access to one or more geo-fencing devices, access to a battery station, access to a fuel station, or access to a base station and/or dock. Any other resource as described elsewhere herein may be provided.

A traffic management module of an air control system may record one or more flight plans of the UAV. The UAV may be permitted to apply for a modification in a scheduled flight of the UAV. The UAV may be permitted to modify a flight plan of the UAV prior to starting the flight plan. The UAV may be permitted to modify a flight plan while the UAV is executing the flight plan. A traffic management module may make a determination whether the UAV is permitted to make a requested modification. If the UAV is permitted to make the requested modification, the flight plan may be updated to include the requested modification. If the UAV is not permitted to make the requested modification, the flight plan may not be changed. The UAV may be required to comply with the original flight plan. If a UAV deviates significantly from a flight plan (whether original or updated), a flight response measure may be imposed upon the UAV.

In some embodiments, after authentication of a user and/or UAV at the authentication center, a communication connection between the UAV and one or more geo-fencing devices may be established. Further details relating to geo-fencing devices are provided elsewhere herein.

After authentication of the user and/or UAV at the authentication center, a communication connection between the UAV and one or more authenticated intermediary object may be established. The authenticated intermediary object may be another authenticated UAV, or an authenticated geo-fencing device. The authenticated intermediary object may be a base station, or a station or device that may relay communications. The authenticated intermediary object may undergo any type of authentication process such as those described elsewhere herein. For example, the authenticated intermediary object may have passed authentication using an AKA process.

A determination may be made whether a user is authorized to operate a UAV. The determination may be made prior to authenticating the user and/or the UAV, concurrently with authenticating the user and/or the UAV, or after authenticating the user and/or the UAV. If a user is not authorized to operate a UAV, the user may not be permitted to operate the UAV. If a user is not authorized to operate a UAV, the user may only be able to operate the UAV in a restricted manner. A user may only be permitted to operate the UAV at selected locations when the user is not authorized to operate the UAV. One or more flight regulations, such as those described elsewhere herein, may be imposed on a user who is not authorized to operate the UAV. In some implementations, the set of flight regulations imposed on the user when the user is not authorized to operate the UAV may be more restricting or stringent than regulations that may be imposed on the user when the user is authorized to operate the UAV. When a user is authorized to operate the UAV, a set of flight regulations may or may not be imposed on the user. When a user is authorized to operate the UAV, the set of flight regulations imposed on the user may include a null value. A user may be able to operate a UAV in an unrestricted manner when the user is authorized to operate the UAV. Alternatively, some restrictions may apply, but may not be as stringent, or may be different, from restrictions that may apply to a user when a user is not authorized to operate the UAV.

A set of flight regulations may depend on an identity of the UAV and/or an identity of a user. In some instances, a set of flight regulations may be changed, depending on an identity of the UAV and/or identity of the user. Restrictions to flight of a UAV may be adjusted or maintained based on an identity of the UAV. Restrictions to flight of the UAV may be adjusted or maintained based on an identity of the user. In some embodiments, a default set of restrictions to flight of a UAV may be provided. The default may be in place prior to authentication and/or identification of the UAV. The default may be in place prior to authentication and/or identification of the user. Depending on an authenticated identity of a user and/or UAV, the default may be maintained or adjusted. In some instances, the default may be adjusted to a less restrictive set of flight regulations. In other instances, the default may be adjusted to a more restrictive set of flight regulations.

In some embodiments, a user may be authorized to operate the UAV if the user and/or UAV are identified and authenticated. In some instances, a user may not be authorized to operate the UAV even if the user and/or UAV are identified and authenticated. Whether a user is authorized to operate the UAV may be independent of whether the user and/or UAV are authenticated. In some instances, identification and/or authentication may occur prior to determining whether a user is authorized in order to confirm the user and/or UAV before making the determination whether the confirmed user is authorized to operate the confirmed UAV.

In some instances, only a single user is authorized to operate the UAV. Alternatively, multiple users may be authorized to operate the UAV.

The UAV may be authenticated prior to permitting the UAV to take off. The user may be authenticated prior to permitting the UAV to take off. The user may be authenticated prior to permitting a user to exert control over the UAV. The user may be authenticated prior to permitting a user to send one or more operational commands to the UAV via a user remote controller.

Degree of Authentication

Varying degrees of authentication may occur. In some instances, different authentication processes, such as those described elsewhere herein, may occur. In some instances, higher degrees of authentication may occur, and in other instances, lower degrees of authentication may occur. In some embodiments, a determination may be made on the degree or type of authentication process to undergo.

An aspect of the invention provides a method of determining a level of authentication for operation of an unmanned aerial vehicle (UAV), said method comprising: receiving contextual information regarding the UAV; assessing, using one or more processors, a degree of authentication of the UAV or a user of the UAV based on the contextual information; effecting authentication of the UAV or the user in accordance with the degree of authentication; and permitting operation of the UAV by the user when the degree of authentication is completed. Similarly, a non-transitory computer readable medium containing program instructions for determining a level of authentication for operating an unmanned aerial vehicle (UAV) may be provided, said computer readable medium comprising: program instructions for receiving contextual information regarding the UAV; program instructions for assessing a degree of authentication of the UAV or a user of the UAV based on the contextual information; program instructions for effecting authentication of the UAV or the user in accordance with the degree of authentication; and program instructions for providing a signal that permits operation of the UAV by the user when the degree of authentication is completed.

An unmanned aerial vehicle (UAV) authentication system may comprise: a communication module; and one or more processors operably coupled to the communication module and configured to individually or collectively: receive contextual information regarding the UAV; assess a degree of authentication of the UAV or a user of the UAV based on the contextual information; and effect authentication of the UAV or the user in accordance with the degree of authentication. An unmanned aerial vehicle (UAV) authentication module may be provided, comprising: one or more processors configured to individually or collectively: receive contextual information regarding the UAV; assess a degree of authentication of the UAV or a user of the UAV based on the contextual information; and effect authentication of the UAV or the user in accordance with the degree of authentication.

A degree of authentication may be provided for a user and/or UAV. In some instances, a degree of authentication for a user may be variable. Alternatively, a degree of authentication for a user may be fixed. A degree of authentication for a UAV may be variable. Alternatively, a degree of authentication for a UAV may be fixed. In some embodiments, degree of authentication for a user and a UAV may both be variable. Optionally, a degree of authentication for a user and a UAV may both be fixed. Alternatively, a degree of authentication for a user may be variable while degree of authentication for a UAV may be fixed, or a degree of authentication for a user may be fixed while degree of authentication for a UAV may be variable.

The degree of authentication may include not requiring any authentication for the user and/or UAV. For example, the degree of authentication can be zero. Thus, the degree of authentication may comprise no authentication of the UAV or the user. The degree of authentication may include authentication of both the UAV and the user. The degree of authentication may include authentication of the UAV without requiring authentication of the user, or may include authentication of the user without requiring authentication of the UAV.

The degree of authentication may be selected from a plurality of options for degrees of authentication for the UAV and/or the user. For example, three options for degrees of authentication of the UAV and/or the user may be provided (e.g., high degree of authentication, moderate degree of authentication, or low degree of authentication. Any number of options for degrees of authentication may be provided (e.g., 2 or more, 3 or more, 4 or more, 5 or more, 6 or more, 7 or more, 8 or more, 9 or more, 10 or more, 12 or more, 15 or more, 20 or more, 25 or more options). In some instances, a degree of authentication may be generated and/or determined without selecting from one or more predetermined options. The degree of authentication may be generated on the fly.

Higher degrees of authentication may provide a greater level of certainty that the user is who the user is identified to be, or that the UAV is who the UAV identifies to be, as compared to lower degrees of authentication. Higher degrees of authentication may provide a greater level of certainty that the user identifier matches the actual user and/or that the UAV identifier matches the actual UAV, as compared to lower degrees of authentication. Higher degrees of authentication may be a more rigorous authentication process than lower degrees of authentication. Higher degrees of authentication may include the authentication processes of the lower degrees of authentication plus additional authentication processes. For example, a lower degree of authentication may only include a username/password combination, while a higher degree of authentication may include the username/password combination plus an AKA authentication process. Optionally, higher degrees of authentication may take more resources or computing power. Optionally, higher degrees of authentication may take a greater amount of time.

Any description herein of a degree of authentication may apply to a type of authentication. For instance, the type of authentication use may be selected from a plurality of different options. The types of authentication may or may not be indicative of a higher degree of authentication. Depending on contextual information, different types of authentication processes may be selected. For example, based on the contextual information, a username/password combination may be used for authentication, or biometric data may be used for authentication. Depending on the contextual information, an AKA authentication process plus a biometric data authentication may occur, or a username/password plus biological sample data authentication may occur. Any description herein of selecting a degree of authentication may also apply to selecting a type of authentication.

The contextual information may be used to assess a degree of authentication. Contextual information may include any information about a user, UAV, remote controller, geo-fencing device, environmental conditions, geographic conditions, timing conditions, communication or network conditions, risk to a mission (e.g., risk of attempted takeover or interference), or any other type of information that may be related to a mission. The contextual information may include information provided by the user, remote controller, UAV, geo-fencing device, authentication system, external device (e.g., external sensor, external data source) or any other device.

In one example, the contextual information may include environmental conditions. For example, the contextual information may comprise an environment within which the UAV is to be operated. The environment may be an environment type, such as a rural area, suburban area, or urban area. A greater degree of authentication may be required when the UAV is in an urban area than when a UAV is in a rural area. A greater degree of authentication may be required when the UAV is in an urban area than when the UAV is in a suburban area. A greater degree of authentication may be required when the UAV is in a suburban area than when the UAV is within a rural area.

The environmental conditions may include a population density of the environment. A greater degree of authentication may be required when the UAV is in an environment with greater population density than when the UAV is in an environment with lower population density. A greater degree of authentication may be required when a UAV is in an environment with a population density that meets or exceeds a population threshold, and a lesser degree of authentication may be required when a UAV is in an environment with a population degree that does not exceed or is below a population threshold. Any number of population thresholds may be provided, which may be used to determine a degree of authentication. For example, three population thresholds may be provided, where an increasing degree of authentication may be required as each threshold is met and/or exceeded.

The environmental conditions may include a degree of traffic within the environment. The traffic may include air traffic and/or surface-based traffic. Surface-based traffic may include ground vehicles and/or water vehicles in the environment. A greater degree of authentication may be required when the UAV is in an environment with a higher degree of traffic than when the UAV is in an environment with lesser degree of traffic. A greater degree of authentication may be required when a UAV is in an environment with a degree of traffic that meets or exceeds a traffic threshold, and a lesser degree of authentication may be required when a UAV is in an environment with a degree of traffic that does not exceed or is below a traffic threshold. Any number of traffic thresholds may be provided, which may be used to determine a degree of authentication. For example, five traffic thresholds may be provided, where an increasing degree of authentication may be required as each threshold is met and/or exceeded.

The environmental conditions may include an environmental complexity of the environment. The environmental complexity may be indicative of obstacles and/or potential safety hazards within the environment. An environmental complexity factor can be used to represent the extent to which an environment is occupied by obstacles. The environmental complexity factor may be a quantitative or qualitative measure. In some embodiments, the environmental complexity factor may be determined based on one or more of: the number of obstacles, the volume or percentage of space occupied by obstacles, the volume or percentage of space within a certain proximity to the UAV occupied by obstacles, the volume or percentage of space unobstructed by obstacles, the volume or percentage of space within a certain proximity to the UAV unobstructed by obstacles, the proximity of obstacles to the UAV, the obstacle density (e.g., number of obstacles per unit space), the types of obstacles (e.g., stationary or mobile), the spatial disposition of obstacles (e.g., position, orientation), the motion of obstacles (e.g., velocity, acceleration), and so on. For instance, an environment having a relatively high obstacle density would be associated with a high environmental complexity factor (e.g., indoor environment, urban environment), whereas an environment having a relatively low obstacle density would be associated with a low environmental complexity factor (e.g., high altitude environment). As another example, an environment in which a large percentage of space is occupied by obstacles would have a higher complexity, whereas an environment having a large percentage of unobstructed space would have a lower complexity. An environmental complexity factor can then be computed based on a generated environmental representation. An environmental complexity factor can be determined based on a three-dimensional digital representation of the environment generated using the sensor data. The three-dimensional digital representation can comprise a three-dimensional point cloud or an occupancy grid. A greater degree of authentication may be required when the UAV is in an environment with more environmental complexity than when the UAV is in an environment with less environmental complexity. A greater degree of authentication may be required when a UAV is in an environment with a degree of environmental complexity that meets or exceeds an environmental complexity threshold, and a lesser degree of authentication may be required when a UAV is in an environment with a degree of environmental complexity that does not exceed or is below an environmental complexity threshold. Any number of environmental complexity thresholds may be provided, which may be used to determine a degree of authentication. For example, two environmental complexity thresholds may be provided, where an increasing degree of authentication may be required as each threshold is met and/or exceeded.

The environmental conditions may include environmental climate conditions. Examples of climate conditions may include, but are not limited to, temperature, precipitation, wind speed or direction, or any other climate conditions. A greater degree of authentication may be required when the UAV is in an environment with more extreme or potentially harmful climate conditions than when the UAV is in an environment with less extreme or harmful climate conditions. A greater degree of authentication may be required when a UAV is in an environment that meets or exceeds a climate threshold, and a lesser degree of authentication may be required when a UAV is in an environment that does not exceed or is below a climate threshold. Any number of climate thresholds may be provided, which may be used to determine a degree of authentication. For example, multiple climate thresholds may be provided, where an increasing degree of authentication may be required as each threshold is met and/or exceeded.

Contextual information may include geographical information. For instance, the contextual information may include a location of a UAV. Contextual information may comprise geographic flight restrictions for the location of the UAV. Some locations may be classified as sensitive locations. In some examples, the locations may include airports, schools, campuses, hospitals, military zones, secured zones, research facilities, jurisdictional landmarks, power plants, private residences, shopping malls, gathering places, or any other type of location. In some instances, the locations may be categorized into one or more categories that may indicative of a level of "sensitivity" of the locations. A greater degree of authentication may be required when the UAV is at a location with a higher degree of sensitivity than when the UAV is at a location with lesser degree of sensitivity. For example, a greater degree of authentication may be required when a UAV is at a security military installation than when a user is at shopping mall. A greater degree of authentication may be required when a UAV is at a location with a degree of sensitivity that meets or exceeds a location sensitivity threshold, and a lesser degree of authentication may be required when a UAV is at a location with a degree of sensitivity that does not exceed or is below a location sensitivity threshold. Any number of location sensitivity thresholds may be provided, which may be used to determine a degree of authentication. For example, multiple location sensitivity thresholds may be provided, where an increasing degree of authentication may be required as each threshold is met and/or exceeded.

Contextual information may include time-based information. Time-based information may include time of day, day of the week, date, month, quarter, season, year, or any other time-based information. A greater degree of authentication may be required for time periods than other time periods. For example, a greater degree of authentication may be required on a day of a week with higher historic traffic. A greater degree of authentication may be required for a time of day with higher historic traffic or accidents. A greater degree of authentication may be required for a season with more extreme environmental climate. A greater degree of authentication may be required when time is within one or more specified time range. Any number of specified time ranges may be provided, which may be used to determine a degree of authentication. For example, ten time ranges may be provided, with different degrees or types of authentication required for each time range. In some instances, multiple types of time ranges may be weighed simultaneously in determining a degree of authentication. For example, time of day and day of the week may be considered and weighed to determine a degree of authentication.

Contextual information may include information relating to a user. The contextual information may include an identity of a user. The identity of the user may be indicative of a user type. The contextual information may include a user type. An example of user type may include a skill level and/or experience of the user. Any other user information as described elsewhere herein may be used as contextual information. A greater degree of authentication may be required when the user has less skill or experience than when a user has more skill or experience. A lesser degree of authentication may be required when the user has a skill or experience level that meets or exceeds a skill or experience threshold, and a greater degree of authentication may be required when the user has a skill or experience level that is less than or equal to a skill or experience threshold. Any number of skill or experience thresholds may be provided, which may be used to determine a degree of authentication. For example, three skill or experience thresholds may be provided, where a decreasing degree of authentication may be required as each threshold is met and/or exceeded.

Contextual information may include information relating to a UAV. The contextual information may include an identity of a UAV. The identity of the UAV may be indicative of a UAV type. The contextual information may include a UAV type. An example of UAV type may include a model of a UAV. Any other UAV information as described elsewhere herein may be used as contextual information. A greater degree of authentication may be required when the UAV model is a more complex or difficult to handle model than when the UAV model is a more simple or easy to handle model. A greater degree of authentication may be required when the UAV model complexity or difficulty meets or exceeds a complexity or difficulty threshold, and a lesser degree of authentication may be required when the UAV model complexity or difficulty is less than or equal to a complexity or difficulty threshold. Any number of complexity or difficulty thresholds may be provided, which may be used to determine a degree of authentication. For example, four complexity or difficulty thresholds may be provided, where an increasing degree of authentication may be required as each threshold is met and/or exceeded.

The contextual information may include a complexity of a task to be performed by the UAV. The UAV may perform one or more tasks during a mission. The task may include flying along a flight path. The task may include collecting data about the UAV environment. The task may include transmitting data from the UAV. The task may include picking up, carrying, and/or depositing a payload. The task may include managing power on-board the UAV. The mission may include a surveillance or photography mission. In some instances, task complexity may be greater when greater computing or processing resources on-board the UAV are used in completing the task. In one example, a task to detect a moving target and follow the moving target with the UAV may be more complex than a task to play prerecorded music from a speaker of the UAV. A greater degree of authentication may be required when the UAV task is more complex than when the UAV task is more simple. A greater degree of authentication may be required when the UAV task complexity meets or exceeds a task complexity threshold, and a lesser degree of authentication may be required when the UAV task complexity is less than or equal to a task complexity threshold. Any number of task complexity thresholds may be provided, which may be used to determine a degree of authentication. For example, multiple task complexity thresholds may be provided, where an increasing degree of authentication may be required as each threshold is met and/or exceeded.

The contextual information may include information about surrounding communication systems. For example, the presence or absence of wireless signals in the environment may be an example of contextual information. In some instances, a likelihood of impacting one or more surrounding wireless signals may be provided as contextual information. The number of wireless signals in an environment may or may not affect the likelihood of impacting one or more surrounding wireless signals. If a larger number of signals are provided, there may be a higher likelihood that a least one of them may be affected. The security level of the wireless signals in the environment may or may not affect the likelihood of impacting one or more surrounding wireless signals. For example, the more wireless signals that have some security on them, the less likely that they will be affected. A greater degree of authentication may be required when the likelihood of affecting one or more surrounding wireless signals is higher than when the likelihood of affecting one or more surrounding wireless signals is lower. A greater degree of authentication may be required when the likelihood of affecting one or more surrounding wireless signal meets or exceeds a communication threshold, and a lesser degree of authentication may be required when the likelihood of affecting one or more surrounding wireless signal is less than or equal to a communication threshold. Any number of communication thresholds may be provided, which may be used to determine a degree of authentication. For example, multiple communication thresholds may be provided, where an increasing degree of authentication may be required as each threshold is met and/or exceeded.

A risk to interference with an operation of the UAV may be an example of contextual information. The contextual information may include information about risk of hacking/hijacking of a UAV. Another user may attempt to take over control of the UAV in an unauthorized fashion. A greater degree of authentication may be required when there is a higher risk of hacking/hijacking than when the risk of hacking/hijacking is lower. A greater degree of authentication may be required when the risk of hacking/hijacking meets or exceeds a risk threshold, and a lesser degree of authentication may be required when the risk of hacking/hijacking is less than or equal to a risk threshold. Any number of risk thresholds may be provided, which may be used to determine a degree of authentication. For example, multiple risk thresholds may be provided, where an increasing degree of authentication may be required as each threshold is met and/or exceeded.

The contextual information may include information about risk of interference with communications of the UAV. For instance, another unauthorized user may interfere with an authorized user's communications with the UAV in an unauthorized fashion. The unauthorized user may interfere with commands from the authorized user to the UAV, which may affect control of the UAV. The unauthorized user may interfere with data from the UAV to a device of the authorized user. A greater degree of authentication may be required when there is a higher risk of interference with UAV communications than when the risk interference with the UAV communications is lower. A greater degree of authentication may be required when the risk of interference with the UAV communications meets or exceeds a risk threshold, and a lesser degree of authentication may be required when the risk of interference with the UAV communications is less than or equal to a risk threshold. Any number of risk thresholds may be provided, which may be used to determine a degree of authentication. For example, multiple risk thresholds may be provided, where an increasing degree of authentication may be required as each threshold is met and/or exceeded.

The contextual information may include information about one or more sets of flight regulations. The contextual information may include information about a degree of flight restrictions in an area. This may be based on current flight restrictions or historic flight restrictions. The flight restrictions may be imposed by a control entity. A greater degree of authentication may be required when there is a greater degree of flight restrictions in the area than when there is a lesser degree of flight restrictions in the area. A greater degree of authentication may be required when the degree of flight restrictions in the area meets or exceeds a restriction threshold, and a lesser degree of authentication may be required when the degree of flight restrictions in the area is less than or equal to a restriction threshold. Any number of restriction thresholds may be provided, which may be used to determine a degree of authentication. For example, multiple restriction thresholds may be provided, where an increasing degree of authentication may be required as each threshold is met and/or exceeded.

Any type of contextual information may be used alone or in combination in determining a degree of authentication for a user and/or UAV. The type of contextual information used may remain the same over time, or may change. When multiple types of contextual information are assessed, they may be assessed substantially simultaneously in coming to the determination of the degree of authentication. The multiple types of contextual information may be considered as equal factors. Alternatively, the multiple types of contextual information may be weighted, and need not necessarily be equal factors. The types of contextual information with greater weight may have greater bearing on the degree of authentication that is determined.

The determination of the degree of authentication may be made on-board a UAV. The UAV may receive and/or generate the contextual information that is used. One or more processors of the UAV may receive the contextual information, either from external data sources (e.g., authentication system), or data sources on-board the UAV (e.g., sensors, clock). In some embodiments, the one or more processors may receive information from an air control system off-board the UAV. The information from the air control system may be assessed to determine a degree of authentication. The information from the air control system may be contextual information, or may be in addition to types of contextual information described elsewhere herein. The one or more processors may use the contextual information received to make the determination.

The determination of degree of authentication may be made off-board a UAV. For instance, the determination may be made by an authentication system. In some instances, an air control system or authentication center off-board a UAV may make a determination about the degree of authentication. One or more processors of the authentication system may receive the contextual information, either from external data sources (e.g., UAV, external sensors, remote controller), or data sources on-board the authentication system (e.g., clock, information about other UAVs). In some embodiments, the one or more processors may receive information from a UAV, remote controller, remote sensor, or other external device off-board the authentication system. The one or more processors may use the contextual information received to make the determination.

In another instance, the determination may be made on-board a remote controller of a user. The remote controller may receive and/or generate the contextual information that is used. One or more processors of the remote controller may receive the contextual information, either from external data sources (e.g., authentication system), or data sources on-board the remote controller (e.g., memory, clock). In some embodiments, the one or more processors may receive information from an air control system off-board the remote controller. The information from the air control system may be assessed to determine a degree of authentication. The information from the air control system may be contextual information, or may be in addition to types of contextual information described elsewhere herein. The one or more processors may use the contextual information received to make the determination.

Any other external device may be used in making a determination of the degree of authentication based on the contextual information. A single external device may be used or multiple external devices may be used together. The other external device may receive the contextual information from an off-board or on-board source. The other external device may include one or more processors that may use the contextual information received to make the determination.

Figure 10:
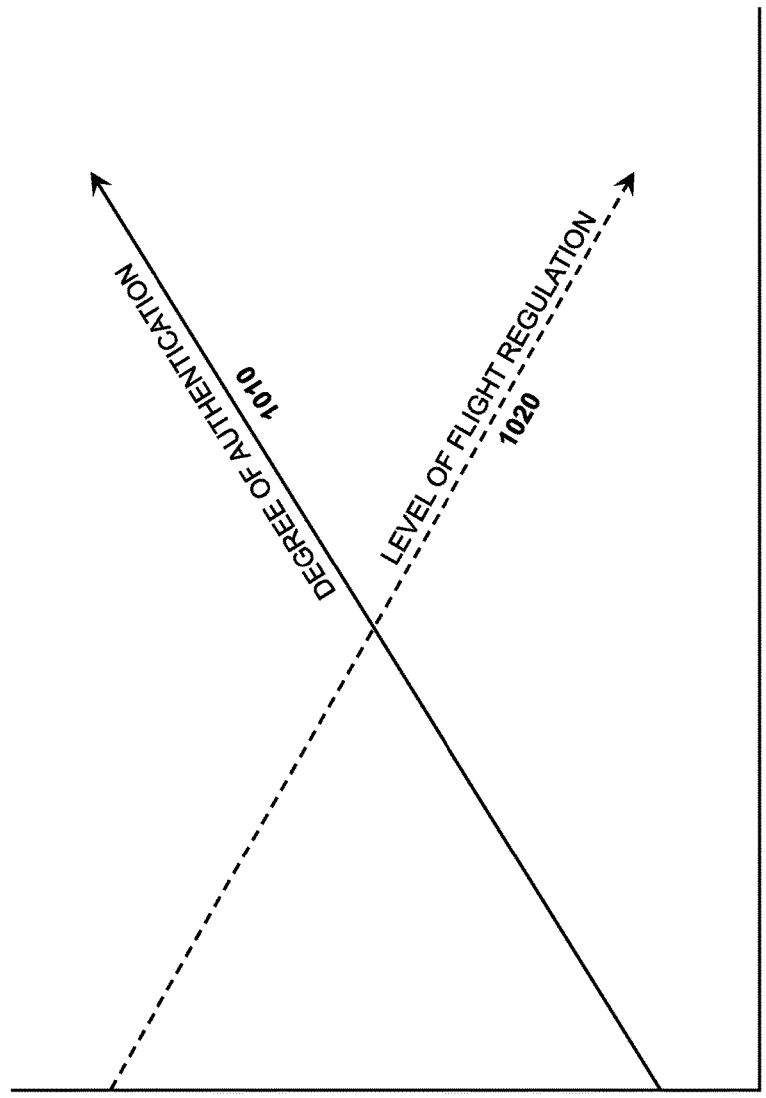
FIG. 10 shows an illustration of a level of flight regulation may be affected by a degree of authentication, in accordance with an embodiment of the invention.

FIG. 10 shows an illustration of a level of flight regulation may be affected by a degree of authentication, in accordance with an embodiment of the invention. A set of flight regulations may be generated, that may affect operation of the UAV. The set of flight regulations may be generated based on a degree of authentication. The set of flight regulations may be generated based on the degree of authentication that was completed. Whether the authentication was successfully passed may be considered. The degree of authentication may apply to any part of the system, such as UAV authentication, user authentication, remote controller authentication, geo-fencing device authentication, and/or any other type of authentication.

In some embodiments, as a degree of authentication 1010 increases, a level of flight regulation 1020 may decrease. If a greater degree of authentication has been formed, there may be less concern and need for restrictions on flight. The degree of authentication and the level of flight regulation may be inversely proportional. The degree of authentication and the level of flight regulation may be linearly proportional (e.g., linearly inversely proportional). The degree of authentication and the level of flight regulation may be exponentially proportional (e.g., exponentially inversely proportional). Any other inverse relationship may be provided between degree of authentication and level of flight regulation. In alternative embodiments, the relationship may be directly proportional. The relationship may be directly linearly proportional, directly exponentially proportional, or any other relationship. The level of flight regulation may depend on the degree of authentication performed. In alternatively embodiments, the level of flight regulation may be independent of the degree of authentication. The level of flight regulation may or may not be selected with regard to the degree of authentication. A more restrictive set of flight regulations is generated when the degree of authentication is lesser. A less restrictive set of flight regulations is generated when the degree of authentication is greater. A set of flight regulations may or may not be generated based on the degree of authentication.

An aspect of the invention is directed to a method of determining a level of flight regulation for operation of a UAV, said method comprising: assessing, using one or more processors, a degree of authentication of the UAV or a user of the UAV; effecting authentication of the UAV or the user in accordance with the degree of authentication; generating a set of flight regulations based on the degree of authentication; and effecting operation of the UAV in accordance with the set of flight regulations. Similarly an embodiment of the invention may be directed to a non-transitory computer readable medium containing program instructions for determining a level of flight regulation for a UAV, said computer readable medium comprising: program instructions for assessing a degree of authentication of the UAV or a user of the UAV; program instructions for effecting authentication of the UAV or the user in accordance with the degree of authentication; program instructions for generating a set of flight regulations based on the degree of authentication; and program instructions for providing a signal that permits operation of the UAV in accordance with the set of flight regulations.

A UAV authentication system may be provided, comprising: a communication module; and one or more processors operably coupled to the communication module and configured to individually or collectively: assess a degree of authentication of the UAV or a user of the UAV; effect authentication of the UAV or the user in accordance with the degree of authentication; and generate a set of flight regulations based on the degree of authentication. A UAV authentication module may comprise: one or more processors configured to individually or collectively: assess a degree of authentication of the UAV or a user of the UAV; effect authentication of the UAV or the user in accordance with the degree of authentication; and generate a set of flight regulations based on the degree of authentication.

As described elsewhere herein, the degree of authentication may include not requiring any authentication for the user and/or UAV. For example, the degree of authentication can be zero. Thus, the degree of authentication may comprise no authentication of the UAV or the user. The degree of authentication may include authentication of both the UAV and the user. The degree of authentication may include authentication of the UAV without requiring authentication of the user, or may include authentication of the user without requiring authentication of the UAV.

The degree of authentication may be selected from a plurality of options for degrees of authentication for the UAV and/or the user. For example, three options for degrees of authentication of the UAV and/or the user may be provided (e.g., high degree of authentication, moderate degree of authentication, or low degree of authentication. Any number of options for degrees of authentication may be provided (e.g., 2 or more, 3 or more, 4 or more, 5 or more, 6 or more, 7 or more, 8 or more, 9 or more, 10 or more, 12 or more, 15 or more, 20 or more, 25 or more options). In some instances, a degree of authentication may be generated and/or determined without selecting from one or more predetermined options. The degree of authentication may be generated on the fly. The UAV and/or user may be authenticated in accordance with the degree of authentication. The UAV and/or user may be considered to be authenticated if/when they pass the authentication process. The UAV and/or user may be considered to not be authenticated if they undergo the authentication process but do not pass. For example, an identifier/key mismatch may be an example of when authentication is not passed. Biometric data that is provided that does not match the biometric data on file may be another example of when authentication is not passed. Providing an incorrect login username/password combination may be an additional example of when the authentication process is not passed.

Information about a degree of authentication may include a level or category of authentication that has occurred. The level of category may be qualitative and/or quantitative. Information about a degree of authentication may include one or more types of authentication that have occurred. Information about a degree of authentication may include data collected during authentication (e.g., if authentication includes processing biological data, the biological data itself may be provided).

The set of flight regulations may be generated based on the degree of authentication. Any description herein of degree of authentication may also apply to type of authentication. The set of flight regulations may be generated in accordance with any technique as described elsewhere herein. For example, the set of flight regulations are generated by selecting the set of flight regulations from a plurality of set regulations. In another example, the set of flight regulations may be generated from scratch. The set of flight regulations may be generated with aid of an input from a user.

The set of flight regulations may be generated with aid of one or more processors. The generation of the set of flight regulations may occur on-board a UAV. The UAV may receive and/or generate the degree of authentication that is used. One or more processors of the UAV may receive the information pertaining to the degree of authentication, from external data sources, or data sources on-board the UAV. In some embodiments, the one or more processors may receive information from an air control system off-board the UAV. The information from the air control system may be assessed to generate a set of flight regulations. The one or more processors may use the information about the degree of authentication received to make the determination.

The generation of a set of flight regulations may occur off-board a UAV. For instance, the generation of the set of flight regulations may be effected by an authentication system. In some instances, an air control system or authentication center off-board a UAV may generate the set of flight regulations. One or more processors of the authentication system may receive the information pertaining to the degree of authentication, either from external data sources, or data sources on-board the authentication system. In some embodiments, the one or more processors may receive information from a UAV, remote controller, remote sensor, or other external device off-board the authentication system. The one or more processors may use the information about the degree of authentication received to make the determination.

In another instance, the generational of the set of flight regulations may occur on-board a remote controller of a user. The remote controller may receive and/or generate the degree of authentication that is used. One or more processors of the remote controller may receive the 1 information pertaining to the degree of authentication, either from external data sources or data sources on-board the remote controller. In some embodiments, the one or more processors may receive information from an air control system off-board the remote controller. The information from the air control system may be assessed to generate a set of flight regulations. The one or more processors may use the information about the degree of authentication to make the determination.

Any other external device may be used in generating a set of flight regulations based on the degree of authentication. A single external device may be used or multiple external devices may be used together. The other external device may receive the information about the degree of authentication from an off-board or on-board source. The other external device may include one or more processors that may use the information about the degree of authentication received to make the determination.

A UAV may be operated in accordance with the set of flight regulations. A user of the UAV may issue one or more commands that effects operation of the UAV. The commands may be issued with aid of a remote controller. The operation of the UAV may be effected in compliance with the set of flight regulations. If one or more commands are not in compliance with the set of flight regulations, the commands may be overridden so the UAV remains in compliance with the set of flight regulations. When the commands are in compliance with the set of flight regulations, the commands need not be overridden, and may be able to effect control of the UAV without interference.

Device Identification Storage

Figure 11:
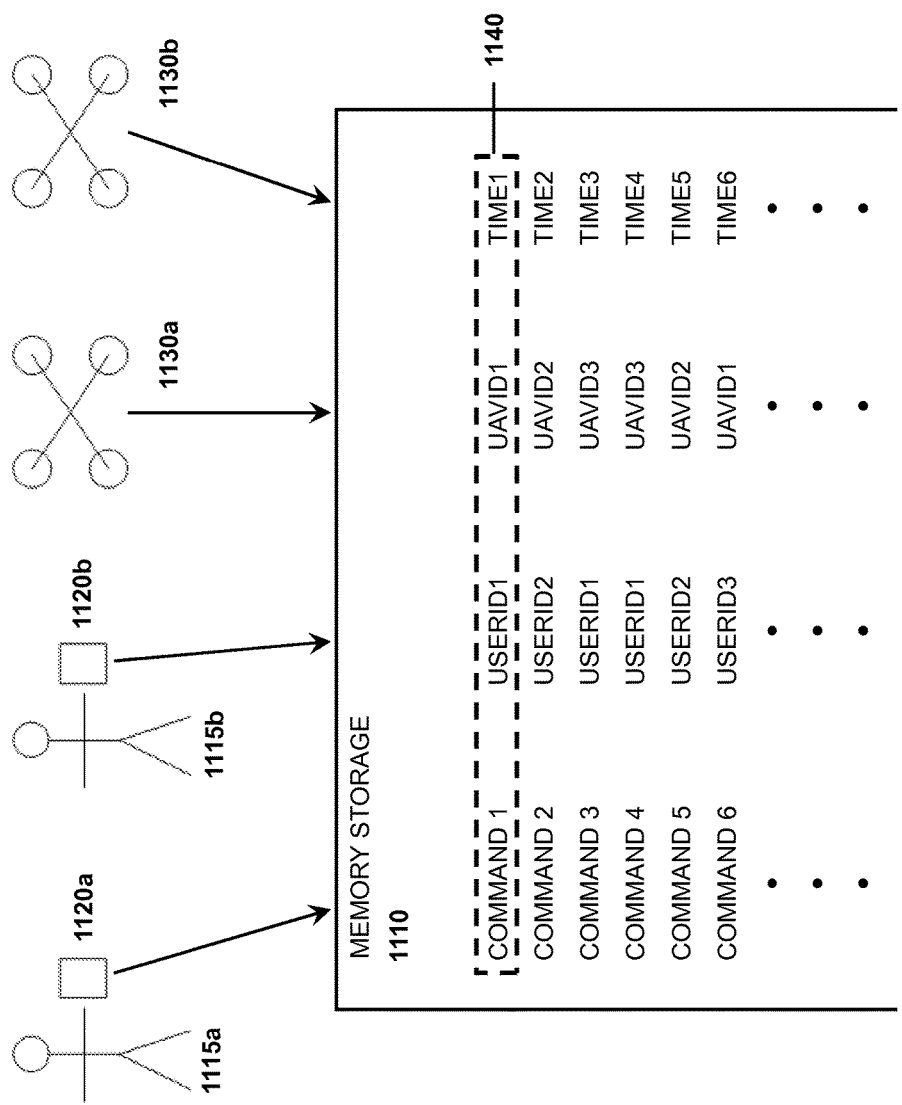
FIG. 11 shows an example of device information that may be stored in memory, in accordance with an embodiment of the invention.

FIG. 11 shows an example of device information that may be stored in memory, in accordance with an embodiment of the invention. A memory storage system 1110 may be provided. Information from one or more users 1115a, 1115b, one or more user terminals 1120a, 1120b, and/or one or more UAVs 1130a, 1130b may be provided. The information may include one or more commands, associated user identifier, associated UAV identifier, associated timing information, and any other associated information. One or more sets of information 1140 may be stored.

The memory storage system 1110 may include one or more memory storage units. The memory storage system may include one or more databases that may store the information described herein. The memory storage system may include computer readable media. One or more electronic storage units, such memory (e.g., read-only memory, random-access memory, flash memory) or a hard disk, may be provided. "Storage" type media can include any or all of the tangible memory of the computers, processors or the like, or associated modules thereof, such as various semiconductor memories, tape drives, disk drives and the like, which may provide non-transitory storage at any time for the software programming. In some embodiments, non-volatile storage media include, for example, optical or magnetic disks, such as any of the storage devices in any computer(s) or the like, such as may be used to implement the databases, etc. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The memory storage system may be provided at a single location or may be distributed over multiple locations. In some embodiments, the memory storage system may include a single memory storage unit, or multiple memory storage units. A cloud computer infrastructure may be provided. In some instances, a peer-to-peer (P2P) memory storage system may be provided.

The memory storage system may be provided off-board a UAV. The memory storage system may be provided on a device external to UAVs. The memory storage system may be provided off-board a remote controller. The memory storage system may be provided on a device external to remote controllers. The memory storage system may be off-board UAVs and remote controllers. The memory storage system may be part of authentication system. The memory storage system may be part of an air control system. The memory storage system may include one or more memory units that may be one or more memory units of an authentication system, such as an air control system. Alternatively, the memory storage system may be separate from an authentication system. The memory storage system may be owned and/or operated by the same entity as the authentication system. Alternatively, the memory storage system may be owned and/or operated by a different entity as the authentication system.

A communication system may include one or more recorders. The one or more recorders may receive data from any devices of the communication system. For example, the one or more recorders may receive data from one or more UAVs. The one or more recorders may receive data from one or more users and/or remote controllers. The one or more memory storage units may be provided over the one or more recorders. For instance, the one or more memory storage units may be provided over one or more recorders that receive one or more messages from the UAVs, users, and/or remote controllers. The one or more recorders may or may not have a limited range of receiving information. For example, a recorder may be configured to receive data from a device that is within the same physical area as the recorder. For example, a first recorder may receive information from a UAV when the UAV is in a first zone, and a second recorder may receive information from the UAV when the UAV is in a second zone. Alternatively, the recorders do not have a limited range and may receive information from devices (e.g., UAVs, remote controllers) regardless of the location of the device. The recorders may be the memory storage units and/or may convey the gathered information to the memory storage units.

Information from one or more users 1115a, 1115b may be stored in the memory storage system. The information may include user identification information. Examples of user identification information may include a user identifier (e.g., USERID1, USERID2, USERID3, . . . ). The user identifier may be unique to the user. In some instances the information from the users may include information useful for identifying and/or authenticating the user. The information from the one or more users may include information about the users. The information from the one or more users may include one or more commands (e.g., COMMAND1, COMMAND2, COMMAND3, COMMAND4, COMMAND5, COMMAND6, . . . ) from the user. The one or more commands may include commands that effect operation of the UAV. The one or more commands may be used to control flight of the UAV, take-off of the UAV, landing of the UAV, operation of a payload of the UAV, operation of a carrier of the UAV, operation of one or more sensors on-board a UAV, one or more communication units of the UAV, one or more power unit of the UAV, one or more navigation units of the UAV, and/or any features of the UAV. Any other type of information may be provided from the one or more users and may be stored in the memory storage system.

In some embodiments, all user inputs may be stored in the memory storage system. Alternatively, only selected user inputs may be stored in the memory storage system. In some instances, only certain types of user inputs are stored in the memory storage system. For instance, in some embodiments, only user identification inputs and/or command information is stored in the memory storage system.

The users may optionally provide information to the memory storage system with aid of one or more user terminals 1120a, 1120b. The user terminals may be a device capable of interacting with a user. The user terminal may be capable of interacting with a UAV. The user terminal may be a remote controller configured to send one or more operational commands to the UAV. The user terminal may be a display device configured to show data based on information received from the UAV. The user terminal may be capable of both sending information to the UAV and receiving information from the UAV.

Users may provide information to the memory storage system with aid of any other type of device. For example one or more computers or other devices may be provided that may be capable of receiving a user input. The devices may be capable of communication user input to the memory storage device. The devices need not interact with the UAVs.

The user terminals 1120a, 1120b may provide information to the memory storage system. The user terminals may provide information relating to a user, user commands, or any other type of information. The user terminals may provide information about the user terminals themselves. For instances, user terminal identification may be provided. In some instances, a user identifier and/or user terminal identifier may be provided. Optionally a user key and/or user terminal key may be provided. In some examples, a user does not provide any input relating to the user key, but the user key information may be stored on the user terminal or may be accessible by the user terminal. In some instances, the user key information may be stored on a physical memory of the user terminal. Alternatively, the user key information may be stored off-board (e.g., on the cloud) and may be accessible by the user terminal. In some embodiments, the user terminals may convey the user identifiers and/or associated commands.

The UAVs 1130a, 1130b may provide information to the memory storage system. The UAVs may provide information relating to the UAV. For example, UAV identification information may be provided. Examples of UAV identification information may include a UAV identifier (e.g., UAVID1, UAVID2, UAVID3, . . . ). The UAV identifier may be unique to the UAV. In some instances the information from the UAVs may include information useful for identifying and/or authenticating the UAV. The information from the one or more UAVs may include information about the UAVs. The information from the one or more UAVs may include one or more commands (e.g., COMMAND1, COMMAND2, COMMAND3, COMMAND4, COMMAND5, COMMAND6, . . . ) that we were received by the UAVs. The one or more commands may include commands that effect operation of the UAV. The one or more commands may be used to control flight of the UAV, take-off of the UAV, landing of the UAV, operation of a payload of the UAV, operation of a carrier of the UAV, operation of one or more sensors on-board a UAV, one or more communication units of the UAV, one or more power unit of the UAV, one or more navigation units of the UAV, and/or any features of the UAV. Any other type of information may be provided from the one or more UAVs and may be stored in the memory storage system.

In some embodiments, a user may be authenticated before user-related information is stored in the memory storage system. For example, the user may be authenticated before a user identifier is obtained and/or stored by the memory storage system. Thus, in some implementations, only authenticated user identifiers are stored in the memory storage system. Alternatively, a user need not be authenticated and a purported user identifier may be stored in the memory storage system prior to authentication. If authentication is passed an indication may be made that the user identifier has been verified. If authentication is not passed, an indication may be made that the user identifier has been flagged for suspicious activity, or that a failed attempt at authentication was made using the user identifier.

Optionally, a UAV may be authenticated before UAV-related information is stored in the memory storage system. For example, the UAV may be authenticated before a UAV identifier is obtained and/or stored by the memory storage system. Thus, in some implementations, only authenticated UAV identifiers are stored in the memory storage system. Alternatively, a UAV need not be authenticated and a purported UAV identifier may be stored in the memory storage system prior to authentication. If authentication is passed an indication may be made that the UAV identifier has been verified. If authentication is not passed, an indication may be made that the UAV identifier has been flagged for suspicious activity, or that a failed attempt at authentication was made using the UAV identifier.

In some embodiments, one or more flight commands are permitted only when a user is authorized to operate the UAV. A user and/or UAV may or may not be authenticated prior to determining whether the user is authorized to operate the UAV. A user and/or UAV may be authenticated prior to allowing the user to operate the UAV. In some instances, commands in the memory storage system may only be stored if the user is authorized to operate the UAV. Commands in the memory storage system may only be stored if the user and/or UAV are authenticated.

The memory storage unit may store one or more sets 1140 of information. The sets of information may include information from the user, user terminal, and/or UAV. The sets of information may include one or more commands, user identifier, UAV identifier, and/or associated time. The user identifier may be associated with the user who issued the command. The UAV may be associated with the UAV who received and/or executed the command. The time may be the time the command was issued and/or received. The time may be the time that the command was stored in memory. The time may be the time that a UAV executed the command. In some instances, a single command may be provided for a single set of information. Alternatively multiple commands may be provided for a single set of information. The multiple commands may include both commands issued by the user and corresponding commands received by the UAV. Alternatively, a single command may be provided, which may be recorded as it is issued from the user, or may be recorded as it is received by the UAV and/or executed by the UAV.

Thus, multiple sets of information may be provided with a related command. For example, a first set of information may be stored when the command is issued by the user. The time for the first set of information may be reflective of when the command was issued by the user or when the set of information was stored in the memory storage system. Optionally, data from a remote controller may be used to provide the first set of information. A second set of information may be stored when the command is received by the UAV. The time for the second set of information may be reflective of when the command was received by the UAV or when the set of information was stored in the memory storage system. Optionally, data from a UAV may be used to provide the second set of information based on the related command. A third set of information may be stored when the command is executed by the UAV. The time for the third set of information may be reflective of when the command was executed by the UAV or when the set of information was stored in the memory storage system. Optionally, data from a UAV may be used to provide the third set of information based on the related command.

The memory storage system may store sets of information relating to a particular interaction between a first user and a first UAV. For instance, multiple commands may be issued during the interaction between the first user and the first UAV. The interaction may be execution of a mission. In some instances, the memory storage unit may only store information pertaining to the particular interaction. Alternatively, the memory storage system may store information pertaining to multiple interactions (e.g., multiple missions) between the first user and the first UAV. The memory storage system may optionally store information according to the user identifier. Data that is tied to the first user may be stored together. Alternatively, the memory storage unit may store information according to the UAV identifier. Data that is tied to the first UAV may be stored together. The memory storage unit may store information according to user-UAV interactions. For instance, data that is tied to the first UAV and the first user together may be stored together. In some instances, only information relating to the user, the UAV, or the user-UAV combination may be stored in the memory storage unit.

Alternatively, the memory storage system may store sets of information pertaining to interactions between multiple users and/or UAVs. The memory storage system may be a data repository that collects information from multiple users and/or UAVs. The memory storage system may store information from multiple missions, which may include various users, various UAVs, and/or various user-UAV combinations. In some instances, the information sets in the memory storage system may be searchable or index-able. The information sets may be found or indexed according to any parameter, such as user identity, UAV identity, time, user-UAV combinations, types of commands, locations, or any other information. The information sets may be stored in accordance with any parameter.

In some instances, information in the memory storage system may be analyzed. The information sets may be analyzed to detect one or more patterns of behavior. The information sets may be analyzed to detect one or more characteristics that may be related to an accident or undesirable condition. For example, if a particular user frequently crashes a particular model of UAV, this data may be extracted. In another example, if another user tends to attempt to fly UAVs into regions where flight is not permitted in accordance with a set of flight regulations, such information may be extracted. Statistical analysis may be performed on the information sets in the memory storage units. Such statistical analysis may be useful for identifying trends or correlated factors. For example, it may be noticed that certain UAV models may have a higher accident rate overall than other UAV models. The information sets may be analyzed to determine that when the temperature in the environment falls beneath 5 degrees C., there may be a higher malfunction rate of UAVs in general. Thus, information in the memory storage system may be analyzed generally to gather information about operation of UAVs. Such general analysis need not be in response to particular events or scenarios.

The information from the memory storage system may be analyzed in response to particular events or scenarios. For example, if a UAV crash occurs, information associated with the UAV may be analyzed to provide further forensic information about the crash. If a UAV crash occurs during a mission, information sets collected during the mission may be pulled together and analyzed. For example, a mismatch between an issued command and a received command may be identified. Environmental conditions at the time of the crash may be analyzed. The presence of other UAVs or obstacles in the region may be analyzed. In some embodiments, information sets for the UAV from other missions may also be pulled. For example, in other missions, it may be detected that there were several near misses or malfunctions. Such information may be useful in determining the cause of the crash and/or any actions that need to be taken after the crash.

The information in the information sets may be used to track individualized UAV activity. For example, one or more commands, associated user identifier(s), and associated UAV identifier(s) may be used to track individualized UAV activity.

Information sets may store commands, user information, UAV information, timing information, location information, environmental condition information, flight regulation information, or any detected conditions. Any information may be corresponding to a command. For example, geographical information may include location of a UAV and/or remote controller when the command is issued. The geographical information may also be indicative of whether the UAV falls into a zone for the purposes of considering flight regulations. The environmental condition may include one or more environmental conditions of the area. For example, when the command is issued or received, the environmental complexity of an area around the UAV may be considered. A climate that the UAV is experiencing when the command is issued or received may be considered. The command may occur at a point in time.

The memory storage system may be updated in real-time. For instance, as commands are issued, received, and/or executed, they may be recorded in the memory storage system, along with any other information from the information set. This may occur in real-time. The commands and any related information in the information set may be stored within less than 10 minutes, 5 minutes, 3 minutes, 2 minutes, 1 minute, 30 seconds, 15 seconds, 10 seconds, 5 seconds, 3 seconds, 1 second, 0.5 seconds, or 0.1 seconds of the command being issued, received, and/or executed. The information sets may be stored or recorded in the memory storage system in any manner. They may be recorded as they come in without regard to other parameters, such as user identity, UAV identity, or user-UAV combination. Alternatively, they may be recorded with regard to other parameters. For instance, all the information sets for the same user may be stored together. Even if the information sets are not all stored together, they may be searchable and/or index-able to find associated information. For instance, if the information sets for a particular user come in at different points in time and are recorded together with information sets from other users, the information sets may be searchable to find all the information sets associated with the user.

In alternative embodiments, the memory storage system may not need to be updated in real-time. The memory storage system may be updated periodically at regular or irregular time intervals. For instance, the memory storage system may be updated every week, every day, every several hours, every hour, every half hour, every quarter hour, every 10 minutes, every 5 minutes, every 3 minutes, every minute, every 30 seconds, every 15 seconds, every 10 seconds, every 5 seconds, or every 1 second. In some instances, an update schedule may be provided, which may include regular or irregular update times. The update schedule may be fixed, or may be alterable. In some instances, the update schedule may be altered by an operator or manager of the memory storage system. The update schedule may be altered by an operator or manager of an authentication system. A user of a UAV may or may not be able to alter the update schedule. A user of a UAV may be able to alter an update schedule of a UAV associated with the user. The user may be able to alter an update schedule for a UAV the user is authorized to operate.

The memory storage system may be updated in response to a detected event or condition. For instance, the memory storage system may request or pull information sets from one or more external sources (e.g., remote controllers, UAVs, users) when an operator of the memory storage system requests the information. In another example, the memory storage system may be able to request or pull information sets when a detected condition, such as a detected crash, occurs. In some instances, the one or more external sources (e.g., remote controllers, UAVs, users) may push information sets to the memory storage system. For example, if a UAV detects that the UAV is approaching a flight-restricted zone, the UAV may push an information set to the memory storage system. In another example, if a remote controller or UAV recognizes that there may be some interfering wireless signal, they may push information sets to the memory storage unit.

An aspect of the invention may be directed to a method of recording unmanned aerial vehicle (UAV) behavior, said method comprising: receiving a UAV identifier that uniquely identifies the UAV from other UAVs; receiving a user identifier that uniquely identifies the user from other users, wherein the user provides one or more commands to effect operation of the UAV via a remote controller; and recording, in one or more memory storage units, the one or more commands, the user identifier associated with the one or more commands, and the UAV identifier associated with the one or more commands. Similarly, a non-transitory computer readable medium containing program instructions for recording unmanned aerial vehicle (UAV) behavior may be provided in accordance with embodiments of the invention, said computer readable medium comprising: program instructions for associating a user identifier with one or more commands from a user, wherein the user identifier that uniquely identifies the user from other users, and wherein the user provides one or more commands to effect operation of the UAV via a remote controller; program instructions for associating a UAV identifier with the one or more commands, wherein the UAV identifier uniquely identifies the UAV from other UAVs; and program instructions for recording, in one or more memory storage units, the one or more commands, the user identifier associated with the one or more commands, and the UAV identifier associated with the one or more commands.

An unmanned aerial vehicle (UAV) behavior recordation system may be provided in accordance with an embodiment of the invention. The system may comprise: one or more memory storage units; and one or more processors operably coupled to the one or more memory storage units and configured to individually or collectively: receive a UAV identifier that uniquely identifies the UAV from other UAVs; receive a user identifier that uniquely identifies the user from other users, wherein the user provides one or more commands to effect operation of the UAV via a remote controller; and record, in the one or more memory storage units, the one or more commands, the user identifier associated with the one or more commands, and the UAV identifier associated with the one or more commands.

A memory storage system may store the information sets for any period of time. In some instances, the information sets may be stored indefinitely, until they are deleted. Deletion of information sets may or may not be permitted. In some instances, only an operator or administrator of the memory storage system may be permitted to interact with the data stored in the memory storage system. In some instances, only an operator of an authentication system (e.g., air control system, authentication center) may be permitted to interact with the data stored in the memory storage system.

Optionally, the information sets may be automatically deleted after a period of time. The period of time may be pre-established. For instance, information sets may be automatically deleted after greater than a predetermined period of time. Examples of predetermined periods of time may include, but are not limited to 20 years, 15 years, 12 years, 10 years, 7 years, 5 years, 4 years, 3 years, 2 years, 1 year, 9 months, 6 months, 3 months, 2 months, 1 month, 4 weeks, 3 weeks, 2 weeks, 1 week, 4 days, 3 days, 2 days, 1 day, 18 hours, 12 hours, 6 hours, 3 hours, 1 hour, 30 minutes, or 10 minutes. In some instances, information sets may be deleted manually only after the predetermined period of time has passed.

Takeover Control

In some embodiments, operation of a UAV may be compromised. In one example, a user may operate a UAV. Another user (e.g., hijacker) may attempt to take over control of the UAV in an unauthorized manner. Systems and methods described herein may permit detection of such attempts. The systems and methods described herein may also provide responses to such hijacking attempts. In some embodiments, information collected in a memory storage system may be analyzed to detect hijacking.

Figure 12:
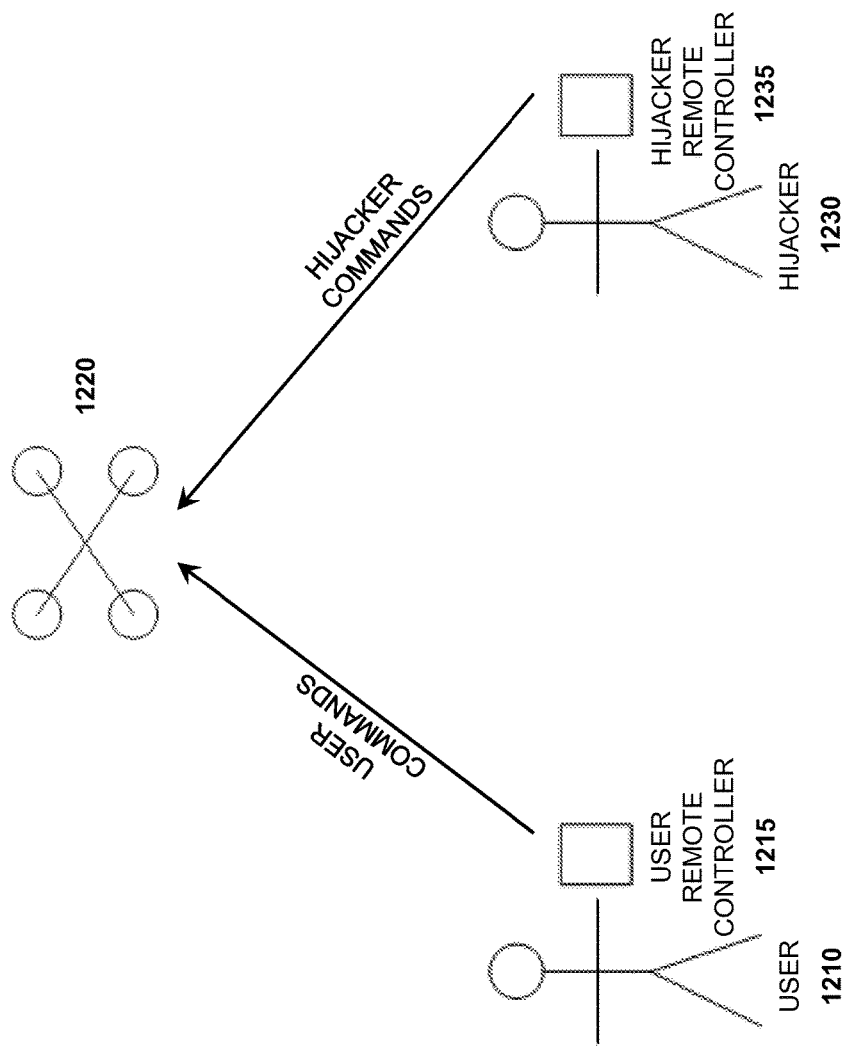
FIG. 12 shows an illustration of a scenario where a hijacker is attempting to take over control of a UAV, in accordance with an embodiment of the invention.

FIG. 12 shows an illustration of a scenario where a hijacker is attempting to take over control of a UAV, in accordance with an embodiment of the invention. A user 1210 may use a user remote controller 1215 to issue user commands to a UAV 1220. A hijacker 1230 may use a hijacker remote controller 1235 to issue hijacker commands to the UAV 1220. The hijacker commands may interfere with the user commands.

In some embodiments, a user 1210 may be an authorized user of the UAV 1220. A user may have an initial relationship with the UAV. The user may optionally be pre-registered with the UAV. The user may be operating the UAV prior to a hijacker attempt to take over control of the UAV. In some instances, a user may operate the UAV if the user is an authorized user of the UAV. If a user is not an authorized user of the UAV, the user may not be permitted to operate the UAV, or may operate the UAV in a more restricted manner.

A user identity may be authenticated. In some instances, the user identity may be authenticated prior to the user operating the UAV. The user may be authenticated prior to, concurrently with, or subsequent to determining whether the user is an authorized user of the UAV. A user may operate the user if the user is authenticated. If a user is not authenticated, the user may not be permitted to operate the UAV, or may operate the UAV in a more restricted manner.

The user 1210 may use a user remote controller 1215 to control operation of the UAV 1220. The remote controller may obtain a user input. The remote controller may transmit user commands to the UAV. The user commands may be generated based on the user input. The user commands may control operation of the UAV. For instance, the user commands may control flight (e.g., flight path, take-off, landing) of the UAV. The user commands may control operation of one or more payloads, position of one or more payloads, operation of one or more carriers, operation of one or more sensors, operation of one or more communication units, operation of one or more navigation units, and/or operation of one or more power units.

In some instances, the user commands may be continuously sent to the UAV. Even if the user does not actively provide an input at a moment in time, a command may be sent to the UAV to maintain status quo, or based on the last input provided by the user. For example, if user input includes a movement of a joystick, and the user maintains the joystick at a particular angle, a flight command may be sent to the UAV based on the joystick angle known from the previous motion. In some instances, user input may be continuously provided to the remote controller, even if the user is not actively moving or physically changing anything. For example, if a user input includes tilting the remote controller to a particular attitude, and the user does not adjust the attitude that has been established, a user input may be constantly provided based on a constantly measured attitude of the remote controller. For instance, if the remote controller is at angle A for an extended period of time, during that period of time, the user input may be interpreted as the attitude of the remote controller being angle A. The flight commands may be transmitted to the UAV indicating a flight command in response to the remote controller being at angle A. The user commands to the UAV may be updated in real-time. The user commands may be reflective of user inputs within less than 1 minute, 30 seconds, 15 seconds, 10 seconds, 5 seconds, 3 seconds, 2 seconds, 1 second, 0.5 seconds, 0.1 seconds, 0.05 seconds, or 0.01 seconds.

Optionally, the user commands need not be continuously sent to the UAV. The user commands may be sent at regular or irregular periods of time. For example, user commands may be sent within less than or equal to every hour, every 30 minutes, every 15 minutes, every 10 minutes, every 5 minutes, every 3 minutes, every minute, every 30 seconds, every 15 seconds, every 10 seconds, every 5 seconds, every 3 seconds, every 2 seconds, every 1 second, every 0.5 seconds, or every 0.1 seconds. The user commands may be sent in accordance with a schedule. The schedule may or may not be alterable. The user commands may be sent in response to one or more detected events or conditions.

The user commands may be received by the UAV 1220. When the received user commands at the UAV match the sent user commands from the user remote controller 1215, the UAV may be able to operate in accordance with the commands from the user. The communication link between the UAV and the remote controller may be operational when the issued and received commands match. The commands may not have been dropped if the issued and received commands match. In some embodiments, if the issued and received commands do not match, the commands may have been dropped (e.g., communication link between the remote controller and UAV may have been dropped), or an interfering command may be have been issued.

The hijacker 1230 may use a hijacker remote controller 1235 to control operation of the UAV 1220. The remote controller may obtain a hijacker input. The remote controller may transmit hijacker commands to the UAV. The hijacker commands may be generated based on the hijacker input. The hijacker commands may control operation of the UAV. For instance, the hijacker commands may control flight (e.g., flight path, take-off, landing) of the UAV. The hijacker commands may control operation of one or more payloads, position of one or more payloads, operation of one or more carriers, operation of one or more sensors, operation of one or more communication units, operation of one or more navigation units, and/or operation of one or more power units.

In some instances, the hijacker commands may be continuously sent to the UAV. This may occur in a similar manner to how user commands may be continuously sent to the UAV. Alternatively, the hijacker commands need not be continuously sent to the UAV. This may occur in a similar manner to how user commands need not be continuously sent to the UAV. The hijacker commands may be sent at regular or irregular periods of time. The hijacker commands may be sent in accordance with a schedule. The hijacker commands may be sent in response to one or more detected events or conditions.

The hijacker commands may be received by the UAV 1220. When the received hijacker commands at the UAV match the sent hijacker commands from the hijacker remote controller 1235, the UAV may be able to operate in accordance with the commands from the hijacker. The communication link between the UAV and the hijacker remote controller may be operational when the issued and received commands match. The hijacker may have successfully taken over control of the UAV when the received commands by the UAV match the issued commands from the hijacker receiver controller. In some instances, the hijacker may have successfully taken over control of the UAV when the UAV executes one or more operations in accordance with the hijacker commands. The hijacker may have successfully taken over when the UAV does not execute one or more operations in accordance with the user commands.

When hijacker commands are received at the UAV, the UAV may or may not also receive user commands. In one type of hijacking, a communication link between the UAV and the hijacker remote controller may interfere with a communication link between the UAV and the user remote controller. This may prevent user commands from reaching the UAV, or may cause the user commands to only unreliably be received by the UAV. Hijacker commands may or may not be received by the UAV. In some embodiments, the hijacker connection may interfere with the user connection while the hijacker issues commands to take over control of the UAV. The UAV may only receive the hijacker commands in this scenario. The UAV may operate in accordance with the hijacker commands. In another embodiment, the hijacker connection may interfere with the user connection while the hijacker does not necessarily send commands to the UAV. The inference of the signal may be sufficient to constitute hijacking or hacking of a user operation of a UAV. The UAV may optionally not receive any commands (e.g., may stop receiving user commands that were previously coming in). The UAV may have one or more default actions that may take place when communications with the user are lost. For example, the UAV may hover in place. In another example, the UAV may return to a starting point of the mission.

In another type of hijacking, the UAV may receive both user commands and the hijacker commands. The communication link between the UAV and the hijacker remote controller need not necessarily interfere with a communication link between the UAV and the user remote controller. The UAV may operate in accordance with the hijacker commands. The UAV may choose to operate in accordance with the hijacker commands while ignoring the user commands. Alternatively, when multiple sets of commands are received by the UAV, the UAV may take one or more default actions. For example, the UAV may hover in place. In another example, the UAV may return to a starting point of the mission.

A hijacker may be an individual who is not authorized to operate the UAV. The hijacker may be an individual who is not pre-registered with the UAV. The hijacker may be an individual who is not authorized to take over control from the user to operate the UAV. The hijacker may otherwise be authorized to operate the UAV. However, when a user is already operating a UAV, the hijacker may not be authorized to interfere with the user's operation.

The systems and methods described herein may include detecting interference with one or more commands from the user. This may include hijacking of the UAV. The user commands may be interfered with when the user commands do not reach the UAV. The user commands may be interfered with due to a communication connection between the UAV and the hijacker. In some instances, the hijacker may attempt to jam a signal between the user and the UAV. The signal jamming may occur in response to a hijacker communication with the UAV. Alternatively, the hijacker need not be communicating with the UAV to jam a signal between a user and the UAV. For example, a hijacker device may broadcast a signal that may interfere with a user's communications with the UAV even if the hijacker device is not issuing any hijacker commands. The user commands may be interfered with even if the user commands do reach the UAV. The user commands may be interfered with if the UAV does not perform an operation in accordance with user commands. For instance, the UAV may choose to perform operations in accordance with hijacker commands instead of user commands. Or the UAV may choose to take a default action, or no action instead of the user commands.

Hijacker commands may or may not be contradictory to user commands. An unauthorized communication may interference with one or more commands from the user providing contradictory commands to the UAV. In one example, the user commands may effect flight of the UAV and the hijacker commands may effect flight in a different manner. For instance, the user commands may instruct the UAV to turn right while the hijacker commands may instruct the UAV to proceed forward. The user commands may instruct the UAV to rotate about a pitch axis while the hijacker commands may instruct the UAV to rotate about a yaw axis.

In addition to detecting interference, the systems and methods herein may permit an action to be taken in response to a detected inference with one or more commands from a user. The action may include alerting the user about the interference. The action may include alerting one or more other parties (e.g., operator or administrator of an authentication system) about the interference. The action may include on or more default actions by the UAV (e.g., landing, hovering in place, returning to a starting point).

An aspect of the invention is directed to a method of alerting a user when operation of a UAV is compromised, said method comprising: authenticating a user to effect operation of the UAV; receiving one or more commands from a remote controller that receives user inputs to effect the operation of UAV; detecting an unauthorized communication that interferes with the one or more commands from the user; and alerting the user, via the remote controller, about the unauthorized communication. In similar respects, a non-transitory computer readable medium containing program instructions for alerting a user when operation of a UAV is compromised may be provided. Said computer readable medium may comprise: program instructions for authenticating a user to effect operation of the UAV; program instructions for receiving one or more commands from a remote controller that receives user inputs to effect the operation of UAV; and program instructions for generating an alert to be provided to the user, via the remote controller, about a detected unauthorized communication that interferes with the one or more commands from the user.

A UAV alert system may be provided in accordance with embodiments of the invention, said UAV alert system comprising: a communication module; and one or more processors operably coupled to the communication module and configured to individually or collectively: authenticate a user to effect operation of the UAV; receive one or more commands from a remote controller that receives user inputs to effect the operation of UAV; detect an unauthorized communication that interferes with the one or more commands from the user; and generate a signal to alert the user, via the remote controller, about the unauthorized communication. A UAV alert module may comprise: one or more processors configured to individually or collectively: authenticate a user to effect operation of the UAV; receive one or more commands from a remote controller that receives user inputs to effect the operation of UAV; detect an unauthorized communication that interferes with the one or more commands from the user; and generate a signal to alert the user, via the remote controller, about the unauthorized communication.

The unauthorized communication may include a hijacker command. The unauthorized communication may be indicative of a hijacking attempt by an unauthorized user. The hijacker command may optionally include one or more commands for controlling operation of the UAV. The unauthorized communication is indicative of a signal jamming attempt by an unauthorized user. The unauthorized communication that causes the signal jamming need not include a hijacker command for controlling operation of the UAV.

An alert may be generated about the unauthorized communication. The alert may be provided to the user who is attempting to operate the UAV to another individual (e.g., operator and/or administrator of an authentication system, an individual in law enforcement, an individual in emergency services) and/or to a control entity.

The alert may be provided visually, audibly, and/or tactilely. For example, the alert may be provided on a display screen of a user remote controller. For example, text or images may be provided indicative of the unauthorized communication. Text or images may be provided indicative that an interference with user commands occurred. In another example, the alert may be provided audibly via a user remote controller. The user remote controller may have a speaker that may produce sound. The sound may be indicative of the unauthorized communication. The sound may be indicative of an interference with user commands. The alert may be provided tactilely via the remote controller. The user remote controller may vibrate or pulse. Alternatively, the user remote controller may jerk, turn warmer or colder, deliver a mild electric shock or provide any other tactile indication. The tactile effect may be indicative of an unauthorized communication. The tactile effect may be indicative of an interference with user commands.

The alert may be indicative of a type of unauthorized communication. The type of unauthorized communication may be selected from one or more categories of unauthorized communication. For example, an unauthorized communication may be a competing flight command, a signal jamming communication, competing payload operation command, or competing communication (e.g., data transmission) command. The alert may visually differentiate the different types of unauthorized communication. For example, different text and/or images may be provided. The alert may audibly differentiate the different types of unauthorized communications. For example, different sounds may be provided. The different sounds may be different words or different tones. The alert may tactilely differentiate the different types of unauthorized communications. For example, different vibrations or pulses may be used.

Various ways of detecting unauthorized communication may be implemented. For example, an unauthorized communication may be detected when a user identifier associated with the unauthorized communication is not authenticated or is not indicative of a user permitted to interact with the UAV. For example, a hijacker may not be authenticated as the user. In some instances, a separate hijacker identifier may be extracted. The hijacker identifier may be determined to not be an individual authorized to operate the UAV, or not an individual authorized to take over control of the operation from the user. In some instances, key information may be used as well to identify a hijacker. For example, information about a hijacker key may be extracted in undergoing an identification and/or authentication process. The hijacker key may not match the user key. The hijacker may not have access to the user's key. The hijacker may thus be identified as not being the user. The hijacker communications may be identified as not being the user communications. In some instances, the hijacker may not be able to produce the user identifier and/or user key.

Unauthorized communications may be detected when a comparison is made between user commands issued from the remote controller and/or commands that are received at the UAV. If the user commands are not received at the UAV, one or more interfering unauthorized communications may have taken place. The unauthorized communication may be detected when the unauthorized communication reduces efficacy of a communication channel between the user remote controller and the UAV. One or more contradictory commands may or may not be provided to the UAV based on the unauthorized communications. For example, the one or more contradictory commands may be a hijacker flight command that may be in contradiction to the user commands. A detection may be made that the UAV received the contradictory commands. In other instances, no contradictory commands are received at the UAV, and no contradictory commands may be detected by the UAV. The lack of receipt of commands issued from the user may be sufficient to indicate that unauthorized communications have interfered with the user commands.

Unauthorized communications may be detected when a comparison is made between user commands issued from the remote controller and operations conducted by the UAV. If the UAV does not act in accordance with the user commands, one or more interfering unauthorized communications may have taken place. This may occur at a first stage where communications may occur between the user remote controller and the UAV. This may occur at a second stage between when the UAV receives commands and the UAV executes the commands. Examples of types of unauthorized communications in the first stage are provided above. For unauthorized communications at the second stage, the user commands may be received by the UAV. However, alternative contradictory commands may also be received by the UAV. The UAV may operate in accordance with the alternative contradictory commands. The mismatch between the user issued commands and the actions of the UAV may be indicative of the unauthorized communications. In another example, the UAV may receive the user commands and the alternative contradictory commands, but may take no action or may take a default action due to the conflicting nature of commands. The lack of action or default action may provide a mismatch between the user commands and the operation of the UAV.

In some instances, data from a memory storage system (e.g., a memory storage system as illustrated in FIG. 11) may be analyzed to detect unauthorized communications. Data from one or more information sets may be analyzed. In some embodiments, commands stored in the information sets may be compared. For example, multiple information sets may be stored, tied to a particular interaction between a user and a UAV. The multiple information sets may include the command that was issued by the remote controller, the command that was received by the UAV, and/or the command that was executed by the UAV. If the command that was issued by the remote controller matches the command that was received by the UAV, then there is little or no risk of interference of the communication between the user remote controller and the UAV. If the command that was issued by the remote controller does not match the command that was received by the UAV, then there is a high risk of interference with the communication between the remote controller and the UAV. The commands may not match if a different command was received by the UAV, or if no commands were received by the UAV. If the command that was issued by the remote controller matches the command that was executed by the UAV, then there is little or no risk of unauthorized communications interfering with the user commands. If the command that was issued by the remote controller does not match the operation of the UAV, then there is a high risk of unauthorized interference with the user commands. In some instances, an error may occur in UAV operation without hijacker interference. For instance, the UAV may receive the user commands, but may not be able to execute it in accordance with the command. The commands or other data from the memory storage system may be compared to detect interference with a user command.

In some instances, the data, such as the command data, may be pulled from separate devices and need not reside at the memory storage system. For instance, user command data may be pulled from the remote controller and/or command data from the UAV may be pulled, and the comparison may be made.

Hijackers may be individuals who are not authorized to take over control of a UAV from a user. However, in other instances, as described elsewhere herein, takeover control may be permitted. For example, a user with a higher level of priority or higher operational level may be able to take over control. The user may be an administrative user. The user may be a law enforcement member, or emergency services member. The user may have any characteristics as described elsewhere herein. When a user is authorized to take over control from an initial user, the UAV may have a different reaction. Any description herein of an authorized user may also apply to an autonomous or semi-autonomous system that may take over control of the UAV from the user. For example, a computer may take over control of the UAV in certain circumstances and may operate the UAV in accordance with one or more sets of code, logic, or instructions. The computer may operate the UAV in accordance with a set of flight regulations.

The system may be able to differentiate between unauthorized takeover and authorized takeover. If the takeover is authorized, then the authorized user may be permitted to continue taking over control of the UAV. When the takeover is unauthorized, then communication between the UAV and the initial user may be re-established, the communication between the UAV and unauthorized user may be blocked out, an alert may be provided to one or more individuals, the UAV may take one or more default flight responses, and/or an authorized entity make take over control of the UAV.

An example of a scenario of when an authorized takeover may occur is presented herein. A UAV can send out messages containing a signature. The messages may comprise various types of information concerning flight control command, GPS position of the UAV and/or time information.

Any other information pertaining to the UAV or operation of the UAV may be sent (e.g., information about a UAV payload, information about a positioning of a UAV payload, information about data collected using the payload, information about one or more sensors of the UAV, information about data collected using the one or more sensors, information about communications of the UAV, information about navigation of the UAV, information about power usage of the UAV, or any other information may be sent). In some instances, the message may be received by an air control system.

If, from the information sent (e.g., broadcasted) by a UAV, an air control system finds that a UAV enters into a restricted area, the air control system may warn the UAV or dissuade the UAV from continuing activity in said area. The restricted area may or may not be determined with aid of a geo-fencing device as described elsewhere herein. A restricted area may optionally be an allocated volume or space above an allocated region. The user may not be authorized to fly the UAV into the restricted area. The UAV may not be authorized to enter the restricted area. In some embodiments, no UAVs are authorized to enter the restricted area. Alternatively, some UAVs may be authorized to enter the restricted area, but the area may be restricted to the UAV controlled by the user.

Warning may be sent to a user via a communication connection between the air control system and the user. For example, the warning may be sent to a remote controller of the user that the user is interacting with. The user may be an individual operating the UAV when the UAV enters into a restricted area. Optionally, warning may also be sent to the UAV first, which is then sent to a user via a communication connection between the UAV and the user. The warning may be relayed to the user using any intermediary device or network. If the user does not interrupt the unauthorized flight of the UAV accordingly, the air control system may take over said UAV. The UAV may be given a period of time to permit the UAV to leave the restricted area. If the UAV does not leave the restricted area within the period of time, the air control system may take over control of operation of the UAV. If the UAV continues to further enter the restricted area and does not start turning around, the air control system may take over control of operation of the UAV. Any description herein of a UAV entering a restricted region may be applied to any other activity of the UAV that is unauthorized under a set of flight regulations for the UAV. For example, this may include the UAV collecting images with a camera, when the UAV is in an area that does not permit photography. The warning may similarly be issued to the UAV. The UAV may or may not be given some time to comply before an air control system takes over.

After initiating a process to take over control, the air control system may use a digital signature to send out a remote control command to the UAV. Such a remote control command may bear a reliable digital signature and digital certificate of the air control system, which can guard against forged control command. The digital signature and the digital certificate of the air control system may not be forged.

A flight control unit of the UAV may recognize the remote control command from the air control system. A priority of a remote control command from the air control system may be set to be higher than that from the user. Thus, the air control system may be at a higher operational level than the user. These commands from the air control system may be recorded by an authentication center. The original user of the UAV may also be informed of the commands from the air control system. The original user may be informed that the air control system is taking over. The original user may or may not know details of how the air control system is controlling the UAV. In some embodiments, a user remote controller may show information on how the air control system is controlling the UAV. For instance, data such as positioning of the UAV may be shown on the remote controller in real-time, while the air control system is controlling the UAV. The commands from the air control system may be provided from an operator of the air control system. For instance, the air control system may utilize one or more administrative users who have the ability to take over control of the UAV. In other instances, the commands from the air control system may be provided automatically with aid of one or more processors without requiring human intervention. The commands may be generated with aid of one or more processors in accordance with one or more parameters. For example, if a UAV enters a restricted area the UAV is not authorized to enter, the one or more processors of the air control system may generate a return flight for the UAV to exit the restricted area. In another example, the air control system may generate a path for the UAV to start landing.

An air control system can guide the UAV to exit a restricted area. Then, the right of control may be returned to the original user. Alternatively, an air control system can let the UAV land appropriately. Thus, authorized takeover may be permitted in various scenarios. In contrast, unauthorized takeover may be detected. One or more response to unauthorized takeover may be taken, as described elsewhere herein. For instance, an authorized entity may take over control of the UAV from the unauthorized hijacker. The air control system may be at a higher operational level than the unauthorized hijacker. The air control system may be able to take over control of the UAV from the unauthorized hijacker. In some embodiments, the air control system may be granted the higher operational level. Alternatively, the air control system may be granted a high operational level while one or more government entities may have a higher operational level. The air control system may have a higher operational level than all private users.

Deviation of UAV behavior may be detected. The deviation of the UAV behavior may occur due to activities of one or more hijacker. The deviation of the UAV behavior may occur due to a malfunction of the UAV and/or remote controller of the user. In one example, UAV behavior may include flight. Any description herein of deviation of the UAV flight may be applied to deviation of any other type of UAV behavior, such as deviation in behavior of payload, positioning of payload, carrier operation, sensor operation, communications, navigation, and/or power usage.

Figure 13:
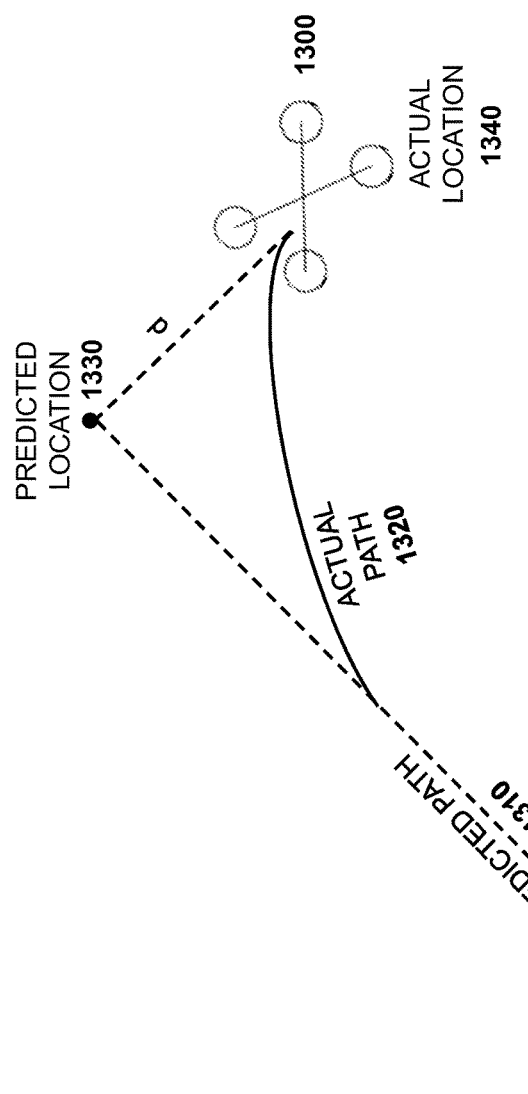
FIG. 13 shows an example of UAV flight deviation, in accordance with an embodiment of the invention.

FIG. 13 shows an example of UAV flight deviation, in accordance with an embodiment of the invention. A UAV 1300 may have a predicted path 1310 of travel. However, the actual path 1320 of the UAV may be different from the predicted path. At a point in time, a predicted location 1330 of the UAV may be determined. However, the actual location of the UAV 1340 may be different. In some embodiments, a distance d between the predicted location and the actual location may be determined.

The predicted path 1310 of the UAV travel may be determined. Data from a user remote controller may be used to determine information about the predicted path. For example, the user may provide an input to the remote controller, and the remote controller may provide one or more flight commands to the UAV based on the user input. The flight commands from the remote controller may be received by the UAV flight control unit, which may send one or more control signals to the UAV propulsion units to effect said flight commands. In some embodiments, the one or more flight commands sent by the remote controller may be used to determine a predicted path of the UAV. For example, if the flight command instructs the UAV to proceed straight forward, then it may be expected that the predicted path will continue on straight forward. Attitude/orientation of the UAV may be considered in calculating a predicted path. The flight commands may result in maintenance or adjustment of the UAV orientation, which may be used to affect a flight path.

At any given point in time, a predicted location 1330 for the UAV may be determined based on the predicted path. Predicted movement of the UAV, such as predicted velocity and/or predicted accelerated may be considered in calculating a predicted location. For example, if it is determined that the predicted path is straight forward and that the velocity of the UAV is remaining steady, a predicted location may be calculated.

The actual path 1320 of the UAV travel may be determined. Data from one or more sensors may be used to determine information about the actual path. For example, the UAV may have one or more GPS sensors on-board that may be used to determine coordinates of the UAV in real-time. In another example, the UAV may use one or more inertial sensors, vision sensors, and/or ultrasonic sensors to provide navigation of a UAV. Multi-sensor fusion may be implemented to determine a location of the UAV. At any given point in time, an actual location 1340 for the UAV may be determined based on the sensor data. The UAV may carry one or more sensors, such as those described elsewhere herein. One or more of the sensors may be any of the sensors described elsewhere herein. In some instances, data from on-board sensors may be used to determine the actual path and/or location of the UAV. In some instances, one or more off-board sensors may be used to determine the actual path and/or location of the UAV. For example, multiple cameras may be provided at known locations and may capture images of the UAV. The images may be analyzed to detect a position of the UAV. In some instances, combinations of sensors on-board the UAV and off-board the UAV may be used to determine an actual path and/or location of the UAV. The one or more sensors may operate independently of the UAV and may optionally not be controllable by the user. The one or more sensors may be on-board the UAV or off-board the UAV, while still operating independently of the UAV. For example, the UAV may have a GPS tracking device that a user may not be able to control.

A difference d between a predicted location of the UAV and an actual location of the UAV may be determined. In some instances, the distance d may be calculated with aid of one or more processors. Difference in coordinates between a UAV predicted location and a UAV actual location may be calculated. The coordinates may be provided as global coordinates. Alternatively, the coordinates may be provided as local coordinates and one or more conversion may take place to a global coordinate system, or to a same local coordinate system.

The one or more processors used to determine the difference may be on-board the UAV, on-board a remote controller, or may be provided externally to the UAV and the remote controller. In some instances, the one or more processors may be part of an air control system, or any other portion of an authentication system. In some embodiments, the one or more processors may be part of a flight supervision module, flight regulation module, or a traffic management module.

In one example, the commands from the remote controller may be conveyed to the UAV, and may also be detected by the air control system. The air control system may receive the commands directly from the remote controller or via one or more intermediary device or network. A memory storage system (e.g., memory storage system of FIG. 11) may receive the commands. The memory storage system may be part of the air control system or may be accessed by the air control system. The data from the sensors (on-board and/or off-board the UAV) may be received by the air control system. The air control system may receive the sensor data directly from the sensors, via the UAV, or via any other intermediary device or network. The memory storage system may or may not receive the sensor data.

In some embodiments, there may be some natural deviation between a predicted path and an actual path of the UAV. However, when a deviation is larger, there is an increased likelihood of deviation due to hijacking or malfunction, or any other compromise to the UAV. This may apply to any type of behavioral deviation of the UAV and need not be limited to flight. In some instances, the distance d may be evaluated to determine a risk of hijacking or malfunction, or any other compromise to the UAV. An indication of risk may be determined based on the distance. In some instances, the indication of risk may be a binary indication of risk (e.g., whether risk exists or does not exist). For example, if a distance remains beneath a predetermined value, no indication of risk may be provided. If the distance exceeds the predetermined value, an indication of risk of hijacking or malfunction may be provided. In other instances, the indication of risk may be provided as one or more categories or level. For example, if the distance meets or exceeds a first threshold, a high level of risk may be indicated. If the distance falls between the first threshold and a lower second threshold, a moderate level of risk may be indicated. If the distance falls beneath the second threshold, a low level of risk may be indicated. In some instances, the level of risk may be substantially continuous or may have a very large number of categories. For example, the risk indication may be quantitative. A risk percentage may be provided based on the distance. For example, based on a deviation, a 74% risk of hijacking or malfunction may be provided.

In some instances, the deviation may be the sole factor upon which the indication of risk is provided. In other embodiments, other factors combined with the deviation may be used to determine the indication of risk that is to be presented. For example, under a first set of environmental conditions, a particular distance deviation may be indicative of a high risk that the UAV is compromised (e.g., hijacking, malfunction), while under a second set of environmental conditions, the same particular distance may be indicative of a low risk that the UAV is compromised. For instance, on a still day, a deviation of 10 meters from a predicted location may be indicative that some form of hijacking or malfunction has occurred. However, on a windy day, a deviation of 10 meters may present a lower risk of hijacking or malfunction since the wind would make deviations in flight path more likely.

Factors that may be considered in determining the indication of risk may include environmental conditions (e.g., environmental climate (wind, precipitation, temperature), traffic, environmental complexity, obstructions), movement of the UAV (e.g., velocity, acceleration), communication conditions (e.g., strength of signals, likelihood of signals dropping out or the existence of interfering signals), sensitivity of the UAV type (e.g., cornering, stability), or any other factors.

An indication of the risk that the UAV is not operating in accordance with the one or more flight commands may be provided. This may comprise a degree of risk that the UAV is compromised. This may include flight operations, payload operations, carrier operations, sensor operations, communications, navigation, power usage, or any other type of UAV operation described herein. Greater deviations in the UAV behavior may correspond to a higher degree of risk that the UAV is not operating in accordance with the one or more flight commands. In some embodiments, the types of deviations in the UAV behavior are assessed to determine the degree of risk. For example, a flight deviation of the UAV may be treated differently than a deviation in payload activity. In some embodiments a deviation in a location of the UAV may be treated differently than a deviation in speed of the UAV.

Aspects of the invention may be directed to a method of detecting flight deviations of a UAV, said method comprising: receiving one or more flight commands provided by a user from a remote controller; calculating, with aid of one or more processors, a predicted location of the UAV based on the one or more flight commands; detecting an actual location of the UAV with aid of one or more sensors; comparing the predicted location with the actual location to determine deviations in UAV behavior; and providing an indication of a risk that the UAV is not operating in accordance with the one or more flight commands based on the deviations in UAV behavior. Additionally, a non-transitory computer readable medium containing program instructions for detecting flight deviations of a UAV may be provided, said computer readable medium comprising: program instructions for calculating a predicted location of the UAV based on one or more flight commands provided by a user from a remote controller; program instructions for detecting an actual location of the UAV with aid of one or more sensors; program instructions for comparing the predicted location with the actual location to determine deviations in UAV behavior; and program instructions for providing an indication of a risk that the UAV is not operating in accordance with the one or more flight commands based on the deviations in UAV behavior.

A UAV flight deviation detection system may be provided in accordance with embodiments of the invention. The flight deviation detection system may comprise: a communication module; and one or more processors operably coupled to the communication module and configured to individually or collectively: receive one or more flight commands provided by a user from a remote controller; calculate a predicted location of the UAV based on the one or more flight commands; detect an actual location of the UAV with aid of one or more sensors; compare the predicted location with the actual location to determine deviations in UAV behavior; and generate a signal to provide an indication of a risk that the UAV is not operating in accordance with the one or more flight commands based on the deviations in UAV behavior. A UAV flight deviation detection module may comprise: one or more processors configured to individually or collectively: receive one or more flight commands provided by a user from a remote controller; calculate a predicted location of the UAV based on the one or more flight commands; detect an actual location of the UAV with aid of one or more sensors; compare the predicted location with the actual location to determine deviations in UAV behavior; and generate a signal to provide an indication of a risk that the UAV is not operating in accordance with the one or more flight commands based on the deviations in UAV behavior.

An indication of risk is provided as an alert. The alert may be provided to a user, via the remote controller of the user. The user may then be able to choose to take action depending on the indication of risk. The indication of the risk is provided to an air control system that is separate from the remote controller and the UAV. The air control system may then be able to determine whether to take action depending on the indication of risk. For example, the air control system may take over control of the UAV. The air control system may ask a user for confirmation on whether the user is still controlling the UAV before determining whether to take over control of the UAV. For example, if a user confirms the UAV is operating in accordance with the user's commands, then the air control system may determine to not take over control of the UAV. If the user does not confirm the UAV is operating in accordance with the user's command, the air control system may take over control of the UAV.

In some embodiments, an indication of risk may be presented to the UAV itself. The UAV may have one or on-board protocols in place that may initiate one or more default flight response from the UAV. For example, if a UAV receives a report that its flight controls are compromised, the UAV may automatically initiate a landing sequence, may automatically hover in place or fly in a holding pattern, may automatically return to a starting point of the mission, or may automatically fly to a designated 'home' location. In some embodiments, the starting point of the mission may be the location that the UAV took off from. The 'home' location may be predetermined set of coordinates that may be stored in the UAV memory. In some instances, the starting point of the mission may be set to a home location. In some instances, the home location may be location of the user or a remote controller of the user. Even if the user moves around, the home location of the remote controller may be updated and the UAV may be able to find the remote controller. In some instances, a user may manually enter the home coordinates or designate a street address as the home. The UAV may block out commands from external sources while undergoing the default flight response procedures. In some instances, the UAV may block out commands from private users while undergoing the default flight response procedures. The UAV may or may not block out commands from an air control system or a control entity while undergoing the default flight response procedures.

The indication of the risk that the UAV is not operating in accordance with the one or more flight commands may comprise information on the type of UAV compromise. For example, the indication of risk that the UAV is not operating in accordance with the one or more flight commands may comprise an indication of risk that the UAV is hijacked. In another example, an indication of risk that the UAV is not operating in accordance with the one or more flight commands may comprise an indication of risk that a signal from the remote controller is jammed. In another example, an indication of risk that the UAV is not operating in accordance with the one or more flight commands may comprise an indication of risk that a malfunction has occurred on-board the UAV. An alert may convey the information about the type of UAV compromise. The alert may convey information about the degree of risk. The alert may covey information about the degree of risk for various types of UAV compromise. For example, an alert may indicate there is a 90% likelihood of some form of compromise, and that there is an 85% chance that compromise is due to hijacking, a 15% chance the compromise is due to communication jamming, and a 0% chance the compromise is due to UAV on-board malfunction.

A risk of hijacking may be higher if commands received by the UAV are different from commands issued through the remote controller. A risk of communication jamming may be higher if the commands received by the UAV are missing commands from commands issued through the remote controller. A risk of on-board malfunction may be higher if the commands received by the UAV match the commands issued through the remote controller, but the UAV operation is not in accordance with the received commands.

Any description herein of hijacking may also apply to hacking. A hacker may intercept one or more communications going to the UAV or issuing from the UAV. A hacker may intercept data collected by a UAV. The hacker may intercept data from one or more sensors or payload or of the UAV. For example, the hacker may intercept data from an image capturing device on-board the UAV. The hacker may thus be attempting to steal acquired data. The hacker may thus invade privacy of an operator of the UAV. A hacker may also intercept communications going to the UAV. For example, a hacker may intercept one or more commands form a user remote controller to the UAV. The hacker may intercept the commands to determine how the UAV will be behaving. The hacker may use the intercepted commands to determine a location of the UAV that may otherwise not be apparent, or other activities of the UAV.

Interception of communications (uplink or downlink) by the hacker may not disturb the rest of the communications. For example, when a hacker intercepts images streaming from a UAV, the intended recipient of the images may still receive the images. The intended recipient may otherwise not know that the interception has occurred. Alternatively, interception of communications may disturb the rest of the communications. For instance, the intended recipient of the images may not receive the images when they are intercepted. Systems and methods described herein may aid in detecting and/or preventing hacking.

For example, device may need to be authenticated prior to engaging in any communications with various components of the UAV system. For instance, a device may need to authenticated prior to receiving a communication from a UAV and/or a remote controller. The device may only receive the communications if the device is authorized to receive the communications. A hacker may not be authorized to receive the communications, and may thus not be able to receive the communications. Similarly, if a hacker were to try and issue a false replacement communication, the identity of the hacker may not correspond to an authorized user and the hacker may be prevented from issuing the false communication. Similarly, if a false communication is issued, or an attempt at a false communication is issued from an unauthorized user, an alert may be provided to the authorized user. In some embodiments, encryption of communications may occur. In some instances, only authorized and/or authenticated users may be capable of decrypting the encrypted communications. For instance, even if a hacker were to intercept communications, the hacker may not be able to decrypt the communications and interpret them. In some embodiments, decryption may require the user of a key which may be stored in a physical memory of only authorized devices. Thus, hackers may have difficulty trying to get a copy of the key and/or trying to pretend to be authorized users.

Individualized Evaluation

Activities of a user and/or UAV may be evaluated. For example, activities of a user of a UAV may be evaluated. Since the user may be uniquely identifiable, the activities of the user may be tied into the unique user identity. Thus, activities performed by the same user may be associated with the user. In one example, activities of the users may relate to previously flown missions by the user. Various tests, certification, or training exercises may also be associated with the user. Activities of the user may also refer to any failed attempts by the user to participate in a mission, interference with operation of another user's UAV, and/or interception of communications with another user's UAV. In some embodiments, a user may be authenticated prior to associating activities with the user identifier.

Activities of a UAV may be evaluated. The UAV may also be uniquely identifiable, and activities of the UAV may be tied into the unique UAV identity. Thus, activities performed by the same UAV may be associated with the UAV. In one example, activities of UAVs may relate to previously flown missions by the UAVs. Various maintenance activities, diagnostics, or certifications may also be associated with the UAV. Activities of the UAV may also include any errors, malfunctions, or accidents. In some embodiments, a UAV may be authenticated prior to associating activities with the UAV identifier.

One or more activities of the user and/or the UAV may be evaluated. In some instances, the evaluation may include providing a qualitative evaluation. For instance, one or more notes pertaining to any of the activities of the user or UAV may be associated with the user or UAV, and/or corresponding activities of the user or UAV. For example, if the UAV was involved in an accident, notes about the accident, how it occurred, who the fault was allocated to, may be associated with the UAV. In another example, if the user has previously flown many missions in high wind speed and successfully navigated different terrain, notes about these accomplishments may be provided. One or more categories of evaluation may be associated with the user and/or corresponding activity of the user. For example, if a user completes many difficult missions, the user may have an 'expert user' evaluation associated with the user. If the UAV undergoes many malfunctions and errors, the UAV may have a 'high risk of malfunction' evaluation associated with the UAV.

In some instances, the evaluation may include providing a quantitative evaluation. For example, user and/or UAV activity may receive a rating, such as a letter grade, or numerical rating. The ratings may be pertaining to any of the activities of the user or UAV and may be associated with the user or UAV, and/or corresponding activities of the user or UAV. For instance, when a user completes a mission, a user may receive a rating or score as to how the user performed during the mission. For instance, a user may receive a 7.5 rating for the first mission, and a 9.8 rating for the second mission, indicating that the user may have performed better during the second mission. Other factors, such as difficulty of the mission may come into play. In some instances, a user may receive a higher rating for successfully completing a more difficult mission. In another example, a user may undergo a skills test or certification test, and may receive a numerical score indicative of how the user performed. A UAV may receive a rating depending on how a mission completion goes. For example, if the UAV malfunctions during the mission, a UAV may receive a lower rating than if the UAV does not malfunction during the mission. If the UAV is undergoing regular maintenance, the UAV rating may be higher than if the UAV is not undergoing regular maintenance.

A user and/or UAV may have a higher overall rating when the user and/or UAV successfully completes activities in a positive manner. A user and/or UAV may have a lower overall rating when the user and/or UAV does not successfully complete an activity, or engages in behavior that may be suspicious. Thus a user and/or UAV may have a reputation score based on activities of the user and/or UAV.

In some embodiments, an evaluation system may provide a set of evaluations for the user and/or UAV. The evaluation may determine the evaluations (e.g., qualitative and/or quantitative evaluations) automatically with aid of one or more processors without requiring human interaction. The evaluation may be determined in accordance with one or more parameters or algorithms and data about activities of the user and/or UAV. For example, each successfully completed mission may automatically raise a user and/or UAV evaluation to a move positive end. Each failed mission or crash may automatically lower a user and/or UAV evaluation to a more negative end. The evaluations may therefore be objective.

Alternatively or in addition, evaluations may be provided by one or more human users. For instance, a user may evaluate him or herself. The user may evaluate a UAV that the user flew. In other instances, peers of the user may evaluate him or her. The peers may evaluate the UAV flown by the user. For example, a first user may be operating a first UAV. A second user may observe the first user and notice that the first user is engaging in bad flying behavior (e.g., swooping toward the second user's UAV or intimidating the second user). The second user may provide a negative evaluation of the first user. In another example, the second user may observe that the first user is engaging in positive flying behavior (e.g., executing difficult maneuvers, helping the second user) and may provide a positive evaluation of the first user.

User and/or UAV evaluations may be viewed by other users. For instance, a first user may view the overall evaluation of a second user and vice versa. A user may view the user's own evaluation. The user may take steps to try and increase the user's rating. In some embodiments, a system may only permit activities by a user when the user evaluation reaches a threshold level. For instance, the user may only operate in certain areas when the user evaluation reaches a threshold level. A user may only fly a UAV in certain areas when the user rating is 7.0 or higher. A level of flight restriction may depend on a user and/or UAV evaluation. In some instances, a user and/or UAV evaluation may be indicative of user type and/or UAV type or vice versa. A lower level of flight restriction may be provided when the user is of a higher user evaluation, and a higher level of flight restriction may be provided when the user is of a lower user evaluation. The set of flight regulations for a user may be more stringent when the user is of lower user evaluation, and the set of flight regulations for the user may be less stringent when the user is of higher user evaluation. A lower level of flight restriction may be provided when the UAV is of a higher UAV evaluation, and a higher level of flight restriction may be provided when the UAV is of a lower UAV evaluation. The set of flight regulations for a UAV may be more stringent when the UAV is of lower UAV evaluation, and the set of flight regulations for the UAV may be less stringent when the UAV is of higher UAV evaluation.

Flight Monitoring

It may be desirable for an air control system to be aware of UAV locations. The UAV may send location information to the air control system. In some instances, it may be preferable for UAVs to report location information for security and/or safety purposes. A UAV may regularly and actively report to the air control system its current position and course. However, in some instances, a UAV may not comply with the reporting. This may occur when communications between the UAV and air control system are lost, or the UAV may maliciously intentionally withhold information or provide false (i.e. forged) information. An air control system may deploy a recorder in its management area to monitor the status of UAVs. One or more recorders may be deployed to monitor UAV activity.

Figure 14:
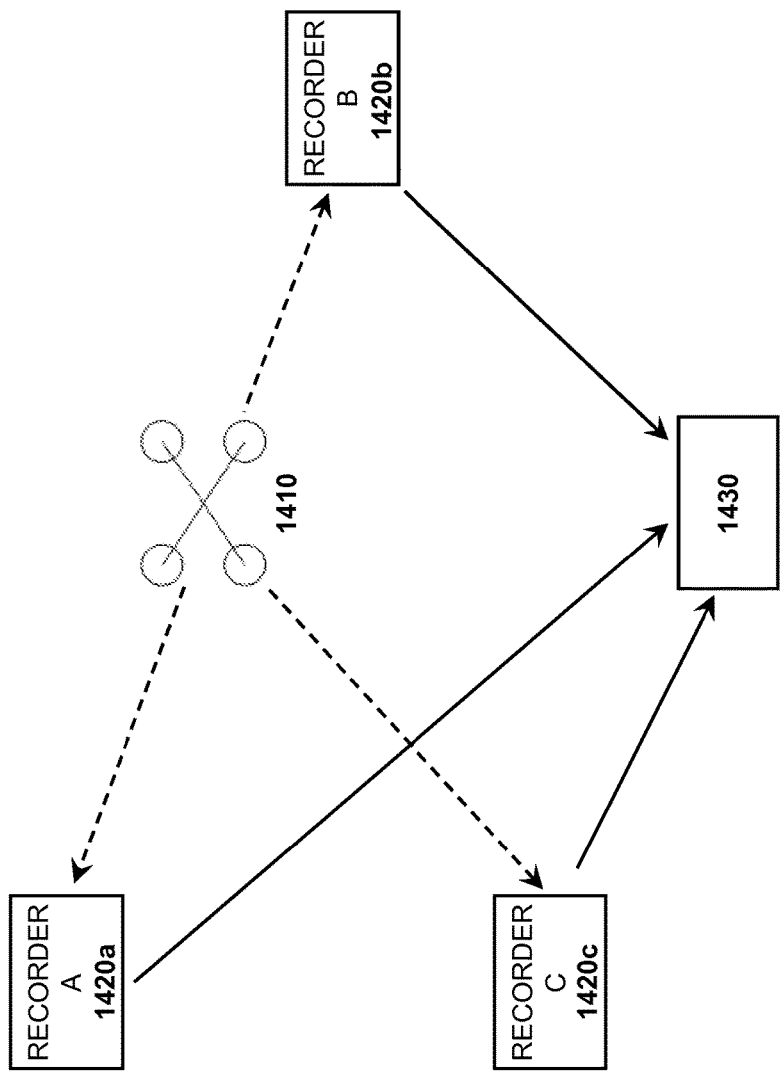
FIG. 14 shows an example of a monitoring system using one or more recorders, in accordance with an embodiment of the invention.

FIG. 14 shows an example of a monitoring system using one or more recorders, in accordance with an embodiment of the invention. A UAV 1410 may be provided within an environment. The environment may be within an area managed by an air control system. One or more recorders (e.g., RECORDER A 1420a, RECORDER B 1420b, RECORDER C 1420c, . . . ) may be provided within the area managed by the air control system. A monitoring device or system 1430 may receive information collected from the one or recorders. In some embodiments, the monitoring system may be an air control system.

In some embodiments, an air control system may be used to manage an entire UAV flight system. The area managed by the air control system may be the whole world. In other instances, the area managed by the air control system may be limited. The area managed by the air control system may be based on jurisdiction. For example, the air control system may manage a UAV flight system within an entire jurisdiction (e.g., nation, state/province, region, city, town, county, or any other jurisdiction). Different air control systems may manage different areas. The size of the areas may be similar or may be different.

A UAV 1410 may send one or more messages, which may be monitored by the one or more recorders 1420a, 1420b, 1420c. The messages from the UAV may include a signature. In some instances, the messages from the UAV may include identifying information that is unique to the UAV (e.g., UAV identifier, and/or UAV key information). The identifying information may uniquely identify and differentiate the UAV from other UAVs. The messages from the UAV may include any other information, such as information concerning flight control command, GPS position of the UAV (or other location information for the UAV), and/or time information. The information may include location information (e.g., GPS information) for the UAV. The time information may include the time that the messages were formulated and/or transmitted. The time may be provided according to a clock of the UAV.

Signals obtained from these recorders 1420a, 1420b, 1420c may be time-stamped and gathered in an air control system 1430. The data from the recorders may be stored in a memory storage system. The memory storage system may be part of the air control system or may be accessible by the air control system. The air control system can analyze the information from the data recorders. Thus, the air control system may be able to collect historical control information of the UAV, as well as flying information, and asserted GPS flight-path of the UAV. The air control system may be able to collect operational data pertaining to the UAV, which may include commands sent to the UAV, commands received by the UAV, executed actions by the UAV, and information about the UAV, such as UAV location at different points in time.

In some embodiments, a UAV may communicate directly with an air control system, and/or directly provide information to a memory storage system. Alternatively, the UAV may communicate directly with one or more recorders, who may communicate with the air control system and/or the memory storage system. In some instances, information about the UAV may be relayed to the air control system via the one or more recorders. In some instances, the recorders may provide additional data associated with information to the UAV, to the air control system.

An air control system can analyze time data to determine a location of the UAV. An aspect of the invention may be directed to a method of determining a location of a UAV, said method comprising: receiving, at a plurality of recorders, one or more messages from the UAV; time-stamping, at the plurality of recorders, the one or more messages from the UAV; and calculating, with aid of one or more processors, the location of the UAV based on the time-stamping of the one or more messages. A non-transitory computer readable medium containing program instructions for determining a location of a UAV may be provided, said computer readable medium comprising: program instructions for receiving, at a plurality of recorders, one or more messages from the UAV; program instructions for time-stamping, at the plurality of recorders, the one or more messages from the UAV; and program instructions for calculating the location of the UAV based on the time-stamping of the one or more messages. A UAV communication location system may comprise: a communication module; and one or more processors operably coupled to the communication module and configured to, individually or collectively, calculate a location of the UAV based on time-stamps of one or more messages sent from the UAV and received at a plurality of recorders remote to the UAV.

In one example of analyzing UAV location based on time data, the time difference of signals transmitted from different recorders that collected the same message from the same UAV, may be used to determine the rough position of a UAV. For example, if two recorders both receive signals sent from a certain UAV, according to time difference of when the recorders receive the signals, it can be known that the UAV is on a hyperbola formed by time-difference determination and position of said two recorders. Two, three or more recorders may be used in forming the hyperbola. Thus, a rough location of the UAV may be asserted along the hyperbola. A timestamp may be taken when the signal departs the UAV, and a timestamp may be taken when the signal arrives at the recorder. Such information may be used to calculate the time difference.

In another example, multiple recorders may receive signals from the UAV, and may determine a time difference. An example of the time difference may be the time difference between when the signals were sent by the UAV and when the recorders received the signal). In some instances, the UAVs may time stamp the signal when the signal is sent to the one or more recorders. The one or more recorders may time stamp when the signals are received. The difference in time between the two time stamps may be indicative of a travel time for the signal to reach the recorders. The travel time may be correlated to a rough distance from the UAV to the recorders. For instance, if the travel time is lesser, the UAV may be closer to the recorder than if the travel time is greater. If multiple recorders show different travel times, the UAV may be closer to the recorder that shows a smaller travel time. For example, if a UAV is further away from the recorder, the travel time for the signal may be expected to be greater. The travel time may be small units of time. For instance, the travel time may be on the order of seconds, milliseconds, microseconds, or nanoseconds. The time stamps for the UAV and/or recorders may be provided with a high degree of precision (e.g., on the order of seconds, milliseconds, microseconds, and/or nanoseconds). The clocks on the UAV and/or the recorders may be synchronized. The clocks may be used to provide the timestamps. In some instances, there may be some offset between one or more clocks of the UAV and/or recorders but the offset may be known and compensated for. Triangulation techniques or other similar techniques may be used to determine a rough location of the UAV based on the distance from the UAV to one or more recorders.

In an additional example of analyzing UAV location, the one or more recorders may also roughly determine the distance between a UAV and a recorder through received signal strength indication (RSSI). The RSSI may be a measurement of power present in a received signal (e.g., radio signal) at the recorder. A higher RSSI measurement may be indicative of a stronger signal. In some embodiments, a wireless signal may attenuate over distance. Thus, a stronger signal may be correlated to a closer distance, while a weaker signal may be correlated to a further distance. The rough distance of the UAV to the recorder may be ascertained based on the RSSI. In some instances, the RSSI of multiple recorders may be compared to determine the rough location of the UAV. For example, if two recorders are provided, a potential location of a UAV may be provided as a hyperbola. If three or more recorders are provided, triangulation techniques may be used to determine the rough UAV location. If multiple recorders show different RSSI values, the UAV may be closer to a recorder that shows a stronger RSSI value, compared to a recorder that shows a weaker RSSI value.

A further example may provide one or more recorders with multiple receiving channels. The recorders may have one or more antennas which may receive multiple signals. For example, a receiving antenna may have multiple receiving channels. The multiple signals received through the multiple receiving channels may be processed to obtain a relative direction of the UAV. An air control system, authentication center, or other portion of an authentication system may process multiple signals from a receiving antenna by way of receiving beamforming. This may permit the air control system or other entity to roughly obtain relative direction and location of the UAV relative to the recorder. The beamforming may detect the direction from which the signal is coming, and may be used to detect a direction of the UAV relative to the recorder. Multiple recorders may be used to narrow down the location of the UAV by looking at where the expected directions of the UAV intersect.

In another example, a recorder may include a sensor, such as a vision sensor, ultrasonic sensor, or other type of sensor. The recorder may be able to record the environment around the recorder. The recorder may record presence or movement of the UAV within the environment. For example, a recorder may video tape a UAV flying within the environment. Data from the recorder may be used to detect the UAV and analyze the location of the UAV relative to the recorder. For example, the distance of the UAV relative to the recorder may be determined based on size of the UAV in the image, and/or direction may be determined when the direction of the sensor is known.

The locations of the recorders may be known. The global coordinates of the recorders may be known. Alternatively, the recorders may have local coordinates, and the local coordinates of the recorders may be converted to a common coordinate system. In some embodiments, the recorders may have predetermined locations. In other instances, the recorders may move around or be placed in an ad hoc fashion. The recorders may transmit a signal indicative of the locations of the recorders. For example, each recorder may have a GPS unit, which may provide a global coordinate for the recorder. The coordinates for the recorder may be transmitted. An air control system, or any other portion of an authentication system may know the locations of the recorders. The air control system, or any other portion of the authentication system may receive signals from the recorders indicative of the recorder locations. Thus, even if the recorders are moved around, the air control system may have the updated data about the locations of the recorders. In some instances, the recorders may be small devices that may be picked up and moved about. The recorders may or may not be self-propelled. The recorders may be handheld or capable of being carried by a human. Alternatively, the recorders may be substantially large devices that may be permanent or semi-permanently provided at a location.

Any number of recorders may be provided within the area. One, two, three, four, five, six, seven, eight, nine, ten or more recorders may be provided. In some instances, a signal from a UAV may have a limited range. In some instances, only recorders within a proximity of the UAV may receive the signal. The recorders that do receive the signal may record information about the received signal and may provide information to an authentication system (e.g., air control system of the authentication system). A higher number of recorders receiving the signal from the UAV may provide a greater certainty or precision to a rough location of the UAV. In some embodiments, providing a greater density or number of recorders within a particular area may increase the likelihood that a significant number of recorders will receive the signal from the UAV. In some instances, recorders may be distributed in an area with a density of at least 1 recorder per square mile, 3 recorders per square mile, 5 recorders per square mile, 10 recorders per square mile, 15 recorders per square mile, 20 recorders per square mile, 30 recorders per square mile, 40 recorders per square mile, 50 recorders per square mile, 70 recorders per square mile, 100 recorders per square mile, 150 recorders per square mile, 200 recorders per square mile, 300 recorders per square mile, 500 recorders per square mile, or 1000 recorders per square mile.

The recorders may be distributed over a large area. For instance, the plurality of recorders may be distributed over an area greater than about 50 square meters, 100 square meters, 300 square meters, 500 square meters, 750 square meters, 1000 square meters, 1500 square meters, 2000 square meters, 3000 square meters, 5000 square meters, 7000 square meters, 10000 square meters, 15000 square meters, 20000 square meters or 50000 square meters. Having a large area may be useful in detecting differences in travel time, signal strength or other data collected by the recorders. If the recorders are only within a small area, then the travel time for a signal will be small, and may be difficult to discern or differentiate from recorder to recorder. The recorders may be spread apart from one another. For example, at least two at least two of the plurality of recorders are located at least 1 meter away from one another, 5 meters away from one another, 10 meters away from one another, 20 meters away from one another, 30 meters away from one another, 50 meters away from one another, 75 meters away from one another, 100 meters away from one another, 150 meters away from one another, 200 meters away from one another, 300 meters away from one another, 500 meters away from one another, 750 meters away from one another, 1000 meters away from one another, 1250 meters away from one another, 1500 meters away from one another, 1750 meters away from one another, 2000 meters away from one another, 2500 meters away from one another, 3000 meters away from one another, 5000 meters away from one another, or 10000 meters away from one another. Having recorders that may be spread apart may be useful in detecting differences in travel time, signal strength, or other data collected by the recorders. If the recorders are too close together, the travel time for a signal may be small, and may be difficult to discern or differentiate from recorder to recorder.

An authentication center, air control system, or any other portion of an authentication system may calculate the rough location of the UAV based on data received from the recorders. One or more processors may be used to calculate the rough location of the UAV based on the data from the recorders. The data from the recorders may include timestamp data, signal strength data, sensor data, or any other type of data described elsewhere herein.

An authentication center, air control system, or any other portion of an authentication system may check an asserted position by the UAV against the rough location information based on the timing information to determine whether or not there is a relatively large difference between the asserted position and the rough position. A larger deviation may be indicative of higher risk of some form of compromise to the UAV. For example, a larger deviation may be indicative of higher risk of a falsely reported location by the UAV. A falsely reported location from the UAV may be indicative of malicious or fraud-related conduct (e.g., sensor tampering, or reporting forged location data). The falsely reported location may be indicative of an error or malfunction of a navigation system of the UAV (e.g., broken GPS sensor, error to one or more sensors used to determine UAV location). Error or malfunction of the navigation system of the UAV need not be malicious, but may also cause concerns if the UAV location is not accurately being tracked. In some instances, an asserted/reported position by the UAV may be compared with the calculated location of the UAV, and an alert may be provided when the difference between the calculated location and the asserted location exceeds a threshold value. In some instances, only the difference between the locations is considered in determining a risk of fraud. Alternatively, other factors, such as environmental conditions, wireless communication conditions, UAV model parameters, or any other factors may be considered, as described elsewhere herein.

The recorders may exist as an air traffic monitoring system and may record the history of flight missions being monitored. The air control system can compare the flight information actively reported by a UAV to flight information obtained by one or more recorders for the same UAV, and rapidly decide whether or not data reported by the UAV is true. An alert may be provided when there is a risk of some form of compromise to the UAV. The alert may be provided to an operator of the UAV, an air control system, or any other entity. The alert may or may not be indicative of an estimated level of risk. The alert may or may not be indicative of a type of compromise (e.g., likely malicious tampering or forgery, likely sensor malfunction).

Authentication Process of a User

An authentication center may use any of a number of processes to authenticate the identity of a user that is flying a UAV. For example, the authentication center may use a simple authentication process, such as by comparing a user's identifying information and password with authentication information that is stored in association with the user. In other processes, the identity of a user may be authenticated by obtaining a voiceprint, fingerprint, and/or iris information of the user and comparing the obtained information to stored user information. Alternatively, the user identity may be verified using a short message signal (SMS) verification that is sent to a mobile device that is associated with the user. The system may also utilize a token and/or a built-in identity module in a remote controller to authenticate a user that is associated with the remote controller.

In further examples, the process of authenticating a user may include multiple forms of authentication listed above. For instance, a user may be authenticated using a two-step process that requires the user to input identifying information (such as a username) along with a password, and then asks the user to provide a second step of authentication by verifying a text that is received at the mobile device of the user.

After the authentication is successfully performed, the authentication center may retrieve information about the user from a database. The retrieved information may be sent to the air control system, which may then determine whether the user has permission to fly.

Authentication Process of a UAV

While authentication of a user may be performed using personal information that is inherent to the user (e.g., voiceprint, fingerprint), the authentication of a UAV may utilize device information that is stored within the UAV, such as key that is encoded into the device. As such, the authentication of a UAV may be based on a combination of a UAV identifier and a key stored within the UAV. Additionally, the authentication of the UAV may be implemented using an authentication and key agreement (AKA). An AKA is a bi-directional authentication protocol. In examples, while using the AKA, the authentication center may authenticate the validity of the UAV and the UAV may authenticate the validity of the authentication center. An example of authentication based on AKA is discussed in FIG. 15.

Figure 15:
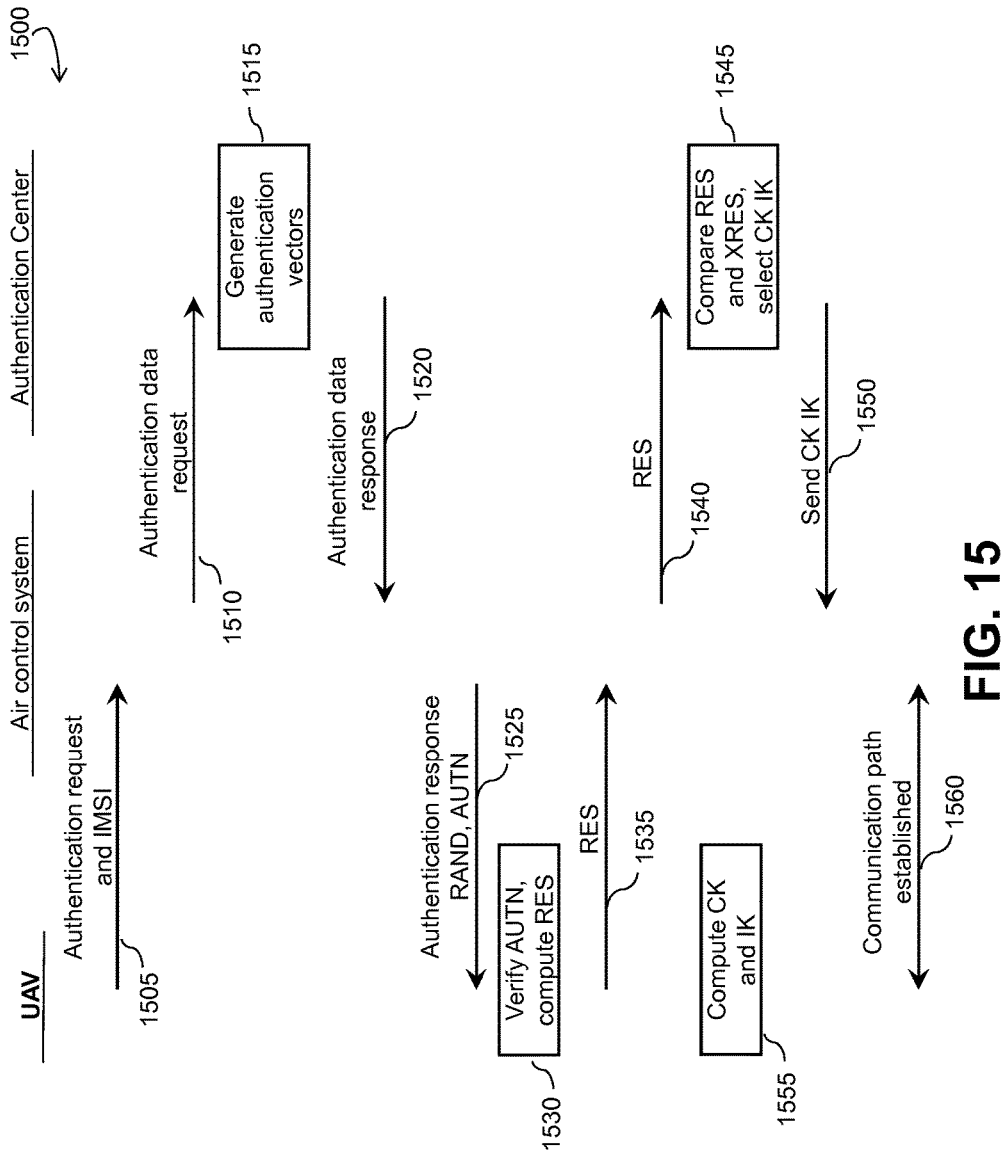
FIG. 15 shows an illustration of bi-directional authentication between a UAV and an authentication center, in accordance with an embodiment of the present invention.

FIG. 15 shows an illustration 1500 of bi-directional authentication between a UAV and an authentication center, in accordance with an embodiment of the present invention. In particular, FIG. 15 shows the way that a UAV interacts with an air control system, which in turn interacts with the authentication center.

An AKA authentication between a UAV and an authentication center may be performed based on a Universal Subscriber Identification Module (USIM). In particular, a UAV may have a USIM module onboard containing an International Mobile Subscriber Identity (IMSI) and a key. In some examples, the key is burned into the UAV when it is manufactured. The key may be permanently inscribed or integrally formed into the UAV when it is manufactured. As such, the key is protected and cannot be read out. Additionally, the key is shared with an authentication center, or any other component of an authentication system (e.g., authentication center 220 as illustrated in FIG. 2). It is extremely difficult to crack the USIM. In the art, AKA is recognized as an authentication system having high degree of security. As such, an authentication center may have high degree of security and credibility which extends to the protections of the user's IMSI, the key, and the counter SQN.

As seen in step 1505, a UAV may provide an authentication request and IMSI to the air control system. The UAV may actively (broadcast) or passively (respond) transmit its IMSI. Once the authentication request and IMSI has been received at the air control system, the air control system may transmit an authentication data request to the authentication center at step 1510. The authentication data request may include information about the UAV, such as the UAV's IMSI.

At step 1515, the authentication center may receive the IMSI, inquire the corresponding key, generate a random number, and calculate an authentication vector (AV) according to a predetermined algorithm. The algorithms f1, f2, f3, f4 and f5 are described in ordinary Universal Mobile Telecommunications System (UMTS) security protocol. The AV may contain 5 elements, such as, RAND (random number), XRES (expected response), CK (encryption key), IK (integration-checking key) and AUNT (authentication token). Alternatively, the authentication vectors may contain one or more elements that include at least one of the elements in the present examples, including different elements. In the present example, the AUNT is composed of a hidden counter SQN, AMF (authentication management filed), and MAC (message authentication code).

$$AUNT := SQN(+)AK \| AMF \| MAC$$

At step 1520, the authentication center may transmit an authentication data response to the air control system, which may then provide at authentication response that includes the AUNT and RAND to the UAV at step 1525. In particular, the AUNT and RAND may be transmitted to the security module A of the UAV. At step 1530, the security module A may verify the AUNT. The security module A may calculate the AK according to the RAND and a key. Once the AK is calculated, the SQN may be calculated and recovered according to the AUNT. An XMAC (expected authentication code), a RES (response to the random number), a CK (encryption key), and an IK (integration-checking key) may then be calculated. The security module A may compare MAC and XMAC. If MAC and XMAC are different, the UAV may send an authentication refusal message to the remote controller and the authentication center, in response to which the authentication is terminated. Alternatively, if MAC and XMAC are identical, the security module A may check if the received SQN falls within a reasonable range. In particular, security module A may record the largest SQN ever received, therefore SQN may only be increased. If the SQN is abnormal, the UAV may send a synchronization failure message, which in turn may terminate the authentication. Alternatively, if the SQN falls within the reasonable range, the security module A may verify the authenticity of AUNT and may provide a computer RES to the authentication center.

As seen in FIG. 15, the security module A may transmit the RES to an air control system at step 1535, which may then provide the RES to the authentication center at step 1540. Alternatively, the UAV may provide the RES to the authentication center directly.

Once the authentication center has received the RES, the authentication center may compare XRES (expected response to the random number) and RES at step 1545. If XRES and RES are found to be inconsistent, the authentication fails. Alternatively, if XRES and RES are found to be identical, the mutual authentication succeeds.

After the mutual authentication, UAV and the air control system may perform secure communication by using an agreed CK and IK. In particular, after mutual authentication, the authentication center may transmit an agreed CK and IK to the air control system at step 1550. Additionally, the UAV may calculate the agreed CK and IK at step 1555. Once the air control system has received the agreed CK and IK from the authentication center, secure communication may be established between the UAV and air control system at step 1560.

Air Control System

An air control system may comprise a user and UAV access subsystem, an air situation monitoring subsystem, a traffic right management subsystem and a geo-fencing subsystem. An air control system may perform a number of functions, including real-time air situation monitoring and recording of UAV activity. The air control system may also allocate traffic rights in restricted airspaces. Additionally, the air control system may accept applications for geo-fencing devices, and may also examine and determine the properties of the geo-fencing devices.

The air control system may also conduct necessary approval of user and aircraft authentication. Further, the air control system may monitor non-compliant aircrafts. The air control system may recognize non-compliant behavior, or behavior that is nearing non-compliance, and may caution for such behaviors. Additionally, the air control system may provide countermeasures against aircrafts continuing non-compliance, such as air situation monitoring, traffic right administration, a safety interface with an authentication center, geo-fencing, and other forms of non-compliance countermeasures. The air control system may also possess a respective event recording function. The air control system may also provide hierarchical access to air situation information.

The air control system may include an air situation monitoring subsystem. The air situation monitoring subsystem may be responsible for real-time monitoring of flight situations, such as flights of UAV's, in an allocated airspace. In particular, the air situation monitoring subsystem may monitor whether authorized aircrafts are flying along a predetermined course. The air situation monitoring subsystem may also be responsible for discovering abnormal behavior of authorized aircrafts. Based on the discovered abnormal behavior, the air situation monitoring subsystem may warn a non-compliance countermeasure system. Additionally, the air situation monitoring subsystem may monitor for the presence of unauthorized aircrafts and may warn a non-compliance countermeasure system based on the detection of unauthorized aircrafts. Examples of airspace monitoring may include radar, photoelectric, and acoustic sensing along with other examples.

The air situation monitoring subsystem may also actively perform authentication of aircraft identity, and may also respond to authentication requests received from aircrafts. Additionally, the air situation monitoring system may actively obtain information regarding the flight status of specific aircrafts. Aircrafts that are being monitored may be positioned in a three-dimensional manner when they are being monitored. For example, the air situation monitoring system may trace tracks of aircrafts and compare them with the planned courses to recognize abnormal behaviors. Abnormal behaviors may be recognized as behaviors that exceed predetermined tolerance thresholds (for example, thresholds for veering off a predetermined flight plan or falling below a threshold altitude while in flight). Additionally, the points that are monitored may be dispersed or concentrated.

The air situation monitoring subsystem may have a primary means for airspace monitoring as receiving and resolving (directly received or received and forwarded) flight information real-time that is broadcast real-time by the authorized (or compliant) aircrafts regarding themselves in the monitored airspace. The real-time flight information may be obtained by active inquiry of the air administration and response by the aircraft. Additionally, the air situation monitoring subsystem may have the auxiliary means for airspace monitoring such as acoustic radar and photoelectric radar. In examples, an authenticated user may be allowed to inquire the airspace monitoring subsystem about the current air situation status.

The air control system may also include a traffic right management subsystem. The traffic right management system may be responsible for accepting the initial application for a course resource and application for changing course, which is capable of planning the flight course and sending the feedback regarding the determined response to the application to the applicant. Examples of information provided in the determined response include planned flight course, monitoring points en route, as well as time corresponding windows. Additionally, the traffic right management system may be responsible for adjusting the predetermined flight course when conditions of the present airspace and/or other airspaces. A predetermined flight course may be adjusted for reasons including but not limited to climate, changes in available airspace resource, accidents, establishment of geo-fencing devices, as well as adjustments to their properties such as spatial range, duration, and restrictive hierarchy, etc. The traffic right management system may also inform the applicant or user of the original flight course to be adjusted. Further, an authenticated user may be allowed to inquire the traffic right management subsystem about the allocation of the authorized air courses.

The air control system may also include a safety interface with the authentication center subsystem. The safety interface with authentication center subsystem may be responsible for safe communication with the authentication center. In particular, the air control system may communicate with the authentication center for purposes of authentication or for purposes of a property query of the aircraft and a user.

In examples, a user may be aware of other users in the same region through the air control system. The user may choose to share information with other users, such as their flight path. Users may also share content that is captured by their device. For example, users may share content that is captured from a camera on or within their UAV. Additionally, users may send instant messages to one another.

A UAV flight system may also include a geo-fencing subsystem that includes one or more geo-fencing devices. A UAV may be able to detect a geo-fencing device, or vice versa. A geo-fencing device may cause a UAV to act in accordance with a set of flight regulations. Examples of a geo-fencing subsystem will be discussed in greater detail later in the application.

Flight Process Depending on Only Authentication on UAV

In certain applications, before a UAV can take off, the air control system may only need to perform authentication for the UAV. In these applications, it is not necessary to perform authentication for the user. The process by which the air control system performs authentication for the UAV may be demonstrated by AKA as provided in FIG. 15 above. After authentication, the UAV and the air control system may obtain a CK and an IK to communicate with each other as described in steps 1550 and 1555 of FIG. 15. The CK may be used for data encryption, and the IK may be used for data integrity protection.

After authentication, a user may obtain the keys (CK, IK) finally produced during the authentication process via secure channels, and the communication data between the user and the UAV can be protected by encryption using the keys so as to avoid being hijacked or controlled erroneously. As such, the subsequent data message (MSG) may include information related to the UAV, such as position of the UAV, velocity of the UAV, etc. In this way, the UAV can be subject to inclusive protection and tested by IK. The information transmitted is as follows:

$$\text{MSG1}\|((\text{HASH}(\text{MSG1})\|\text{CRC}(\ )+\text{SCR}(\text{IK}))\|\text{IMSI} \quad \text{Equation 1:}$$

wherein MSG1=MSG∥RAND∥TIMESTAMP∥GPS

In the equation 1 above, the CRC( ) can be an informational cyclic checksum and SCR(IK) can be an IK-derived data mask. Additionally, in this description, MSG is the original message, HASH ( ) is the hash function, RAND is as random number, TIMESTAMP is the current time stamp, and GPS is the current location so as to avoid a replay attack.

Figure 16:
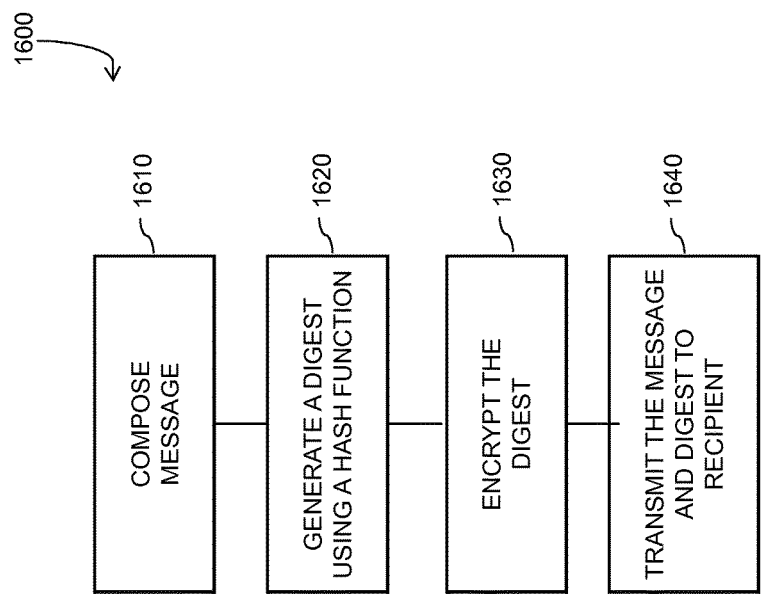
FIG. 16 shows a process for sending a message with an encrypted signature, in accordance with an embodiment of the present invention.

FIG. 16 shows a process 1600 for sending a message with an encrypted signature, in accordance with an embodiment of the present invention. At a first step 1610, a message is composed. As provided in the discussion above, the message may be represented as "MSG." After the message has been composed, at step 1620 a sender of the message may generate a digest of the message from the text of the message using a hash function. The digest may be a hash of just the message itself, MSG, or it may be a hash of a modified message such as MSG1 as seen above. In particular, MSG1 may comprise a compilation of information such as the original message MSG, a random number RAND, a current time stamp TIMESTAMP, and a current location GPS. In other examples, the modified message may contain alternative information.

Once a digest of the message MSG, or modified message MSG1, has been generated, at step 1630 the sender may encrypt the digest using a personal key. In particular, the digest may be encrypted using the sender's open key such that the encrypted digest may serve as a personal signature for the message that is sent. As such, in step 1630 this encrypted digest may then be sent to the recipient as the digital signature of the message together with the message.

Figure 17:
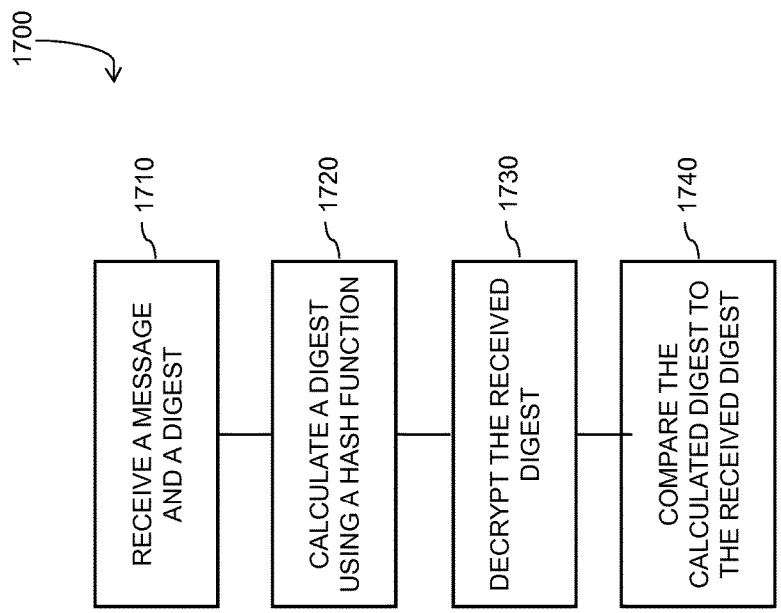
FIG. 17 shows another process for verifying a message by decrypting a signature, in accordance with an embodiment of the present invention.

FIG. 17 shows a process 1700 for verifying a message by decrypting a signature, in accordance with an embodiment of the present invention. As seen in step 1710, a recipient receives a message and an encrypted digest, such as the message and encrypted digest discussed in FIG. 16. At step 1720, the recipient may calculate the digest of the message from the received original message using the same hash function as the sender. Additionally, at step 1730, the recipient may decrypt the digital signature attached to the message using the open key of the sender. Once the digital signature attached to the message is decrypted, the recipient may compare the digests at step 1740. If these two digests are identical, the recipient can confirm that the digital signature is from the sender.

As such, when other counterparts receive this information and upload to the authentication center, it can be treated as a digital signature. That is, the presence of such wireless information is equivalent to the presence of this UAV. This process can simplify the authentication process of the UAV. That is, after the completion of the initial authentication, the UAV can correctly announce the definite presence of itself by executing the aforesaid process, instead of having to initiate a complicated initial authentication process each time.

Flight Process Depending on Authentication of UAV and User

In some applications, the UAV may take off only after authentication is performed for both the UAV and the user.

Authentication for the user can be based on electronic key. When the UAV is manufactured, the manufacturer may build in an electronic key. The electronic key may have a built-in USIM card, which contains IMSI-U (an IMSI associated with a user) and K-U (a key associated with a user) shared with the authentication center. This is also the only personal identification of the user and is written in only once when the USIM is manufactured. As such, the USIM card is unable to be duplicated or counterfeited. Moreover, it is protected by the safety mechanism of USIM and cannot be read out.

Therefore, it is extremely difficult to decrypt the USIM. The electronic key, as an electronic device, can be inserted in the remote controller, integrated into the remote controller, or communicated with the remote controller via conventional means such as Bluetooth™, WIFI, USB, audio, optical communication, etc. The remote controller may acquire essential information of the electronic key and may communicate with the authentication center for corresponding authentication.

Authentication for the user may also be achieved by various other means, such as inherent features of the user. In particular, authentication of a user may be achieved by voiceprint, fingerprint, iris information, etc.

Authentication for the UAV is based on an onboard security module, which is authenticated with the authentication center via the CH (channel). In an example, the onboard security module of the UAV includes a USIM which contains an IMSI-M (IMSI that is associated with the UAV, e.g. as provided by a manufacturer) and a K-M (a key that is associated with the UAV, e.g. as provided by a manufacture). The K-M, shared between the UAV and the authentication center, is written in only once when the USIM is manufactured. Moreover, it is protected by the safety mechanism of USIM and cannot be read out. Therefore, it is extremely difficult to decrypt USIM.

The onboard security module of the UAV and the authentication center may be authenticated bi-directionally, using a process is similar to the bidirectional authentication of UTMS by employing a mechanism of authentication and key agreement, that is, AKA. AKA is a bidirectional authentication agreement. That is, not only does the authentication center requires verification of the validity of the UAV or the electronic key, but the UAV or the electronic key requires verification of the validity of the authentication center that provides service as well. This process is illustrated by an AKA authentication process between a UAV and the authentication center as provided in FIG. 15, discussed above.

Before performing a flight task, the UAV and the electronic key may need to execute an authentication process. In an example, both are authenticated with the authentication center in series or in parallel in which basic authentication processes are performed. In particular, (IMSI-M, K-M) may be employed in the authentication of the UAV, and (IMSI-U, K-U) may be employed in the authentication of the electronic key. The description below is a general one. The security module indicates the UAV or the electronic key.

After the completion of the authentication of the UAV with the authentication center, the authentication center can determine a number of characteristics of the UAV through databases. For example, the authentication center may determine the type of the UAV, the capacity of the UAV, the ownership of the UAV, the health/working order of the UAV, the need for maintenance of the UAV, the historical flight record of the UAV, etc. Additionally, after the completion of the authentication of the electronic key with the authentication center, the authentication center can determine the personal information, operational permission, flight history, etc., of the user corresponding to the electronic key.

After the completion of the aforesaid authentication, the controller acquires several important passwords in agreement: CK-U (a CK that is associated with a user), IK-U (an IK that is associated with a user), CK-M (a CK that is associated with the UAV), and IK-M (an IK that is associated with the UAV). The aforesaid basic authentication processes and results can be used with flexibility in the context of the UAV.

The electronic key can negotiate with the authentication center regarding the flight task via an encrypted channel. The authentication center can approve, reject, or provides relevant suggestions or prompts for modification regarding the flight task based on the user and the properties of the UAV. During the flight process, the authentication can further keep communication with the UAV and the remote controller using various passwords, so as to obtain flight parameters (such as position, velocity, etc.), and manage and control the permission of the UAV or the user in flight.

In the wireless communication link between the UAV and the remote controller, double signatures of the UAV and the electronic key are employed. When a message is sent, the sender generates a digest of the message from the text of the message using a hash function, and then encrypts the digest using a personal key. This encrypted digest is sent to the recipient as the digital signature of the message together with the message. The recipient first calculates the digest of the message from the received original message using the same hash function as the sender, and then decrypts the digital signature attached to the message using the open key of the sender. If these two digests are identical, the recipient can confirm that the digital signature is from the sender.

In particular, the subsequent data message (MSG) may be a remote control command, position report, a velocity report, etc. and can be subject to integrity protection and tested by IK-U and IK-M. The information transmitted is as follows:

$$MSG1\|(HASH(MSG\|RAND)\|CRC)(+)SCR1(IK\text{-}M)(+)SCR2(IK\text{-}U))\|IMSU\text{-}U\|IMSU\text{-}M$$

wherein MSG1=MSG‖RAND‖TIMESTAMP‖GPS

In the equation above, CRC(+) is an informational cyclic checksum, and SCR1(IK) and SCR2(IK) are IK-derived data masks. SCR1( ) and SCR2( ) can be ordinary password generators. Additionally, HASH( ) is the hash function, and RAND is a random number, TIMESTAMP is the current timestamp, and GPS is the current location to avoid a replay attack.

Such information, when uploaded to the authentication center, can be treated as a digital signature. That is, the presence of such wireless information may be equivalent to the presence of this UAV and the presence of the user. This process can simplify the authentication process of the UAV. That is, after the completion of the initial authentication, the UAV can correctly announce the definite presence of itself by executing the aforesaid process, instead of having to initiate a complicated initial authentication process each time.

In order to increase safety, the aforesaid IK can be assigned a period of validity. The authentication center can continuously perform the AKA process with the UAV and the electronic key. During the flight process, the UAV can be subject to a program of user switch.

The authentication center may possess the identity of the UAV, the registered flight task of the UAV, and its actual flight history. It also may possess information of the corresponding user. Moreover, based on the results of the bidirectional verification, the authentication center can further provide various services and information regarding safety to the user. The authentication center can also somewhat take over the UAV. For example, the authentication center may take over some functions of the UAV. In this way, the administration and regulation of the UAV by the administrative agency may be enhanced.

Administration Process

The air control system may send an IMSI query command to the UAV via a peer communicator B. After the UAV responds to the IMSI query with its IMSI, an administrator at the air control system may initiate the aforementioned command authentication to identify this UAV as legitimately possessing the IMSI. Once it has been established that the UAV legitimately possesses the IMSI, further reciprocal signaling interaction may be performed between the UAV and the air control system using an agreed CK and IK. For example, the UAV may report history information or task planning. Additionally, the air control system can request the UAV to perform certain actions. As such, the air control system may take over some actions of the UAV. By using this authentication process, the air control system can ensure the correct identification of the UAV without the risk of counterfeit.

In another example, if the air control system sends an IMSI query command to the UAV and receives no response, an erroneous response, or an erroneous authentication, the air control system can deem the UAV as being non-compliant. In other examples, the UAV system can request the UAV to regularly broadcast its IMSI without needing to be prompted from air traffic control. The air control system, upon receiving the broadcast IMSI, may choose to initiate the aforesaid authentication process with the UAV.

Geo-Fencing Overview

A UAV flight system may include one or more geo-fencing devices. A UAV may be able to detect a geo-fencing device, or vice versa. A geo-fencing device may cause a UAV to act in accordance with a set of flight regulations. The set of flight regulations may include a geographic component that may be related to the location of the geo-fencing device. For example, a geo-fencing device may be provided a location and may assert one or more geo-fencing boundaries. Activity of the UAV may be regulated within the geo-fencing boundaries. Alternatively or in addition, activity of the UAV may be regulated outside the geo-fencing boundaries. In some instances, rules imposed on the UAV may be different within the geo-fencing boundaries and outside the geo-fencing boundaries.

Figure 18:
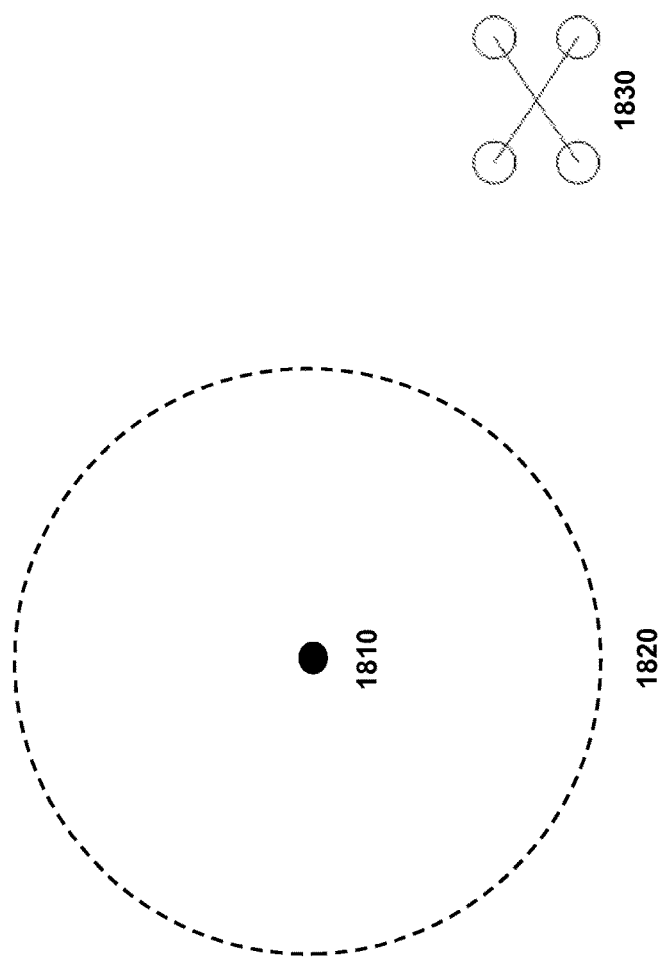
FIG. 18 shows an example of a UAV and a geo-fencing device, in accordance with an embodiment of the invention.

FIG. 18 shows an example of a UAV and a geo-fencing device, in accordance with an embodiment of the invention. The geo-fencing device 1810 may assert a geo-fencing boundary 1820. A UAV 1830 may encounter the geo-fencing device.

A UAV 1830 may operate in accordance with a set of flight regulations. The set of flight regulations may be generated based on the geo-fencing device. The set of flight regulations may take a boundary of a geo-fencing device into account. A set of flight regulations may be associated with a geo-fencing boundary within a range of the geo-fencing device.

A geo-fencing device 1810 may be provided at a location. A geo-fencing device may be any device that may be used to aid in determining one or more geo-fencing boundaries, that may be used in one or more sets of flight regulations. The geo-fencing device may or may not transmit a signal. The signal may or may not be detectable by a UAV. The UAV may be capable of detecting a geo-fencing device with or without a signal. The geo-fencing device may or may not be capable of detecting a UAV. The UAV may or may not transmit a signal. The signal may or may not be detectable by the geo-fencing device. One or more intermediary devices may be capable of detecting a signal from a UAV and/or geo-fencing device. For example, an intermediary device may receive a signal from the UAV and may transmit data to the geo-fencing device about the UAV. The intermediary device may receive a signal from the geo-fencing device and may transmit data to the UAV about the geo-fencing device. Various combinations of detection and communication may occur as described in greater detail elsewhere herein.

The geo-fencing device may be used as a reference to one or more geo-fencing boundaries 1820. The geo-fencing boundaries may be indicative of a two-dimensional region. Anything above or below the two-dimensional region may be within the geo-fencing boundary. Anything above or below a region outside the two-dimensional region may be outside the geo-fencing boundary. In another example, the geo-fencing boundaries may be indicative of a three-dimensional volume. The space within the three-dimensional volume may be within the geo-fencing boundary. The space outside the three-dimensional volume may be outside the geo-fencing boundary.

The geo-fencing device boundary may be open or closed. A closed geo-fencing device boundary may entire enclose a region within the geo-fencing device boundary. A closed geo-fencing device boundary may begin and end at the same point. In some embodiments, a closed geo-fencing boundary may not have a beginning or end. Examples of a closed geo-fencing boundary may be a circle, square, or any other polygon. An open geo-fencing boundary may have a different beginning and end. A geo-fencing wall may have a boundary that is a straight line or curved line. A closed geo-fencing boundary may enclose a region. For instance, the closed boundary may be useful for defining a flight-restricted zone. An open geo-fencing boundary may form a barrier. A barrier may be useful for forming a geo-fencing boundary at a natural physical boundary. Examples of physical boundaries may include jurisdictional boundaries (e.g., boundaries between nations, regions, states, provinces, town, cities, or property lines), naturally occurring boundaries (e.g., rivers, creeks, brooks, cliffs, ravines, canyons), man-made boundaries (e.g., walls, streets, bridges, dams, doors, entryways), or any other type of boundary.

The geo-fencing device may have a location relative to the geo-fencing boundary. The location of the geo-fencing device may be used to determine the location of the geo-fencing boundary. The location of the geo-fencing device may serve as a reference for the geo-fencing boundary. For example, if the geo-fencing boundary is a circle around the geo-fencing device, the geo-fencing device may be at the center of the circle. Thus, depending on the location of the geo-fencing device, the geo-fencing boundaries may be determined to be a circle around the geo-fencing device, with the geo-fencing device at its center and with a predetermined radius. The geo-fencing device need not be a center of the circle. For example, the boundaries of the geo-fencing device may be provided so that they are a circle that is off-set relative to the geo-fencing device. The geo-fencing device itself may be within the boundaries of the geo-fencing device. In alternative embodiments, the boundaries of the geo-fencing device may be such that the geo-fencing device is outside the boundaries of the geo-fencing device. However, the boundaries of the geo-fencing device may be determined based on the location of the geo-fencing device. The location of the boundaries of the geo-fencing device may also be determined based on the geo-fencing boundary type (e.g., shape, size of the geo-fencing boundary). For example, if the geo-fencing boundary type is known to be a hemispherical boundary with a center at the location of the geo-fencing device and a radius of 30 meters, and the geo-fencing device is known to have global coordinates of X, Y, Z, then the location of the geo-fencing boundaries can be calculated according to global coordinates.

A UAV may approach a geo-fencing device. A recognition of the boundaries of the geo-fencing device may be provided by the UAV. The UAV may fly in accordance with flight regulations that may have different rules based on whether the UAV is on a first side of a boundary of the geo-fencing device or a second side of a boundary of the geo-fencing device.

In one example, a UAV may not be permitted to fly within the boundaries of a geo-fencing device. Thus, when a UAV approaches the geo-fencing device, a detection may be made that the geo-fencing boundaries are close, or that the UAV has crossed the geo-fencing boundary. The detection may be made by the UAV. For instance, the UAV may be aware of the UAV location and the geo-fencing boundary. In another example, the detection may be made by an air control system. The air control system may receive data bout the UAV location and/or the geo-fencing device location. The UAV may or may not be aware of the geo-fencing device location. The flight regulations may be such that the UAV is not permitted to fly within the boundary. A flight response measure may be taken by the UAV. For example, the course of the UAV may be altered to cause the UAV to not enter the region within the geo-fencing boundary or may cause the UAV to leave the region within the geo-fencing boundary if the UAV has entered. Any other type of flight response measure may be taken, which may include providing an alert to a user of the UAV, or an air control system. The flight response measure may be initiated on-board the UAV or may be initiated from an air control system.

In instance, the UAV may approach a geo-fencing device. The UAV may be aware of the UAV's own location (e.g., using a GPS unit, any other sensors, or any other technique described elsewhere herein). The UAV may be aware of the geo-fencing device's location. The UAV may sense the geo-fencing device directly. The geo-fencing device may sense the UAV and may transmit a signal to the UAV indicative of the geo-fencing device location. The UAV may receive an indication of the geo-fencing device from an air control system. Based on the geo-fencing device location, the UAV may be aware of the location of the geo-fencing boundary. The UAV may be able to calculate the location of the geo-fencing boundary based on the known location of the geo-fencing device. In other instances, calculation of the geo-fencing boundary location may be performed off-board the UAV and the location of the geo-fencing boundary may be transmitted to the UAV. For example, a geo-fencing device may know its own location and the type of boundary (e.g., spatial disposition of the boundary relative to the device location). The geo-fencing device may calculate the location of its geo-fencing boundary and transmit the boundary information to the UAV. The boundary information may be transmitted directly from the geo-fencing device to the UAV or via one more intermediary (e.g., air control system). In another example, the air control system may know the geo-fencing device location. The air control system may receive the geo-fencing device location from the geo-fencing device, or from the UAV. The air control system may know the type of boundary. The air control system may calculate the location of the geo-fencing boundary and may transmit the boundary information to the UAV. The boundary information may be transmitted directly from the air control system to the UAV. The boundary information may be transmitted directly from the air control system to the UAV or via one or more intermediary. When the location of the geo-fencing boundary location is known to the UAV, the UAV may compare its own location relative to the geo-fencing boundary location.

Based on the comparison, one or more flight response measure may be taken. The UAV may be able to self-initiate a flight response measure to take. The UAV may have a set of flight regulations stored on-board the UAV and may be able to initiate the flight response measure in compliance with the flight regulations. Alternatively, the flight regulations may be stored off-board the UAV but may be accessible by the UAV, for the UAV to determine the flight response measure to be taken by the UAV. In another example, the UAV does not self-initiate the flight response, but may receive the flight response instruction from an external source. Based on the location comparison the UAV may ask the external source whether a flight response measure is needed, and the external source may provide an instruction for a flight response measure if needed. For example, the air control system may look at the location comparison and determine whether a flight response measure is needed. If so the air control system may provide the direction to the UAV. For instance, if a UAV flight path needs to deviate to avoid entrance within the geo-fencing boundary, then the command to alter the flight path may be provided.

In another instance, the UAV may approach a geo-fencing device. The UAV may be aware of the UAV's own location (e.g., using a GPS unit, any other sensors, or any other technique described elsewhere herein). The UAV is optionally not aware of the geo-fencing device's location. The UAV may provide information about the UAV location to an external device. In one example, the external device is a geo-fencing device. The geo-fencing device may be aware of its own location. The geo-fencing device may be aware of the UAV location, from the information provided from the UAV. In alternative embodiments, the geo-fencing device may sense the UAV and determine the UAV location based on the sensed data. The geo-fencing device may be able to receive information about the UAV location from an additional source, such as an air control system. The geo-fencing device may be aware of the location of the geo-fencing boundary. The geo-fencing device may be able to calculate the location of the geo-fencing boundary based on the known location of the geo-fencing device. The calculation of the boundary location may also be based on the boundary type (e.g., spatial disposition of the boundary relative to the device location). When the location of the geo-fencing boundary location is known, the geo-fencing device may compare the UAV location relative to the geo-fencing boundary location.

In another example, the external device is an air control system. The air control system may be aware of a geo-fencing device location. The air control system may receive the geo-fencing device location directly from the geo-fencing device, or via one or more intermediary devices. The air control system may sense the geo-fencing device and determine the geo-fencing device location based on the sensed data. In some instances, information from one or more recorders may be used to determine a location of the geo-fencing device. The air control system may be able to receive the location of the geo-fencing device from an additional source, such as the UAV. The air control system may be aware of the UAV location, from the information provided from the UAV. In alternative embodiments, the air control system device may sense the UAV and determine the UAV location based on the sensed data. In some instances, information from one or more recorders may be used to determine a location of the UAV. The geo-fencing device may be able to receive information about the UAV location from an additional source, such as a geo-fencing device. The air control system may be aware of the location of the geo-fencing boundary. The air control system may receive the location of the geo-fencing device boundary from the geo-fencing device or another source. The air control system may be able to calculate the location of the geo-fencing boundary based on the known location of the geo-fencing device. The calculation of the boundary location may also be based on the boundary type (e.g., spatial disposition of the boundary relative to the device location). When the location of the geo-fencing boundary location is known, the air control system may compare the UAV location relative to the geo-fencing boundary location.

Based on the comparison, one or more flight response measure may be taken. The geo-fencing device, or the air control system may be able to provide information about the comparison to the UAV. The UAV may be able to self-initiate a flight response measure to take. The UAV may have a set of flight regulations stored on-board the UAV and may be able to initiate the flight response measure in compliance with the flight regulations. Alternatively, the flight regulations may be stored off-board the UAV but may be accessible by the UAV, for the UAV to determine the flight response measure to be taken by the UAV.

In another example, the UAV does not self-initiate the flight response, but may receive the flight response instruction from an external source. The external source may be geo-fencing device or an air control system. Based on the location comparison, the external source may provide an instruction for a flight response measure if needed. For example, the air control system may look at the location comparison and determine whether a flight response measure is needed. If so the air control system may provide the direction to the UAV. For instance, if a UAV flight path needs to deviate to avoid entrance within the geo-fencing boundary, then the command to alter the flight path may be provided.

Any description previously provided to flight regulation may be applied herein. The geo-fencing devices may establish the boundaries of locations that may play into the flight regulations. Various types of flight regulations may be imposed as provided elsewhere herein. The geo-fencing devices may be used to establish boundaries for the different types of flight regulations, which may include regulations that may affect flight of the UAV (e.g., flight path, take-off, landing), operation of a payload of the UAV, positioning of a payload of the UAV, operation of a carrier of the UAV, operation or disposition of one or more sensors of the UAV, operation of one or more communication units of the UAV, operation of a navigation of the UAV, power disposition of the UAV, and/or any other operations of the UAV.

Figure 19:
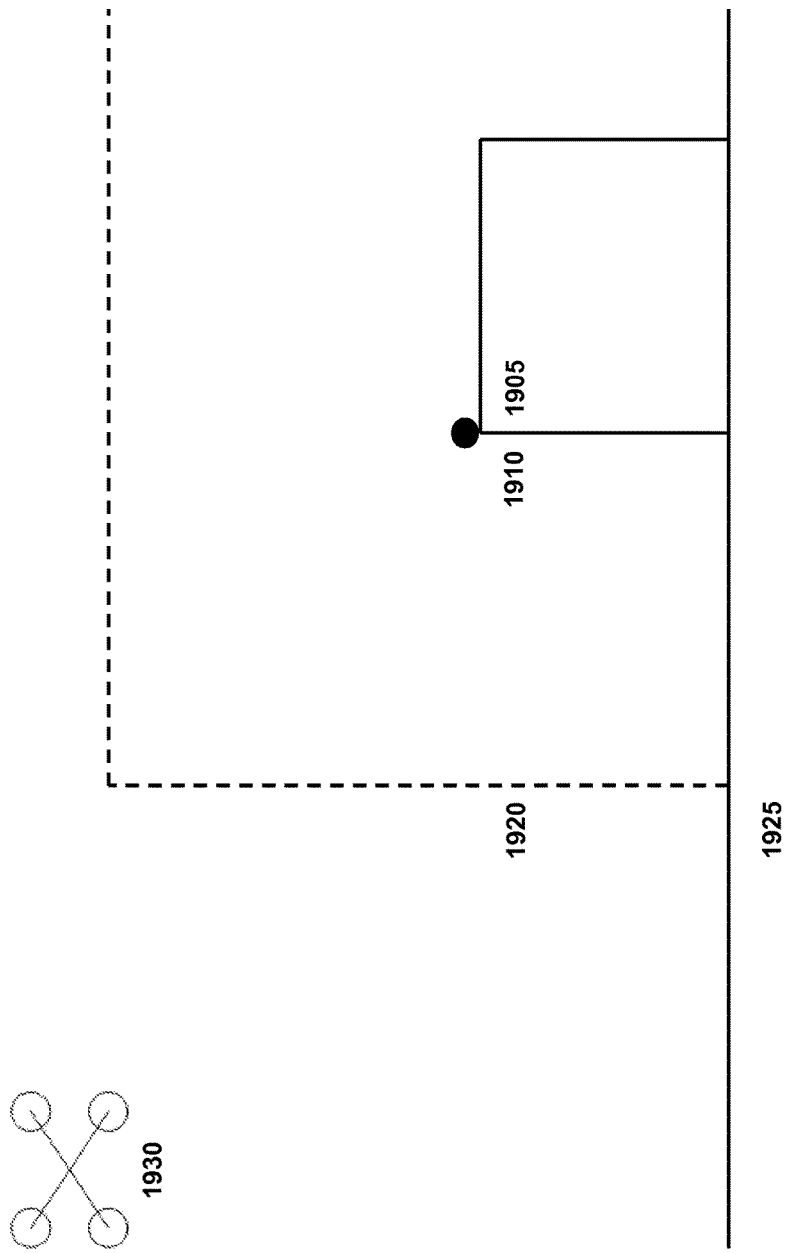
FIG. 19 shows a side view of a geo-fencing device, geo-fencing boundary, and UAV in accordance with an embodiment of the invention.

FIG. 19 shows a side view of a geo-fencing device, geo-fencing boundary, and UAV in accordance with an embodiment of the invention. A geo-fencing device 1910 may be provided at any location. For example, the geo-fencing device may be provided on an object 1905, or on a surface 1925. The geo-fencing device may be used as a reference for one or more geo-fencing boundary 1920. A UAV 1930 may approach the geo-fencing device and/or geo-fencing boundary.

The geo-fencing device 1910 may be established at a location. In some instances, the geo-fencing device may be provided in a permanent or semi-permanent manner. The geo-fencing device may be substantially immovable. The geo-fencing device may not be moved manually without aid of a tool. The geo-fencing device may remain at the same location. In some instances, the geo-fencing device may be affixed or attached to an object 1905. The geo-fencing device may be built into the object.

Alternatively, the geo-fencing device may be easily movable and/or portable. The geo-fencing device may be moved manually without requiring a tool. The geo-fencing device may move from location to location. The geo-fencing device may be attached to or supported by the object in a removable manner. In some instances, the geo-fencing device may be a handheld device. The geo-fencing device may be picked up and carried by a human. The geo-fencing device may be picked up and carried by a human in one hand. The geo-fencing device may be easily transportable. In some embodiments, the geo-fencing device may weigh less than or equal to about 500 kg, 400 kg, 300 kg, 200 kg, 150 kg, 100 kg, 75 kg, 50 kg, 40 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1.5 kg, 1 kg, 750 g, 500 g, 300 g, 200 g, 100 g, 75 g, 50 g, 30 g, 20 g, 15 g, 10 g, 5 g, 3 g, 2 g, 1 g, 500 mg, 100 mg, 50 mg, 10 mg, 5 mg, or 1 mg. The geo-fencing device may have a volume of less than or equal to about 5 $m^3$, 3 $m^3$, 2 $m^3$, 1 $m^3$, 0.5 $m^3$, 0.1 $m^3$, 0.05 $m^3$, 0.01 $m^3$, 0.005 $m^3$, 0.001 $m^3$, 500 $cm^3$, 300 $cm^3$, 100 $cm^3$, 75 $cm^3$, 50 $cm^3$, 30 $cm^3$, 20 $cm^3$, 10 $cm^3$, 5 $cm^3$, 3 $cm^3$, 1 $cm^3$, 0.1 $cm^3$, or 0.01 $cm^3$. The geo-fencing device may be worn by an individual. The geo-fencing device may be carried in a pocket, bag, pouch, purse, backpack, or any other article of individual.

The geo-fencing device may be moved from location to location with aid of an individual. For example, a user may pick up a geo-fencing device, move it to another location, and put it down. Optionally, a user may need to detach the geo-fencing device from an existing object, then pick up the geo-fencing device, move it to another location, and attach it at the new location. Alternatively, the geo-fencing device may be self-propelled. The geo-fencing device may be mobile. For example, the geo-fencing device may be another UAV, or may be another vehicle (e.g., ground based vehicle, water-based vehicle, air-based vehicle, space-based vehicle). In some instances, the geo-fencing device may be attached to or supported by a UAV or other vehicle. The location of the geo-fencing device may be updated and/or tracked as it moves.

In some embodiments, the geo-fencing device may be substantially stationary during use. The geo-fencing device may be provided on an object 1905 or on a surface 1925. The object may be a naturally occurring object or a man-made object. Examples of naturally occurring objects may include trees, bushes, stones, hills, mountains, or any other naturally occurring object. Examples of man-made objects may include structures (e.g., buildings, bridges, poles, fences, walls, piers, buoys) or any other man-made object. In one example, the geo-fencing device may be provided on a structure, such as a roof of a building. The surface may be a naturally occurring surface or may be a man-made surface. Examples of surfaces may include ground surface (e.g., terrain, dirt, gravel, asphalt, roads, flooring) or water-based surfaces (e.g., lakes, oceans, rivers, creeks).

Optionally, a geo-fencing device may be UAV docking station. The geo-fencing device may be affixed to a UAV docking station. The geo-fencing device may be placed on a UAV docking station or may be supported by the UAV docking station. The geo-fencing device may be part of the UAV docking station or may be integrally formed into the UAV docking station. A UAV docking station may permit one or more UAVs to land on the docking station or be supported by the docking station. A UAV docking station may include one or more landing zones that may be used to bear weight of the UAV. The UAV docking station may provide power to the UAV. In some instances, the UAV docking station may be used to charge one or more power units (e.g., batteries) on-board the UAV. The UAV docking station may be used to swap out power units from the UAV with new power units. The new power units may have a higher energy capacity or state of charge. The UAV docking station may be able to conduct repairs on the UAV or provide spare parts to the UAV. The UAV docking station may accept an item carried by the UAV or may store an item that may be picked up to be carried by the UAV.

The geo-fencing device may be any type of device. The device may be a computer (e.g., personal computer, laptop computer, server), mobile device (e.g., smartphone, cellular phone, tablet, personal digital assistant), or any other type of device. The device may be a network device capable of communicating over a network. The device comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein.

A device may become a geo-fencing device when the device provides a reference point for a set of boundaries associated with a set of flight regulations. In some instances, the device may be a geo-fencing device when a software or application is operating on the device that may provide the location of the device as a reference point for a set of boundaries associated with a set of flight regulations. For example, a user may have a device that performs additional functions, such as a smartphone. An application may be downloaded to the smartphone that may communicate with an air control system, another component of an authentication system, or any other system. The application may provide the air control system with a location of the smartphone and indicate that the smartphone is a geo-fencing device. Thus, the location of the smartphone may be known and may be used to determine boundaries that may be associated with restrictions. The device may already have a locator or may use locating systems to determine a location of the device. For instance, locations of smartphones and/or tablets or other mobile devices may be determined. The locations of the mobile devices may be leveraged to provide a reference point as a geo-fencing device.

In some embodiments, a geo-fencing device may be designed to be provided in an outdoor environment. The geo-fencing device may be designed to withstand various climates. The geo-fencing device may have a housing that may partially or completely enclose one or more components of the geo-fencing device. The housing may protect the one or more components from wind, dust, or precipitation (e.g., rain, snow, hail, ice). The housing of the geo-fencing device may or may not be air tight, and may or may not be water proof. The housing of the geo-fencing device may enclose one or more processors of the geo-fencing device. The housing of the geo-fencing device may enclose one or more memory storage units of the geo-fencing device. The housing of the geo-fencing device may enclose a locator of the geo-fencing device.

In some embodiments, the geo-fencing device may be a remote controller configured to receive a user input. The remote controller may control operation of the UAV. This may be useful when a geo-fencing boundary is used to permit operation of the UAV within the geo-fencing boundary, but restrict operation of the UAV outside the geo-fencing boundary. For instance, the UAV may only be permitted to fly within the geo-fencing boundary. If the UAV approaches or exits the boundary, the flight path of the UAV may be altered to keep the UAV within the geo-fencing boundary. If the UAV is only permitted to fly within the geo-fencing boundary, this may keep the UAV within a specified proximity of the remote controller. This may help the user keep tabs on the UAV more easily. This may prevent the UAV from flying outside a desired range and getting lost. If the geo-fencing device is the remote controller, the user may be able to walk around and the geo-fencing device boundary may move along with the remote controller. Thus, the user may have some freedom to freely traverse an area, while the UAV remains within a desired boundary relative to the user.

A geo-fencing boundary may include one or more lateral boundaries. For instance, a geo-fencing boundary may be a two-dimensional region that may define a lateral dimension of space within a geo-fencing boundary and space outside a geo-fencing boundary. The geo-fencing boundary may or may not include an altitude boundary. The geo-fencing boundary may define a three-dimensional volume.

FIG. 19 provides an illustration where the geo-fencing boundary 1920 may include a lateral aspect and an altitude aspect. For example one or more lateral boundaries may be provided. An altitude ceiling and/or floor may be provided. For example, an altitude ceiling may define the top of the boundary. The altitude floor may define a bottom of the boundary. The boundaries may be substantially flat, or may be curved, slanted, or have any other shape. Some boundaries may have cylindrical shapes, prismatic shapes, conical shapes, spherical shapes, semi-spherical shapes, bowl shapes, doughnut shapes, tetrahedral shapes, or any other shapes. In one illustration, and UAV may not be permitted to fly within the geo-fencing boundary. The UAV may freely fly outside the geo-fencing boundary. Thus, the UAV may fly above the altitude ceiling provided in FIG. 19.

In some embodiments, a geo-fencing system may be provided. The geo-fencing system may be a subsystem of an air control system. In some instances, an air control system may include a geo-fencing module that may perform one or more examples described herein. Any description herein of a geo-fencing system may apply to a geo-fencing module that may be part of an air control system. The geo-fencing module may be part of an authentication system. Alternatively, a geo-fencing system may be separate and/or independent of an authentication system or air control system.

The geo-fencing system may accept application for the establishment of geo-fencing devices. For example, when geo-fencing devices are part of a UAV system, they may be identified and/or tracked. A geo-fencing device may have a unique identity. For instance, the geo-fencing device may have a unique geo-fencing identifier that may uniquely identify and/or differentiate the geo-fencing device from other geo-fencing devices. Identity information about a geo-fencing device may be gathered. Such information may include information about a geo-fencing device type. A geo-fencing device identifier may be used to ascertain a geo-fencing device type. Further description may be provided elsewhere herein about geo-fencing device type.

In some embodiments, geo-fencing device identifiers may be provided from an ID registration center. The ID registration center may also provide user identifier and/or UAV identifiers (e.g., ID registration center 210 illustrated in FIG. 2). Alternatively, a geo-fencing device may use a separate ID registration center from the UAV and/or user. Thus, geofencing devices may be identified. When the geo-fencing devices undergo application for establishment through the geo-fencing system, the geo-fencing devices may be identified.

In some embodiments, geo-fencing devices may also under authentication. Authentication of the geo-fencing devices may include confirming that the geo-fencing devices are the geo-fencing devices indicated by the geo-fencing device identifier. Any authentication technique may be used to authenticate the geo-fencing device. Any techniques used for authenticated a UAV and/or user may be used in authenticating a geo-fencing device. A geo-fencing device may have a geo-fencing device key. The geo-fencing device key may be used during the authentication process. In some instances an AKA process may be used to aid in authentication of the geo-fencing device. Further possible processes for authenticating the geo-fencing device are described in greater detail elsewhere herein. The geo-fencing system may prevent the geo-fencing devices from being cloned. The geo-fencing system may prevent a cloned geo-fencing device from being authenticated by an air administration system (e.g., air control system) and the UAV. An authenticated geo-fencing device may be used by the air control system and may communicate with the UAV.

The geo-fencing system may track the identities of the geo-fencing device that have undergone a registration process of with the geo-fencing device system. The geo-fencing device may have been authenticated prior to successfully being registered with the geo-fencing device system. In some instances, a geo-fencing device is registered once with the geo-fencing device subsystem. Alternatively, registration may occur multiple times. The geo-fencing device may be identified and/or authenticated every time the geo-fencing device is powered on. In some instances, the geo-fencing devices may remain powered on during use. In some instances, the geo-fencing devices may be powered off. When the geo-fencing devices are powered off, and then powered back on, they may undergo an identification and/or authentication process to be established in the system. In some instances, only geo-fencing devices that are currently on are tracked by the system. Data relating to geo-fencing devices that were once established but are not currently powered on may be stored by the system. When the devices are powered off, they need to be tracked.

The geo-fencing system may examine and determine an effective spatial range, duration and/or restrictive hierarchy of the geo-fencing devices. For example, the location of the geo-fencing devices may be tracked. In some instances, the geo-fencing devices may self-report their locations. In some instances, the geo-fencing devices may have a location tracker, such as a GPS unit, or one or more sensors. The geo-fencing device may transmit information about the geo-fencing device location to the geo-fencing system. The location may include coordinates of the geo-fencing device, such as global coordinates or local coordinates.

The geo-fencing system may keep track of geo-fencing boundaries for each of the geo-fencing devices. The geo-fencing devices may have the same types of boundaries or may have different types of boundaries. For instance, the boundaries from device to device may differ. The geo-fencing system may keep track of the type of boundaries and the locations of the geo-fencing devices. Thus, the geo-fencing system may be able to determine locations of the boundaries of the geo-fencing devices. The effective spatial range of the geo-fencing devices may be known by the system.

The duration of the geo-fencing device boundaries may be known. In some embodiments, the geo-fencing boundaries may remain static over time. They may remain on as long as the geo-fencing device is powered on. In other instances, the geo-fencing boundaries may change over time. Even when a geo-fencing device is powered on, the geo-fencing boundaries may have the same scope, but may be in effect, or may not be in effect. For example, from 2 pm to 5 pm every day, the geo-fencing boundary may be provided, while during rest of the hours, the geo-fencing boundaries are not in effect. The shape and/or size of the geo-fencing boundary may change over time. The changes in geo-fencing boundary may be based on time of day, day of the week, day of the month, week of the month, month, quarter, season, year, or any other time related factor. The changes may be regular or periodic. Alternatively, the changes may be irregular. In some instances, a schedule may be provided which the geo-fencing boundary changes may follow. Further examples and illustrations of changing geo-fencing boundaries are provided in greater detail elsewhere herein.

Hierarchy of geo-fencing devices may be known by the geo-fencing subsystem. Earlier description of hierarchy of various flight regulations may apply to hierarchy of geo-fencing devices. For instance, if multiple geo-fencing devices have an overlapping spatial range, the overlapping range may be treated in accordance with hierarchy. For example, flight regulations pertaining to a geo-fencing device with a higher hierarchy may apply in the overlapping region. Alternatively, more restrictive flight regulations may be used in the overlapping region.

A geo-fencing system may determine how a geo-fencing device may be announced. In some instances, the geo-fencing device may emit a signal. The signal may be used to detect the geo-fencing device. The UAV may use be able to detect the signal from the geo-fencing device to detect the geo-fencing device. Alternatively, a UAV may not be able to directly detect the geo-fencing device, but a geo-fencing system may be able to detect the geo-fencing device. A recorder, such as recorders described elsewhere herein, may be able to detect the geo-fencing device. An air control system may be able to detect the geo-fencing device. The geo-fencing device may be announced in any way. For instance, the geo-fencing device may be announced using an electromagnetic signal, or acousto-optic signal. The signal from the geo-fencing device may be detected with aid of a vision sensor, infrared sensor, ultraviolet sensor, sound sensor, magnetometer, radio receiver, WiFi receiver, or any other type of sensor or receiver. The geo-fencing system may track which geo-fencing devices use which type of signal. The geo-fencing system may inform one or more other devices or systems (e.g., UAVs) which type of signal is provided by a geo-fencing device, so that a correct sensor may be used to detect the geo-fencing device. The geo-sensing information may also track information such as frequency ranges, bandwidths, and/or protocols used in transmitting the signal.

A geo-fencing system may manage a resource pool for UAV flight based on information from the geo-fencing devices. Geo-fencing devices may impose one or more regulations on UAV operation. For example, the UAV flight may be restricted based on the geo-fencing devices. An example of a resource may be available airspace. The available airspace may be restricted based on the location and/or boundaries of the geo-fencing devices. The available airspace information may be used by the air control system in allocating resources for a UAV. The available airspace may be updated in real-time. For instance, geo-fencing devices may be turned or off, may be added or removed, may be moved, or boundaries of the geo-fencing devices may change over time. Thus, the available airspace may change over time. The available airspace may be updated in real-time. The available airspace may be updated continuously or on a periodic basis. The available airspace may be updated at regular or irregular intervals of time, or in accordance with a schedule. The available airspace may be updated in response to an event, such as a request for a resource. In some instances, an available airspace may be predicted over time. For instance, if geo-fencing device schedules are known ahead of time, some changes in the air space may be predictable. Thus, when a user asks for a resource, such as airspace, for a future time, a predicted available airspace may be assessed. In some embodiments, different levels may be provided. For example, different operational level of users may be provided. Based on the operational level of the user, different resources may be available to the user. For instance, some geo-fencing restrictions may only apply to certain users while not applying to other users. A user type may affect the available resources. Another example of a level may include a UAV type. A UAV type may affect the available resources. For instance, some geo-fencing restrictions may apply to certain models of UAV while not applying to other models of UAVs.

When a user wishes to operate a UAV, a request for one or more resources may be made. In some instances, the resources may include some space for a period of time. The resources may include devices, such as those described elsewhere herein. Based on the available resources, the flight plan may be accepted or rejected. In some instances, alterations may be provided to the flight plan to comply with the available resources. The geo-fencing device information may be used in determining availability of resources. The geo-fencing device information may be useful in determining whether a proposed flight plan is accepted, rejected, or altered.

A use may interact with a geo-fencing system. The user may inquire the geo-fencing system about the allocation of resources. For example, a user may ask for an allocation of the status of available airspace or other resources. The user may ask about the allocation of the status of available airspace corresponding to the user's level (e.g., operational level, user type). The user may ask for allocation of the status of available airspace corresponding to a UAV type or other characteristic. In some instances, a user may receive information back from the geo-fencing system about the allocation of resources. In some instances, the information may be presented in a graphical format. For example, a map may be provided showing available airspace. The map may show available airspace at the current point in time when the user makes the inquiry, or may project available airspace at a future point in time that the user is inquiring after. The map may show locations and/or boundaries of the geo-fencing device. Further descriptions of user interfaces that may show geo-fencing devices and/or available resources may be provided in greater detail elsewhere herein (e.g., FIG. 35).

In some embodiments, a non-compliance countermeasure system may be provided. The non-compliance countermeasure system may be a subsystem of an air control system. An air control system may include a non-compliance countermeasure module that may perform one or more of the actions described herein. Any description herein of a non-compliance countermeasure system may apply to a non-compliance countermeasure module that may be part of an air control system. The non-compliance countermeasure module may be part of an authentication system. Alternatively, a non-compliance countermeasure system may be separate and/or independent of an authentication system or air control system.

The non-compliance countermeasure system may track UAV activity. For example, the location of the UAV may be tracked. The location of the UAV may include orientation of the UAV. Tracking location of the UAV may also include tracking movement of the UAV (e.g., translational velocity, translational acceleration, angular velocity, angular acceleration). Other operations of the UAV may be tracked, such as operation of the payload, positioning of the payload, operation of a carrier, operation of one or UAV sensors, operation of a communication unit, operation of a navigation unit, power dissipation, or any other activities of the UAV. The non-compliance countermeasure system may detect when the UAV is behaving abnormally. The non-compliance countermeasure system may detect when a UAV engages in behavior that is not in compliance with a set of flight regulations. The user identity and/or the UAV identity may be considered in determining whether the UAV is complying or is not complying with the set of flight regulations. Geo-fencing data may be considered in determining whether UAV is complying or is not complying with the set of flight regulations. For example, the non-compliance countermeasure system may detect when an unauthorized UAV appears in a restricted airspace. A restricted airspace may be provided within boundaries of a geo-fencing device. The user and/or UAV may not be authorized to enter the restricted airspace. However, the presence of the UAV approaching or entering the restricted airspace may be detected. The UAV activity may be tracked in real-time. The UAV activity may be continuously tracked, periodically tracked, tracked according to a schedule, or tracked in response to a detected event or condition.

The non-compliance countermeasure system may send out a warning when a UAV is about to engage in an activity that does not comply with a set of flight regulations for the UAV. For example, if the unauthorized UAV is about enter the restricted airspace, a warning may be provided. The warning may be provided in any manner. In some instances, the warning may be an electromagnetic or acousto-optic warning. An alert may be provided to a user of the UAV. The alert may be provided via a user terminal, such as a remote controller. A warning may be provided to the air control system and/or the UAV. A user may be presented with an opportunity to change the UAV behavior to cause the UAV to comply with the flight regulations. For example, if the UAV is approaching restricted airspace, the user may have some time to alter the path of the UAV to avoid the restricted airspace. Alternatively, the user may not be presented with an opportunity to change the UAV behavior.

The non-compliance countermeasure system may cause a flight response measure to be effected by the UAV. The flight response measure may come into effect to cause the UAV to comply with the set of flight regulations. For example, if the UAV has entered a restricted region, the UAV flight path may be altered to cause the UAV to exit the restricted region immediately, or to cause the UAV to land. The flight response measure may be a coercive measure that may override one or more user input. The flight response measure may be a mechanical, electromagnetic, or acousto-optic measure or takeover of control of the UAV. The measure may cause the UAV to dispel, be captured, or even destroyed if the warning is ineffective. For example, the measure may automatically cause an alteration of the UAV flight path. The measure may cause the UAV to automatically land. The measure may cause the UAV to power off or self-destruct.

Any other flight response measure, such as those described elsewhere herein, may be employed.

The non-compliance countermeasure system may record and track information about the UAV activity. The various types of information about UAV may be recorded and/or stored. In some embodiments, the information may be stored in a memory storage system. All information pertaining to UAV activity may be stored. Alternatively, a subset of the information pertaining to the UAV activity may be stored. In some instances, the recorded information may be used to facilitate post facto review. The recorded information may be used for forensic purposes. In some instances, the recorded information may be used for disciplinary actions. For example, an event may take place. The recorded information pertinent to the event may be reviewed. The information may be used to determine details of how or why the event occurred. If the event is an accident, the information may be used to determine a cause of the accident. The information may be used to allocate fault for the accident. For example, if a party is responsible for the accident, the information may be used to determine that the party is at fault. Disciplinary actions may be instituted if the party is at fault. In some instances, multiple parties may share varying degrees of fault. Disciplinary action may be allocated depending on the recorded information. In another example, the event may be an action by the UAV that is not in compliance with a set of flight regulations. For example, a UAV may fly through a region where photography is not permitted. However, the UAV may have captured images using the camera. The UAV may have somehow continued capturing images after a warning was issued. The information may be analyzed to determine for how long the UAV captured the images or the types of images that were captured. The event may be abnormal behavior exhibited by the UAV. If a UAV exhibited abnormal behavior, the information may be analyzed to determine a cause of the abnormal behavior. For example, if the UAV performed an action that did not match a command issued from a user remote controller, the information may be analyzed to determine how or why the UAV performed the action.

In some embodiments, the recorded information may not be alterable. Optionally, a private user may not be able to alter the recorded information. In some instances, only an operator or administrator of the memory storage system and/or the non-compliance countermeasure system may be able to access the recorded information.

Types of Communications

UAVs and geo-fencing devices may interact in a UAV system. Geo-fencing devices may provide one or more geo-fencing boundaries that may affect available airspace for the UAV and/or activities that the UAV may or may not perform while in the airspace.

FIG. 39 shows different types of communications between UAVs and geo-fencing devices, in accordance with an embodiment of the invention. A geo-fencing device may be on-line 3910 or may be off-line 3920. The geo-fencing device may only receive signals from the UAV 3930, may only send signals to the UAV 3940, or may both send and receive signals from the UAV 3950.

A geo-fencing device may be online 3910 when the geo-fencing device is connected to (e.g., in communication with) an authentication center. The geo-fencing device may be online when the geo-fencing device is connected to (e.g., in communication with) any portion of the authentication system. The geo-fencing system may be online when the geo-fencing system is connected to (in communication with) an air control system or module thereof (e.g., geo-fencing module, non-compliance counter measure module). The geo-fencing device may be online when the geo-fencing device is connected to a network. The geo-fencing device may be online when the geo-fencing device is directly connected to another device. The geo-fencing device may be online when the geo-fencing device is capable of communicating with another device or system.

A geo-fencing device may be offline 3920 when the geo-fencing device is not connected to (e.g., in communication with) an authentication center. The geo-fencing device may be offline when the geo-fencing device is not connected to (e.g., in communication with) any portion of the authentication system. The geo-fencing system may be offline when the geo-fencing device is not connected to (in communication with) an air control system or module thereof (e.g., geo-fencing module, non-compliance counter measure module). The geo-fencing device may be offline when the geo-fencing device is not connected to a network. The geo-fencing device may be offline when the geo-fencing device is not directly connected to another device. The geo-fencing device may be offline when the geo-fencing device is not capable of communicating with another device or system.

A geo-fencing device may communicate with a UAV. Communications between a geo-fencing device and a UAV may occur in various ways. For example, the communications may occur via channel, signal system, multi-access mode, signal format, or signaling format. Communications between the geo-fencing device and the UAV may be direct or may be indirect. In some instances, only direct communications may be employed, only indirect communications may be employed or both direct and indirect communications may be employed. Further examples and details pertaining to direct and indirect communications are provided elsewhere herein.

When the geo-fencing device only receives signals from the UAV 3930, indirect communications may be used. When the geo-fencing device is online, the indirect communications may include signals to the UAV. For example, a network may be employed to convey signals to the UAV from the geo-fencing device. When the geo-fencing device is offline, the indirect communications may include recorded presence of the UAV. The geo-fencing device may be able to detect the presence of the UAV or receive indirect communication of the presence of the UAV.

When the geo-fencing device only sends signal to the UAV 3940, direct communications may be used. Direct communications may be used regardless of whether the geo-fencing device is online or offline. Even if a geo-fencing device is not in communication with an authentication system or component thereof, the geo-fencing device may be capable of directly communicating with the UAV. The geo-fencing device may send direct communications to the UAV. The geo-fencing device may provide a direct communication via a wireless signal. The direct communication may be an electromagnetic signal, an opto-acoustic signal or any other type of signal.

When the geo-fencing device both sends and receives signals with the UAV 3950 (e.g., engages in two-way communication), direct or indirect communications may be used. In some instances, direct and indirect communications may be used simultaneously. The geo-fencing device and the UAV may switch between using direct and indirect communications. The direct or indirect communications may be used regardless of whether the geo-fencing device is online or offline. In some embodiments, the direct communications may be used for the portion of the two-way communications from the geo-fencing device to the UAV while the indirect communications may be used for the portion of the two-way communications from the UAV to the geo-fencing device. For the portion of the two-way communications from the UAV to the geo-fencing device, the indirect communications may include a signal to the UAV when the geo-fencing device is online, and may include a recorded presence of the UAV when the geo-fencing device is offline. Alternatively, the direct and indirect communications may be used interchangeably without regard to direction.

Optionally, communication rules may be stored in memory on-board a geo-fencing device. Optionally, one or more rules pertaining to one or more sets of flight regulations may be stored on-board the geo-fencing device. The geo-fencing device may or may not be capable of connecting a network, such as the Internet, any other WAN, a LAN, a telecommunications network, or a data network. If the geo-fencing device can be connected to the network, the geo-fencing device need not be storing the rules in the memory. For instance, the communication rules need not be stored on-board the geo-fencing device. Alternatively, one or more rules pertaining to the one or more sets of flight regulations need not be stored on-board the geo-fencing device. The geo-fencing device may access the rules stored on a separate device or memory through the network.

The geo-fencing device memory may store geo-fence identification and/or authentication information. For example, the geo-fencing device memory may store a geo-fencing device identifier. The memory may store a geo-fencing device key. Related algorithms may be stored. The geo-fencing device identifier and/or key may not be altered. Optionally, the geo-fencing device identifier and/or key may not be externally readable. The geo-fencing device identifier and/or key may be stored in a module that may be inseparable from the geo-fencing device. The module may not be removed from the geo-fencing device without damaging the function of the geo-fencing device. In some instances, the geo-fencing identification and/or authentication information may be stored on-board the geo-fencing device independent of whether the geo-fencing device may access a network.

The geo-fencing device may include a communication unit and one or more processors. The one or more processors may individually or collectively perform any of the steps or functions of the geo-fencing devices. The communication unit may permit direct communications, indirect communications, or both indirect and direct communications. The communication unit and the one or more processors may be provided on the geo-fencing device independent of whether the geo-fencing device may access a network.

In some embodiments, a UAV may be offline or online. A UAV may be offline (e.g., not connected to the authentication system). When offline, the UAV may not be in communication with any component of the authentication system, such as the authentication center, air control system, or module of the air control system (e.g., geo-fencing module, non-compliance counter measure module). The UAV may be offline when the UAV is not connected to a network. The UAV may be offline when the UAV is not directly connected to another device. The UAV may be offline when the UAV is not capable of communicating with another device or system.

When the UAV may be offline, digital signature method may be used in the communications. Certificate issuing and use may be used for the communications. Such methods may provide some measure of security to communications with the UAV. Such security may be provided without requiring that the UAV be in communication with the authentication system.

A UAV may be online when the UAV is connected to (e.g., in communication with) any component of an authentication system, such as an authentication center, air control system, or any module of the authentication center (e.g., geo-fencing module, non-compliance counter measure module). The UAV may be online when the UAV is connected to a network. The UAV may be online when the UAV is directly connected to another device. The UAV may be online when the geo-fencing device is capable of communicating with another device or system.

When the UAV is online, various communication methods or techniques may be employed. For example, a UAV and/or user may receive a geo-fencing signal, and authentication may be performed at an authentication center of an authentication system. The authentication may be for the geo-fencing devices, which may confirm that the geo-fencing device is authentic and authorized. In some instances, a confirmation may be made that the geo-fencing device complies with legal standards. In some instances, the authenticated geo-fencing device may inform the UAV and/or user about one or more sets of flight regulations. An air control system may inform the UAV and/or user about the one or more sets of flight regulations imposed in response to the authenticated geo-fencing device.

Figure 20:
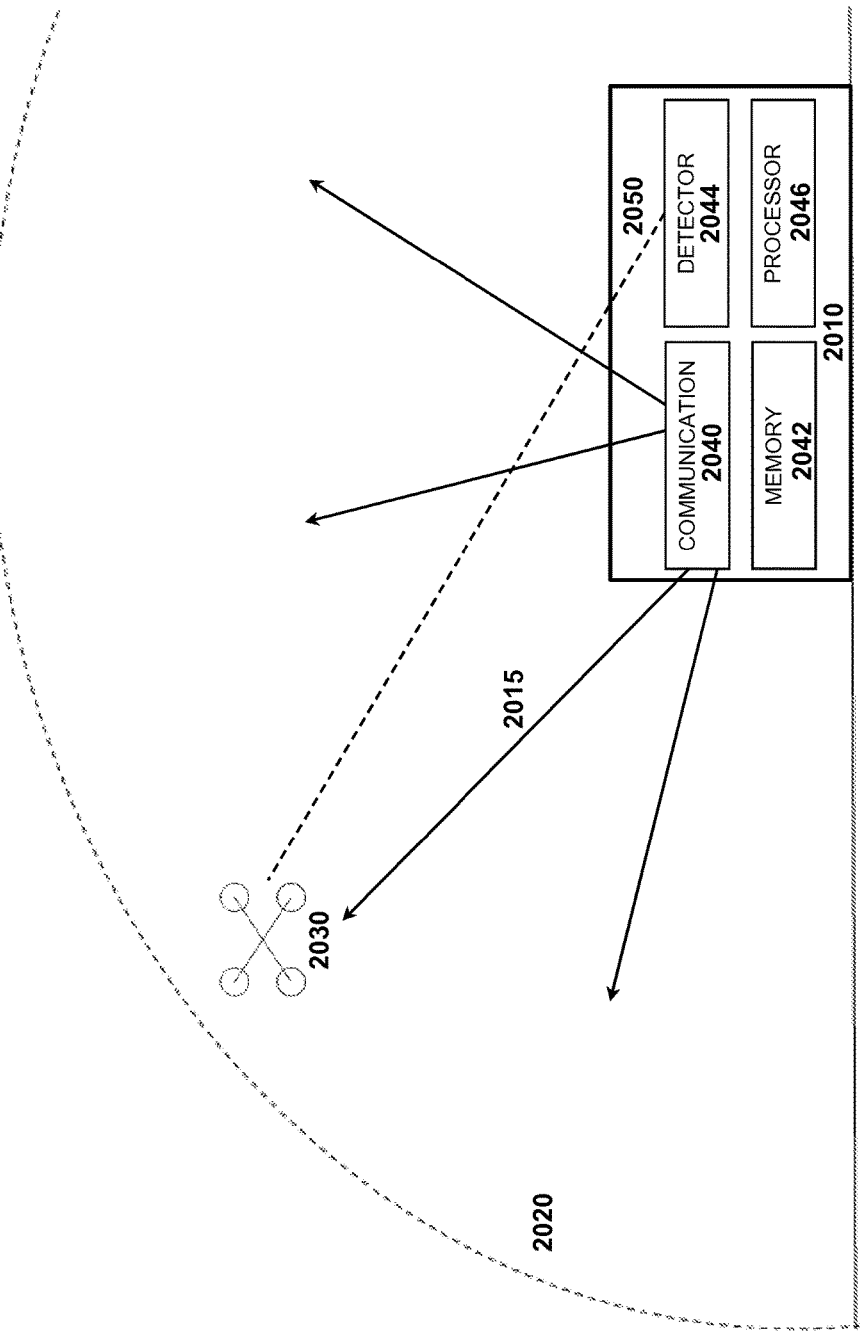
FIG. 20 shows a system where a geo-fencing device directly transmits information to a UAV, in accordance with an embodiment of the invention.

FIG. 20 shows a system where a geo-fencing device directly transmits information to a UAV, in accordance with an embodiment of the invention. A geo-fencing device 2010 may transmit a signal 2015 which may be received by a UAV 2030. The geo-fencing device may have a geo-fencing boundary 2020. The geo-fencing device may include a communication unit 2040, memory unit 2042, detector 2044, and one or more processors 2046. The communication may be used to transmit the signal. The detector may be used to detect the presence of the UAV 2050.

A geo-fencing device 2010 may broadcast a wireless signal 2015. The broadcast may occur continuously. The broadcast may occur independent of any detected conditions. This broadcast mode may advantageously be simple. Alternatively, the broadcasting of the signal may occur when an approaching UAV 2020 is detected. At other times, the broadcasting need not occur. This may advantageously spare wireless resources. The geo-fencing device may be kept hidden until the UAV is detected.

Aspects of the invention may be directed to a geo-fencing device 2010, comprising: a communication module 2040 configured to transmit information within a predetermined geographic range of the geo-fencing device; and one or more storage units 2042 configured to store or receive one or more sets of flight regulations for the predetermined geographic range of the geo-fencing device, wherein the communication module is configured to send a set of flight regulations from the one or more sets of flight regulations to a UAV when the UAV enters the predetermined geographic range of the geo-fencing device. A method of providing a set of flight regulations to a UAV may be provided, said method comprising: storing or receiving, in one or more storage units of a geo-fencing device, one or more sets of flight regulations for a predetermined geographic range of the geo-fencing device; and transmitting, with aid of a communication module configured to transmit information within the predetermined geographic range of the geo-fencing device, a set of flight regulations from the one or more sets of flight regulations to the UAV when the UAV enters the predetermined geographic range of the geo-fencing device.

The geo-fencing device 2010 may detect a presence of a UAV 2020. Optionally, a detector 2044 of the geo-fencing device may air in detecting the presence of the UAV.

In some embodiments, the geo-fencing device may detect the UAV by identifying the UAV via visual information. For example, the geo-fencing device may visually detect and/or identify the presence of the UAV. In some instances, a camera or other form of vision sensor may be provided as a detector of the UAV. The camera may be able to detect the UAV when the UAV comes within a predetermined range of the geo-fencing device. In some instances, a detector of the geo-fencing device may include multiple cameras or vision sensors. The multiple camera or vision sensors may have different fields of view. The camera may capture an image of the UAV. The image may be analyzed to detect the UAV. In some instances, the image may be analyzed to detect the presence or absence of the UAV. The image may be analyzed to determine an estimated distance of the UAV from the geo-fencing device. The image may be analyzed to detect a UAV type. For instance, different models of UAVs may be discerned.

Information from any portion of the electromagnetic spectrum may be employed in identifying the UAV. For instance, in addition to visible spectra, other spectra from the UAV may be analyzed to detect and/or identify the presence of the UAV. In some instances, a detector may be an infrared detector, an ultraviolet detector, a microwave detector, radar, or any other type of device that may detect electromagnetic signals. The detector may be able to detect the UAV when the UAV comes within a predetermined range of the geo-fencing device. In some instances, multiple sensors may be provided. The multiple sensors may have different fields of view. In some instances, an electromagnetic image or signature of the UAV may be detected. The image or signature may be analyzed to detect the presence or absence of the UAV. The image or signature may be analyzed to estimate a distance of the UAV from the geo-fencing device. The image or signature may be analyzed to detect a UAV type. For instance, different models or UAVs may be discerned. In one example, a first UAV model type may have a different heat signature than a second UAV model type.

The geo-fencing device may detect the UAV by identifying the UAV via acoustic information (e.g., sound). For example, the geo-fencing device may acoustically detect and/or identify the presence of the UAV. In some instances, a detector may include a microphone, sonar, an ultrasonic sensor, a vibration sensor, and/or any other type of acoustic sensor. The detector may be capable of detecting the UAV when the UAV comes within a predetermined range of the geo-fencing device. The detector may include multiple sensors. The multiple sensors may have different fields of view. The sensors may capture an acoustic signature of the UAV. The acoustic signature may be analyzed to detect the UAV. The acoustic signature may be analyzed to detect the presence or absence of the UAV. The acoustic signature may be analyzed to determine an estimated distance of the UAV from the geo-fencing device. The acoustic signature may be analyzed to detect a UAV type. For instance, different models of UAVs may be discerned. In one example, a first UAV model type may have a different acoustic signature than a second UA model type.

The geo-fencing device may identify the approaching UAV by monitoring one or more wireless signals from the UAV. The UAV may optionally be broadcasting a wireless signal that may be detectable by the geo-fencing device when the UAV comes into range. A detector of a UAV may be a receiver of the wireless signal from the UAV. The detector may optionally be a communication unit of the UAV. The same communication unit may be used to transmit signals and detect a wireless communication from the UAV. Alternatively different communication units may be used transmit the signals and to detect the wireless communication from the UAV. The wireless data captured by the detector may be analyzed to detect the presence or absence of the UAV. The wireless data may be analyzed to estimate a distance of the UAV from the geo-fencing device. For example, a time difference or a signal strength may be analyzed to estimate the distance of the UAV from the geo-fencing device. The wireless data may be analyzed to detect a UAV type. In some instances, the wireless data may include identifying data about the UAV, such as a UAV identifier and/or UAV type.

In some instances, the geo-fencing device may detect the UAV based on information from the air control system, or any other component of the authentication system. For instance, the air control system may track the location of the UAV and may send a signal the geo-fencing device when the air control system detects that the UAV is close to the geo-fencing device. In other instances, the air control system may send location information about the UAV to the geo-fencing device and the geo-fencing device may make the determination that the UAV is close to the geo-fencing device. In some embodiments, a detector may be a communication unit that may receive the data from the air control system.

A UAV may or may not be sending out any information about the UAV 2020. In some instances, the UAV may send out wireless communications. The wireless communication may be detected by a detector on-board the geo-fencing device. The wireless communication may include information broadcast by the UAV. The information broadcast by the UAV may declare the presence of the UAV. Additional information about UAV identity may or may not be provided. In some embodiments, the information about the UAV identity may include a UAV identifier. The information may include information about UAV type. The information may include position information for the UAV. For example, the UAV may broadcast its current global coordinates. The UAV may broadcast any other attributes, such as parameters of the UAV or UAV type.

In some embodiments, a UAV may establish communications with the geo-fencing device and an exchange of information may occur. The communications may include one-way communications or two-way communications. The communications may include information about UAV identity, geo-fencing device identity, UAV type, geo-fencing device type, UAV location, geo-fencing device location, geo-fencing device type of boundary, flight regulations, or any other type of information.

The geo-fencing device may become aware of the presence of the UAV through the detector on-board the geo-fencing device. The geo-fencing device may become aware of the presence of the UAV through information from other devices. For example, an air control system (e.g., geo-fencing module, non-compliance counter measure module), an authentication center, another geo-fencing device, another UAV may provide information to the geo-fencing device about the presence of the UAV.

The detector of a geo-fencing device may be configured to detect a presence of the UAV within the predetermined range of the geo-fencing device. In some implementations, the detector may possibly detect the presence of the UAV outside the predetermined range. The detector may have a very high likelihood of detecting the presence of the UAV when the UAV is within the predetermined range. The detector may have greater than an 80% likelihood, 90% likelihood, 95% likelihood, 97% likelihood, 99% likelihood, 99.5% likelihood, 99.7% likelihood, 99.9% likelihood, or 99.99% likelihood of detecting the UAV when the UAV is within the predetermined range of the geo-fencing device. The predetermined range of the geo-fencing device may be when the UAV is within a predetermined distance of the geo-fencing device. The predetermined range of the geo-fencing device may have a circular, cylindrical, semi-spherical, or spherical shape relative to the geo-fencing device. Alternatively, the predetermined range may have any shape relative to the geo-fencing device. The geo-fencing device may be provided at the center of the predetermined range. Alternatively, the geo-fencing device may be offset from the center of the predetermined range.

The predetermined range of the geo-fencing device may include any order of distance. For instance, the predetermined range of the geo-fencing device may be within 1 meter, 3 meters, 5 meters, 10 meters, 15 meters, 20 meters, 25 meters, 30 meters, 40 meters, 50 meters, 70 meters, 100 meters, 120 meters, 150 meters, 200 meters, 300 meters, 500 meters, 750 meters, 1000 meters, 1500 meters, 2000 meters, 2500 meters, 3000 meters, 4000 meters, 5000 meters, 7000 meters, or 10000 meters.

A communication unit of the geo-fencing device may be configured to transmit information to the UAV within the predetermined range of the geo-fencing device. The communication unit may be configured to continuously transmit the information, periodically transmit the information, transmit the information in accordance with a schedule, or transmit the information upon a detected event or condition. The transmitted information may be broadcasted so that it may be received by the UAV. If other devices were within the predetermined range they may receive the information as well. Alternatively, only selected devices may receive the information, even when within the range. In some implementations, the communication unit may possibly transmit information to the UAV outside the predetermined range. The communication unit may have a very high likelihood of communications reaching the UAV when the UAV is within the predetermined range. The communication unit may have greater than an 80% likelihood, 90% likelihood, 95% likelihood, 97% likelihood, 99% likelihood, 99.5% likelihood, 99.7% likelihood, 99.9% likelihood, or 99.99% likelihood of successfully transmitting the information to the UAV when the UAV is within the predetermined range of the geo-fencing device.

The communication unit of the geo-fencing device may be configured to transmit the information within the predetermined range of the geo-fencing device upon detection of the presence of the UAV. The detection of the presence of the UAV may be an event or condition that may initiate transmission of the information from the geo-fencing device. The information may be transmitted once, or continuously after detection of the presence of the UAV. In some instances, the information may be transmitted continuously or periodically to the UAV while the UAV remains within the predetermined range of the geo-fencing device.

In some embodiments, the information transmitted to the UAV may include a set of flight regulations. The set of flight regulations may be generated at the geo-fencing device. The set of flight regulations may be generated by being selected from a plurality of sets of flight regulations. The set of flight regulations may be generated from scratch at the geo-fencing device. The set of flight regulations may be generated with aid of a user input. The set of flight regulations may combine features from a plurality of sets of flight regulations.

The set of flight regulations may be generated based on information about the UAV. For instance, the set of flight regulations may be generated based on UAV type. The set of flight regulations may be selected from a plurality of sets of flight regulations based on the UAV type. The set of flight regulations may be generated based on a UAV identifier. The set of flight regulations may be selected from a plurality of sets of flight regulations based on the UAV identifier. The set of flight regulations may be generated based on information about the user. For instance, the set of flight regulations may be generated based on user type. The set of flight regulations may be selected from a plurality of sets of flight regulations based on the user type. The set of flight regulations may be generated based on a user identifier. The plurality of flight regulations may be selected from a plurality of sets of flight regulations based on the user identifier. Any other type of flight regulation generation technique may be utilized.

The geo-fencing device may be configured to receive a UAV identifier and/or user identifier. The UAV identifier may uniquely identify the UAV from other UAVs. The user identifier may uniquely identify the user from other users. The UAV identity and/or the user identity may have been authenticated. The communication module of the geo-fencing device may receive the UAV identifier and/or the user identifier.

A communication module may be capable of changing communication modes when the UAV enters the predetermined range of the geo-fencing device. The communication module may be the communication module of a geo-fencing device. Alternatively, the communication module may be the communication module of a UAV. The communication module may be operating under a first communication mode prior to the UAV entering the predetermined range of the geo-fencing device. The communication module may switch to a second communication mode when the UAV enters the predetermined range of the geo-fencing device. In some embodiments, the first communication mode is an indirect communication mode and the second communication mode is a direct communication mode. For instance, a UAV may communicate with a geo-fencing device via a direct communication mode when the UAV is within a predetermined range of the geo-fencing device. The UAV may communicate with the geo-fencing device via an indirect communication mode when the UAV is outside the predetermined range of the geo-fencing device. In some embodiments, two-way communications may be established between the UAV and the geo-fencing device. Optionally, the two-way communication may be established when the UAV is within the predetermined range of the geo-fencing device. The communication module may transmit information within the predetermined range of the geo-fencing device, when the UAV is within the predetermined range of the geo-fencing device, and optionally not while the UAV is outside the predetermined range of the geo-fencing device. The communication module may receive information within the predetermined range of the geo-fencing device, when the UAV is within the predetermined range of the geo-fencing device, and optionally not while the UAV is outside the predetermined range of the geo-fencing device.

One or more processors 2046 of the geo-fencing device may be configured to, individually, or collectively, generate the set of flight regulations. The set of flight regulations may be generated using information about sets of flight regulations that may be stored on-board the geo-fencing device.

The processors may generate the set of flight regulations may be selecting the set of flight regulations from a plurality of sets of flight regulations stored in one or more memory units 2042. The processors may generate the set of flight regulations by combining flight regulations from a plurality of sets of flight regulations stored in one or more memory units. Alternatively, the processors may generate the set of flight regulations using information about the sets of the flight regulations that may be stored off-board the geo-fencing device. In some instances, information from off-board the geo-fencing device may be pulled and received at the geo-fencing device. The geo-fencing device may permanently or temporarily store the pulled information. The pulled information may be stored in short term memory. In some instances, the pulled information may be temporarily stored by buffering the received information.

The geo-fencing device may or may not be detectable by the UAV. In some instances, the geo-fencing device may include an indicator that is detectable by the UAV. The indicator may be a visual marker, infrared marker, ultraviolet marker, acoustic marker, wireless signal or any other type of marker that may be detectable by the UAV. Further details about detection of the geo-fencing device by the UAV may be provided in greater detail elsewhere herein. The UAV may be capable of receiving the set of flight regulations without detecting the geo-fencing device. The geo-fencing device may detect the UAV and push the set of flight regulations or any other geo-fencing data to the UAV without requiring that the UAV detect the geo-fencing device.

The set of flight regulations may comprises a set of one or more geo-fencing boundaries. The geo-fencing boundaries may be used to contain the UAV or to exclude the UAV. For instance, the set of flight regulations may comprise one or more boundaries within which the UAV is permitted to fly. The UAV may optionally not be permitted to fly outside the boundaries. Alternatively, the set of flight regulations may comprise a set of one or more boundaries within which the UAV is not permitted to fly. The set of flight regulations may or may not impose any altitude restrictions. In some embodiments, the set of flight regulations may comprise an altitude ceiling above which the UAV is not permitted to fly. The set of flight regulations may comprise an altitude floor below which the UAV is not permitted to fly.

The set of flight regulations may comprise conditions under which the UAV is not permitted to operate a payload of the UAV. The payload of the UAV may be an image capture device and the flight regulations may comprise conditions under which the UAV is not permitted to capture images. The conditions may be based on whether the UAV is within or outside the geo-fencing boundaries. The set of flight regulations may comprise conditions under which the UAV is not permitted to communicate under one or more wireless conditions. The wireless conditions may comprises one or more selected frequencies, bandwidths, protocols. The conditions may be based on whether the UAV is within or outside the geo-fencing boundaries.

The set of flight regulations may comprise one or more restrictions on articles which the UAV carries. For example restrictions may be placed on number of articles, dimensions of articles, weight of articles, or types of articles. The conditions may be based on whether the UAV is within or outside the geo-fencing boundaries.

The set of flight regulations may comprise a minimum remaining battery capacity for the UAV to operate. The battery capacity may include state of charge, time of flight remaining, distance of flight remaining, energy efficiency, or any other factors. The conditions may be based on whether the UAV is within or outside the geo-fencing boundaries.

The set of flight regulations may comprise one or more restrictions on landing the UAV. The restrictions may include landing procedures that may be implemented by the UAV, or whether the UAV may land at all. The conditions may be based on whether the UAV is within or outside the geo-fencing boundaries.

Any other types of flight regulations as described in greater detail elsewhere herein may be provided. The one or more sets of flight regulations may be associated with a predetermined range of the geo-fencing device. The one or more sets of flight regulations are associated with one or more geo-fencing boundaries within the predetermined range of the geo-fencing device. In some embodiments, the predetermined range may indicative a range for detection and/or communication with the UAV. The geo-fencing boundaries may be indicative of a boundary that may delineate different operations that may or may not be permitted by the UAV. Different rules may apply inside and outside the geo-fencing boundaries. In some instances, the predetermined range is not used to delineate the operations. The geo-fencing boundaries may end up lining up with the predetermined range. Alternatively, the geo-fencing boundaries may be different from the predetermined range. The geo-fencing boundaries may fall within the predetermined range. In some instances some buffer may be provided between the predetermined range and the geo-fencing boundary. The buffer may ensure that the UAV may receive the set of flight regulations before reaching the boundary.

In one example, the UAV may receive the set of flight regulations when the UAV is within the predetermined range of the geo-fencing device. The UAV may determine from the set of flight regulations that the geo-fencing boundary for the device is coming up, and the UAV is not permitted to enter within the geo-fencing boundary. The UAV may make this determination before the UAV reaches the geo-fencing boundary, as the UAV is crossing the geo-fencing boundary, or soon after the UAV crosses the geo-fencing boundary. The set of flight regulations sent to the UAV may comprise instructions for the UAV to not enter the one or more geo-fencing boundaries. The UAV may take a flight response measure. For instance, the UAV flight path may be automatically controlled avoid the one or more geo-fencing boundaries. The UAV may be automatically forced to land when the UAV enters the one or more geo-fencing boundaries. The UAV flight path may be automatically controlled to cause the UAV to exit a region enclosed by the one or more geo-fencing boundaries when the UAV enters the one or more geo-fencing boundaries.

Figure 21:
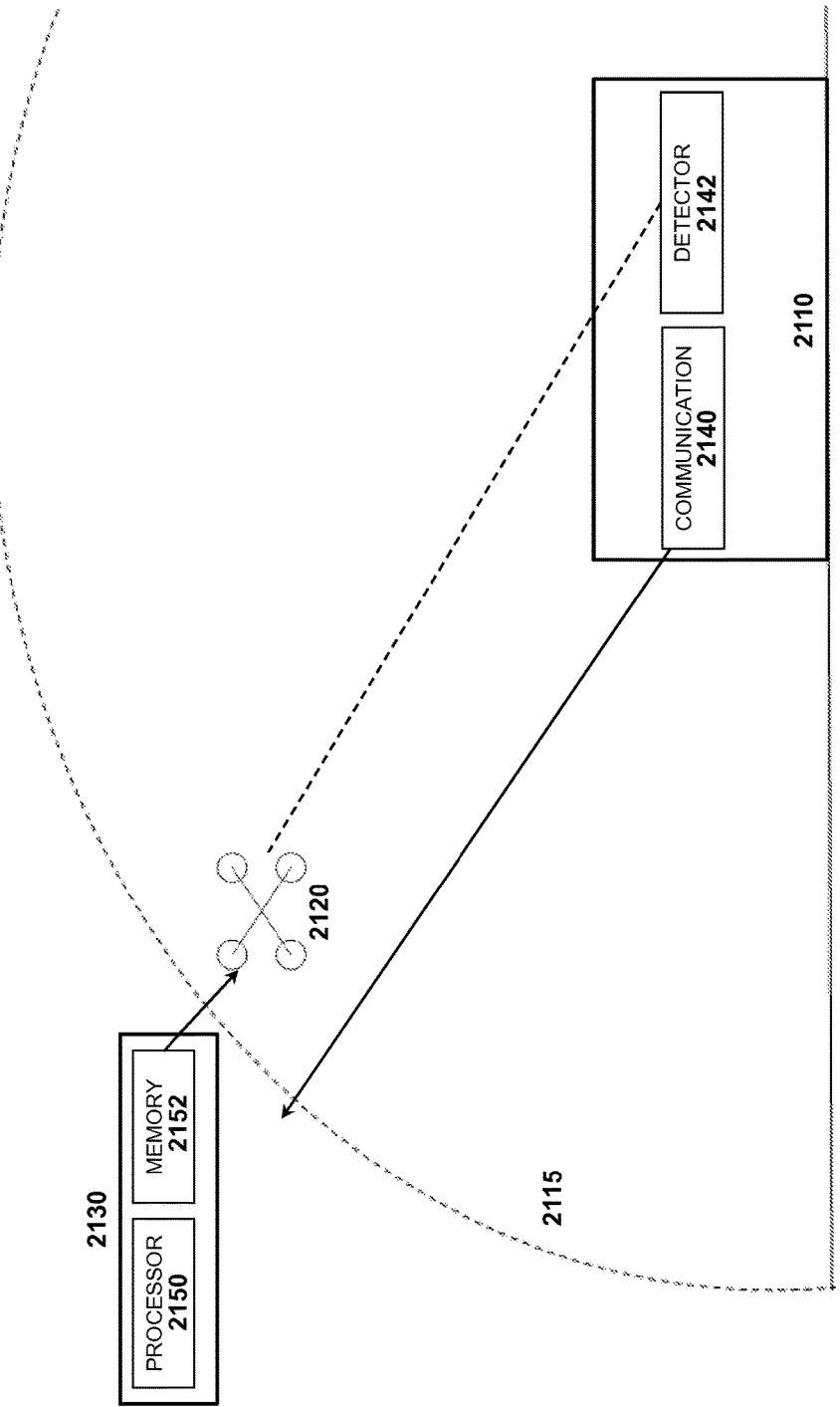
FIG. 21 shows a system where an air control system may communicate with the geo-fencing device and/or UAV.

FIG. 21 shows a system where an air control system may communicate with the geo-fencing device and/or UAV. A geo-fencing device 2110 and a UAV 2120 may be provided within the system. An air control system 2130 may also be provided. The geo-fencing device may provide a spatial reference for one or more geo-fencing boundaries 2115. The geo-fencing device may include a communication unit 2140 and a detector 2142. The air control system may include one or more processors 2150 and a memory unit 2152.

The UAV 2120 may be detected by a detector 2142 of the geo-fencing device. The UAV may be detected using any technique, as described elsewhere herein. The UAV may be detected when the UAV enters the predetermined range. The UAV have a high likelihood of being detected when the UAV enters the predetermined range. In some instances, the UAV may be detected prior to entering the predetermined range.

When the UAV enters the predetermined range, a set of flight regulations may be provided to the UAV.

The set of flight regulations may be generated at the air control system 2130. The set of flight regulations may be generated by selecting a set of flight regulations for the UAV from a plurality of available sets of flight regulations. The plurality of sets of flight regulations may be stored in the memory 2152. The one or more processors 2150 of the air control system may select the set of flight regulations from the plurality of sets of flight regulations. Any other flight regulation generation technique, including those described elsewhere, may be employed by the air control system.

In some instances, the geo-fencing device 2110 may transmit a signal to the air control system 2130 that may trigger the generation of the set of flight regulations at the air control system. The signal may be transmitted with aid of a communication unit 2140 of the geo-fencing device. The geo-fencing device may transmit the signal to the air control system when the geo-fencing device detects that the UAV is within the predetermined range. Detection of the UAV cross into the predetermined range may trigger the instructions from the geo-fencing device to the air control system to generate the set of flight regulations for the UAV.

In some embodiments, the geo-fencing device may be able to detect information about the UAV and/or user. The geo-fencing may be able to detect a UAV identifier and/or user identifier. The geo-fencing device may be able to determine UAV type or user type. The geo-fencing device may convey information about the UAV and/or user to the air control system. For example, the geo-fencing device may convey information about the UAV type or user type to the air control system. The geo-fencing device may convey a UAV identifier and/or user identifier to the air control system. The geo-fencing device may convey additional information to the air control system, such as environmental conditions, or any other data captured or received by the geo-fencing device.

The air control system may optionally use the information from the geo-fencing device to air in the generation of the set of flight regulations. For instance, the air control system may generate the set of flight regulations based on UAV or user information. The air control system may generate the set of flight regulations based on UAV type or user type. The air control system may generate the set of flight regulations based on a UAV identifier or a user identifier. Additional data from the geo-fencing device, such as environmental conditions, may be used by the air control system in the generation of the set of flight regulations. For instance, the set of flight regulations may be generated based on a set of environmental conditions detected or conveyed by the geo-fencing device. The geo-fencing device may have one or more sensors on board that may permit the geo-fencing device to detect one or more environmental conditions. In some instances, the air control system may receive data from additional data sources than the geo-fencing device. In some instances, the air control system may receive data from multiple geo-fencing devices. The air control system may receive information about environmental conditions from multiple data sources, such as multiple geo-fencing devices, geo-fencing devices and external sensors, or third party data sources. Any of the data from the geo-fencing device or other data sources may be used in the generation of the set of flight regulations for the UAV. The set of flight regulations may be generated based on one or more of the following: user information, UAV information, additional data from the geo-fencing device, or additional information from other data sources.

A UAV may or may not directly send communications to the air control system. In some embodiments, a UAV may send UAV and/or user data to the air control system. Alternatively, the UAV does not send UAV and/or user data to the air control system.

When the air control system has generated a set of flight regulations for the UAV, the air control system may convey the set of flight regulations to the UAV. The air control system may communicate directly or indirectly with the UAV in providing the set of flight regulations. The air control system may convey the set of flight regulations to the UAV via the geo-fencing device. For instance, the air control system may generate the set of flight regulations and communicate the set of flight regulations to the geo-fencing device that may then send the set of flight regulations to the UAV.

The UAV may receive the set of flight regulations quickly. The UAV may receive the set of flight regulations prior to, concurrently with, or subsequent to entering the predetermined range of the geo-fencing device. The UAV may receive the set of flight regulations prior to, concurrently with, or subsequent to passing a geo-fencing boundary of the geo-fencing device. In some embodiments the UAV may receive the set of flight regulations within less than about 10 minutes, 5 minutes, 3 minutes, 1 minute, 30 seconds, 15 seconds, 10 seconds, 5 seconds, 3 seconds, 2 seconds, 1 second, 0.5 seconds, or 0.1 seconds of being detected by a detector of the geo-fencing device. The UAV may receive the set of flight regulations within less than about 10 minutes, 5 minutes, 3 minutes, 1 minute, 30 seconds, 15 seconds, 10 seconds, 5 seconds, 3 seconds, 2 seconds, 1 second, 0.5 seconds, or 0.1 seconds of entering a predetermined range of the geo-fencing device.

Figure 22:
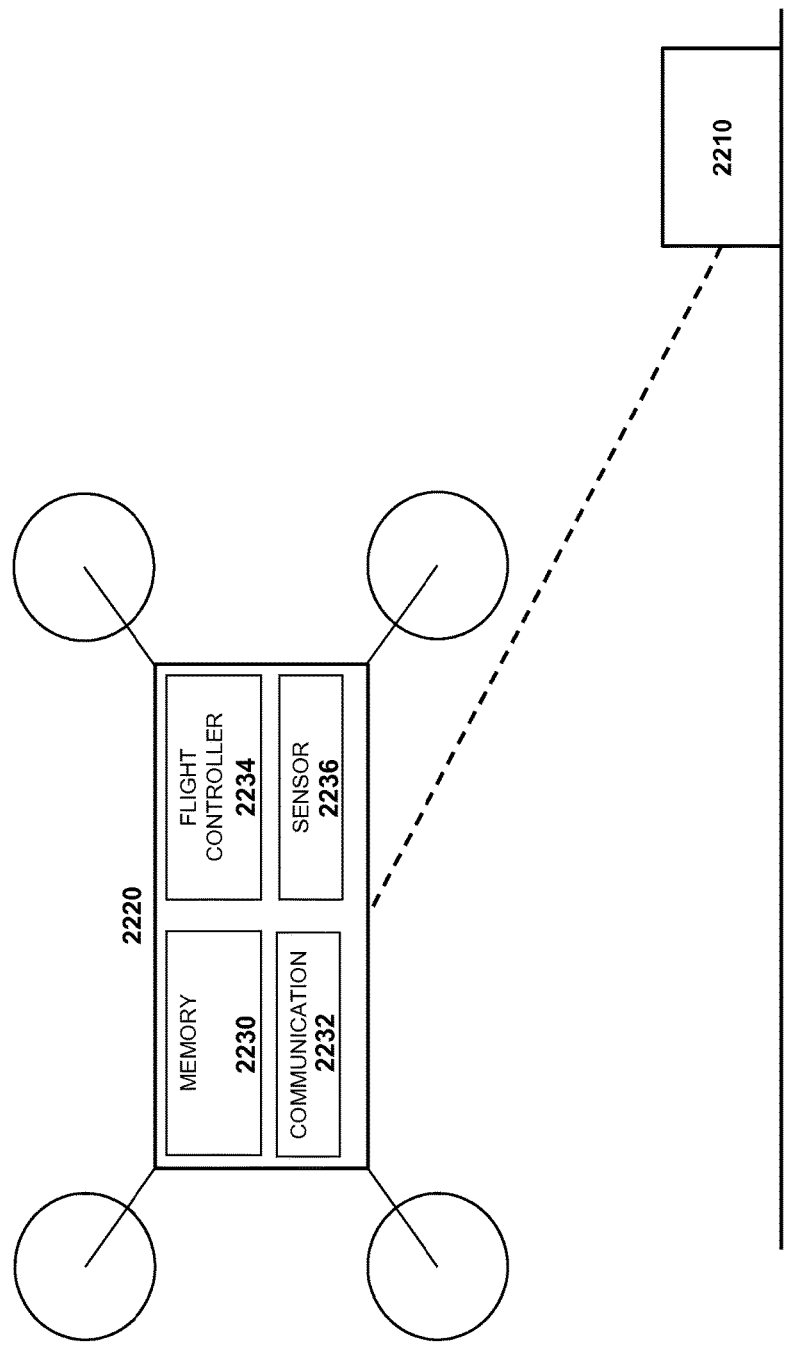
FIG. 22 shows a system where a UAV detects a geo-fencing device, in accordance with an embodiment of the invention.

FIG. 22 shows a system where a UAV detects a geo-fencing device, in accordance with an embodiment of the invention. A geo-fencing device 2210 may be detectable by a UAV 2220. The UAV may have a memory unit 2230, communication unit 2232, flight controller 2234, and/or one or more sensors 2236.

The geo-fencing device 2210 may include an indicator. The indicator of the geo-fencing device may be detectable by the UAV 2220. The indicator may be a marker that may be discernible by one or more sensors 2236 on-board the UAV. The indicator may be detectable by the UAV while the UAV is in flight. The indicator may be detectable by one or more sensors on-board the UAV while the UAV is in flight. The indicator may be detectable by the UAV before or when the UAV comes within a predetermined range of the geo-fencing device. The indicator may be detectable by the UAV before the UAV enters a geo-fencing boundary of the geo-fencing device. The indicator may be detectable by the UAV when the UAV enters a geo-fencing boundary of the geo-fencing device.

The indicator may be a wireless signal. The geo-fencing device may be continuously broadcasting the wireless signal. The geo-fencing device may periodically broadcast the wireless signal (e.g., at regular or irregular time periods). For example, the geo-fencing device may periodically broadcast the wireless signal at less than or equal to about once every 0.01 seconds, once every 0.05 seconds, once every 0.1 seconds, once every 0.5 seconds, once every second, once every 2 seconds, once every 3 seconds, once every 5 seconds, once every 10 seconds, once every 15 seconds, once every 30 seconds, once every minute, once every 3 minutes, once every 5 minutes, once every 10 minutes, or once every 15 minutes. The geo-fencing device may broadcast the wireless signal in accordance with a schedule. The geo-fencing device may broadcast the wireless signal in response to an event or condition. For example, the geo-fencing device may broadcast the wireless signal in response to a detected presence of the UAV. The geo-fencing device may broadcast the wireless signal in response to detecting that the UAV has crossed within a predetermined range of the geo-fencing device. The geo-fencing device may broadcast the wireless signal in response to detecting the UAV before the UAV has crossed into the predetermined range, when the UAV is crossing into the predetermined range, or after the UAV has crossed into the predetermined range. The geo-fencing device may broadcast the wireless signal the UAV before the UAV crosses a geo-fencing boundary of the geo-fencing device.

The indicator may provide any type of wireless signal. For example, the wireless signal may be a radio signal, Bluetooth signal, infrared signal, UV signal, visible or optical signal, WiFi or WiMax signal, or any other type of wireless signal. The wireless signal may be broadcast so that any device in the area may receive and/or detect the wireless signal. In some instances, the wireless signal may be targeted to the UAV alone. The wireless signal may be detectable by a wireless receiver or sensor on-board the UAV. In some embodiments, the wireless receiver or sensor may be a communication unit. The same communication unit may be used to detect the indicator and to provide communications between the UAV and other devices, such as a user terminal. Alternatively, different communication units may be used to detect the indicator and to provide communications between the UAV and other devices, such as a user terminal.

The indicator may be a visible marker. The visible marker may be detectable by one or more vision sensors of the UAV. The visible marker may be visually portrayed on an image captured by a camera. The visible marker may include an image. The visible marker may be static and may include a still image that does not change over time. The still image may include letters, numbers, icons, shapes, symbols, pictures, 1D, 2D, or 3D bar codes, quick response (QR) codes, or any other type of image. The visible marker may be dynamic and may include an image that may change over time. The visible marker may change continuously, periodically, according to a schedule, or in response to a detected event or condition. The visual marker may be displayed on a screen that may remain static or that may change the marker displayed over time. The visual marker may be a sticker that may be provided on a surface of the geo-fencing device. The visual marker may include one or more lights. The spatial disposition of the lights and/or blinking pattern of the lights may be used as part of the visual marker. The visual marker may have a color. Further descriptions of dynamic markers are provided in greater detail elsewhere herein. The visual marker may be visually discernible from a distance. The UAV may be capable of visually discerning the visual marker when the UAV enters a predetermined range of the geo-fencing device. The UAV may be capable of visually discerning the visual marker before the UAV enters the predetermined range of the geo-fencing device. The UAV may be capable of visually discerning the visual marker before the UAV enters a geo-fencing boundary of the geo-fencing device.

The indicator may be an acoustic marker. The acoustic marker may emit a sound, vibration, or other discernible acoustic effect. The acoustic marker may be detected by an acoustic sensor on-board the UAV, such as a microphone, or other type of acoustic detector. The acoustic marker may emit different tones, pitches, frequencies, harmonics, volumes, or patterns of sounds or vibrations. The acoustic markers may or may not be detectable by a naked human ear. The acoustic markers may or may not be detectable by typical mammalian ears.

The indicator may be indicative of a presence of the geo-fencing device. When a UAV detects the indicator, the UAV may be aware that a geo-fencing device may be present. In some instances, the indicator may uniquely identify the geo-fencing device. For instance, each geo-fencing device may have a different indicator that may be detectable by a UAV to distinguish the geo-fencing device from other geo-fencing devices. In some instances, a set of flight regulations may be generated based on the uniquely identified geo-fencing device. A set of flight regulations may be associated with the uniquely identified geo-fencing device.

In some instances, the indicator may be indicative of geo-fencing device type. The indicator need not be unique to a particular geo-fencing device but may be unique to a particular geo-fencing device type. In some instances, geo-fencing devices of different types may have different physical characteristics (e.g., models, shapes, sizes, power output, ranges, battery life, sensors, performance capabilities) or may be used to perform different geo-fencing functions (e.g., keeping UAVs out of an area, affecting flight of a UAV, affecting payload operation of a UAV, affecting communications of a UAV, affecting sensors on-board a UAV, affecting navigation of the UAV, affecting power usage of the UAV). The geo-fencing devices of different types may have different security levels or priorities. For instance, rules imposed by a geo-fencing device of a first level may outweigh rules imposed by a geo-fencing device of a second level. Geo-fencing device types may include different geo-fencing device types created by the same manufacturer or designer, or by different manufacturers or designers. In some instances, a set of flight regulations may be generated based on the identified geo-fencing device type. A set of flight regulations may be associated with the identified geo-fencing device type.

The indicator may be permanently affixed to the geo-fencing device. The indicator may be integral to the geo-fencing device. In some instances, the indicator may not be removed from the geo-fencing device without damaging the geo-fencing device. Alternatively, the indicator may be removable from the geo-fencing device. The indicator may be removed from the geo-fencing device without damaging the geo-fencing device. In some embodiments, the indicator may be body or shell of the geo-fencing device itself. The body or shell of the geo-fencing device may be recognizable by the UAV. For example, the UAV may include a camera that may capture an image of the geo-fencing device and may recognize the geo-fencing device from its body or shell.

A UAV 2220 may be capable of sensing the geo-fencing device. The UAV may sense an indicator of the geo-fencing device. A UAV may comprise: a sensor configured to detect an indicator of a geo-fencing device; and a flight control module configured to generate one or more signals that cause the UAV to operate in accordance with a set of flight regulations that are generated based on the detected indicator of the geo-fencing device. A method of operating a UAV may comprise: detecting, with aid of a sensor on-board the UAV, an indicator of a geo-fencing device; generating, using a flight control module, one or more signals that cause the UAV to operate in accordance with a set of flight regulations that are generated based on the detected indicator of the geo-fencing device.

The UAV may detect the indicator with aid of a sensor 2236. The UAV may carry one or more types of sensors. In some instances, the UAV may be capable of detecting different types of indicators. For instance, a UAV may encounter a geo-fencing device with a visible marker, and another geo-fencing device with a wireless signal as an indicator. The UAV may be capable of detecting both types of indicators. Alternatively, the UAV may be on the lookout for particular types of indicators (e.g., only recognizing visual markers as indicators of geo-fencing devices). The UAV may carry one or more types of sensors, such as those described elsewhere herein and may have a communication unit 2232 which may also function as a sensor for an indicator.

When the UAV detects the geo-fencing device, the UAV may generate or receive a set of flight regulations. The UAV may then operate in accordance with the set of flight regulations. Various types of flight regulations may be provided, such as those described in further detail elsewhere herein. The set of flight regulations may include information about geo-fencing boundaries and locations, and the types of UAV operators that are or are not permitted within the geo-fencing boundaries or outside the geo-fencing boundaries. The set of flight regulations may include timing of which rules or restrictions apply, and/or any flight responses to be taken by the UAV to comply with the regulations.

The set of flight regulations may be generated on-board the UAV. The UAV may include one or more processors that may execute steps to generate the set of flight regulations. The UAV may include a memory 2230 that may store information that may be used to generate the set of flight regulations. In one example, the set of flight regulations may be generated by selecting a set of flight regulations from a plurality of sets of flight regulations. The plurality of sets of flight regulations may be stored in the memory on-board the UAV.

The UAV may detect the presence of the geo-fencing device. The set of flight regulations may be generated based on the detected presence of the geo-fencing device. In some instances, the presence of the geo-fencing device may be sufficient to generate the set of flight regulations. UAV and/or user information may be provided at the UAV. In some instances, the UAV and/or user information may be used to aid in generating the set of flight regulations. For instance, the set of flight regulations may be generated based on the UAV and/or user information (e.g., UAV identifier, UAV type, user identifier, and/or user type).

The UAV may receive other information about the geo-fencing device, such as type of geo-fencing device or a unique identifier for the geo-fencing device. The information about the geo-fencing device may be determined based on the indicator of the geo-fencing device. Alternatively, other channels may deliver information about the geo-fencing device. The geo-fencing device information may be used to aid in generating the set of flight regulations. For instance, the set of flight regulations may be generated based on the geo-fencing information (e.g., geo-fencing device identifier, geo-fencing device type). For instance, different types of geo-fencing devices may have different sizes or shapes of boundaries. Different types of geo-fencing devices may have different operational rules or limitations imposed on the UAV. In some instances, different geo-fencing devices of the same type may have the same shape or size of boundary, and/or the same type of operational rules imposed. Alternatively, even within the same geo-fencing device type, different flight regulations may be imposed.

The UAV may gather or receive other information that may be used to generate the set of flight regulations. For example, the UAV may receive information about environmental conditions. The information about the environmental conditions may be received from the geo-fencing device, an air control system, one or more external sensors, one or more sensors on-board the UAV, or any other source. The set of flight regulations may be generated based on the other information, such as the environmental conditions.

The set of flight regulations may be generated off-board the UAV. For instance, the set of flight regulations may be generated at an air control system off-board the UAV. The air control system may include one or more processors that may execute steps to generate the set of flight regulations. The air control system may include a memory that may store information that may be used to generate the set of flight regulations. In one example, the set of flight regulations may be generated by selecting a set of flight regulations from a plurality of sets of flight regulations. The plurality of sets of flight regulations may be stored in the memory of the air control system.

The UAV may detect the presence of the geo-fencing device. In response to the detection of the geo-fencing device, the UAV may send a request to the air control system for a set of flight regulations. The set of flight regulations may be generated at the air control system based on the detected presence of the geo-fencing device. In some instances, the presence of the geo-fencing device may be sufficient to generate the set of flight regulations. UAV and/or user information may be provided to the air control system from the UAV or from any other component of the system. In some instances, the UAV and/or user information may be used to aid in generating the set of flight regulations. For instance, the set of flight regulations may be generated based on the UAV and/or user information (e.g., UAV identifier, UAV type, user identifier, and/or user type).

The air control system may receive other information about the geo-fencing device, such as type of geo-fencing device or a unique identifier for the geo-fencing device. The air control system may receive the information from a UAV that may have determined the information based on the indicator of the geo-fencing device. Alternatively, other channels may deliver information about the geo-fencing device. For instance, the air control system may receive the information directly from the geo-fencing device. The air control system may be able to compare locations of the UAV and the geo-fencing devices to determine which geo-fencing device(s) the UAV may have detected. The geo-fencing device information may be used to aid in generating the set of flight regulations. For instance, the set of flight regulations may be generated based on the geo-fencing information (e.g., geo-fencing device identifier, geo-fencing device type). For instance, different types of geo-fencing devices may have different sizes or shapes of boundaries. Different types of geo-fencing devices may have different operational rules or limitations imposed on the UAV. In some instances, different geo-fencing devices of the same type may have the same shape or size of boundary, and/or the same type of operational rules imposed. Alternatively, even within the same geo-fencing device type, different flight regulations may be imposed.

The air control system may gather or receive other information that may be used to generate the set of flight regulations. For example, the air control system may receive information about environmental conditions. The information about the environmental conditions may be received from the geo-fencing device, one or more external sensors, one or more sensors on-board the UAV, or any other source. The set of flight regulations may be generated based on the other information, such as the environmental conditions.

In another example, the set of flight regulations may be generated on-board a geo-fencing device. The geo-fencing device may include one or more processors that may execute steps to generate the set of flight regulations. The geo-fencing device may include a memory that may store information that may be used to generate the set of flight regulations. In one example, the set of flight regulations may be generated by selecting a set of flight regulations from a plurality of sets of flight regulations. The plurality of sets of flight regulations may be stored in the memory of the geo-fencing device.

The UAV may detect the presence of the geo-fencing device. In response to the detection of the geo-fencing device, the UAV may send a request to the geo-fencing device for a set of flight regulations. The set of flight regulations may be generated at the geo-fencing device in response to the request from the UAV. UAV and/or user information may be provided to the geo-fencing device from the UAV or from any other component of the system. In some instances, the UAV and/or user information may be used to aid in generating the set of flight regulations. For instance, the set of flight regulations may be generated based on the UAV and/or user information (e.g., UAV identifier, UAV type, user identifier, and/or user type).

The geo-fencing device may use information about the geo-fencing device, such as type of geo-fencing device or a unique identifier for the geo-fencing device. The geo-fencing device may store the information about the geo-fencing device on-board the geo-fencing device. The geo-fencing device information may be used to aid in generating the set of flight regulations. For instance, the set of flight regulations may be generated based on the geo-fencing information (e.g., geo-fencing device identifier, geo-fencing device type). For instance, different types of geo-fencing devices may have different sizes or shapes of boundaries. Different types of geo-fencing devices may have different operational rules or limitations imposed on the UAV. In some instances, different geo-fencing devices of the same type may have the same shape or size of boundary, and/or the same type of operational rules imposed. Alternatively, even within the same geo-fencing device type, different flight regulations may be imposed.

The geo-fencing device may gather or receive other information that may be used to generate the set of flight regulations. For example, the geo-fencing device may receive information about environmental conditions. The information about the environmental conditions may be received from other geo-fencing devices, one or more external sensors, one or more sensors on-board the geo-fencing device, the UAV, or any other source. The set of flight regulations may be generated based on the other information, such as the environmental conditions.

In some embodiments, a geo-fencing device may comprise: a receiver configured to receive data useful for determining a set of flight regulations; one or more processors configured to individually or collectively: determine the set of flight regulations based on the data received by the receiver; and one or more transmitters configured to convey a signal that causes the UAV to fly in accordance with the set of flight regulations. Aspects of the invention may be directed to a method of controlling flight of a UAV, said method comprising: receiving, user a receiver of a geo-fencing device, data useful for determining a set of flight regulations; determining, with aid of one or more processors, the set of flight regulations based on the data received by the receiver; and conveying, with aid of a one or more transmitters of the geo-fencing device, a signal that causes the UAV to fly in accordance with the set of flight regulations. A receiver may be an input element that collects the data. The transmitter may be an output element that outs the signal to the UAV.

In some embodiments, the receiver may be a sensor. The data received by the receiver may be sensed data indicative of one or more environmental conditions of the geo-fencing device. The geo-fencing device may include any type of sensor, such as a vision sensor, GPS sensor, IMU sensor, magnetometer, acoustic sensor, infrared sensor, ultrasonic sensor, or any other type of sensor described elsewhere herein, including other sensors described within the context of being carried by a UAV. The one or more environmental conditions may include any type of environmental condition, such as those described elsewhere herein. The sensor may be able detect data about environmental climate (e.g., temperature, wind, precipitation, sunshine, humidity), environmental complexity, population density, or traffic (e.g., surface traffic or air traffic in proximity of the geo-fencing device). Environmental conditions may be considered when generating the set of flight regulations. For example, flight regulations may be different if it is raining vs. not raining Flight regulations may be different if the sensor senses a lot of movement around the geo-fencing device (e.g., high traffic) vs. no movement.

The data received by the receiver may be sensed data indicative of one or more wireless or communication conditions of the geo-fencing device. For instance, the geo-fencing device may be surrounded by different wireless networks or hotspots. The wireless or communication conditions may be considered when generating the set of flight regulations.

The receiver may be a detector configured to detect a presence of the UAV. The data received by the receiver may be indicative of the presence of the UAV. The detector may be able to recognize the UAV as a UAV, compared to other objects that may be within the environment. The detector may be able to detect a UAV identity and/or UAV type. In some instances, the data received by the receiver may be indicative of the UAV's type and/or an identifier of the UAV. The detector may be able to detect the location of the UAV. The detector may be able to detect a distance of the UAV relative to the detector. The detector may be able to detect a direction of the UAV relative to the detector. The detector may be able to determine an orientation of the UAV. The detector may be able to detect the position of the UAV relative to the detector and/or relative to a global environment.

The receiver may be a communication module configured to receive a wireless signal. The data received by the communication module may be a user input. The user may manually input the data directly into the communication module. Alternatively the user may interact with a remote user terminal that may send a signal the communication module indicative of the user input. The data may comprise information from one or more surrounding geo-fencing devices. Geo-fencing devices may communicate with one another and share information. The data may comprise information from an air control system or any other part of an authentication system.

The set of flight regulations may be determined based on the data received by the receiver. The set of flight regulations may include one or more geo-fencing boundaries for one or more flight restrictions. The geo-fencing boundaries may be determined based on the data received by the receiver. Thus, for the same geo-fencing device, different geo-fencing boundaries may be provided under different circumstances. For example, the geo-fencing device may yield a first set of boundaries when a UAV of a first type detected, and the geo-fencing device may yield a second set of boundaries when a UAV of a second type is detected. Both the UAV of the first type and the UAV of the second type may be simultaneously within the range of the geo-fencing device, and may each have different boundaries imposed thereon. In another example, the geo-fencing device may yield a first set of boundaries when the environmental conditions indicate that the wind speed is high, and may yield a second set of boundaries when the environmental conditions indicate that the wind speed is low. The geo-fencing boundaries may be determined based on any data received by the receiver, including, but not limited to, UAV information, user information, environmental information, shared information.

The set of flight regulations may include one or more types of flight restrictions. Flight restrictions may be applied to regions within or outside geo-fencing boundaries. The flight restrictions may impose limits on one or more aspects of UAV operation (e.g., flight, take-off, landing, payload operation, payload positioning, carrier operation, objects that may be carried by the UAV, communications, sensors, navigation, and/or power usage). In some instances, flight restrictions may be imposed only within the geo-fencing boundary. Alternatively, the restrictions may be imposed only outside the geo-fencing boundary. Some restrictions may be provided both within and outside the boundary. The overall set of restrictions within the boundary may differ from the overall set of restriction outside the boundary. The flight restrictions may be determined based on the data received by the receiver. Thus, for the same geo-fencing device, different restrictions may be provided under different circumstances. For example, the geo-fencing device may yield a first set of flight restrictions when a UAV of a first type is detected, and the geo-fencing device may yield a second set of restrictions when a UAV of a second type is detected. Both the UAV of the first type and the UAV of the second type may be simultaneously within the range of the geo-fencing device and may each have a different set of restrictions imposed thereon. In another example, the geo-fencing device may have yield a first set of flight restrictions when the geo-fencing device detects a large number of wireless hot spots in the area and may yield a second set of flight regulations when the geo-fencing device does not detect many wireless hot spots.

The geo-fencing device may send a signal that causes the UAV to fly in accordance with the set of flight regulations. The signal may include the set of flight regulations itself. The geo-fencing device may locally determine the set of flight regulations and then send the set of flight regulations to the UAV. The set of flight regulations may be sent directly to the UAV, or may be sent to an air control system that may relay the set of flight regulations to the UAV. The signal may be sent directly to the UAV or to another external device.

In some embodiments, the signal may include a trigger that causes an external device to send the set of flight regulations to the UAV. An example of the external device may be another geo-fencing device, the air control system, or any other external device. In some instances, the external device may store a plurality of possible sets of flight regulations, or components that may be used to generate the set of flight regulations. The geo-fencing device may send a signal that may cause the external device to generate the set of flight regulations in accordance with the determination by the geo-fencing device. The external device may then deliver the generated set of flight regulations to the UAV. The signal may be sent directly to the external device.

The signal may include an identifier that causes the UAV to select the determined set of flight regulations from a memory of the UAV. The UAV may generate the set of flight regulations based on the signal from the geo-fencing device. For example, the UAV may store one or more sets of flight regulations or components of flight regulations in a memory of the UAV. The geo-fencing device may send a signal that may cause the UAV to generate the set of flight regulations in accordance with the determination by the geo-fencing device. In one example, the signal may include an identifier which may dictate the generation of the set of flight regulations. The identifier may be an identifier that is unique to a particular set of flight regulations. The UAV may then operate in compliance with the generated set of flight regulations.

Figure 23:
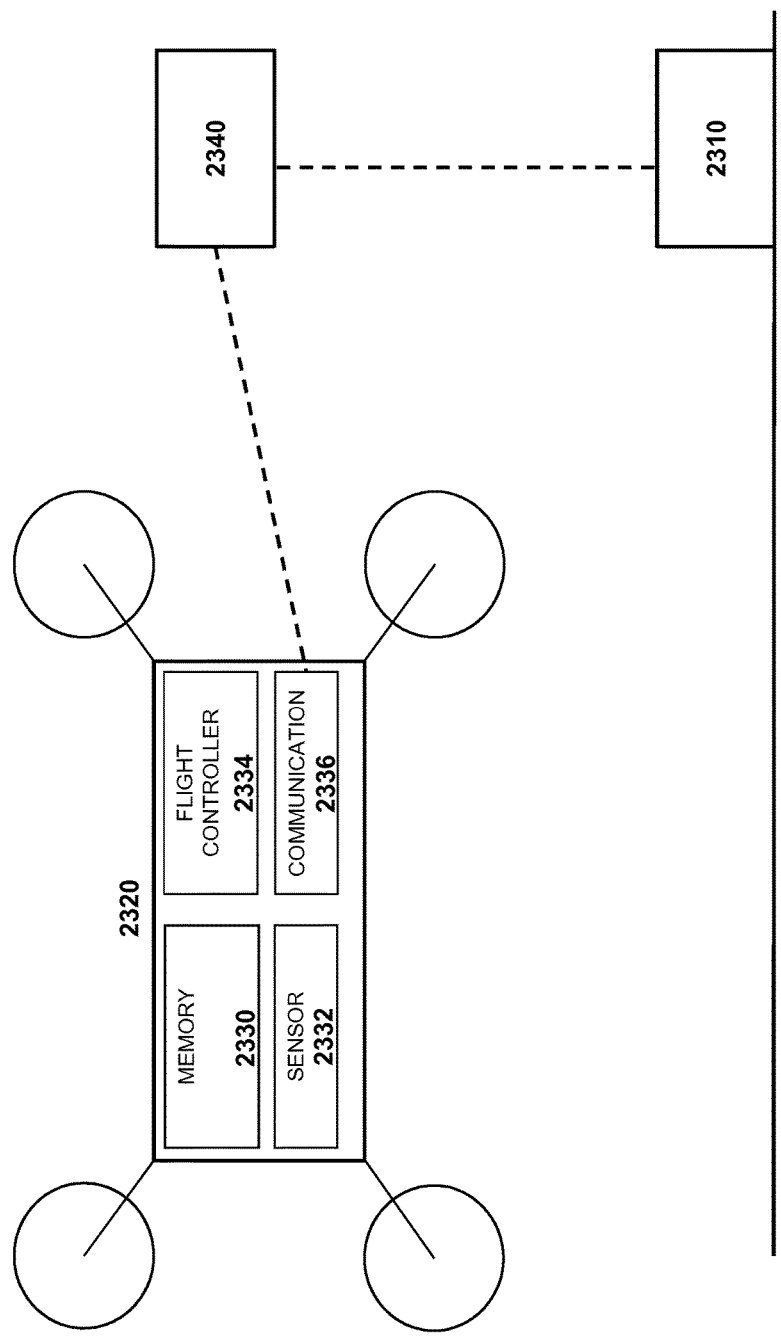
FIG. 23 shows an example of a UAV system where the UAV and a geo-fencing device do not need to directly communicate with one another, in accordance with an embodiment of the invention.

FIG. 23 shows an example of a UAV system where the UAV and a geo-fencing device do not need to directly communicate with one another. In some instances, the UAV may detect a presence of the geo-fencing device, or vice versa.

The UAV system may include a geo-fencing device 2310, UAV 2320, and/or an external device 2340. The UAV may include a memory unit 2330, sensor 2332, flight controller 2334, and/or a communication unit 2336.

The external device 2340 may be an air control system, authentication center, or any other portion of an authentication system. The external device may be another UAV or another geo-fencing device. The external device may be a separate device from the other type of devices mentioned herein. In some instances, the external device may include one or multiple physical devices. The multiple physical devices may be in communication with one another. The external device may be provided with a distributed architecture. In some instances, the external device may have a cloud computing infrastructure. The external device may have a P2P architecture. The external device may communicate with the UAV 2320 and may independently communicate with the geo-fencing device 2310.

In one implementation, the geo-fencing device 2310 may be able to detect the presence of the UAV. The geo-fencing device may include a detector that may detect the presence of a UAV when the UAV is within a predetermined geographic range of the geo-fencing device. The detector may be any type of detector, such as those described elsewhere herein. For example, the detector may use a vision sensor, radar, or any other detection mechanism as described elsewhere herein. The detector may be configured to detect the UAV with aid of one or more external device. For example additional sensors may be separately provided in the environment. The separate sensors may detect the UAV or may aid the detector of the geo-fencing device in detecting the UAV, or collecting information about the UAV. For example, the separate sensors may include vision sensors, acoustic sensors, infrared sensors, or wireless receivers that may be scattered throughout an environment occupied by the geo-fencing device. The detector may detect the UAV before the UAV enters the predetermined range, or may have a very high likelihood of detecting the UAV when the UAV is within the predetermined range, as described elsewhere herein. The detector may detect the UAV before the UAV reaches the geo-fencing device boundary.

The detector may be able to detect any information about the UAV and/or the user. The detector may detect UAV or user type. The detector may be able to determine a UAV identifier and/or user identifier. In some embodiments, the detector may be a communication module. The communication module may receive a communication from the UAV or the external device indicative of the UAV and/or user information. The UAV may broadcast information that may be received by the detector to detect the presence of the UAV. The broadcasted information may include information about the UAV, such as identity of the UAV, UAV type, location of the UAV, or attribute of the UAV.

The geo-fencing device may include a communication module that may be configured to send a signal that triggers a sending of a set of flight regulations to the UAV. The communication module may send the signal when the UAV enters the predetermined geographic range of the geo-fencing device. The communication module may send the signal when the UAV is detected by the geo-fencing device. The communication module may send the signal before the UAV enters a geo-fencing device boundary.

Aspects of the invention may include a geo-fencing device, comprising: a detector configured to detect a presence of a UAV within a predetermined geographic range of the geo-fencing device; and a communication module configured to send a signal that triggers sending of a set of flight regulations to the UAV when the UAV enters the predetermined geographic range of the geo-fencing device. Further aspects may be directed to a method of providing a set of flight regulations to a UAV, said method comprising: detecting, with aid of a detector of a geo-fencing device, a presence of the UAV within a predetermined geographic range of the geo-fencing device; and transmitting, with aid of a communication module of the geo-fencing device, a signal that triggers sending of a set of flight regulations to the UAV when the UAV enters the predetermined geographic range of the geo-fencing device.

The signal from the communication module may be sent to any device off-board the geo-fencing device. For instance, the signal may be sent to an external device 2340. As previously described, the signal may be sent to an air control system, authentication center, other geo-fencing device, or other UAV. In some instances, the signal may be sent to the UAV itself. The external device may receive the signal and may send a set of flight regulations to the UAV 2320. The external device may generate the set of flight regulations when the external device receives the signal. The external device may send the set of flight regulations to the UAV after the set of flight regulations have been generated.

In some alternative embodiments, the communication module may provide the signal to a component on-board the geo-fencing device. For example, the signal may be provided to one or more processors of the geo-fencing device that may retrieve a set of flight regulations from a memory of the geo-fencing device and send the set of flight regulations to the UAV. Two-way communications may be provided between the geo-fencing device and the UAV.

The communication module may be configured to transmit information within the predetermined geographic range of the geo-fencing device. The communication module may be configured to reach devices at least within the predetermined geographic range of the geo-fencing device. The communication module may be able to reach devices beyond the predetermined geographic range of the geo-fencing device. The communication module may issue direct communications which may have a limited range. In some instances, the communication module may communicate indirectly, and may utilize one or more intermediary device or network.

The communication module may be configured to continuously transmit information. The communication module may be configured to periodically transmit information (e.g., at regular or irregular intervals), transmit information in accordance with a schedule, or transmit information upon an event or condition. For example, the communication module may transmit the information upon detection of the presence of the UAV. The communication module may transmit information upon detecting that the UAV is within the predetermined range of the geo-fencing device. The communication module may transmit information upon detecting that the UAV is nearing a geo-fencing boundary. The communication module may transmit the information upon any detected condition, such as those described elsewhere herein.

The geo-fencing device 2310 may comprise a locator configured to provide a position of the geo-fencing device. In some instances, the locator may be a GPS unit. The locator may provide global coordinates of the geo-fencing device. The locator may use one or more sensors to determine the geo-fencing device location. The locator may provide local coordinates of the geo-fencing device. The position of the geo-fencing device may be included in the signal that triggers the sending of the set of flight regulations. In one example, the external device may receive the geo-fencing device location. The external device may be able to track the location of the geo-fencing device and/or any other geo-fencing devices in the area.

In some embodiments, the set of flight regulations may be generated at the external device. The set of flight regulations may be generated based on the UAV and/or user information. For example, the UAV identity, UAV type, user identity, and/or user type may be used to generate the set of flight regulations. Information about the geo-fencing device may be used to generate the set of flight regulations. For instance, the geo-fencing device identity, type, or location may be used. The set of flight regulations may be selected from a plurality of sets of flight regulations based on any type of information described herein.

The set of flight regulations may include any characteristics as described elsewhere herein. The set of flight regulations may include geo-fencing boundaries. The set of flight regulations may include one or more restrictions to operation of the UAV.

The set of flight regulations may be sent to the UAV from the external device. In some instances, set of flight regulations may be sent to the UAV from the geo-fencing device. The set of flight regulations may be sent to the UAV from the geo-fencing device directly, or by way of the external device.

In another implementation, the UAV may receive information about a position of the geo-fencing device. The UAV may comprise a communication unit configured to receive a position of the geo-fencing device; and a flight control module configured to generate one or more signals that cause the UAV to operate in accordance with a set of flight regulations that are generated based on the position of the geo-fencing device. Aspects of the invention may include a method of operating a UAV, said method comprising: receiving, with aid of a communication unit of the UAV, a position of a geo-fencing device; and generating, with aid of a flight control module, one or more signals that cause the UAV to operate in accordance with a set of flight regulations that are generated based on the position of the geo-fencing device.

The UAV may receive information about the positioning of the geo-fencing device while the UAV is in flight. The geo-fencing device may have a locator on-board the geofencing device. For instance, the locator may be a GPS unit configured to provide global coordinates for the geo-fencing device. Any other locator, as described elsewhere herein, may be provided on the geo-fencing device.

The UAV may receive the information about the positioning of the geo-fencing device at a communication unit of the UAV. The communication unit may be configured to receive the position of the geo-fencing device directly from the geo-fencing device. The communication unit may be configured to receive the position of the geo-fencing device from one or more intermediary devices (i.e. external device). The one or more intermediary devices may be an air control system off-board the UAV.

The set of flight regulations may be generated on-board the UAV. The UAV may store information that may be used for the generation of the set of flight regulations in an on-board memory of the UAV. For instance, an on-board memory of the UAV may store a plurality of sets of flight regulations. The UAV may use the received information pertaining to the geo-fencing device to generate the set of flight regulations. The detection of the geo-fencing device may trigger the generation of the set of flight regulations. Information of the geo-fencing device may or may not affect the generation of the set of flight regulations. The UAV may then operate in accordance with the set of generated set of flight regulations.

The set of flight regulations may be generated at an air control system, or other external devices off-board the UAV. The external device may store information that may be used for the generation of the set of flight regulations in an on-board memory of the external device. For instance, an on-board memory of the external device may store a plurality of sets of flight regulations. The external device may use the received information pertaining to the geo-fencing device to generate the set of flight regulations. The detection of the geo-fencing device may trigger the generation of the set of flight regulations. Information of the geo-fencing device may or may not affect the generation of the set of flight regulations. In some instances, the set of flight regulations may be generated based on the position of the geo-fencing device. The external device may send the generated set of flight regulations to the UAV. The set of flight regulations may be sent directly or indirectly. The UAV may have a communication unit that may receive the set of flight regulations from the external device.

An external device, such as an air control system or other portion of an authentication system, may assist in managing interactions between the UAV and the geo-fencing device. Any description herein may apply to any type of external device. The air control system may receive information from multiple UAVs and multiple geo-fencing devices. The air control system may collect the information from the multiple sources and aid in managing flight of the UAVs. The air control system may push dynamic route information for the various UAVs. The air control system may accept, reject, or alter a proposed route of the UAV based on information about other UAVs and/or geo-fencing devices. The air control system may use the positional information of the various geo-fencing devices in order to accept, reject, or alter a proposed route of the UAV. The air control system may provide navigation services. The air control system may aid in helping UAVs navigate an environment. The air control system may help UAVs to navigate an environment that may have one or more geo-fencing devices therein.

Figure 41:
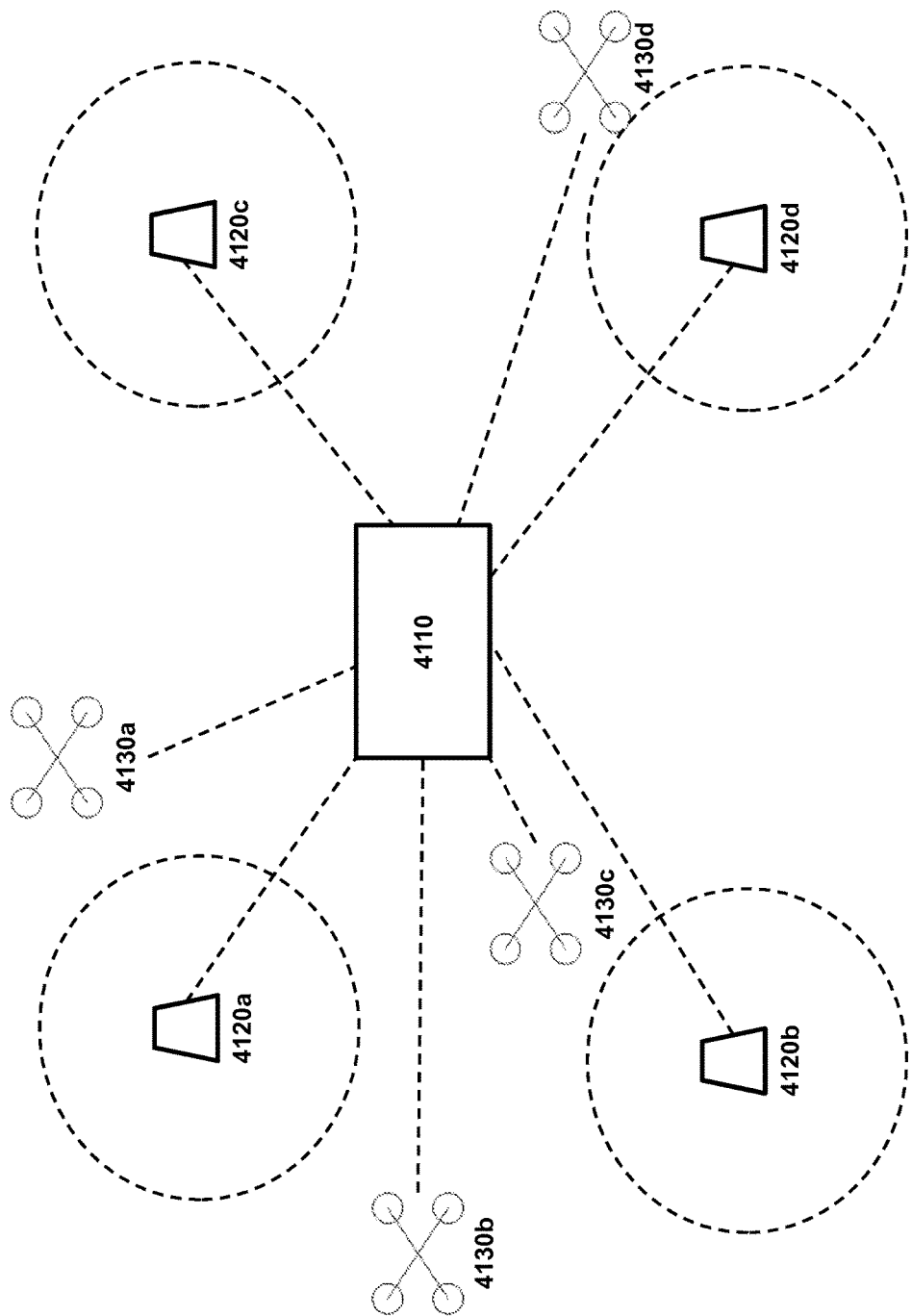
FIG. 41 shows an example of a UAV system where an air control system interacts with multiple UAVs and multiple geo-fencing devices, in accordance with an embodiment of the invention.

FIG. 41 shows an example of a UAV system where an air control system interacts with multiple UAVs and multiple geo-fencing devices, in accordance with an embodiment of the invention. The air control system 4110 may communicate with one or more geo-fencing devices 4120a, 4120b, 4120c, 4120d. The air control system may communicate with one or more UAVs 4130a, 4130b, 4130c, 4130d.

In some embodiments, an air control system may know the locations of the geo-fencing devices. The geo-fencing devices may have locators that may determine the geo-fencing device locations. The information from the locators may be conveyed to the air control system. The locations of the geo-fencing devices may be updated if they change.

The air control system may know the locations of the UAVs. The UAVs may have locators that determine the UAV locations. For example, the UAVs may have GPS units, or may use other sensors to determine a location of the UAVs. The information about the UAV location may be conveyed to the air control system. The locations of the UAVs may be updated if they change.

The air control system may be aware of locations of geo-fencing devices and UAVs. The locations of the geo-fencing devices and the UAVs may be located in real time, or with high frequency. The air control system may advantageously collect information from multiple geo-fencing devices and multiple UAVs. Thus, the air control system may be able to have good overview of devices within an area. The air control system may be aware of locations of the geo-fencing devices and the UAVs without requiring that the geo-fencing device detect the UAV or vice versa. In some instances, detection between the geo-fencing device and UAV may occur. The air control system may be able to detect if the UAV is entering a predetermined range of a geo-fencing device. The air control system may be able to detect if the UAV is nearing a geo-fencing boundary of a geo-fencing device. The air control system may be able to alert the UAV and/or geo-fencing device that the UAV is approaching the geo-fencing device. Alternatively, an alert may not be provided.

When the air control system detects that the UAV is nearing the geo-fencing device, the air control system may generate a set of flight regulations for the UAV and transmit the set of flight regulations to the UAV. The air control system may detect that the UAV is nearing the geo-fencing device by comparing location data of the UAV with the location data of the geo-fencing device. Real-time location of the UAV may be compared with real-time location of the geo-fencing device. Coordinates of the UAV may be compared with coordinates of the geo-fencing device. The locations of the UAV and geo-fencing device may be compared without requiring detection of the UAV by the geo-fencing device or vice versa. The set of flight regulations may be tailored to, or generated based on, the geo-fencing device that the UAV is nearing. The UAV may receive the set of flight regulations and operation in accordance with the set of flight regulations.

In alternative implementations, a UAV may detect the geo-fencing device may provide an indication to air control system that the UAV is approaching the geo-fencing device. The air control system may generate the set of flight regulations for the UAV and transmit the set of flight regulations to the UAV. The geo-fencing device may be provided at a location to be detected but need not have other functionality. In some instances, the geo-fencing device may be provided at the location and may be uniquely identified or identifiable by type which may have some bearing on the type of flight regulations that are generated. The geo-fencing device need not perform any actions on its own. Alternatively, the geo-fencing device may detect that the UAV is approaching and may provide an indication to the air control system that the UAV is approaching the geo-fencing device. The air control system may generate the set of flight regulations for the UAV and transmit the set of flight regulations to the UAV. The geo-fencing device may be provided at a location to be detected by the UAV but need not have other functionality. In some instances, the geo-fencing device may have a uniquely identifier or may be identifiable by type which may have some bearing on the type of flight regulations that are generated. The geo-fencing device need not perform any additional actions on its own. Thus, the geo-fencing device may advantageously be a relative simple or cost-effective device in some implementations.

In further alternative implementations, rather than generating the set of flight regulations on-board the air control system, the air control system provides a signal to the UAV that may cause the UAV to generate the set of flight regulations. The signal from the air control system may determine which set of flight regulations is to be generated. The signal from the air control system may correspond to a single set of flight regulations. When the UAV generates the set of flight regulations, the UAV may then act in accordance with the set of flight regulations. In another example, rather than generating the set of flight regulations on-board the air control system, the air control system may provide a signal to the geo-fencing device that may cause the geo-fencing device to generate the set of flight regulations. The signal from the air control system may determine which set of flight regulations is to be generated. The signal from the air control system may correspond to a single set of flight regulations. The geo-fencing device may transmit the generated set of flight regulations to the UAV. When the UAV receives the set of flight regulations, the UAV may then act in accordance with the set of flight regulations. Similarly, the air control system may provide the signal the any other type of additional device that may cause the additional device to generate the set of flight regulations. The additional device may transmit the generated set of flight regulations to the UAV, which may operate in accordance with the set of flight regulations.

As previously described, various types of interactions between components of a UAV system may permit the generation of flight regulations, and the operation of UAVs to be in compliance with the flight regulations. The flight regulations may pertain to one or more regions defined by boundaries of the geo-fencing devices. In some instances, the various components, such as UAVs, user terminals (e.g., remote controllers), geo-fencing devices, external storage units, and/or an air control system (or other external device) may be in communication with one another or detectable by one another.

In some embodiments, push communications may be provided between any two of the components. The push communications may include communications that are sent from a first component to a second component, where the first component initiates the communication. The communication may be sent from the first component to the second component without any request for the communication from the second component. For example, an air control system may push communications down to a UAV. The air control system may send a set of flight regulations to a UAV without the UAV asking for the set of flight regulations.

Optionally, pull communications may be provided between any two components. The pull communication may include communications that are sent from a first component to a second component, where the second component initiates the communication. The communication may be sent from the first component to the second component in response to a request for the communication from the second component. For example, an air control system may send a set of flight regulations to the UAV, when the UAV requests an update to the set of flight regulations.

The communications between any two components may be automatic. The communications may occur without requiring any instructions or input from a user. The communications may occur automatically in response to a schedule, or detected event or condition. One or more processors may receive data, and may automatically generate an instruction for the communication based on the received data. For example, an air control system may automatically send updates to a local navigational map to a UAV.

One or more communications between any two components may be manual. The communications may occur upon instructions or input from a user. A user may initiate the communication. The user may control one or more aspects of the communication, such as content or delivery. For example, a user may instruct a UAV to request an update to a local navigational map from the air control system.

The communications may occur in continuously in real-time, may occur in accordance with a routine (e.g., on a periodic basis with regular or irregular time intervals, or in accordance with a schedule), or in a non-routine manner (e.g., in response to a detected event or condition). A first component may send communications to a second component in a continuous manner, in accordance with a routine, or in a non-routine manner. For example, a geo-fencing device may continuously send information about its location to an air control system. The air control system may be aware in real-time of the location of the geo-fencing device. Alternatively the geo-fencing device may send information about the geo-fencing device location in a routine manner. For example, the geo-fencing device may update the air control system about its location every minute. In another example, the geo-fencing device may send the air control system about its location in accordance with a schedule. The schedule may be updated. For example, on Mondays, the geo-fencing device may send update about its location every minute, while on Tuesdays, the geo-fencing device may send updates about its location every 5 minutes. In another example, the geo-fencing device may send information about the geo-fencing device location in a non-routine manner. For example, the geo-fencing device may send information about geo-fencing device location to the air control system when the device detects a UAV is approaching the device.

Communications between any two components may be direct or indirect. A communication may be provided directly from a first component to a second component without requiring any intermediary. For example, a remote controller may send a radio signal from a transmitter that is directly received by a receiver of a UAV. A communication may be provided indirectly from a first component to a second component by being relayed through an intermediary. The intermediary may be one or more intermediary devices or networks. For example, a remote controller may send a signal to control operation of the UAV through a telecommunications network, which may include being routed via one or more telecommunications tower. In another example, flight regulation information may be directly sent to a UAV, and then indirectly sent to a user terminal (e.g., via the UAV), or may be sent directly to the user terminal, and then indirectly sent to the UAV (e.g., via the user terminal).

Any type of communications between any of the components may be provided in various manners, such as those described herein. The communications may include location information, identification information, information for authentication, information about environmental conditions, or information pertaining to flight regulations. For example, one or more sets of flight regulations may be provided via communications that may be push or pull communications, automatic or manual communication, communications that occur continuously in real-time, in accordance with a routine, or in an on-routine manner, or communications that may occur directly or indirectly.

Geo-Fence Device-Determined Regulations

A geo-fencing device may have a boundary. The boundary may define a region to which a set of flight regulations may apply. The region may be within the geo-fencing boundaries. The region may be outside the geo-fencing boundaries. The boundaries may be determined in the generation of the set of flight regulations. The boundaries may be determined independently of generating the rest of the set of flight regulations.

In some embodiments, a geo-fencing device may generate a set of flight regulations. The set of flight regulations generated by the geo-fencing device may also include indications of the boundaries of the geo-fencing device. Alternatively, the geo-fencing device may determine the boundaries for the geo-fencing device independent of whether the geo-fencing device generates the set of flight regulations or a different device generates the set of flight regulations.

Alternatively, an air control system may generate a set of flight regulations. The set of flight regulations generated by the air control system may also include indications of the boundaries of the geo-fencing device. Alternatively, the air control system may determine the boundaries for the geo-fencing device independent of whether the air control system generates the set of flight regulations or a different device generates the set of flight regulations. Any description herein of the geo-fencing device determining flight regulations or boundaries of the geo-fencing device may also apply to the air control system determining flight regulations or boundaries of the geo-fencing device.

In further examples, a UAV may generate a set of flight regulations. The set of flight regulations generated by the UAV may also include indications of the boundaries of the geo-fencing device. Alternatively, the UAV may determine the boundaries for the geo-fencing device independent of whether the UAV generates the set of flight regulations or a different device generates the set of flight regulations. Any description herein of the geo-fencing device determining flight regulations or boundaries of the geo-fencing device may also apply to the UAV determining flight regulations or boundaries of the geo-fencing device.

The geo-fencing device may self-determine a set of flight regulations applicable to the geo-fencing device and/or boundaries of the geo-fencing device. The set of flight regulations (and/or boundaries) may be based on information from the air traffic control system, user input, environmental condition information (e.g., environmental climate, environmental complexity, population density, traffic), airway status (e.g., air traffic status), information from surrounding geo-fencing devices, and/or information from one or more UAVs. Any of the flight regulations may be modified or updated in response to any of the factors described or information from any of the sources described. The updates or changes may be make in real-time, may be make periodically (e.g., regular or irregular time intervals), in accordance with a schedule, or in response to a detected event or condition.

Types of Restrictions

As previously described, any type of flight regulation may be imposed on an operation of the UAV. Any type of flight regulation as previously described may be imposed in response to a presence of a geo-fencing device. The geo-fencing device may have one or more geo-fencing boundaries that may be associated with the set of flight regulations.

The set of flight regulations may include restrictions to behavior of the UAV. For example, the entrance of a UAV to a region circumscribed by the geo-fencing boundary may be restricted. Other examples of restrictions may include, but are not limited to restricting the presence, permitting presence, altitude restriction, linear speed restriction, angular speed restriction, linear acceleration restriction, angular acceleration restriction, time restriction, restriction of payload usage, restriction of aerial photography, restrictions on operation of sensors (e.g., turning specific sensors on/off, not collecting data using sensor, not recording data from sensors, not transmitting data from sensors), restriction of emissions (e.g., issuing within a specified electromagnetic spectrum which may include visible light, infrared, or ultraviolet, restriction of sounds or vibrations), restrictions on appearance change of the UAV (e.g., restrictions on transformation of the UAV), restriction for wireless signals (e.g., bands, frequencies, protocols), restrictions on communications used or changes in communication, restrictions on articles carried by the UAV (e.g., article type, article weight, article dimension, article materials), restrictions on actions to be performed on the articles or with the articles (e.g., article drop or delivery, article pick-up), restrictions on operation of a UAV carrier, restrictions on power usage or management (e.g., requiring sufficient remaining battery capacity), restrictions on landing, restrictions on taking off, or restrictions on any other use of the UAV. Any of the examples given elsewhere herein regarding flight regulations may be applied as possible restrictions to the UAV, tied to the presence of a geo-fencing device.

Geo-fencing devices may be of different types. In some instances, geo-fencing devices of different types may impose different types of flight restrictions. Examples of flight restriction types may include any of the above flight restrictions, or any of the flight regulations described elsewhere herein. In some instances, different geo-fencing devices of different types may have different boundaries relative to the geo-fencing device (e.g., different shapes, sizes, change conditions).

As previously described, different restrictions may be imposed based on UAV identity, user identity, and/or geo-fencing device entity. Different restrictions may be imposed for different UAV types, different user type, and/or different geo-fencing device types. Different restrictions may be provided for UAVs of different operational levels, users of different operational levels, and/or geo-fencing devices of different operational levels.

When a UAV is not acting in compliance with a set of flight regulations, a flight response measure may occur. Control of the UAV may be taken over from the user. The control may be taken over by the UAV itself automatically performing the flight response measures in accordance with instructions on-board the UAV, an air control system which may send instructions for the UAV to perform the flight response measures in accordance with instructions on-board the air control system, or another user of a higher operational level than the original user of the UAV. Instructions may be provided from a source remote to the UAV, the source having a higher privilege than the original user. A report may be made to an air control system of the takeover. The UAV may enact the flight response measure. The flight response measure may be provided depending on the flight restriction that the UAV is not complying with.

For example, if the UAV is in a region that it is not permitted to be, the UAV may be forced to leave the region, to return to a starting point or home point, or to land. The UAV may be given some time for the user to cause the UAV to leave the region, before the takeover occurs. If the UAV exits a region that is the only region that the UAV is permitted to fly, the UAV may be forced to return to the region, or to land. The UAV may be given some time for the user to cause the UAV to return to the region, before takeover controls. If the UAV is operating a payload in a region that the UAV is not permitted to operate the payload, the payload may be automatically turned off. If the UAV is collecting information with a sensor, and collection of information is not permitted within a region, the sensor may be turned off, the sensor may not record the data that is being collected, or the sensor may not be able to transmit the data that it is collecting. In another example, if wireless communications are not permitted within a region, the communication unit of the UAV may be turned off to prevent wireless communications. If the UAV is not permitted to land in a region and a user provides an instruction to land, the UAV may not land, but hover. If a UAV must maintain a certain level of battery charge within a region and the level of charge drops beneath the desired level, the UAV may be automatically directed to a battery charging station, may be navigated outside the region, or may be forced to land. Any of the situations, the user may be given some time to comply, alternatively, the flight response measures may come into effect right away. Any other type of flight response measure that may permit the UAV to come into compliance with a flight regulation that it is not meeting may be provided.

In some instances, geo-fencing device may be used to define a flight restriction zone, where one or more set of flight regulations may apply. The geo-fencing boundaries may be the perimeter of the flight restriction zone. In some instances, for a particular UAV on a particular mission, the same set of flight restrictions may apply within the flight restriction zone, or outside the flight restriction zone.

Figure 24:
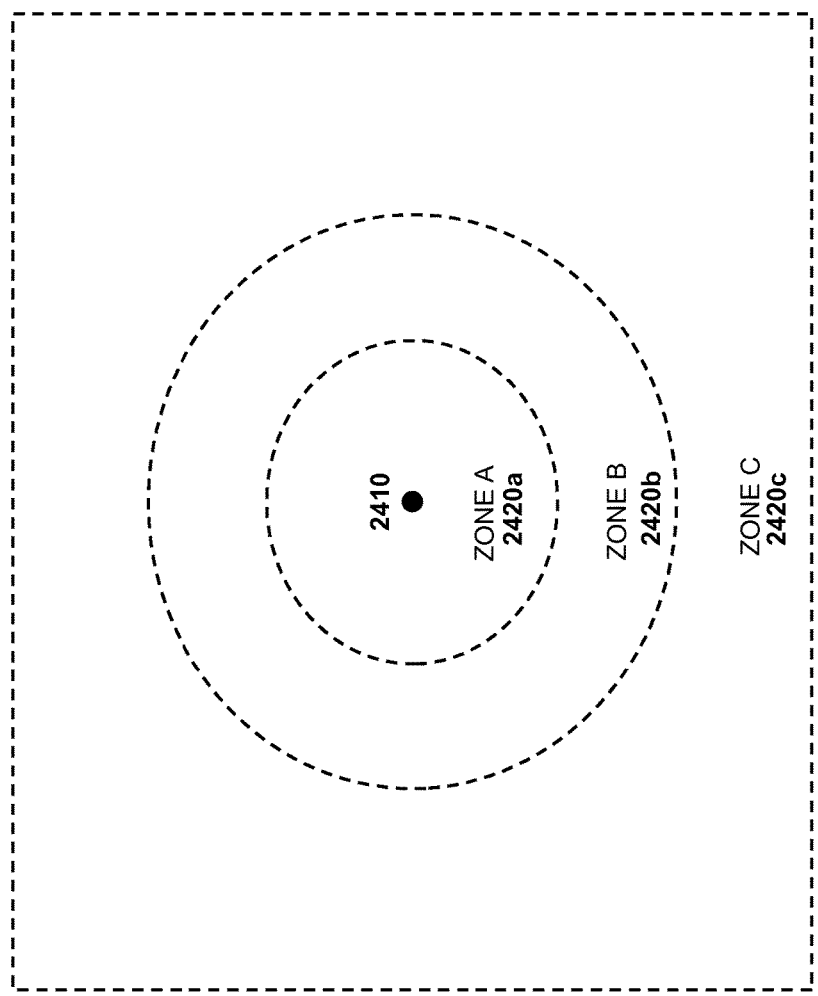
FIG. 24 shows an example of a geo-fencing device that may have multiple flight restriction zones.

Optionally, a geo-fencing device may be used to define multiple flight restriction zones. FIG. 24 shows an example of a geo-fencing device that may have multiple flight restriction zones. The geo-fencing device 2410 may be used to define a first flight restriction zone (e.g., ZONE A 2420*a*), and a second flight restriction zone (e.g., ZONE B 2420*b*). Optionally, a third flight restriction zone (e.g., ZONE C 2420*c*) may be provided. Any number of flight restriction zones may be defined by the geo-fencing device. For example, one or more, two or more, three or more, four or more, five or more, six or more, seven or more, eight or more, nine or more, ten or more, eleven or more, twelve or more, 15 or more, 20 or more, 25 or more, 30 or mores, 50 or more, or 100 or more flight restriction zones may be defined by a geo-fencing device.

The zones may or may not overlap. In one instance, ZONE A, ZONE B, and ZONE C may be separate zones that do not overlap. For example, ZONE A may have a circular shape. ZONE B may be a doughnut shape (e.g., may be within the outer boundary of ZONE B and outside the outer boundary of ZONE A). ZONE C may be a rectangular shape with a hole cut-out (e.g., may be within an outer boundary of ZONE C and outside the outer boundary of ZONE B). The outer boundaries of the zones may be concentric so that the boundaries do not intersect one another. Alternatively, outer boundaries of zones may intersect one another. In some instances, the zones may overlap. In some instances, a zone may be entirely within another zone. For example ZONE A may be a circle. ZONE B may be a circle with no hole. ZONE A may be entirely within ZONE B. In some instances, if a zone is within another zone, the inner zone may have all the restrictions of the outer zone.

The zones may have any size or shape. The zones may be defined by a two-dimensional boundary. The space above or below the two-dimensional boundary may be part of the zone. For example the zones may have a two-dimensional boundary with a circular shape, elliptical shape, triangular shape, square shape, rectangle shape, any quadrilateral shape, strip shape, pentagonal shape, hexagonal shape, octagonal shape, crescent shape, doughnut shape, star shape, or any other regular or irregular shape. The shape may or may not include one or more holes therein. The zones may be defined by a three-dimensional boundary. The space enclosed within the three-dimensional boundary may be part of the zone. For example, the zone may have a spherical shape, cylindrical shape, prismatic shape (with any shaped cross-section), semi-spherical shape, bowl shape, doughnut shape, bell shape, wall shape, conical shape, or any regular or irregular shape. The different zones defined by a geo-fencing device may have the same shape, or may have different shapes. The different zones defined by the geo-fencing device may have different sizes.

In some instances, a geo-fencing device may be within the outer boundaries of all the zones. Alternatively, the geo-fencing device may be outside the outer boundary of one or more of the zones. The zones may all be spaced apart and disjointed. However, all the zones of a geo-fencing device may be located in reference to the geo-fencing device. If the geo-fencing device were to move within an environment, the zones of the geo-fencing device may move along with the device. For example, if the geo-fencing device was moved to the east about 10 meters, the zones of the geo-fencing device may correspondingly move 10 meters to the east. In some embodiments, the zones may be radially symmetrical. Regardless of how the geo-fencing device is rotated, the zones may remain the same. Alternatively, the zones may not be radially symmetric. For instance, if the geo-fencing device is rotated, the zones may rotate accordingly. The zones may rotate about the geo-fencing device. For example, if the geo-fencing device was rotated clockwise 90 degrees, the zones may rotate about a point at the geo-fencing device 90 degrees clockwise. In some instances, rotation of the geo-fencing device may not affect the location of the zones.

In some instances, each flight restriction zone may have its own restrictions. A set of flight regulations may be associated with the different flight restriction zone boundaries and the corresponding restrictions. For example, a set of flight regulations may include boundaries for ZONE A, boundaries for ZONE B, boundaries for ZONE C, restrictions for ZONE A, restrictions for ZONE B, and/or restrictions for ZONE C. Different zones may have different restrictions. In one example, ZONE A may restrict flight so that no UAVs can enter ZONE A. ZONE B may permit flight but may prevent a UAV from operating a camera within ZONE B. ZONE C may permit flight and camera usage but may not permit the UAV to fly beneath an altitude floor. Instructions for these different regulations may be provided in the set of flight regulations. The different zones may have restrictions on different aspects of UAV operation. The different zones may have restrictions on the same aspect of UAV operation, but different levels of restrictions. For example, ZONE A, ZONE B, and ZONE C may restrict flight of the UAV. However, the flight of the UAV may be restricted in different ways in different zones. For example, in ZONE A, the UAV may not be permitted to enter at all. In ZONE B, the UAV may have to fly above an altitude floor, where the altitude floor increases in altitude as distance from ZONE A increases. In ZONE C, the UAV may not fly below an altitude floor that may remain at a substantially level altitude, where the ZONE C altitude floor matches the highest point of the ZONE B altitude floor.

Similarly, each zone may have its own set of boundaries that may be the same or different from boundaries of other zones. Each set of boundaries may correspond to a different set of flight regulations. Each set of boundaries may correspond to a different set of flight restrictions. In some instances, the types of flight restrictions for each set of boundaries may be the same. Alternatively, the types of flight restrictions for each set of boundaries may be different.

In some embodiments, a zone closest to the geo-fencing device may have the most stringent restrictions. In some embodiments, a zone closer to a geo-fencing device may have more stringent restrictions than a zone further from the geo-fencing device. A zone further from the geo-fencing device may have fewer or less stringent restrictions than a zone closer to the geo-fencing device. For example, in ZONE A, the UAV may not be permitted to enter. In ZONE B, the UAV may be permitted to fly above a first altitude floor. In ZONE C, the UAV may be permitted to fly above a second altitude floor that is lower than the first altitude floor. In some embodiments, all restrictions in a zone further from the geo-fencing device may be applied to all zones closer to the geo-fencing device. Thus, zones closer to the geo-fencing device may have added restrictions of the other zones. For instance, ZONE C may have a set of restrictions. ZONE B may have all of ZONE C's restrictions plus additional ZONE B restrictions. ZONE A may have all of ZONE C's restrictions, ZONE B's additional restrictions, and additional restrictions from ZONE A. For example, ZONE C may permit a UAV to fly anywhere within the zone and operate the UAV payload, but not land, ZONE B may also not permit a UAV to land, but may also prevent operation of a payload on the UAV, but still permit the UAV to fly anything, and ZONE A may not permit a UAV to land, may prevent operation of the payload, and may require that the UAV fly above an altitude floor.

In other embodiments, the zones may have restrictions independently of one another. The closer zones to the geo-fencing device need not be more restrictive than the other zones. For example, ZONE A may prevent a UAV from operating a payload but may permit a UAV to fly anywhere, ZONE B may permit a UAV to operate a payload but may prevent the UAV from flying above an altitude ceiling, and ZONE C may prevent wireless communications from the UAV, while the UAV is able to fly anywhere and operate a payload.

UAV Navigation

One or more UAVs may navigate a region. A UAV may travel along a flight path. The flight path may be predetermined, semi-predetermined, or may be created in real-time.

For example, an entirety of the flight path may be predetermined. Each location along the flight path may be predetermined. In some instances, a flight path may include a location of the UAV within a region. In some instances, the flight path may also include orientation of the UAV at the location. In one example, a predetermined flight path may predetermine both location and orientation of the UAV. Alternatively, only the location of the UAV may be predetermined while the orientation of the UAV may not be predetermined and may be variable. Other functions of the UAV may be predetermined as part of the predetermined flight path, or may not be predetermined. For example, payload usage may be predetermined as part of the flight path. For example, the UAV may carry an image capturing device. Locations where the image capturing device is turned on or off, zooms, mode, or other operational features of the image capturing device at the various locations along the path may be predetermined. In some instances, positioning of the image capturing device (e.g., orientation) relative to the UAV may also be predetermined as part of the flight path. For example, the image capturing device may have a first orientation relative to the UAV at a first location, and then may switch to a second orientation relative to the UAV at a second location. In another example, wireless communications may be predetermined as part of the flight path. For instance, it may be predetermined that the UAV will use a certain communication frequency at a first portion of the flight path and then switch to a different communication frequency at a second portion of the flight path. Any other operational functions of the UAV may be predetermined as part of the predetermined flight path. In some embodiments, aspects of the UAV operation that are not predetermined as part of the flight path may be variable. A user may be able to provide an input that may control one or more variable features of the UAV operation while the UAV is traversing the flight path. A user may or may not be able to alter a predetermined portion of the predetermined flight path.

In another example, a flight path may be semi-predetermined. Some portions or checkpoints may be provided for the flight path, which may be predetermined. The portions that are not predetermined may be variable and/or controllable by the user. For example, a series of way points may be predetermined for the flight path. The UAV flight path between the waypoints may be variable. However, the UAV may be guided to each of the waypoints, even if the path between the way points may vary. In some instances, an end destination may be predetermined. The entirety of the path to get to the end destination may be variable and/or controllable by the user.

In another example, the path may be created in real-time. The entirety of the flight may be controlled by the user. The user may manually control the UAV without any agenda or predetermined path or goal. The user may freely fly the UAV within the environment. The flight path of the UAV may be created as the UAV traverses the environment.

Geo-fencing devices within a region may affect a flight path of a UAV. In some instances, the geo-fencing devices within the environment may be considered and may impose one or more set of flight regulations of the UAV operating within the environment. The UAV behavior may or may not be altered by the geo-fencing devices. The UAV behavior may be altered if the action of the UAV does not comply with the set of flight regulations. The UAV behavior may optionally not be altered if the action of the UAV is in compliance with the set of flight regulations. The geo-fencing device may be considered when the UAV is traversing a predetermined flight path, semi-predetermined flight path, or a real-time flight path.

Figure 42:
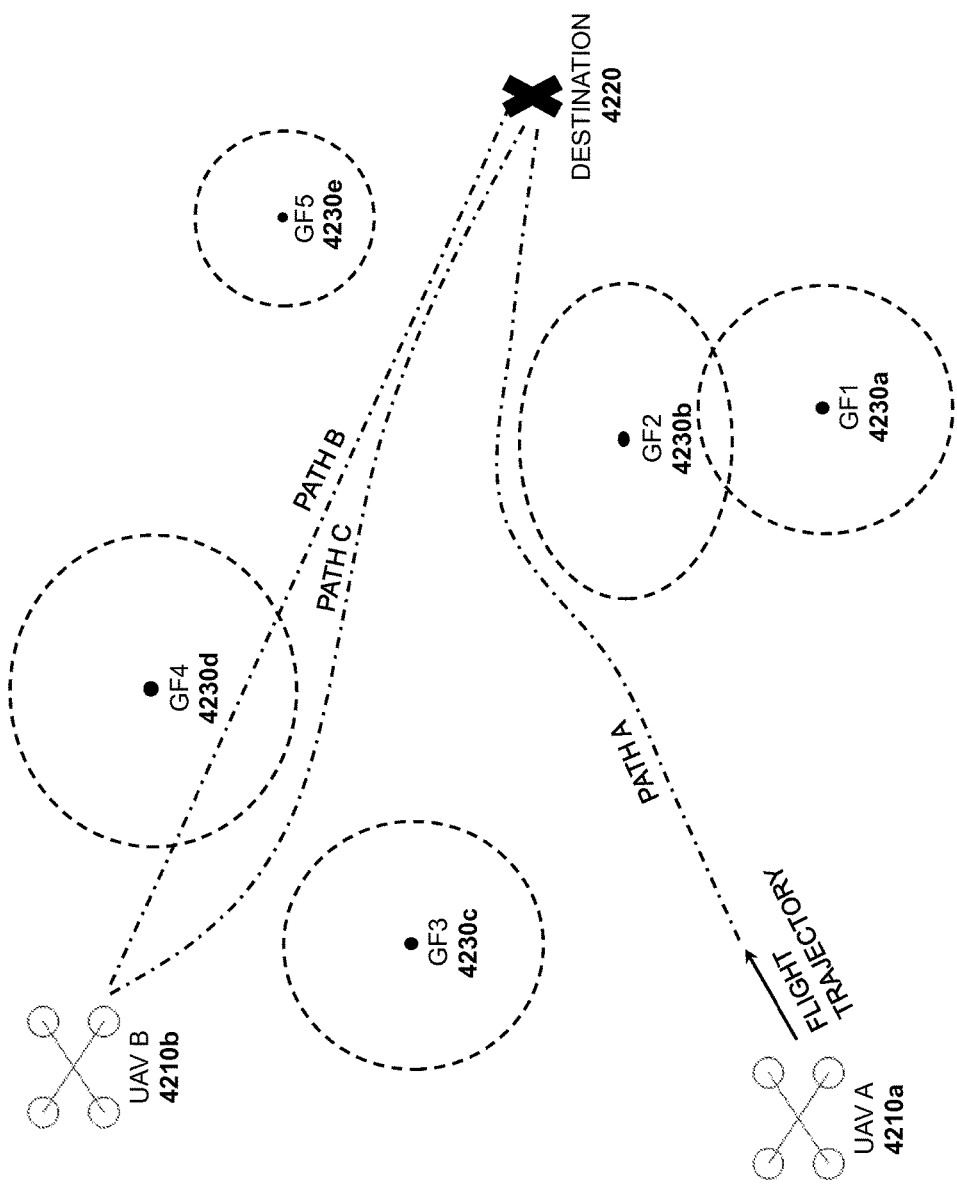
FIG. 42 shows an example of an environment with UAVs that may be traversing a flight path, and one or more geo-fencing devices within the environment FIG. 43 provides an example of a device that may accept a user input to control one or more geo-fencing devices, in accordance with an embodiment of the invention.

FIG. 42 shows an example of an environment with UAVs that may be traversing a flight path, and one or more geo-fencing devices within the environment. One or more UAVs (e.g., UAV A 4210a, UAV B 4210b) may traverse an environment along a flight path. The flight paths (e.g., PATH A, PATH B, PATH C) may be predetermined, may be semi-predetermined, or may be determined in real-time. The UAVs may optionally be flying to a destination 4220. The destination may be a predetermined destination or may be a destination that is determined in real-time. The destination may be a final end destination, or may be a way-point along a path. The destination may be any location that may be a target of the UAV. One or more geo-fencing devices (e.g., GF1 4230*a*, GF2 4230*b*, GF3 4230*c*, GF4 4230*d*, or GF5, 4230*e*) may be provided within the environment. The geo-fencing devices may have geo-fencing device boundaries.

A UAV may operate in accordance with a set of flight regulations that may be associated with one or more of the geo-fencing devices. Any interaction between the UAV and geo-fencing device may be provided as described elsewhere herein. Any interaction between an air control system (or other external device or system) and a UAV and/or geo-fencing device may be provided as described elsewhere herein. The interaction may result in the generation of a set of flight regulations that may be provided to the UAV, or generated on-board the UAV. The set of flight regulations may include one or more restrictions imposed by the geo-fencing devices within the region.

In one example, a UAV 4210*a* may be heading toward a destination 4220. One or more geo-fencing devices 4230*a*, 4230*b* may be provided between the UAV and the destination. The geo-fencing devices may have boundaries that may be fall between the UAV and the destination. In some instances, the geo-fencing device boundaries may impede a UAV path toward its destination. A UAV may optionally have a flight trajectory. In some instances, if the UAV were to continue along the flight trajectory, the UAV may encounter a boundary of a geo-fencing device on the way to the destination. The trajectory may be for a UAV along a predetermined flight path, semi-predetermined flight path, or a real-time flight path.

In one example, an initially planned flight path may intersect a restricted area within the boundary of a geo-fencing device. If that is the case, the path may be altered to another path (e.g., PATH A) that may avoid the geo-fencing device and keep the UAV outside a restricted area. PATH A may be calculated to get the UAV to the destination while avoiding the restricted area. In some instances, PATH A may be selected to get the UAV to the destination with a relatively small amount of deviation from the predetermined path. The smallest amount of possible deviation may be calculated. Alternatively, the amount of deviation may be within 50% or less, 40%, or less, 30%, or less, 20%, or less, 10% or less, 5% or less, or 1% or less of the smallest amount of deviation possible. For example it may be determined that GF1 and GF2 overlap boundaries so that the UAV may not pass between the geo-fencing devices. The UAV may elect to take a path around the GF2 side or the GF1 side. The GF2 path may be shorter, or deviate less from the original path. Thus, PATH A may be selected to go around the GF2 side. In some instances PATH A may be selected taking environmental conditions into account. If the wind is blowing strongly, the UAV may take a wider path to avoid the boundary to provide greater assurance the UAV may not be inadvertently blown into the restricted area. Other metrics, such as energy efficiency may be taken into account. The UAV may be directed to a path with a relatively high level of energy efficiency. The predetermined path may thus be altered while the UAV is in flight to avoid the geo-fencing device.

In other instances, the predetermined path may be calculated or generated to avoid geo-fencing devices up front. For example, a user may enter a proposed path, waypoint, or destination. A user may indicate that the user wishes for the UAV to reach a particular destination (which may be a waypoint). The air control system or any other system described elsewhere herein, may collect data about geo-fencing devices in the area. The air control system may detect the locations and/or boundaries of the geo-fencing devices. The user may optionally propose a flight path to get to the destination. The air control system may accept, reject, or alter the path. In some instances, the air control system may propose a path (e.g., PATH A) that may permit the UAV to reach the destination while avoiding restricted areas. The proposed path may be selected to have a relatively small amount of deviation from the path initially proposed by the user. The user may choose to accept or reject the proposed path. Alternatively, the proposed path from the air control system may automatically be enforced. Thus, the predetermined flight path of the UAV may already take the geo-fencing devices into account and chart a path past the various geo-fencing devices to get the UAV to the destination. In some embodiments, the user need not propose an entire path but may propose one or more destinations. The air control system may consider the geo-fencing device information and may generate a predetermined flight path that allows the UAV to reach the destination without entering restricted areas. In some instances, multiple possible paths that avoid the restricted areas may be considered and a single path from the multiple paths may be selected.

In another example, a semi-predetermined flight path may have the UAV on a trajectory to intersect a restricted area within the boundary of a geo-fencing device. For example, a destination may be entered and the UAV may be traveling toward the destination. If that is the case, the path may be altered to another path (e.g., PATH A) that may avoid the geo-fencing device and keep the UAV outside a restricted area. PATH A may be calculated to get the UAV to the destination while avoiding the restricted area. In some instances, PATH A may be selected to get the UAV to the destination with a relatively small amount of deviation based on the previous trajectory. The new path may be selected taking environmental conditions or other conditions into account. The semi-predetermined path may thus be altered while the UAV is in flight to avoid the geo-fencing device, but still allow the UAV to arrive at the destination.

In some instances, the semi-predetermined path may be calculated or generated to avoid geo-fencing devices up front. For example, a user may enter a proposed destination (e.g., end destination, waypoint). The air control system or any other system described elsewhere herein, may collect data about geo-fencing devices in the area. The air control system may detect the locations and/or boundaries of the geo-fencing devices. The air control system may determine whether the proposed destination is within a restricted area, which may be within a boundary of a geo-fencing device. If the destination is not within a restricted area, then the proposed destination may be accepted. If the destination is within a restricted area that the UAV will not be permitted to enter, then the air control system may reject the destination. In some instances, the air control system may propose another destination that may be outside a restricted area but close to where the original destination was. One or more factors such as distance from original proposed destination, ease of flight path to approach the new destination, or environmental conditions may be considered in generating a new proposed destination.

Additionally, a user may be manually controlling a UAV in real-time. The UAV may have a trajectory that may be indicative of an imminent entry of the UAV into a restricted area within the boundary of a geo-fencing device. If that is the case, the path may be altered to another path (e.g., PATH A) that may avoid the geo-fencing device and keep the UAV outside a restricted area. In some instances, a warning may be issued to the user that the user is approaching the boundary, and the user may optionally be given some time to self-correct. If the user does not self-correct within the allotted time, the control may be taken over from the user. Alternatively, the path may automatically be altered without giving the user time to self-correct. The takeover may cause the UAV to fly along the altered path (e.g., PATH A). PATH A may be calculated to get the UAV to a projected destination while avoiding the restricted area. One or more factors, such as deviation from original trajectory, energy efficiency, or environmental conditions, may be considered when formulating PATH A. Thus, the real-time path may be altered while the UAV is in flight to avoid the geo-fencing device.

In some embodiments, a UAV may be provided with a local navigation map. The UAV may receive the local navigation map from the air control system, or other external device. The UAV may receive the local navigation map from a geo-fencing device. The local navigation map may include locations of one or more geo-fencing devices. The local navigation map may include boundaries of the one or more geo-fencing devices. The local navigation map may include information about the restrictions that may be imposed on the UAV at various regions. For example, if a UAV is not permitted to fly within the boundaries of a geo-fencing device, the local map may indicate a restriction on flight in a region on the map. In another example, a UAV is not permitted to operate a payload within the boundaries of another geo-fencing device, the local map may indicate a restriction on the payload operation in a region on the map. One or more set of flight regulations for the UAV may be reflected in the local navigation map.

The UAV may use the local navigation map to navigate a region. In some instances, the local navigation map may include a predetermined path of the UAV charted therein. The predetermined path may already take geo-fencing devices into account. The UAV may then be able to follow the predetermined path. Adjustments may be made as necessary, if the UAV deviates from the predetermined path. The UAV current location may be compared with where the UAV is supposed to be on the map. If the predetermined path does not take geo-fencing devices into account and is seen to enter a restricted area, the predetermined path may be updated, and the map information updated to reflect this information.

In some embodiments, the local navigation map may include one or more destinations for the UAV as part of a semi-predetermined path. The destinations may include waypoints for the UAV. The destinations may already take the geo-fencing devices into account. For instance, the destinations may be selected at locations that are not within restricted areas. The UAV may be able to travel from destination to destination. Adjustments may be made as necessary, if one or more restricted area is encountered. If the destinations do not take the geo-fencing devices into account, and one or more of the destinations are within a restricted area, the destinations may be updated to areas outside the restricted regions, and map information may be updated to reflect this information.

Alternatively, the UAV may be operating along a real-time path. The local navigation map may track the UAV location relative to the one or more geo-fencing devices. If the UAV is seen to be approaching a flight restricted region, adjustments may be made as necessary to alter the UAV path.

In some instances, the local navigation map may be updated to reflect information about the environment that is close to the UAV as the UAV traverses the environment. For instance, as a UAV approaches a new portion of the environment, the local navigation map for the UAV may be reflect information about the new portion of the environment. In some embodiments, if a UAV leaves a previous portion of the environment the local navigation map may no longer reflect the information about the previous portion of the environment. In some instances, the local navigation map may be updated by an air control system. In other instances, one or more geo-fencing devices may be updating the map. As a UAV approaches a geo-fencing device, the geo-fencing device may provide information to the UAV that may be used to update the local map. As the UAV encounters different geo-fencing devices along its mission, the UAV map may be updated from the various geo-fencing devices with information local to the geo-fencing devices.

The geo-fencing devices may cause restrictions to be imposed on UAV operation. As previously described, one example may be restriction on UAV flight. For example, a UAV may not be permitted to fly within the boundaries of a geo-fencing device (i.e. flight restricted area). Other examples of flight restrictions imposed by geo-fencing devices may include payload operation restrictions, payload positioning restrictions, carrier restrictions, carried object restrictions, sensor restrictions, communication restrictions, navigation restrictions, power usage restrictions, or any other type of restrictions. A UAV may engage in activity that may or may not be in compliance with the restrictions. The UAV flight path may be affected by different types of restrictions. Different ways of handling different types of flight restrictions may be provided.

A UAV (e.g., UAV B 4210*b*) may be heading toward a destination 4220. If the UAV were to head along the most direct path (e.g., PATH B), the UAV may enter a region within the boundaries of a geo-fencing device (e.g., GF4 4230*d*). The restriction within the region may pertain to a factor other than presence of the UAV. For example, the restriction may be an altitude floor. The UAV may be required to fly above a particular altitude. If the UAV is able to attain the altitude, the UAV may be permitted to travel along PATH B to the destination. However, if the UAV is unable to attain the altitude, or if reaching the altitude would cause a greater deviation to the UAV flight path than going around the region (e.g., along PATH C), then the UAV may be instructed to travel around the region (e.g., along PATH C). In another example, the restriction may be operation of a payload (e.g., capturing of images). If the UAV is able to turn off its camera or not capture any images using its camera, the UAV may travel along PATH B, with its camera off while within the region, and then be able to turn its camera on when it exits the region. However, if the UAV is unable to turn off its camera or stop capturing images, or if it is undesirable for the UAV to turn off its camera, the UAV may be routed around the region along PATH C. Thus, depending on the restriction within the region, the UAV may be able to follow an original path or direction, or may be routed around the region. The UAV may be routed around the region if the UAV is unable to comply with the restriction while within the region, or if it is more undesirable for the UAV to comply with the restriction than be routed around the region. One or more factors may be considered in determining whether it is not desirable for the UAV to comply with the restriction while within the region. Factors such as environmental conditions, navigational needs, energy efficiency, safety, or goals of a mission, may be considered in determining whether a UAV should be routed around the region, or comply with a restriction of the region.

This may hold true when the UAV is flying a predetermined path, semi-predetermined path, or real-time path. For instance, when a UAV is flying a predetermined path, and the predetermined path traverses the region, the same determination may be made whether to remain with the predetermined path or change paths. When a UAV is flying a semi-predetermined path toward the destination, and the most direct path or trajectory of the path traverses the region, the same determination may be made whether to remain on the direct path/path along the trajectory, or to change paths. When a UAV is flying in accordance with real-time manual instructions from a user, and the user is guiding the UAV toward a region, the same determination may be made whether to follow the user commands and allow the user to guide the UAV into the region, or whether to take over control and change paths.

Geo-Fencing Identification

Geo-fencing devices may be uniquely identifiable. In some embodiments, geo-fencing devices may have their own unique geo-fencing device identifier. A geo-fence identifier may uniquely identify a geo-fencing device from other geo-fencing devices. A geo-fencing device may be differentiated from other geo-fencing devices by its geo-fence identifier.

Figure 40:
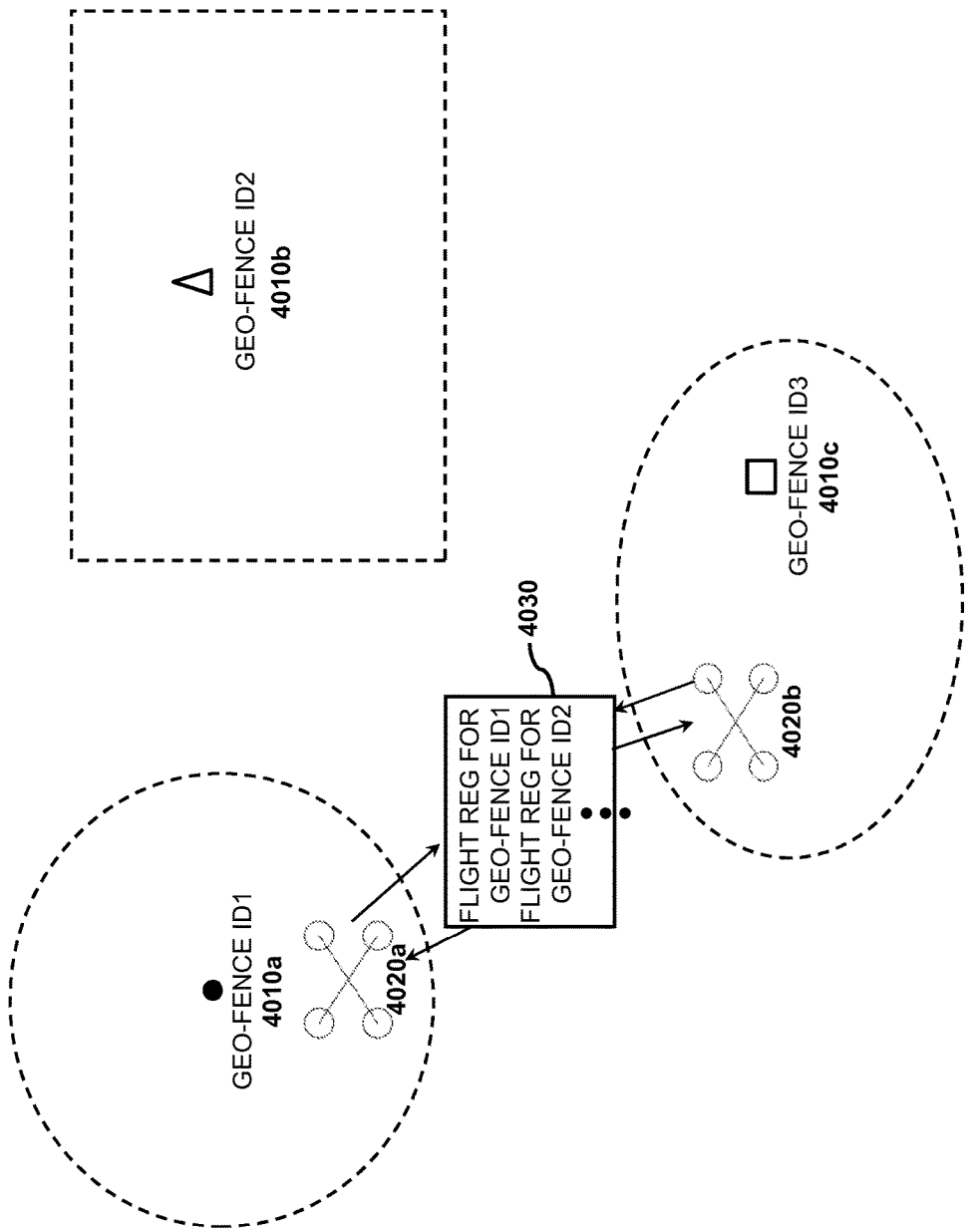
FIG. 40 shows an example of a system with multiple geo-fencing devices, each with a corresponding geo-fence identifier, in accordance with an embodiment of the invention.

FIG. 40 shows an example of a system with multiple geo-fencing devices, each with a corresponding geo-fence identifier. A first geo-fencing device 4010a may have a first geo-fence identifier (e.g., GEO-FENCE ID1), a second geo-fencing device 4010b may have a second geo-fence identifier (e.g., GEO-FENCE ID2), and a third geo-fencing device 4010c may have a third geo-fence identifier (e.g., GEO-FENCE ID3). One or more UAVs 4020a, 4020b may be within an environment, within which the geo-fencing devices may be provided. In some embodiments, an air control system 4030 or other external device may be provided, which may provide sets of flight regulations. Any other architecture, as those described elsewhere may be provided for the generation of flight regulations. For instance, the flight regulations may be generated or stored at the air control system, one or more UAVs, or one or more geo-fencing devices. The air control system is provided by way of example only and is not limiting.

A geo-fencing device may have a geo-fence identifier (e.g., GEO-FENCE ID1, GEO-FENCE ID2, GEO-FENCE ID3, . . . ) that identifies the geo-fencing device. The geo-fence identifier may be unique to the geo-fencing device. Other geo-fencing devices may have different identifiers from the geo-fencing device. A geo-fence identifier may uniquely differentiate and/or distinguish the geo-fencing device from other individuals. Each geo-fencing device may only be assigned a single geo-fence identifier. Alternatively, a geo-fencing device may be able to register multiple geo-fence identifiers. In some instances, a single geo-fence identifier may be assigned to only a single geo-fencing device. Alternatively, a single geo-fence identifier may be shared by multiple geo-fencing devices. In preferable embodiments a one-to-one correspondence may be provided between a geo-fencing device and a corresponding geo-fence identifier.

Optionally, a geo-fencing device may be authenticated as being an authorized geo-fencing device for the geo-fence identifier. An authentication process may include a verification of the geo-fencing device's identity. Examples of authentication processes are described in greater detail elsewhere herein.

In some embodiments, an ID registration database of an authentication system may maintain identity information for a geo-fencing device. The ID registration database may assign a unique identifier to each geo-fencing device. The unique identifier may optionally be a randomly generated alphanumeric string, or any other type of identifier that may uniquely identifier a geo-fencing device from other geo-fencing devices. The unique identifier may be generated by the ID registration database or may be selected from a list of possible identifiers that remain unassigned. The identifiers may be used to authenticate the geo-fencing device. The ID registration database may or may not interact with one or more geo-fencing devices.

A set of flight regulations pertaining to the geo-fencing device may be generated based on information about the geo-fencing device. The information about the geo-fencing device may include identifying information about the geo-fencing device. The identifying information may include the geo-fence identifier, or geo-fencing device type. In some embodiments, a geo-fence identifier may be indicative of geo-fencing device type.

The geo-fencing device type may have any characteristic. For instance, the geo-fencing device type may be indicative of a model of the geo-fencing device, a performance capability of the geo-fencing device, a range of the geo-fencing device (e.g., predetermined range of the geo-fencing device for detection or communication purposes), boundaries of the geo-fencing device, power capabilities of the geo-fencing device (e.g., battery life), manufacturer of the geo-fencing devices, or types of restrictions imposed by the geo-fencing device. The geo-fence identifier may uniquely identify the geo-fencing from other geo-fencing devices. The geo-fence identifier may be received from a geo-fencing device. In some instances, the geo-fencing device may have an identification module. The geo-fence identifier may be stored on the identification module. In some instances, the identification module may not be altered or removed from the geo-fencing device. The geo-fencing identifier may be tamper proof or tamper resistant.

An aspect of the invention may be directed to a method of identifying a geo-fencing device, said method comprising: receiving a geo-fence identifier that uniquely identifies the geo-fencing device from other geo-fencing devices; generating a set of flight regulations for a UAV based on the geo-fence identifier; and operating the UAV in accordance with the set of flight regulations. A geo-fencing device identification system may be provided, comprising: one or more processors operably configured to individually or collectively: receive a geo-fence identifier that uniquely identifies the geo-fencing device from other geo-fencing devices; and generate a set of flight regulations for a UAV based on the geo-fence identifier, to permit operation of the UAV in accordance with the set of flight regulations. The system may further comprise one or more communication modules, wherein the one or more processors are operably coupled to the one or more communication modules.

Figure 25:
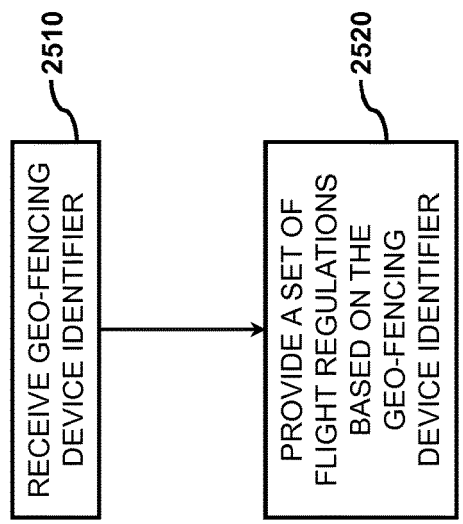
FIG. 25 shows a process for generating a set of flight regulations in accordance with an embodiment of the invention.

FIG. 25 shows a process for generating a set of flight regulations in accordance with an embodiment of the invention. A geo-fencing device identifier may be received 2510. A set of flight regulations may be provided based on the geo-fencing device identifier 2520.

The geo-fencing device identifier may be received by a device or system that may generate the set of flight regulations. For example, the geo-fencing device identifier may be received by the air control system. Alternatively, the geo-fencing device identifier may be received by a UAV, one or more processors of the geo-fencing device, a user terminal, a memory storage system, or any other component or system. The geo-fencing device identifier may be received by one or more processors of any component or system. The same component or system may generate the set of flight regulations. For instance, one or more processors of an air control system, a UAV, the geo-fencing device, a user terminal, a memory storage system, or any other component or system may generate the set of flight regulations based on the geo-fencing device identifier.

The set of flight regulations may be generated based on an identity of the geo-fencing device. The set of flight regulations may be generated based on the geo-fencing device type. Other factors, such as UAV information, user information, environmental conditions, or timing may affect the generation of the set of flight regulations.

Any type of flight regulations, such as those described elsewhere herein, may be provided. The flight regulations may apply to any aspect of the UAV operation. The flight regulations may be tied to a geo-fencing device location and/or boundary. The set of flight regulations may apply to the particular geo-fencing device with which it is associated. Another geo-fencing device may have a second set of flight regulations which may be applicable. In some examples, the set of flight regulations determines that the UAV is configured to remain at least a predetermined distance away from the geo-fencing device, or the set of flight regulations determines that the UAV is configured to remain within at least a predetermined distance of the geo-fencing device. The set of flight regulations may comprises a flight ceiling above which the UAV can not fly or a flight floor beneath which the UAV can not fly while at a predetermined location relative to the geo-fencing device. The set of flight regulations may comprise restrictions on usage of a UAV payload based on a position of the UAV relative to a location of the geo-fencing device, or the set of flight regulations may comprise restrictions on usage of a communication unit of the UAV based on a position of the UAV relative to a location of the geo-fencing device.

A set of flight regulations may be generated for each geo-fencing device. For example, an air control system 4030 may generate and/or provide sets of flight regulations for the various geo-fencing devices. For instance, a set of flight regulations for a first geo-fencing device (e.g., GEO-FENCE ID1 4010*a*) may be provided to a UAV 4020*a* that approaches the first geo-fencing device. The UAV may operate in compliance with the set of flight regulations for the first geo-fencing device. The UAV may communicate with the air control system to receive the generated set of flight regulations. In some instances, the UAV may inform the air control system that the UAV is approaching the first geo-fencing device. Alternatively, the geo-fencing device may inform the air control system that the UAV is approaching the geo-fencing device.

A second UAV 4020*b* may approach another geo-fencing device (e.g., GEO-FENCE ID3 4010*c*). A second set of flight regulations for the other geo-fencing device may be provided to the second UAV. The UAV may operate in compliance with the second set of flight regulations for the other geo-fencing device. The UAV may communicate with the air control system to receive the generated set of flight regulations. In some instances, the UAV may inform the air control system that the UAV is approaching the other geo-fencing device. Alternatively, the other geo-fencing device may inform the air control system that the UAV is approaching the other geo-fencing device.

The UAV may receive the set of flight regulations that are applicable to the UAV. For instance, if the UAV is within the range of the first geo-fencing device but is not within the range of the second or third geo-fencing device, the UAV may only receive the set of flight regulations for the first geo-fencing device. In some instances, only the set of flight regulations for the first geo-fencing device may be generated for the UAV. Similarly, if a second UAV is within the range of the third geo-fencing device but not in the range of the first or second geo-fencing device, the second UAV may only receive the set of flight regulations for the third geo-fencing device. In some instances, only the set of flight regulations for the third geo-fencing device may be generated for the second UAV.

Geo-Fencing Authentication

An identity of a geo-fencing device may be authenticated. The identity of the geo-fencing device may be verified by undergoing an authentication process. The authentication process may confirm that a geo-fencing device using a geo-fence identifier matches the geo-fencing device to whom the geo-fence identifier is registered.

An aspect of the invention is directed to a method of authenticating a geo-fencing device, said method comprising: authenticating an identity of a geo-fencing device, wherein the identity of the geo-fencing device is uniquely distinguishable from other geo-fencing devices; providing a set of flight regulations for a UAV, wherein the flight regulations relate to a location of the authenticated geofencing device; and operating the UAV in accordance with the set of flight regulations. A geo-fencing device authentication system may comprise: one or more processors configured to individually or collectively: authenticate an identity of a geo-fencing device, wherein the identity of the geo-fencing device is uniquely distinguishable from other geo-fencing devices; and generate a set of flight regulations for a UAV, wherein the flight regulations relate to a location of the authenticated geo-fencing device, to permit operation of the UAV in accordance with the set of flight regulations. The system may further comprise one or more communication modules, wherein the one or more processors are operably coupled to the one or more communication modules.

Figure 26:
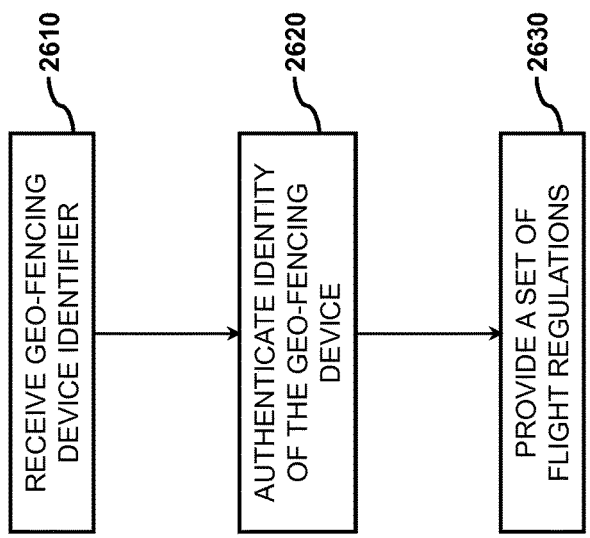
FIG. 26 shows a process for authenticating a geo-fencing device, in accordance with an embodiment of the invention.

FIG. 26 shows a process for authenticating a geo-fencing device, in accordance with an embodiment of the invention. A geo-fencing device identifier may be received 2610. The identity of the geo-fencing device may be authenticated 2620. A set of flight regulations may be provided 2630.

The geo-fencing device identifier may be received by a device or system that may generate the set of flight regulations. For example, the geo-fencing device identifier may be received by the air control system. Alternatively, the geo-fencing device identifier may be received by a UAV, one or more processors of the geo-fencing device, a user terminal, a memory storage system, or any other component or system. The geo-fencing device identifier may be received by one or more processors of any component or system. The same component or system may generate the set of flight regulations. For instance, one or more processors of an air control system, a UAV, the geo-fencing device, a user terminal, a memory storage system, or any other component or system may generate the set of flight regulations based on the geo-fencing device identifier.

The set of flight regulations may be generated after the geo-fencing device identifier is received. The set of flight regulations may be generated after the identity of the geo-fencing device is authenticated. The set of flight regulations may be generated based on an identity of the geo-fencing device. The set of flight regulations may be generated without regard to the geo-fencing device identity. The authentication of the geo-fencing device identity may be required before the set of flight regulations are generated. Alternatively, the set of flight regulations may be generated even if the geo-fencing device is not authenticated. In some embodiments, a first set of flight regulations may be provided for the geo-fencing device if the geo-fencing device is authenticated a second set of flight regulations may be provided for the geo-fencing if the geo-fencing device is not authenticated. The first and second sets of flight regulations may be different. In some embodiments, the second set of flight regulations may be more stringent or restrictive than the first set. The set of flight regulations may be generated based on the geo-fencing device type. Other factors, such as UAV information, user information, environmental conditions, or timing may affect the generation of the set of flight regulations.

Any authentication process may be used to authenticate the geo-fencing device. Any of the techniques described elsewhere herein for authentication of other devices may be applied to authentication of the geo-fencing device. For instance, processes used in authentication of a user or UAV may be applied to a geo-fencing device. In one example, the geo-fencing device may be authenticated with aid of a key on-board the geo-fencing device. The geo-fence key may be immovable from the geo-fencing device. Optionally, the key may not be removed from the geo-fencing device without damaging the geo-fencing device. The key may be stored in an identification module of the geo-fencing device. In some instances, the identification module may not be removed from the geo-fencing device without damaging the geo-fencing device. The identification module may have any characteristic of any other type of identification module (e.g., UAV identification module) as described elsewhere herein.

Geo-Fencing Authentication

Geo-Fence Via an Authentication Center

The authenticated UAV can broadcast its position and IMSI via a wireless link, which may have information that has the nature of a signature. In addition, the UAV and the authentication center may have negotiated and produced a set of reliable CK1 and IK1, which are characterized as SCS1 (Security Communication Set).

A geo-fencing device is authenticated similarly by the authentication center. In particular, similar to the authorization of a UAV, the geo-fencing device and the authentication center may negotiate and produce a reliable CK2 and IK2, characterized as SCS2.

The wireless channel for communication between a geo-fencing device and a UAV may be achieved by way of multiplexing various channels for multiple access arrangements, such as time division, frequency division, or code division. Wireless information sent out by the UAV or geo-fencing device may be sent in the form of signature authentication, such as that described in FIG. 16. Accordingly, when the message (MSG) is to be sent, the information sent is in the format:

$$MSG1\|((HASH(MSG1)\|SCR(\ )(+)SCR(IK))\|IMSI \quad \text{Equation 1:}$$

where MSG1=MSG∥RAND∥TIMESTAMP∥GPS

In the equation 1 above, the SCR( ) can be an ordinary password generator and SCR(IK) can be an IK-derived data mask. Additionally, in this description, MSG is the original message, HASH ( ) is the hash function, RAND is as random number, TIMESTAMP is the current time stamp, and GPS is the current location to avoid replay attack.

Upon receiving the aforesaid information of the UAV, the geo-fencing device can establish a network link with the authentication center and report the IMSI of the UAV. The authentication center may inquire whether the UAV is permitted to appear in this region. If the query indicates that the UAV is forbidden to enter this region, or indicates that restrictive information needs to be transmitted to the UAV, the authentication center may inform the geo-fencing device via network, and the geo-fencing device will send the restrictive information by way of signature authentication.

The information sent by the geo-fencing device may not be counterfeited and may be controlled by the authentication center. After receiving the information sent by the geo-fencing device, the UAV may proceed to provide an encrypted transmission via a CK1-protected link established by a remote controller and/or public communication network with the authentication center. In this way, the UAV may send the geo-fencing information received by the UAV to the authentication center for authentication. After successfully confirming that the geo-fencing information is true and reliable, the UAV may interpret the contents in the geo-fencing device. Meanwhile, it may report to the user via a remote controller. In some examples, a flight course correction may be made by a user or by a UAV itself.

During a flight, a UAV may announce its position or its destination. After the authentication center is informed of such information and finds that said UAV cannot enter the corresponding region, it may send out prohibition information requiring the UAV to return. The process described above may be achieve securely and can endure various attacks. If a UAV keeps entering the restricted area, for example, the authentication center can record the intrusion of said UAV and report the intrusion to relevant administration departments.

No Passing Through an Authentication Center

An authenticated UAV may wirelessly broadcast relevant information (such as its ID, its position, and its course), and other such information that has characteristics of a digital signature. After a geo-fencing device receives the above information from the UAV, it may connect to an air control system via a network and report the IMSI of said UAV. The air control system may then determine whether or not the UAV is present in this area. If it is determined that said UAV cannot enter said area or certain restriction information needs to be notified to the UAV, the air control system may inform the geo-fencing device through a network, and a the geo-fencing device may send out restriction information by way of signature authentication. The information sent by the geo-fencing device may not be counterfeited and may be controlled by the authentication center. A safe information channel from the authentication center to the UAV is described below.

Certain open key algorithms may be employed in embodiments of the present invention. In accordance with an open key algorithm, a password pair may be selected. A password pair consists of a public key and a private key. As such, two password pairs are provided. The geo-fencing device and the authentication center each control their own private key, respectively. The geo-fencing device private key controlled by the geo-fencing device is denoted as KP, and the corresponding public key is denoted as KO. The authentication center private key controlled by the authentication center is denoted as CAP, and the corresponding open key of the authentication center is denoted as CAO.

In an example, when registering a geo-fencing device, a password pair KP (for the private key of the geo-fencing device) and KO (for the open key of the geo-fencing device) may be assigned by, and reported to, the authentication center. The private key (KP) of the geo-fencing device can neither be read nor be copied. Additionally, the authentication center may encrypt the open key (KO) of the geo-fencing device using the private key (CAP) of the authentication center to generate a certificate C. The air control system obtains the certificate C from the authentication center and sends it to the geo-fencing device. Additionally, a MSG that is to be sent to the UAV may first be subjected to the hash function HASH to generate the digest D. The MSG may then encrypted to form the signature S using the private key (KP) of the geo-fencing device. Further, the geo-fencing device may send the C, S, and MSG to the UAV through a wireless channel.

After the UAV receives the C, S, and MSG, it may use a known open key (CAO) of the authentication device to decrypt C to obtain the open key (KO) of the geo-fencing device, and may also use KO to decrypt signature S to obtain decrypted digest D1. Additionally, the UAV may perform the hash function HASH on the MSG to obtain the digest D. The UAV may compare decrypted digest D1 and digest D. If both are identical, the UAV may authenticate the MSG sent by the geo-fencing device. As such, with the aforesaid signature process, the UAV and the authentication can safely communicate with each other.

During flight, the UAV may announce its position or target. Upon receiving the position of the UAV, the authentication center can send restrictive information and request the UAV to reverse course if it determines that the UAV is forbidden to enter the corresponding airspace. The aforesaid process can be conducted with safety and can withstand various attacks. If the UAV continues to enter, the authentication center can record the non-compliant entry of the UAV and report to the administrative agency.

As an alternative, the geo-fencing device can also continue to broadcast the restrictive information uni-directionally. The authentication of this information is the same as the aforesaid process. The restrictive information can indicate the flight permission of UAVs of various types in this area. Additionally, the wireless channel for communication between the geo-fencing device and the UAV can be arranged in a multi-access by way of channel multiplexing, such as time division, frequency division, or code division.

Air Control System May Actively Push Information

According to the position and planned course of UAVs prepared to fly and UAVs flying, the air control system may determine in real-time that the geo-fencing might be affected. In this example, the air control system may prepare a list of geo-fencings to avoid for each UAV. The geo-fences that each UAV is to avoid might be influenced according to the level of the UAV, the user of the UAV, and the flight commission. In addition, the air control system may send said list to the UAV through an encrypted channel between the air control system and the UAV, which is then forwarded to the user.

Before a flight and during a flight, a UAV having an electronic map can accept information pushed by the air control system. The UAV can also receive information concerning e.g. position, range of activity, time period of activity of the UAV and geo-fencing near the course thereof. The UAV can also send explicit receipt confirmation back to the air control system. The UAV may also actively obtain and update valid geo-fencing information near its course and provide such information to the air control system. When providing such information actively, the UAV may not have to send receipt confirmation back to the air control system.

When the air control system pushes information and when the UAV actively obtains information, systems may be used to ensure that the subject sending out the information is not forged and the information has not been manipulated. Using the secure communication connection established during the authentication process to push and obtain information, communication security can be ensured. For details regarding establishing said secure communication connection and security control, please refer to previous sections.

Data-Store with Related Identifiers

Figure 27:
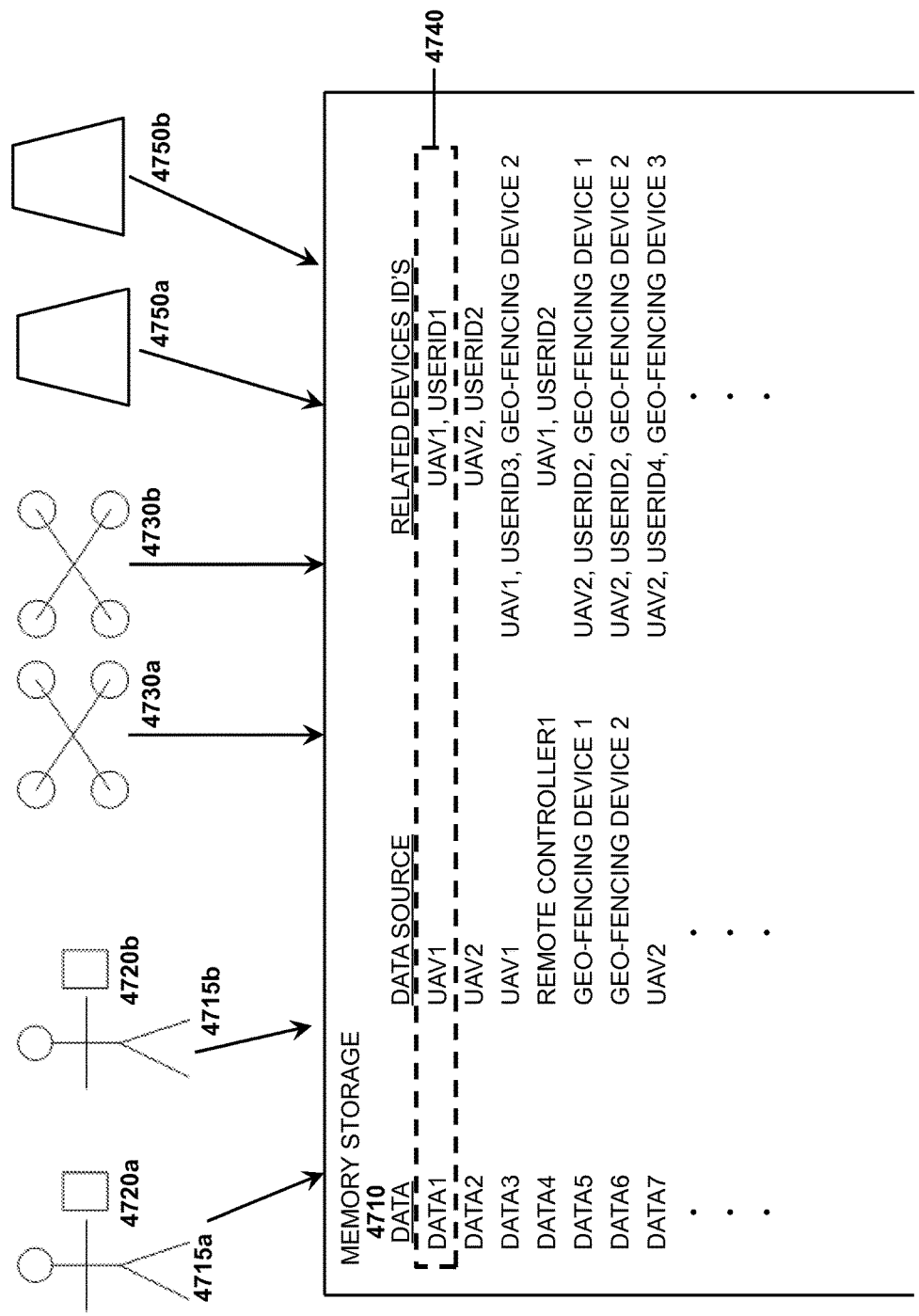
FIG. 27 shows another example of device information that may be stored in memory, in accordance with an embodiment of the invention.

FIG. 27 shows another example of device information that may be stored in memory, in accordance with an embodiment of the invention.

A memory storage system 2710 may be provided. Information from one or more users 2715a, 2715b, one or more user terminals 2720a, 2720b, one or more UAVs 2730a, 2730b and/or one or more geo-fencing devices 2750a, 2750b may be provided. The information may include any type of data (e.g., one or more commands, environmental data), a data source (e.g., identifier of a device from which the data originated), and related device identifiers (e.g., associated user identifier, associated UAV identifier, associated geo-fencing device identifier), and/or any other associated timing information or other associated information. One or more sets of information 2740 may be stored.

The memory storage system 2710 may include one or more memory storage units. The memory storage system may include one or more databases that may store the information described herein. The memory storage system may include computer readable media. The memory storage system may have any characteristic of any other memory storage described herein (e.g., memory storage system of FIG. 11). The memory storage system may be provided at a single location or may be distributed over multiple locations. In some embodiments, the memory storage system may include a single memory storage unit, or multiple memory storage units. A cloud computer infrastructure may be provided. In some instances, a peer-to-peer (P2P) memory storage system may be provided.

The memory storage system may be provided off-board a UAV. The memory storage system may be provided on a device external to UAVs. The memory storage system may be provided off-board a remote controller. The memory storage system may be provided on a device external to remote controllers. The memory storage system may be off-board UAVs and remote controllers. The memory storage system may be part of authentication system. The memory storage system may be part of an air control system. The memory storage system may include one or more memory units that may be one or more memory units of an authentication system, such as an air control system. Alternatively, the memory storage system may be separate from an authentication system. The memory storage system may be owned and/or operated by the same entity as the authentication system. Alternatively, the memory storage system may be owned and/or operated by a different entity as the authentication system.

A communication system may include one or more recorders. The one or more recorders may receive data from any devices of the communication system. For example, the one or more recorders may receive data from one or more UAVs. The one or more recorders may receive data from one or more users and/or remote controllers. The one or more memory storage units may be provided over the one or more recorders. For instance, the one or more memory storage units may be provided over one or more recorders that receive one or more messages from the UAVs, users, and/or remote controllers. The one or more recorders may or may not have a limited range of receiving information. For example, a recorder may be configured to receive data from a device that is within the same physical area as the recorder. For example, a first recorder may receive information from a UAV when the UAV is in a first zone, and a second recorder may receive information from the UAV when the UAV is in a second zone. Alternatively, the recorders do not have a limited range and may receive information from devices (e.g., UAVs, remote controllers, geo-fencing devices) regardless of the location of the device. The recorders may be the memory storage units and/or may convey the gathered information to the memory storage units.

Information from one or more data source may be stored in memory. The data source may be any device or entity that is a source of the recorded data. For example, for DATA1, the data source may be a first UAV (e.g., UAV1). For DATA2, the data source may be a second UAV (e.g., UAV2). The data source may be a user, user terminal (e.g., remote controller), UAV, geo-fencing device, recorder, external sensor, or any other type of device. Information may be about of the data sources may be stored in the memory.

For example, information about one or more users 2715a, 2715b may be stored in the memory storage system. The information may include user identification information. Examples of user identification information may include a user identifier (e.g., USERID1, USERID2, USERID3, . . . ). The user identifier may be unique to the user. In some instances the information from the users may include information useful for identifying and/or authenticating the user. The information from the one or more users may include information about the users. The information from the one or more users may include data originating from the user. In one example, the data may include one or more commands from the user. The one or more commands may include commands that effect operation of the UAV. Any other type of information may be provided from the one or more users and may be stored in the memory storage system.

In some embodiments, all user inputs may be stored in the memory storage system as data. Alternatively, only selected user inputs may be stored in the memory storage system. In some instances, only certain types of user inputs are stored in the memory storage system. For instance, in some embodiments, only user identification inputs and/or command information is stored in the memory storage system.

The users may optionally provide information to the memory storage system with aid of one or more user terminals 2720a, 2720b. The user terminals may be a device capable of interacting with a user. The user terminal may be capable of interacting with a UAV. The user terminal may be a remote controller configured to send one or more operational commands to the UAV. The user terminal may be a display device configured to show data based on information received from the UAV. The user terminal may be capable of both sending information to the UAV and receiving information from the UAV. In some embodiments, a user terminal may be a data source for data stored in the memory storage system. For example, REMOTE CONTROLLER1 may be a source of DATA4.

Users may provide information to the memory storage system with aid of any other type of device. For example one or more computers or other devices may be provided that may be capable of receiving a user input. The devices may be capable of communication user input to the memory storage device. The devices need not interact with the UAVs.

The user terminals 2720a, 2720b may provide data to the memory storage system. The user terminals may provide information relating to a user, user commands, or any other type of information. The user terminals may provide information about the user terminals themselves. For instances, user terminal identification may be provided. In some instances, a user identifier and/or user terminal identifier may be provided. Optionally a user key and/or user terminal key may be provided. In some examples, a user does not provide any input relating to the user key, but the user key information may be stored on the user terminal or may be accessible by the user terminal. In some instances, the user key information may be stored on a physical memory of the user terminal. Alternatively, the user key information may be stored off-board (e.g., on the cloud) and may be accessible by the user terminal. In some embodiments, the user terminals may convey the user identifiers and/or associated commands.

The UAVs 2730a, 2730b may provide information to the memory storage system. The UAVs may provide information relating to the UAV. For example, UAV identification information may be provided. Examples of UAV identification information may include a UAV identifier (e.g., UAVID1, UAVID2, UAVID3, . . . ). The UAV identifier may be unique to the UAV. In some instances the information from the UAVs may include information useful for identifying and/or authenticating the UAV. The information from the one or more UAVs may include information about the UAVs. The information from the one or more UAVs may include any data (e.g., DATA1, DATA2, DATA3, . . . ) that were received by the UAVs. The data may include commands that effect operation of the UAV. Any other type of information may be provided from the one or more UAVs and may be stored in the memory storage system.

The geo-fencing devices 2750a, 2750b may provide information to the memory storage system. The geo-fencing devices may provide information relating to the geo-fencing devices. For example, geo-fencing device identification information may be provided. Examples of geo-fencing device identification information may include a geo-fencing device identifier (e.g., GEO-FENCING DEVICE 1, GEO-FENCING DEVICE 2, . . . ). The geo-fencing device identifier may be unique to the geo-fencing device. In some instances the information from the geo-fencing devices may include information useful for identifying and/or authenticating the geo-fencing devices. The information from the one or more geo-fencing devices may include information about the geo-fencing devices. The information from the one or more UAVs may include any data (e.g., DATA5, DATA6, . . . ) that were received by the geo-fencing devices. The data may include locations of geo-fencing devices, detected conditions or presence of UAV, or information relating to flight regulations. Any other type of information may be provided from the one or more geo-fencing devices and may be stored in the memory storage system.

Any of the devices described herein may be authenticated prior to storing the device-related information in the memory storage system. For example, a user may be authenticated before user-related information is stored in the memory storage system. For example, the user may be authenticated before a user identifier is obtained and/or stored by the memory storage system. Thus, in some implementations, only authenticated user identifiers are stored in the memory storage system. Alternatively, a user need not be authenticated and a purported user identifier may be stored in the memory storage system prior to authentication. If authentication is passed an indication may be made that the user identifier has been verified. If authentication is not passed, an indication may be made that the user identifier has been flagged for suspicious activity, or that a failed attempt at authentication was made using the user identifier.

Optionally, a UAV may be authenticated before UAV-related information is stored in the memory storage system. For example, the UAV may be authenticated before a UAV identifier is obtained and/or stored by the memory storage system. Thus, in some implementations, only authenticated UAV identifiers are stored in the memory storage system. Alternatively, a UAV need not be authenticated and a purported UAV identifier may be stored in the memory storage system prior to authentication. If authentication is passed an indication may be made that the UAV identifier has been verified. If authentication is not passed, an indication may be made that the UAV identifier has been flagged for suspicious activity, or that a failed attempt at authentication was made using the UAV identifier.

Similarly, a geo-fencing device may be authenticated before geo-fencing device-related information is stored in the memory storage system. For example, the geo-fencing device may be authenticated before a geo-fencing device identifier is obtained and/or stored by the memory storage system. Thus, in some implementations, only authenticated geo-fencing device identifiers are stored in the memory storage system. Alternatively, a geo-fencing device need not be authenticated and a purported geo-fencing device identifier may be stored in the memory storage system prior to authentication. If authentication is passed an indication may be made that the geo-fencing device identifier has been verified. If authentication is not passed, an indication may be made that the geo-fencing device identifier has been flagged for suspicious activity, or that a failed attempt at authentication was made using the geo-fencing device identifier.

In addition to a data source, related device information pertaining to the corresponding data may be stored. For example, if a command was issued, related devices may include a device that issued the command and/or a device that received a command. The data source may be the device that issued the command. In another example, data may be collected by a sensor on-board the UAV. The data source may be the UAV. The UAV may communicate the sensed data to multiple devices, which may be included in the information about related devices. For example, DATA3 may be sensed by UAV1, and UAV1 may send the device to a user (e.g., USERID3) and geo-fencing device (e.g., GEO-FENCING DEVICE 2). The related device information may include a user, user terminal (e.g., remote controller), UAV, geo-fencing device, recorder, external sensor, or any other type of device.

The memory storage unit may store one or more sets 2740 of information. The sets of information may include information from the may be a user, user terminal, UAV, geo-fencing device, recorder, external sensor, or any other type of device. The sets of information may include one or more sets of data, a data source, and information regarding related devices. In some instances, a single data item may be provided for a single set of information. Alternatively multiple data items may be provided for a single set of information.

The memory storage system may store sets of information relating to a particular interaction between two devices. For instance, multiple commands may be issued during the interaction between the two devices. The interaction may be execution of a mission. In some instances, the memory storage unit may only store information pertaining to the particular interaction. Alternatively, the memory storage system may store information pertaining to multiple interactions between the two devices. The memory storage system may optionally store information according to an identifier of a particular device. Data that is tied to the same device (e.g., same UAV) may be stored together. Alternatively, the memory storage unit may store information according to the device identifier. Data that is tied to a device or particular combination of devices may be stored together.

Alternatively, the memory storage system may store sets of information pertaining to interactions between multiple devices or sets of devices. The memory storage system may be a data repository that collects information from multiple users, user terminals, UAVs, geo-fencing devices, or other devices. The memory storage system may store information from multiple missions, which may include various users, various user terminals, various UAVs, various geo-fencing devices, and/or various combinations thereof. In some instances, the information sets in the memory storage system may be searchable or index-able. The information sets may be found or indexed according to any parameter, such as user identity, user terminal identity, UAV identity, geo-fencing device identity, time, device combinations, types of data, locations, or any other information. The information sets may be stored in accordance with any parameter.

In some instances, information in the memory storage system may be analyzed. The information sets may be analyzed to detect one or more patterns of behavior. The information sets may be analyzed to detect one or more characteristics that may be related to an accident or undesirable condition. The information sets may be used to analyze air traffic. Statistical analysis may be performed on the information sets in the memory storage units. Such statistical analysis may be useful for identifying trends or correlated factors. For example, it may be noticed that certain UAV models may have a higher accident rate overall than other UAV models. Thus, information in the memory storage system may be analyzed generally to gather information about operation of UAVs. Such general analysis need not be in response to particular events or scenarios.

The memory storage system may be updated in real-time. For instance, as data is sent or received, information pertaining to the data may be recorded in the memory storage system, along with any other information from the information set. This may occur in real-time. The data and any related information in the information set may be stored within less than 10 minutes, 5 minutes, 3 minutes, 2 minutes, 1 minute, 30 seconds, 15 seconds, 10 seconds, 5 seconds, 3 seconds, 1 second, 0.5 seconds, or 0.1 seconds of the command being sent, or received.

In alternative embodiments, the memory storage system may not need to be updated in real-time. The memory storage system may be updated periodically at regular or irregular time intervals. In some instances, an update schedule may be provided, which may include regular or irregular update times. The update schedule may be fixed, or may be alterable. The memory storage system may be updated in response to a detected event or condition.

A memory storage system may store the information sets for any period of time. In some instances, the information sets may be stored indefinitely, until they are deleted. Deletion of information sets may or may not be permitted. In some instances, only an operator or administrator of the memory storage system may be permitted to interact with the data stored in the memory storage system. In some instances, only an operator of an authentication system (e.g., air control system, authentication center) may be permitted to interact with the data stored in the memory storage system.

Optionally, the information sets may be automatically deleted after a period of time. The period of time may be pre-established. For instance, information sets may be automatically deleted after greater than a predetermined period of time. Examples of predetermined periods of time may include, but are not limited to 20 years, 15 years, 12 years, 10 years, 7 years, 5 years, 4 years, 3 years, 2 years, 1 year, 9 months, 6 months, 3 months, 2 months, 1 month, 4 weeks, 3 weeks, 2 weeks, 1 week, 4 days, 3 days, 2 days, 1 day, 18 hours, 12 hours, 6 hours, 3 hours, 1 hour, 30 minutes, or 10 minutes. In some instances, information sets may be deleted manually only after the predetermined period of time has passed.

Identity-Based Geo-Fencing Restrictions

One or more sets of flight regulations within an environment may correspond to one or more geo-fencing devices. Each set of flight regulations may be associated with a geo-fencing device. In some embodiments, only a single set of flight regulations are associated with the geo-fencing device. For example, regardless of number or type of UAVs that may interact with the geo-fencing device, the same set of flight regulations may apply. Alternatively, multiple sets of flight regulations may be associated with the geo-fencing device. This may occur when multiple UAVs interact with the geo-fencing device. Each of the multiple sets of UAVs may have their own set of flight regulations. For example, a first UAV may have a first set of flight regulations, and the second set UAV may have a second set of flight regulations. The restrictions provided by the first and second set of flight regulations may be different. In some instances, the difference may be due to identity of the UAV (e.g., difference in first UAV identity vs second UAV identity). The difference may be due to identity of the user (e.g., difference in an identity of the first user operating the first UAV vs second user operating the second UAV). The difference may be due to any other factor, such as time, environmental conditions, or any other factors. A set of flight regulations may be associated with a single geo-fencing device.

Figure 28:
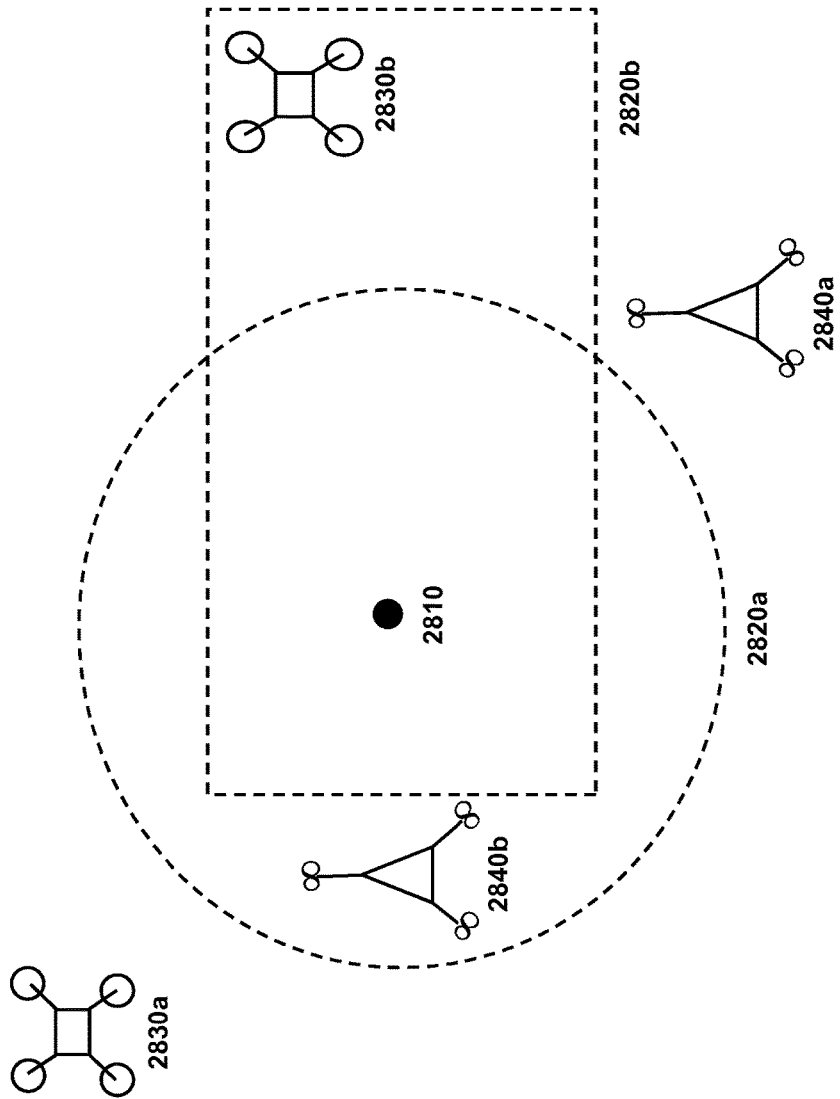
FIG. 28 shows a geo-fencing device that may provide different sets of flight restrictions in different scenarios, in accordance with an embodiment of the invention.

FIG. 28 shows a geo-fencing device 2810 that may provide different sets of flight restrictions in different scenarios. The different sets of flight restrictions may have the same boundaries, or may have different boundaries 2820a, 2820b. Different UAVs 2830a, 2830b, 2840a, 2840b may receive the different sets of flight restrictions.

The geo-fencing device 2810 may be provided at a location within the environment. A set of flight regulations may be provided to a UAV within the environment near the location. If multiple UAVs are within the environment near the location, they may each receive a set of flight regulations. The sets of flight regulations between the multiple UAVs may be the same. The sets of flight regulations between the multiple UAVs may be different. In one example, the difference in sets of flight regulations may be based upon the identity of the UAV. The difference in sets of flight regulations may be based upon the UAV type. For example, a first set of UAVs 2830a, 2830b may be of a first UAV type, and a second set of UAVs 2840a, 2840b may be of a second UAV type. The first and second types of UAVs may be different. Any description herein of difference of sets of flight regulations based on UAV type are provided by way of example only, and may apply to any other type of factor which may cause different sets of flight regulations. These may include user information (e.g., user identity, user type), environmental conditions, timing, other UAV information or any other types of factors described elsewhere herein.

A first set of UAVs may receive a first set of flight regulations and a second set of UAVs may receive a second set of flight regulations. The first and second set of flight regulations may be different. For example, a first set of UAVs 2830a, 2830b may receive a first set of flight regulations and a second set of UAVs 2840a, 2830b may receive a second set of flight regulations for the geo-fencing device 2810. The boundaries between the first set of flight regulations and the second set of flight regulations may be different. Thus, for the same geo-fencing device, multiple sets of boundaries may be provided through the multiple sets of flight regulations. A first set of flight regulations may have a first set of boundaries and a second set of flight regulations may have a second set of boundaries. In some instances, a single set of flight regulations may have multiple sets of boundaries. For example, even if a single UAV receives a set of flight regulations, there may be multiple sets of boundaries, whether for multiple zones, different zones at different times, or different zones for different detected conditions, or any other factors. A first set of boundaries 2820a may be provided in the first set of regulations for the first set of UAVs, and a second set of boundaries 2820b may be provided in the second set of regulations for the second set of UAVs. The boundaries may have different sizes or shapes. The boundaries may overlap.

In the example provided, the boundaries may restrict the presence of UAVs. This is provided by way of example only and any other type of restrictions may apply for the boundaries. The first set of flight regulations may restrict the presence of the first type of UAVs 2830a, 2830b from a region with the first set of boundaries 2820a. Thus UAVs of the first type may not enter the first set of boundaries. The UAVs of the second type 2840a, 2840b may not receive the first set of flight regulations and may thus not be restricted by the restrictions from the first set of flight regulations. Thus, the UAVs of the second type may enter within the first set of boundaries (e.g., UAV 2840b has entered within the first set of boundaries 2820a).

The second set of flight regulations may restrict the presence of the second type of UAVs 2840a, 2840b from a region with the second set of boundaries 2820b. Thus UAVs of the second type may not enter the second set of boundaries. The UAVs of the first type 2830a, 2830b may not receive the second set of flight regulations and may thus not be restricted by the restrictions from the second set of flight regulations. Thus, the UAVs of the first type may enter within the second set of boundaries (e.g., UAV 2830b has entered within the second set of boundaries 2820b).

Thus, even a single geo-fencing device may have a high degree of flexibility. The geo-fencing device may be able to provide a reference point for different sets of flight regulations for different UAVs in different circumstances that may approach the geo-fencing device, which may provide a high degree of control over the types of activities in the proximity of the geo-fencing device without requiring any alteration or update to the geo-fencing device itself. In some embodiments, the sets of flight regulations may be generated off-board so any updates or specific rules may be directed off-board the geo-fencing device that may not require any change to the geo-fencing device itself. In some instances, the geo-fencing device itself may generate the sets of flight regulations on-board, but may receive updates to the parameters, algorithms, or data used to generate the set of flight regulations from the cloud. The geo-fencing device need not receive any manual input in performing its functions. Alternatively, a user may choose to provide personalized requests or input for the geo-fencing device.

Geo-Fencing Device Chance Over Time

As previously described, a set of flight regulations may change over time. UAVs encountering the geo-fencing device at different times may have a different set of flight regulations. In some embodiments, the set of flight regulations are applicable to a particular encounter or a particular time. For example, if a UAV were to approach a geo-fencing device a first time, the UAV may receive a first set of flight regulations. If the UAV were to fly elsewhere and then return and encounter the geo-fencing device a second time, the UAV may receive a second set of flight regulations. The first and second set may be the same. Alternatively, they may be different. The set of flight regulations may have changed based on the time, or other conditions, such as environmental conditions that are detected. Thus, a UAV may be delivered different sets of flight conditions depending on the conditions (e.g., time, environmental conditions). The set of flight conditions themselves need not include any conditions. In other embodiments, the set of flight regulations may encompass different conditions including timing. For example, a set of flight regulations provided for a UAV may indicate that before 3:00 pm, the first set of boundaries and restrictions applies, between 3:00 pm and 5:00 pm, a second set of boundaries and restrictions apply, and after 5:00 pm a third set of boundaries and restrictions apply. Thus, the set of flight restrictions may include different sets of boundaries and restrictions to the UAV depending on different conditions (e.g., time, environmental conditions, etc.).

However, the set of flight regulations is provided, a UAV may be subject to different restrictions to the geo-fencing device depending on conditions such as time, or environmental conditions.

Figure 29:
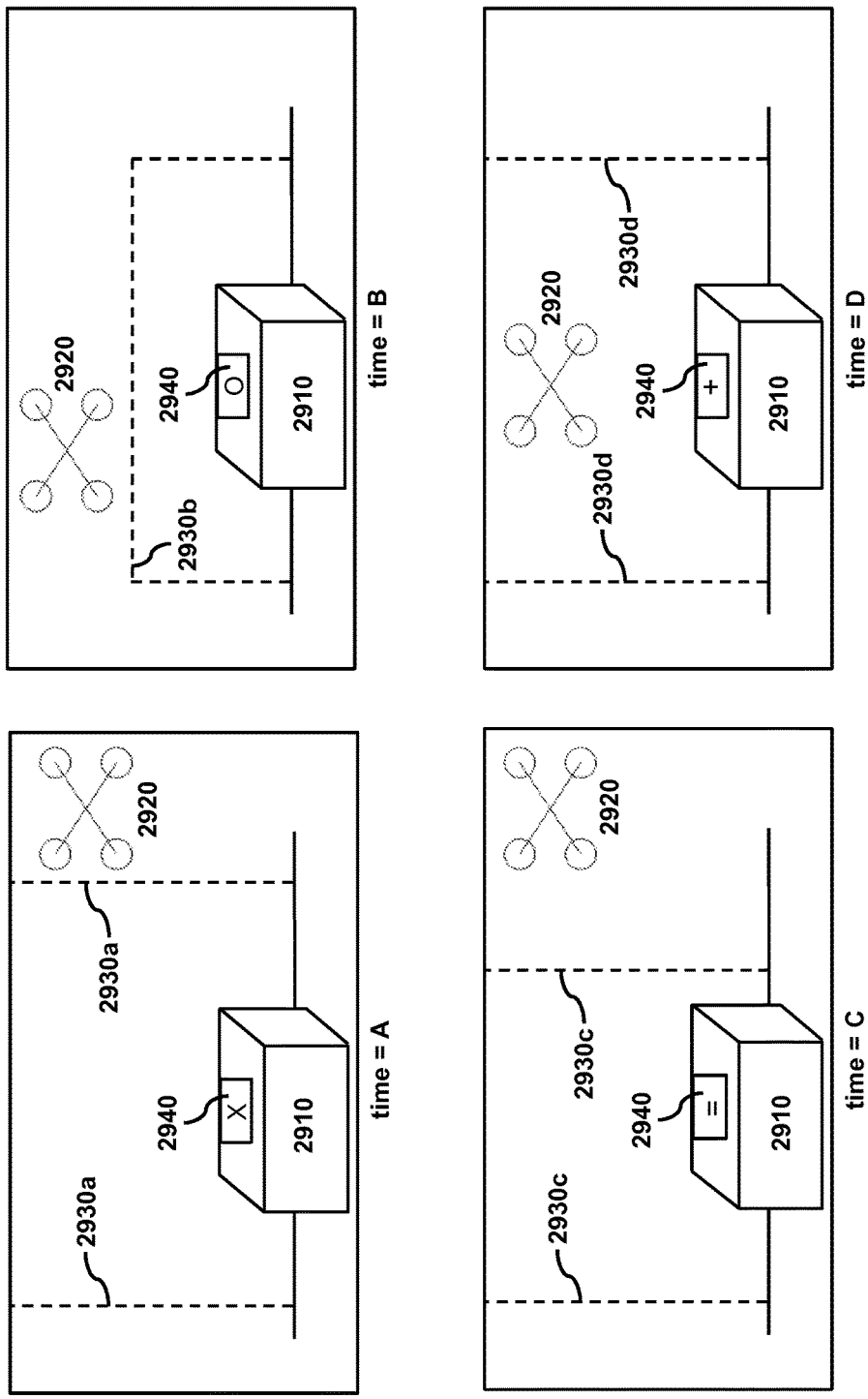
FIG. 29 shows an example of a geo-fencing device with sets of flight regulations that may change over time, in accordance with an embodiment of the invention.

FIG. 29 shows an example of a geo-fencing device with sets of flight regulations that may change over time. The change of regulations over time may be provided by way of example only, and may apply to any other types of conditions, such as environmental conditions. For example, if the example describes changes at a first time, second time, third time, etc., the example may apply to a first set of environmental conditions, a second set of environmental conditions, a third set of environmental conditions, or any other set of conditions (e.g., a first set of conditions, a second set of conditions, a third set of conditions).

A geo-fencing device 2910 may be illustrated at different times (time=A, B, C, or D). Different conditions may be provided at the different times, or the place of the different times. A UAV 2920 may be provided in a proximity of the geo-fencing device. The UAVs illustrated at the different times may be the same UAV or may be different UAVs. The geo-fencing device may have a set of boundaries 2930a, 2930b, 2930c, 2930d.

The boundaries may change over time. For example, a set of boundaries 2930a at a first time (e.g., time=A) may be different from a set of boundaries 2930b at a second time (e.g., time=B). The boundaries may change in any way. For example, a lateral portion of the boundaries may change (e.g., boundaries 2930a at time=A and boundaries 2930c at time=C) and/or a vertical portion of the boundaries may change (e.g., boundaries 2930a at time=A and boundaries 2930b at time=B). In some instances, both the lateral and vertical portions of the boundaries may change (e.g., boundaries 2930b at time=B and boundaries 2930c at time=C). The sizes and/or shapes of the boundaries may change. In some instances the boundaries may remain the same at different times. For example, a set of boundaries 2930a at a first time (e.g., time=A) may be the same as a set of boundaries 2930d at a second time (e.g., time=D).

The types of restrictions imposed in relation to the boundaries may change over time. Even if a set of boundaries remain the same, the type of restriction may change. For example, at a first time (e.g., time=A), the boundaries 2930a may be the same as the boundaries 2930d a second time (e.g., time=D). However, a first set of restrictions may apply at the first time (e.g., at time=A, a UAV 2920 may not be permitted to enter within the boundaries 2930a), and a second set of restrictions may apply at a second time (e.g., at time=D, a UAV 2920 may be permitted to enter within the boundaries 2930d, but optionally other restrictions may be imposed, such as not permitting operation of a payload). Even if the boundaries remain the same, the type of restriction may be different. Even if the boundaries remain the same, and the type of restriction is the same, the level of restriction may be different (e.g., not being permitted to use any wireless communications vs. only being permitted to use wireless communications within a particular frequency range).

In some embodiments, the types of restrictions imposed in relation to the boundaries may remain the same, while the boundaries change over time. For example, at a first time (e.g., time=A), the boundaries 2930a may change with respect to boundaries 2930b at a second time (e.g., time=B). The first of restrictions may apply at the first time and a second set of restrictions may apply at the second time. The first set of restrictions may be the same as the second set of restrictions. For example, at time=A, a UAV 2920 may not be permitted to enter within the boundaries 2930a. At time=B, the UAV may also not be permitted to enter within the boundaries 2930b, but the boundaries may have changed, so that the UAV may enter areas the UAV had not been previously able to enter and/or the UAV may not be able to enter areas that the UAV had previously been able to enter. The areas that the UAV may be able to enter may have changed with the changing of the boundaries.

Alternatively, the first set of restrictions may not be the same as the second set of restrictions. For example, at time=B, a UAV may not be permitted to enter within the boundaries 2930b. At time=C, the UAV may be able to enter within the boundaries 2930c but may not be able to issue any wireless communications while within the boundaries. Thus, both the boundaries and the set of restrictions may change. The set of restrictions may change such that the type of restrictions changes. The set of restrictions may change such that the type of restriction may be the same, but the level of restriction may change.

A UAV may encounter a geo-fencing device in various circumstances. The different circumstances may be provided in sequence (the UAV encounters the geo-fencing device at multiple points in time, or under multiple different conditions), or may be provided in the alternative (e.g., the UAV may theoretically reach a geo-fencing device for the first time at different points in time, or under different sets of conditions).

In some embodiments, the changes to the set of flight regulations may occur without requiring that the geo-fencing device have an indicator. For example, an air control system may be aware of the geo-fencing device and UAV locations. The air control system may detect when a UAV is within a predetermined range of the geo-fencing device. The air control system may be aware of a set of conditions (e.g., current time, environmental conditions, UAV identity or type, user identity or type, etc.) when the UAV nears the geo-fencing device. Based on the conditions, the air control system may provide a set of flight regulations to the UAV. The UAV need not detect the geo-fencing device, nor detect an indicator on the geo-fencing device, although the UAV may do so, as described elsewhere herein.

In another example, the geo-fencing device may detect the presence of the UAV as the UAV approaches the geo-fencing device. The geo-fencing device may detect the UAV when the UAV comes within a predetermined range of the geo-fencing device. The geo-fencing device may be aware of a set of conditions (e.g., current time, environmental conditions, UAV identity or type, user identity or type, etc.) when the UAV nears the geo-fencing device. Based on the conditions, the geo-fencing device may provide a set of flight regulations to the UAV. The UAV need not detect the geo-fencing device, nor detect an indicator of the geo-fencing device, although the UAV may do so, as described elsewhere herein.

Additionally, the UAV may generate the set of flight regulations on board. The UAV may detect the presence of the geo-fencing device. Alternatively, information from an air control system or geo-fencing device about the proximity of the UAV to the geo-fencing device may be provided to the UAV. The UAV may be aware of a set of conditions (e.g., current time, environmental conditions, UAV identity or type, user identity or type, etc.) when the UAV nears the geo-fencing device. Based on the conditions, the UAV may generate a set of flight regulations on-board the UAV. The UAV need not detect the geo-fencing device, nor detect an indicator on the geo-fencing device, although the UAV may do so, as described elsewhere herein.

In other embodiments, the geo-fencing device 2910 may comprise an indicator 2940. The indicator may be any type of indicator as described elsewhere herein. While a visual marker has been provided by way of example only, any other type of indicator, such as a wireless signal, heat signal, acoustic signal, or any other type of indicator may be used. A UAV may be able to detect the indicator of the geo-fencing device. The UAV may be able to detect the indicator when the UAV nears the geo-fencing device (e.g., enters within a predetermined range of the geo-fencing device).

The indicator may change over time. The changes in the indicator may be reflective of different conditions. The indicator may change periodically (e.g., at regular or irregular time intervals), in accordance with a pre-set schedule, or in response to a detected event or condition. The changes in the indicator may be self-initiated by the geo-fencing device. The geo-fencing devices may have a set of instructions on which indicators to provide in which circumstances. The instructions may be updated with information from an external device (e.g., cloud, air control system, UAV, other geo-fencing device, etc.). In some instances, the changes to the indicator may incorporate data from one or more external device. In one example, an air control system may instruct the geo-fencing device to change indicators. In another example, another external device, such as the UAV, other geo-fencing devices, or remote controller of the geo-fencing device may provide an instruction to the geo-fencing device to change indicators. The indicator may change characteristics. The characteristics may be detectable by the UAV. For example, for a visual marker, the change in characteristics may include change in visual appearance of the indicator. In another example, for an acoustic signal, the change in characteristics may include a change in a detectable acoustic signature of the indicator. For a wireless signal, the change in characteristic may include a change in information transmitted by the indicator.

For example, the indicator may change periodically. In one example, the indicator may change every hour. In another example, the indicator may change every day. The geo-fencing device may have an on-board clock that may allow the geo-fencing device to keep track of the time.

The indicator may change in accordance with a pre-set schedule. For example, a schedule may indicate that the indicator should change from a first indicator characteristic to a second indicator characteristic at 9:00 AM on Monday, and then from the second indicator characteristic to a third characteristic at 3:00 PM on Monday, and then from the third characteristic back to the first characteristic at 1:00 AM on Tuesday, and then from the first characteristic to a second characteristic at 10:00 AM on Tuesday, and so forth. The schedule may be alterable. In some instances, an operator of an air control system may be able to alter the schedule. In another example, an owner or operator of the geo-fencing device may be able to alter the schedule. The owner and/or operator of the geo-fencing device may be able to enter or alter the schedule by manually interacting with the geo-fencing device, or remotely from a separate device, which may result in an updated schedule of the geo-fencing device.

In another example, the indicator may change in response to a detected event or condition. For example, if the air traffic around the geo-fencing device reaches a threshold density, then the indicator may change. If the climate around the geo-fencing device changes (e.g., it starts raining or the wind speed picks up), then the indicator may change. Optionally, the dynamic indicator may change in response to a detected presence of the UAV. For example, the UAV may be uniquely identified. The geo-fencing device may receive a UAV identifier that uniquely identifies the UAV from other UAVs. An indicator parameter or characteristic may be selected based on the UAV identifier. For instance, the set of flight regulations may depend on an identity of the UAV or the UAV type. In another example, the indicator parameter or characteristic may be selected based on a user identifier. For instance, the set of flight regulations may depend on an identity of the user or the user type.

The changes to the indicator may reflect changes to the set of flight regulations. For example, a UAV may be able to detect the changes in characteristics of the indicator and know that a different set of restrictions are in place. For example, the UAV may use a different set of flight regulations when the indicator changes. Alternatively, the UAV may use the same set of flight regulations, but the same set of flight regulations may apply for different restrictions or boundaries for different indicators.

For example, if the UAV detects the indicator 2940 under a first set of characteristics (e.g., showing 'X'), the UAV may know that a first set of regulations are in place (e.g., first set of boundaries 2930*a*, first set of restrictions). If the UAV detects the indicator 2940 under a second set of characteristics (e.g., showing 'O'), the UAV may know that a second set of regulations are in place (e.g., second set of boundaries 2930*b*, second set of restrictions). If the UAV detects the indicator 2940 under a third set of characteristics (e.g., showing '='), the UAV may know that a third set of regulations are in place (e.g., third set of boundaries 2930*c*, third set of restrictions). If the UAV detects the indicator 2940 under a fourth set of characteristics (e.g., showing '+'), the UAV may know that the fourth set of regulations are in place (e.g., fourth set of boundaries 2930*d*, fourth set of restrictions).

The UAV may know that different regulations correspond to different indicator characteristics based on a local memory on-board the UAV. The local memory on-board the UAV may or may not be updated continuously, periodically, in accordance with a schedule, or in response to a detected event or condition. In some instances, an external device, such as an air control system, may know different regulations that correspond to different indicator characteristics. The UAV may transmit information to the external device about the detected indicator characteristic. The external device may generate the set of flight regulations and then provide the set of flight regulations to the UAV in response. Any other communication architecture such as those described elsewhere herein may be used.

Aspects of the invention may be directed to a geo-fencing device, comprising: one or more memory storage units configured to store a plurality of indicator parameters; and a dynamic indicator that (1) changes over time from being in accordance with a first indicator parameter to being in accordance with a second indicator parameter of said plurality, and (2) is configured to be detectable by a UAV (a) while the UAV is in flight and (b) when the UAV enters within a predetermined geographic range of the geo-fencing device. A method of providing a set of flight regulations to a UAV may be provided, said method comprising: storing, in one or more memory storage units of a geo-fencing device, a plurality of indicator parameters; and changing a dynamic indicator of the geo-fencing device over time from being in accordance with a first indicator parameter to being in accordance with a second indicator parameter of said plurality, wherein the dynamic indicator is configured to be detectable by the UAV (a) while the UAV is in flight and (b) when the UAV enters within a predetermined geographic range of the geo-fencing device.

As previously described, the indicator may be a dynamic indicator. The dynamic indicator may have one or more parameters/characteristics. In some embodiments, the dynamic indicator may be a visual marker that changes appearance over time. A first appearance of the visual marker may be generated based on the first indicator parameter, and a second appearance of the visual marker that is different from the first appearance of the visual marker may be generated based on the second indicator parameter. In another example, the dynamic indicator may be a wireless signal that changes characteristics over time. A first characteristic of the wireless signal may be generated based on the first indicator parameter, and a second characteristic of the wireless signal that is different from the first characteristic of the wireless signal may be generated based on the second indicator parameter.

The dynamic indicator may uniquely identify the geo-fencing device and distinguishes the geo-fencing device from other geo-fencing devices. For example, different geo-fencing devices may have different indicators. The different dynamic indicators may be different from one another. So when a UAV detects a dynamic indicator, the UAV may not only know the set of flight regulations in place under the conditions, but the identity of the geo-fencing device. In other embodiments, the indicators need not be unique to each geo-fencing device. In some instances, the same indicators may be provided for geo-fencing devices of the same type. The indicators may be unique for the geo-fencing device type. When a UAV detects a dynamic indicator, the UAV may not only know what the set of flight regulations are in place under the conditions, but the type of geo-fencing device. In other instances, the indicator need not be unique to the device. Different geo-fencing devices of different types may show the same indicators. The indicators may be reflective of the set of flight regulations that correspond to the indicator, and the UAV need not uniquely identify the geo-fencing device or geo-fencing device type.

The dynamic indicator may be indicative of a first set of flight regulations when in accordance with the first indicator parameter and may be indicative of a second set of flight regulations when in accordance with the second indicator parameter. As previously described, the set of flight regulations may be generated and/or stored at any device within the UAV system. Any communication combinations may occur to permit the UAV to operate in accordance with the set of flight regulation. In some examples, the first set of flight regulations and the second set of flight regulations may be stored on-board the UAV, the first set of flight regulations and the second set of flight regulations may be stored on an air control system off-board the UAV, or the first set of flight regulations and the second set of flight regulations may be stored on-board the geo-fencing device.

Geo-Fence Overlap and Priority

Figure 30:
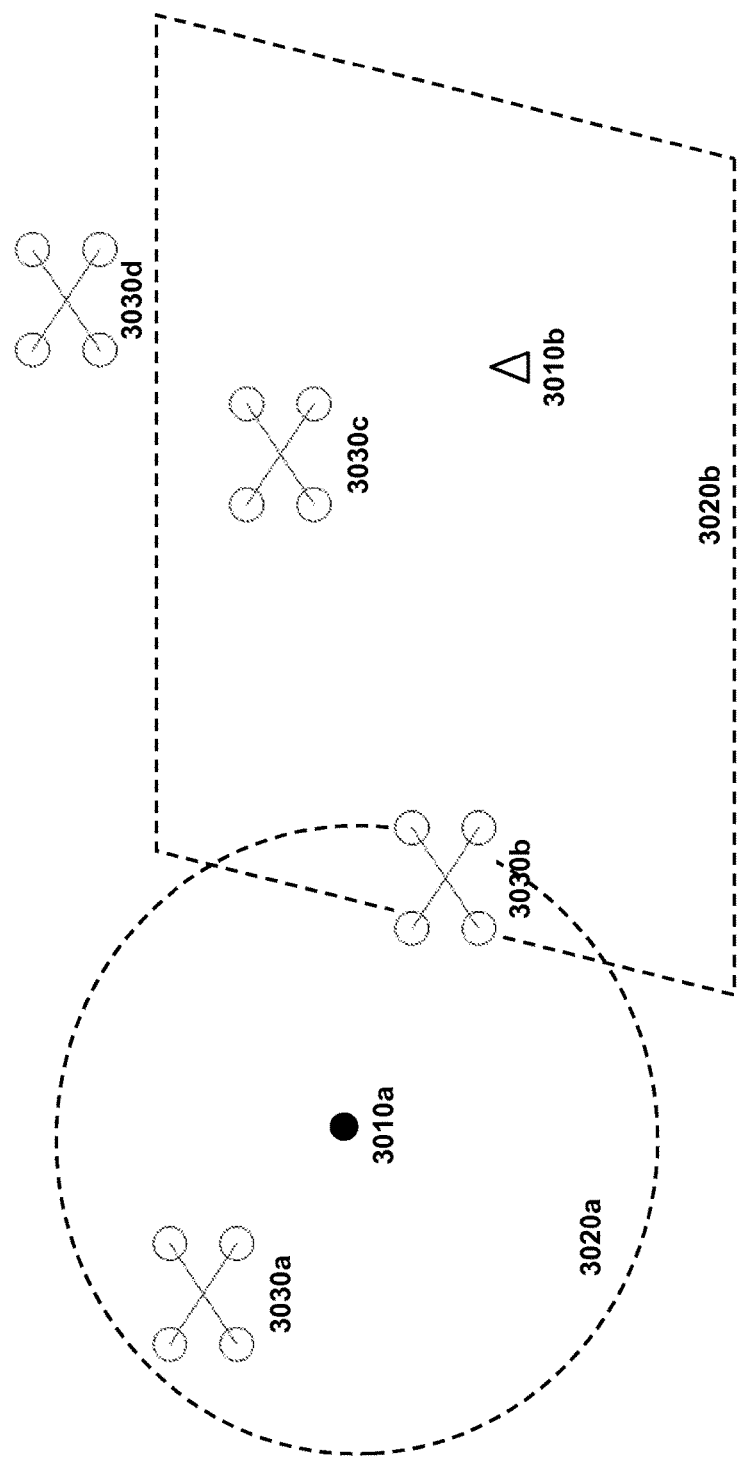
FIG. 30 shows a scenario where a UAV may be provided within an overlapping region for multiple geo-fencing devices, in accordance with an embodiment of the invention.

FIG. 30 shows a scenario where a UAV may be provided within an overlapping region for multiple geo-fencing devices. Multiple geo-fencing devices 3010a, 3010b may be provided within an environment. The geo-fencing devices may have corresponding boundaries 3020a, 3020b. One or more UAVs may be provided within an environment.

A UAV 3030d may be outside the boundaries of both a first geo-fencing device 3010a and a second geo-fencing device 3010b. The UAV may optionally not be under a set of restrictions from either the first geo-fencing device or the second geo-fencing device. The UAV may freely operate within the environment without having a set of flight regulations applied to the UAV.

A UAV 3030a may be within the boundaries of a first geo-fencing device 3010a and outside the boundaries of the second geo-fencing device 3010b. The UAV may be under a set of restrictions from the first geo-fencing device while not under a set of restrictions from the second geo-fencing device. The UAV may operate in compliance with a first set of flight regulations associated with the first geo-fencing device.

A UAV 3030c may be within the boundaries of a second geo-fencing device 3010b and outside the boundaries of the first geo-fencing device 3010a. The UAV may be under a set of restrictions from the second geo-fencing device while not under a set of restrictions from the first geo-fencing device. The UAV may operate in compliance with a second set of flight regulations associated with the second geo-fencing device.

A UAV 3030d may be within the boundaries of both the first geo-fencing device 3010a and the second geo-fencing device 3010b. The UAV may be under a set of flight regulations. Different possibilities may be provided within the UAV falls within the range of multiple geo-fencing devices. Any of the possibilities when describing overlapping multiple zones may be applied herein.

For example, one or more of the zones, provided by different geo-fencing devices, may overlap. For instance, a first zone within the first set of boundaries 3020a of the first geo-fencing device may overlap a second zone within a second set of boundaries 3020b of the second geo-fencing device.

When multiple zones overlap, the rules from the multiple zones may remain in place. For example, both the first set of flight regulations associated with the first geo-fencing device and the second set of flight regulations associated with the second geo-fencing device may remain in place in the overlapping zone. In some instances, the rules from the multiple zones may remain in place as long as they are not conflicting with one another. For example, the first geo-fencing device may not permit usage of a UAV payload while the UAV is within the first zone. The second geo-fencing device may not permit usage of a UAV communication while the UAV is within the second zone. When the UAV 3030d is within both zones, the UAV may not be permitted to operate the UAV payload and may not be permitted to use the communication unit.

If there are conflicts between the rules, various rule responses may be imposed. For instance, the most restrictive set of rules may apply. For example, if a first zone requires that a UAV fly beneath 400 feet in altitude, and a second zone requires that a UAV fly beneath 200 feet in altitude, in the overlapping zone, the rule about flying beneath 200 feet in altitude may apply when the UAV is within the overlapping zone. This may include mixing and matching a set of rules to form the most restrictive set. For example, if a first zone requires that a UAV fly above 100 feet and beneath 400 feet, and a second zone requires that a UAV fly above 50 feet and beneath 200 feet, the UAV may use the flight floor from the first zone and the flight ceiling from the second zone to fly between 100 feet and 200 feet while in the overlapping zone.

In another instance, hierarchy may be provided to the zones. One or more priority levels may be provided within the hierarchy. A geo-fencing device of a higher priority level (e.g., higher up the hierarchy) may have rules that prevail over a geo-fencing device of a lower priority level (e.g., lower down the hierarchy), regardless of whether the rules associated with the geo-fencing device of higher priority are more or less restrictive than the rules of the geo-fencing device of lower priority. The priority levels of the geo-fencing devices may be preselected or pre-entered. In some instances, a user providing a set of rules for the zones may indicate which geo-fencing devices have higher priority levels than other geo-fencing devices. In some instances, a manufacturer of a geo-fencing device may pre-select a hierarchy for the geo-fencing device. The preselected priority may or may not be altered. In other instances, an owner or operator of the geo-fencing device may enter a hierarchy level for the geo-fencing device. The owner or operator of the geo-fencing device may be able to alter the geo-fencing device priority level. In some instances, the level of priority for the geo-fencing device may be determined by an external device, such as an air control system, one or more UAVs, or other geo-fencing devices. In some instances, an operator of the air control system may be able to view information about multiple geo-fencing devices and enter or adjust priority levels of the geo-fencing devices. In some embodiments, some of the priority levels may be jurisdictionally mandated. For example, certain jurisdictions may require that geo-fencing devices of government facilities or emergency services have a higher level of priority than private owned or operated geo-fencing devices.

In one implementation of a priority driven set of rules for a UAV in an overlapping zone, a first zone may require that a UAV fly beneath 400 feet and that the payload be turned off. A second zone may require that the UAV fly beneath 200 feet and have no payload restrictions. If the first zone may be associated with a geo-fencing device of higher priority, the rules from the first zone may be imposed, without imposing any of the rules from the second zone. For instance, the UAV may fly beneath 400 feet and have the payload turned off. If the second zone is associated with a geo-fencing device of higher priority, the rules from the second zone may be imposed, without imposing any of the rules from the first zone. For instance, the UAV may fly beneath 200 feet and not have any payload restrictions.

In some instances, multiple sets of flight regulations may be provided when multiple zones overlap. A master set of flight regulations may be provided, which the UAV may comply with. As previously described, the master set of flight regulations may incorporate both the first and second sets of flight regulations when there is no conflict, may incorporate a more restrictive set of flight regulations between the first and second sets of flight regulations, may incorporate aspects of both the first and second sets of flight regulations in the most restrictive manner, or may incorporate a set of flight regulations associated with a geo-fencing device of higher priority.

An aspect of the invention may include a method of operating a UAV, said method comprising: determining a location of the UAV; identifying a plurality of geo-fencing devices, wherein each geo-fencing device is indicative of a set of flight regulations for the UAV in an area that covers the location of the UAV; prioritizing, with aid of one or more processors, a master set of flight regulations the UAV is to follow, selected from the sets of flight regulations of the plurality of geo-fencing devices; and operating the UAV in accordance with the master set of flight regulations. Similarly, a non-transitory computer readable medium containing program instructions for operating a UAV may be provided, said computer readable medium comprising: program instructions for determining a location of the UAV; program instructions for identifying a plurality of geo-fencing devices, wherein each geo-fencing device is indicative of a set of flight regulations for the UAV in an area that covers the location of the UAV; and program instructions for prioritizing a master set of flight regulations the UAV is to follow, selected from the sets of flight regulations of the plurality of geo-fencing devices, to permit operation of the UAV in accordance with the master set of flight regulations.

Furthermore, a UAV flight regulation prioritization system may comprise: one or more processors configured to individually or collectively: determine a location of the UAV; identifying a plurality of geo-fencing devices, wherein each geo-fencing device is indicative of a set of flight regulations for the UAV in an area that covers the location of the UAV; and prioritize a master set of flight regulations the UAV is to follow, selected from the sets of flight regulations of the plurality of geo-fencing devices, to permit operation of the UAV in accordance with the master set of flight regulations. The system may further comprise one or more communication modules, wherein the one or more processors are operably coupled to the one or more communication modules.

Figure 31:
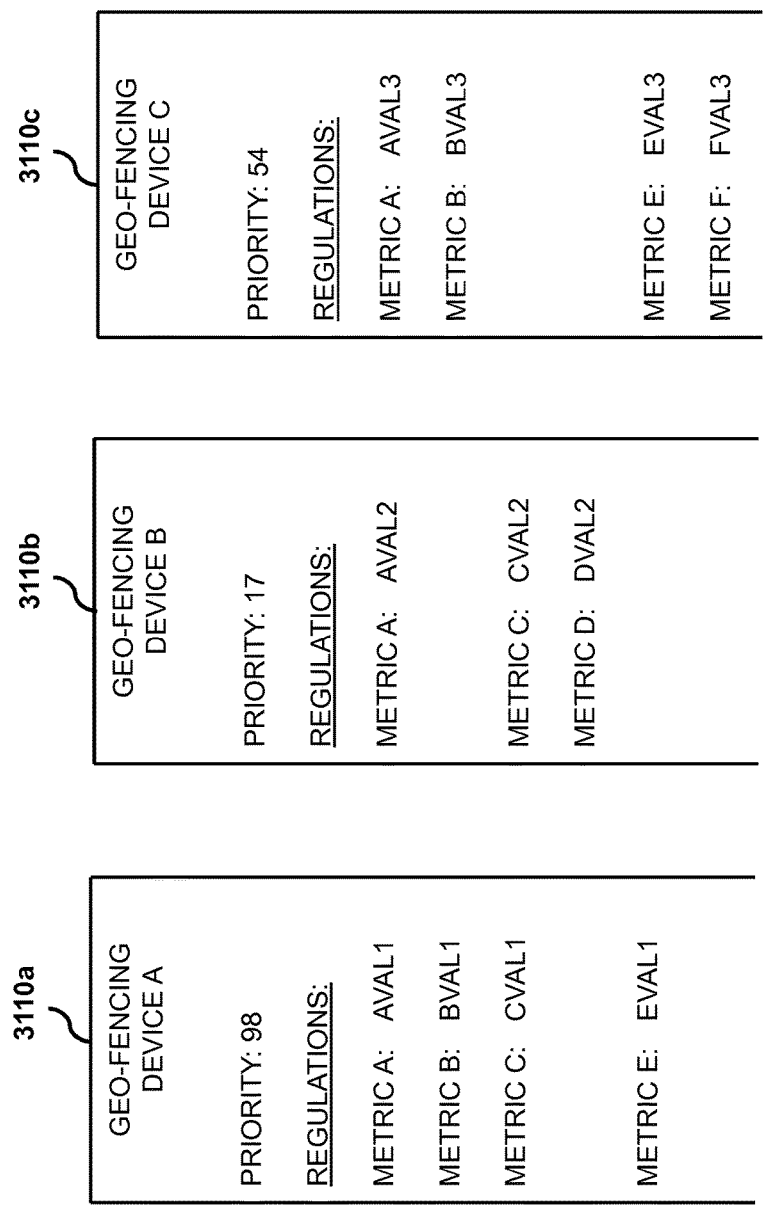
FIG. 31 shows an example of different regulations for different geo-fencing devices, in accordance with an aspect of the invention.

FIG. 31 shows an example of different regulations for different geo-fencing devices, in accordance with an aspect of the invention. Multiple geo-fencing devices 3110a, 3110b, 3110c may have priority levels and/or one or more sets of regulations. The sets of regulations may include one or more metric. One or regulation value may be associated with the one or more metric. One example of a metric may include a type of restriction. For example, a first metric may apply to altitude floor restriction, a second metric may apply to payload operation restriction, a third metric may apply to wireless communication restriction, a fourth metric may apply to battery capacity restriction, a fifth metric may apply to velocity restriction, a sixth metric may apply to maximum item carrying weight, and so forth.

In some embodiments, the geo-fencing devices may have different priority levels. Any number of priority levels may be provided. For example, one or more, two or more, three or more, four or more, five or more, six or more, seven or more, eight or more, nine or more, ten or more, fifteen or more, 20 or more, 25 or more, 30 or more, 40 or more, 50 or more, or 100 or more priority levels may be provided. The priority levels may be qualitative or quantitative. For example, the priority levels may be divided into low, moderate, and high. The geo-fencing device with a high priority level may be higher up the hierarchy than a geo-fencing device with a moderate priority level. Any categorization may be provided to the priority levels. For example, priority level A, priority level B, priority level C, etc. may be provided. In some instances, the priority levels may have numerical values. For example, geo-fencing device A 3110*a* may have a priority level of 98, geo-fencing device B 3110*b* may have a priority level of 17, and geo-fencing device C 3110*c* may have a priority level of 54. In some instances, a priority level with a higher numerical value may be higher up a hierarchy.

The plurality of geo-fencing devices may have different priority levels and a set of flight regulations from the geo-fencing device with the highest priority may be selected as the master set of flight regulations. For example, if a UAV is in a region of overlapping zones of geo-fencing devices A, B, and C, the UAV may have a master set of flight regulations that uses the regulations associated with geo-fencing device A, since geo-fencing device A has the highest priority level. If a UAV is in a region of overlapping zones of geo-fencing devices B and C, the UAV may have a set of flight regulations that use the regulations associated with geo-fencing device C, since geo-fencing device C has a higher priority level than geo-fencing device B. Thus, in this scenario, the UAV master set may include the regulations of AVAL3 for METRIC A, BVAL3 for METRIC B, EVAL3 for METRIC E, and FVAL3 for METRIC F. In some instances, different geo-fencing devices may have the same priority level. If the UAV falls in an overlapping with geo-fencing devices of equal priority level, other techniques may be used to determine a master set of flight regulations for UAV. For example, any of the other examples described elsewhere herein may be used.

In other instances, the master set of flight regulations may comprise the most stringent regulations selected from the sets of flight regulations. For example, if a UAV is in a region of overlapping zones of geo-fencing devices A, B, and C, for each of the metrics, the most restrictive value from the various geo-fencing devices may be selected. For example, for METRIC A, the most restrictive value of AVAL1, AVAL2, or AVAL3 may be selected. For example, if metric A is altitude floor restriction, and AVAL1=400 feet, AVAL2=250 feet, and AVAL3=300 feet, then AVAL1 may be selected because AVAL1 provides the most restrictive altitude floor. For METRIC B, the most restrictive value of BVAL1 or BVAL3 may be selected. Since geo-fencing device does not have any restriction for METRIC B, then the geo-fencing device B is already the least restrictive. If METRIC B is payload operation restriction, and BVAL1=being able to power on the payload but not being able to store any data collected, and BVAL3=not being able to power on the payload, then BVAL3 may be selected because BVAL3 provides more restrictive usage of the payload. For METRIC D, neither geo-fencing device A nor geo-fencing device C may have any restriction. Thus, DVAL2 may be selected for METRIC D since it is the most restrictive by default. For each metric, the most restrictive metric may be selected from the geo-fencing devices.

In other instances, the master set of flight regulations may comprise regulations from the geo-fencing device with the overall most stringent flight regulations. If overall, geo-fencing device C has the most stringent regulations compared to geo-fencing device A and B, then the master set may include the regulations of geo-fencing device C. Even if some of the metrics are more stringent at A and B, if geo-fencing device is overall more restrictive, then geo-fencing device D may be selected.

The master set of flight regulations may comprises flight regulations from a single set of flight regulations. For example, the master set of flight regulations may include only regulations from geo-fencing device A, only regulations from geo-fencing device B, or only regulations from geo-fencing device C. The master set of flight regulations comprises flight regulations from multiple sets of flight regulations. For example the master set may include flight regulations from two or more of geo-fencing devices A, B, and C. Values from different geo-fencing devices for different metrics may be selected.

In some embodiments, a master set of flight regulations may be prioritized based on a UAV identity (e.g., UAV identifier or UAV type). A UAV identifier may be received. The UAV identifier may uniquely identify the UAV from other UAVs. The master set of flight regulations may be based on the unique UAV identity. For instance, the UAV identity may determine which set of geo-fencing device regulations are used, or which combination of geo-fencing device regulations are used. The UAV identity may determine which technique is used to determine the master set. The master set of flight regulations may be based on a UAV type. For instance, the UAV type may determine which set of geo-fencing device regulations are used, or which combination of geo-fencing device regulations are used. The UAV type may determine which technique is used to determine the master set.

In some embodiments, a master set of flight regulations may be prioritized based on a user identity (e.g., user identifier or user type). A user identifier may be received. The user identifier may uniquely identify the user from other users. The master set of flight regulations may be based on the unique user identity. For instance, the user identity may determine which set of geo-fencing device regulations are used, or which combination of geo-fencing device regulations are used. The user identity may determine which technique is used to determine the master set. The master set of flight regulations may be based on a user type. For instance, the user type may determine which set of geo-fencing device regulations are used, or which combination of geo-fencing device regulations are used. The user type may determine which technique is used to determine the master set.

The multiple geo-fencing devices with overlapping regions may be stationary geo-fencing devices. Alternatively, they may include one or more mobile geo-fencing devices. When a mobile geo-fencing device meets a stationary geo-fencing device, an overlapping region may be created. When stationary geo-fencing devices have boundaries that may change over time, overlapping regions may be created or may disappear.

Mobile Geo-Fencing

Geo-fencing devices may be stationary or mobile. In some instances, geo-fencing devices may remain at the same location. In some instances, geo-fencing devices may remain at the same location unless moved by an individual. A substantially stationary geo-fencing device may be placed in an environment and may not be self-propelled. The stationary geo-fencing device may be affixed to or supported by a stationary structure. A user may manually move the stationary geo-fencing device from a first location to a second location.

The geo-fencing device may be mobile. The geo-fencing device may move from location to location. The geo-fencing device may be moved without requiring an individual to move the geo-fencing device. A mobile geo-fencing device may be self-propelled. The mobile geo-fencing device may be affixed to or supported by a movable object, such as a vehicle. The mobile geo-fencing device may have one or more propulsion units thereon that may permit the mobile geo-fencing device to move about the environment. The mobile geo-fencing device may be attached to or supported by movable object that may have one or more propulsion units that may permit the movable object to move about the environment with the mobile geo-fencing device.

Figure 32:
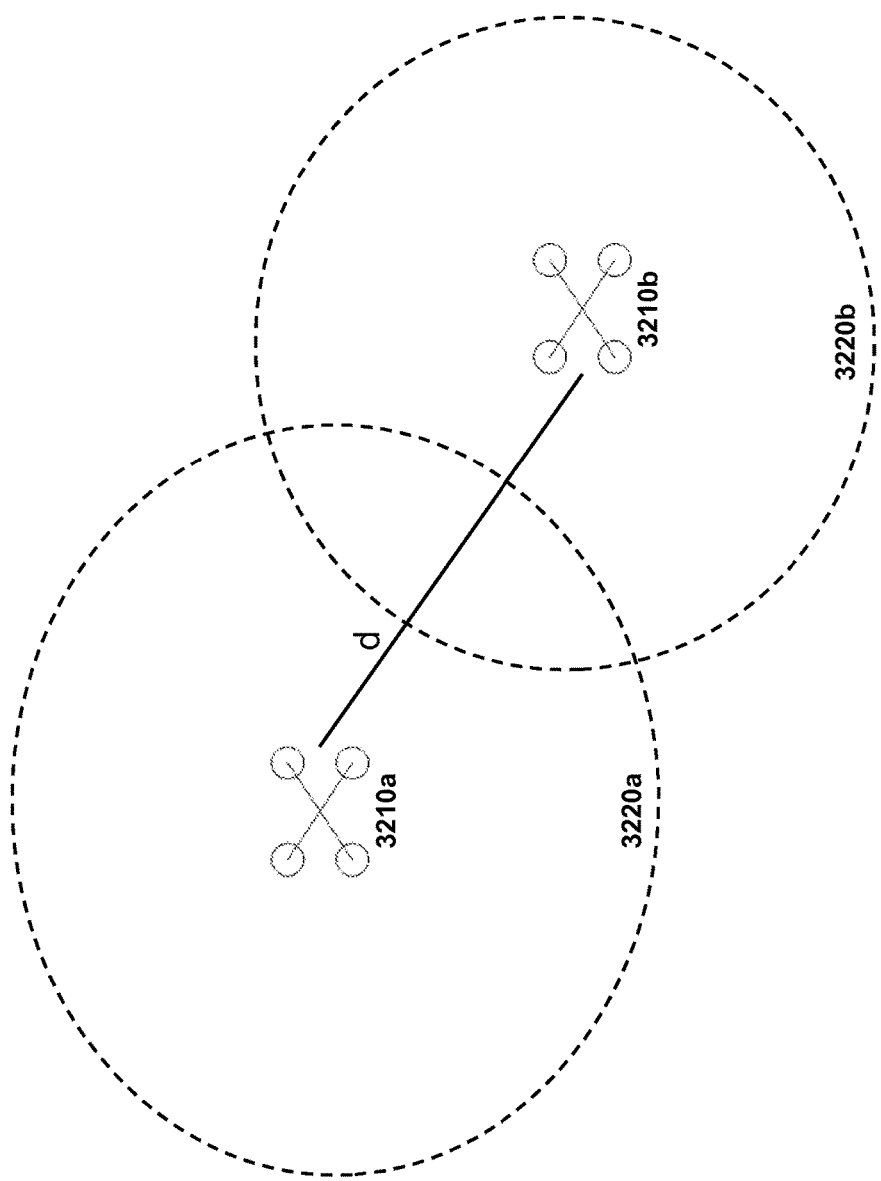
FIG. 32 shows an example of mobile geo-fencing devices in accordance with an embodiment of the invention.

FIG. 32 shows an example of mobile geo-fencing devices in accordance with an embodiment of the invention. The mobile geo-fencing devices may be UAVs 3210a, 3210b. The mobile geo-fencing devices may be aerial vehicles, ground-based vehicles, water-based vehicles, or space-based vehicles, or any combination thereof. UAVs are provided by way of example only, and any description herein of UAVs may apply to any other vehicles or movable objects.

The mobile geo-fencing devices 3210a, 3210b may have locations that may change over time. A distance d may be provided between the mobile geo-fencing devices. The mobile geo-fencing devices may have corresponding boundaries 3220a, 3220b. The boundaries may remain the same or may change over time. The boundaries may change in response to one or more detected conditions, as described elsewhere herein.

The mobile geo-fencing devices may send out a wireless communication. The wireless communication may be a message which may include information about the mobile geo-fencing devices. Identifying information, such as geo-fencing device identifier or geo-fencing device type may be sent. The message may include a message signature. The message may include geo-fencing device key information. The message may include location information for the mobile geo-fencing device. For example, the message may include global coordinates for the geo-fencing device. The mobile geo-fencing device may have a GPS unit or other locator on-board that may provide the location of the mobile geo-fencing device. The message may include information about a flight plan or course for the geo-fencing device. The message may include time information, such as time when the message is sent. The time may be provided in accordance with a clock on-board the mobile geo-fencing device. The message may include flight control information. For example, the message may include information about flight command received and/or flight command being executed.

When the mobile geo-fencing devices are UAVs, the messages may be sent out and received by one another. For example, when a first mobile geo-fencing device 3210a nears a second mobile geo-fencing device 3210b, each may send out a message having any of the information described herein. The UAVs may identity and/or detect one another based on the sent message. Alternatively, other detection or recognition techniques, such as those described elsewhere herein may be used.

The messages from the UAVs may be sent out continuously. For example, the message may be continuously broadcasted. The UAVs may send out the message regardless of whether they have detected one another. The messages from the UAVs may be sent out on a periodic basis (e.g., regular or irregular time intervals), according to a schedule, or in response to a detected event or condition. For example, when the UAVs detect the presence of the other UAVs, the message may be sent. In another example, the UAV may send out the message when instructed to do so by an air control system.

In some instances, the message for a UAV may include a geo-fencing radius. The geo-fencing radius may be related to a maneuverability or mission of a corresponding UAV. For example, if the UAV is more maneuverable, a smaller radius may be provided. When the UAV is less maneuverable a larger radius may be provided.

For example, a first UAV 3210a may broadcast out a first geo-fencing radius (e.g., RA). Optionally, a second UAV 3210b may broadcast out a second geo-fencing radius (e.g., RB). When a second UAV receives the radius from the first UAV, it may calculate the distance d between the first UAV and the second UAV. If said distance d is smaller than RA or smaller than RB, then the second UAV may conduct course correction or on-site hover, meanwhile, it may inform the first UAV of a possibility of collision. In that case, the first UAV may conduct course correction or on-site hover.

Similarly, in the process of flight, the second UAV may simultaneously broadcast out the second geo-fencing radius (e.g., RB). When the first UAV receives the radius from the second UAV, it may calculate the distance d between the first UAV and the second UAV. If said distance d is smaller than RA or smaller than RB, then the first UAV may conduct course correction or on-site hover, meanwhile, it may inform the second UAV of a possibility of collision. In that case, the second UAV may conduct course correction or on-site hover.

When both UAVs broadcast the information, both UAVs may detect the possibility of collision and provide a course correction. In some instances, one of the UAVs may continue on its course while the other UAV takes evasive action to avoid a possible collision. In other instances, both UAVs may take some form of evasive action to avoid possible collision.

In some embodiments, only one of the UAVs may take evasive action while the other does not, when a priority difference exists between the UAVs. For example, a UAV of a higher priority level may not be required to take evasive action, while a UAV of lower priority level may be forced to take evasive action. In another example, a calculation may be made as to which UAV it will be easier to cause to take evasive action. For example, if a first UAV is moving very quickly and a second UAV is moving very slowly, it may be easier to cause the first UAV to course correct if the second UAV can not get out of the way in time. In another example it may cause the second UAV to course correct if it can get out of the way in time and more energy would otherwise be expended in causing the first UAV to take evasive action.

Thus, UAVs may be used as a mobile geo-fencing device, which may aid in UAV collision avoidance. For collision avoidance applications, the UAVs may restrict other UAVs from entering within the boundaries of the UAVs. For example, a first UAV may prevent other UAVs, such as the second UAV, from entering the boundaries of the first UAV. Similarly, the second UAV may prevent the first UA from entering the boundaries of the second UAV. If one of the UAVs enters the boundaries of the other UAVs, a flight response measure may occur that may aid in the prevention of a collision.

A similar collision avoidance application may be provided with stationary mobile geo-fencing devices as well. For example, if a first geo-fencing device is a stationary geo-fencing device installed on a static object, such as a building on the ground, it may be helpful to prevent a second mobile geo-fencing device (e.g., UAV) from running into the static object upon which the first geo-fencing device is installed. Geo-fencing devices may provide virtual 'force fields' that may prevent unauthorized UAVs or other mobile geo-fencing devices from entering within the boundaries.

In other embodiments, other types of restrictions may be provided within the boundaries of the geo-fencing devices. For example, payload operation restrictions may be provided. In one example, both UAVs may be traveling, each with its own corresponding camera that may be capturing images. The first UAV may have a flight restriction that does not permit operation of cameras by other UAVs within the boundaries. The second UAV may have a flight restriction that permits operation of cameras by other UAVs within the boundaries, but does not permit recordation of images. Thus, when the second UAV enters the boundary of the first UAV, the second UAV may have to power off its camera. If it can not power of its camera, it may be forced to take evasive action to avoid the boundary of the first UAV. When the first UAV enters the boundary of the second UAV, it may keep its camera on but must stop recording. Similarly, if it can not stop recording, it may be forced to take evasive action. This type of restriction may be useful if it is desirable for activities of the geo-fencing device to not be recorded or captured on camera. For example, it may be undesirable for other UAVs to capture images of the UAV while the UAV is undergoing a mission. Any other type of restrictions, such as those described elsewhere herein may be used.

Aspects of the invention may include a method of identifying mobile geo-fencing devices, said method comprising: receiving, at a UAV, a signal from a mobile geo-fencing device indicative of (1) a location of the mobile geo-fencing device and (2) one or more geo-fencing boundaries of the mobile geo-fencing device; calculating a distance between the UAV and the mobile geo-fencing device; determining, based on the distance, whether the UAV falls within the one or more geo-fencing boundaries of the mobile geo-fencing device; and operating the UAV under a set of flight regulations provided based on the mobile geo-fencing device when the UAV falls within the one or more geo-fencing boundaries of the mobile geo-fencing device.

A UAV may comprise: a communication unit configured to receive a signal from a mobile geo-fencing device indicative of (1) a location of the mobile geo-fencing device and (2) one or more geo-fencing boundaries of the mobile geo-fencing device; and one or more processors operably coupled to the communication unit, individually or collectively configured to: calculate a distance between the UAV and the mobile geo-fencing device; determine, based on the distance, whether the UAV falls within the one or more geo-fencing boundaries of the mobile geo-fencing device; and generate a signal to effect operation of the UAV under a set of flight regulations provided based on the mobile geo-fencing device when the UAV falls within the one or more geo-fencing boundaries of the mobile geo-fencing device.

The one or more geo-fencing boundaries of the mobile geo-fencing device may be a circular boundary having a first radius with the geo-fencing device at the center. The distance between the UAV and the mobile geo-fencing device may be compared to the first radius. The UAV may also be a geo-fencing device having a second set of one or more geo-fencing boundaries. The second set of one or more geo-fencing boundaries of the UAV may be a circular boundary having a second radius with the UAV at the center. The distance between the UAV and the mobile geo-fencing device may be compared to the second radius. The mobile geo-fencing device may be another UAV.

Figure 33:
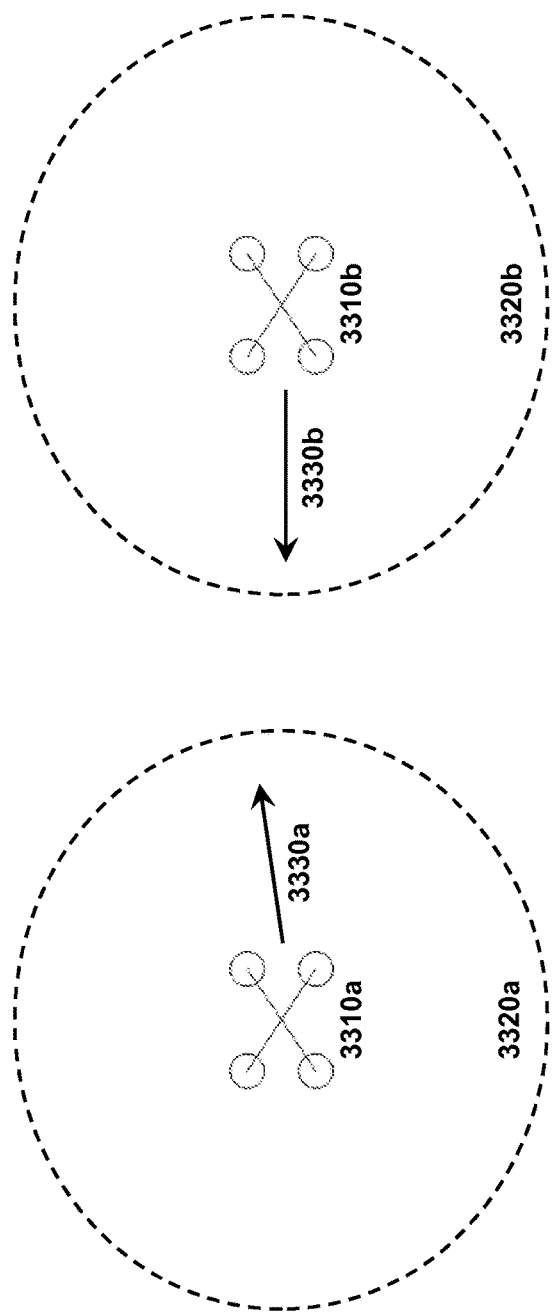
FIG. 33 shows an example of mobile geo-fencing devices approaching one another, in accordance with an embodiment of the invention.

FIG. 33 shows an example of mobile geo-fencing devices approaching one another, in accordance with an embodiment of the invention. A first mobile geo-fencing device 3310a may be approaching a second mobile geo-fencing device 3310b. The second mobile geo-fencing device may be approaching the first mobile geo-fencing device. The geo-fencing devices may be approaching one another. The mobile geo-fencing devices may have corresponding sets of boundaries 3320a, 3320b. The mobile geo-fencing devices may be moving along corresponding trajectories 3330a, 3330b.

In some embodiments, the trajectories and/or boundaries of the mobile geo-fencing devices may be analyzed to determine if the mobile geo-fencing devices will likely cross into one another's boundaries. In some instances, the mobile geo-fencing devices may be moving quickly, so it may be desirable to make a determination whether the devices are on course for a collision early on. The trajectories may be analyzed to predict the future locations of the mobile geo-fencing devices. The boundaries may be analyzed to determine the berth that the mobile geo-fencing devices will need to have in order to avoid one another. For example, larger boundaries may result in the mobile geo-fencing devices needing to keep a wider berth of one another. Smaller boundaries may result in the mobile geo-fencing devices being permitted to keep a smaller berth of one another.

In some instances, the trajectories may be provided so that the mobile geo-fencing devices are directly approaching one another. Alternatively, one or more of the trajectories may be off. Velocity and/or acceleration of the mobile geo-fencing devices may also be considered in determining whether to take evasive action. Also, a determination of whether any mobile geo-fencing device needs to take evasive action, which mobile geo-fencing device will need to take evasive action, or whether both mobile geo-fencing devices will need to take evasive action. Similarly, the type of evasive action may be determined (whether to change course, slow down, speed up, hover, or change any other geo-fencing device operational parameter).

Figure 34:
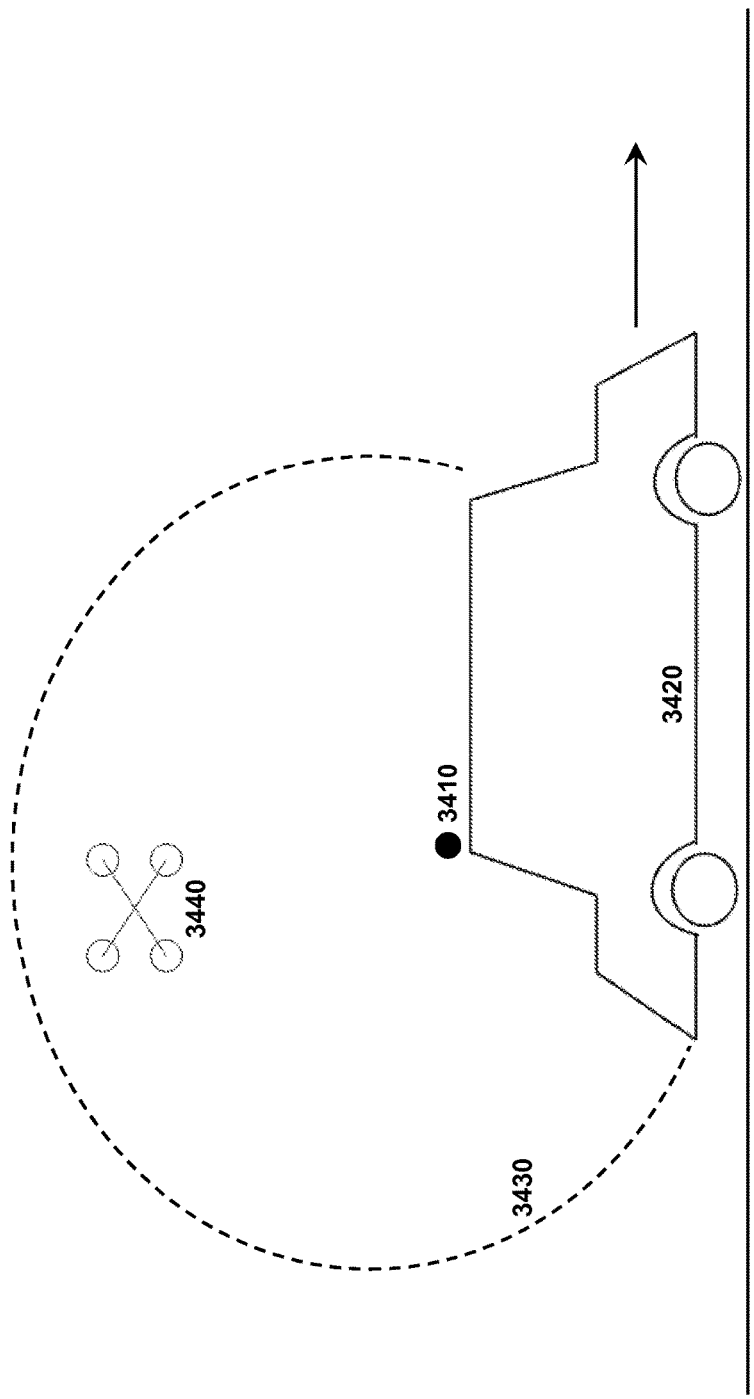
FIG. 34 shows another example of a mobile geo-fencing device in accordance with an embodiment of the invention.

FIG. 34 shows another example of a mobile geo-fencing device in accordance with an embodiment of the invention. A mobile geo-fencing device 3410 may be a movable object, or may be affixed to or supported by the movable object 3420. The movable object may be a vehicle, such as a ground-based vehicle, water-based vehicle, air-based vehicle, or space-based vehicle. The mobile geo-fencing device may have a boundary 3430. The boundary may move with the mobile geo-fencing device. A UAV 3440 may be in a proximity of the geo-fencing device.

The geo-fencing device 3410 may have any associated set of flight regulations for the UAV 3440. In one example, the flight regulations may require that the UAV remain within the geo-fencing boundaries 3430 of the mobile geo-fencing device. The UAV may fly freely within the airspace bounded by the geo-fencing boundary. As the mobile geo-fencing device moves, the boundaries may move with the mobile geo-fencing device. The UAV may then also move with the mobile geo-fencing device. This restriction may be useful in scenarios where it may be desirable for the UAV to follow a movable object. For example, the movable object may be a ground-based vehicle, and it may be desired that the UAV flies above the ground-based vehicle and capture images of the surrounding environment, which may be displayed on the ground-based vehicle. The UAV may remain within proximity of the ground-based vehicle without requiring that a user actively operate the UAV. The UAV may remain within the boundary that moves with the vehicle, and may thus follow the vehicle.

In another example, the restrictions may be to keep the UAV outside of the boundaries. The restriction may prevent a UAV from running into or colliding with the ground-based vehicle. Even if a UAV is manually being operated by a user, if the user provides instructions that would cause the UAV to run into the vehicle, the UAV may take a flight response measure that may prevent a UAV from crashing into the vehicle. This may be use for inexperienced users of the UAV who may otherwise inadvertently cause a crash, or malicious users of the UAV who may be trying to intentionally crash into a vehicle. The mobile geo-fencing device may protect objects from malicious users who would otherwise crash the UAV into the vicinity of the mobile geo-fencing device.

An additional example may be for a payload restriction. For example, the UAV may not be permitted to capture images of the environment while the UAV is within the boundary of the mobile geo-fencing device. Even while the mobile geo-fencing device moves around within the environment, the UAV may not be able to capture images of the mobile geo-fencing device and the movable object. This may be useful if it is desirable to prevent UAVs from collecting data, such as image data, about the mobile geo-fencing device or the movable object.

In another example, the restrictions may prevent wireless communications of the UAV while the UAV is within the boundaries. In some examples, the restrictions may permit wireless communication but may prevent communications that may interference with a function of the movable object and/or the geo-fencing device. While the mobile geo-fencing device is moving, the UAV may not be able to use wireless communications that may interfere with the wireless communications of the geo-fencing device and/or the movable object. This may be useful to prevent random UAVs coming into the vicinity of the movable object and interfering with a communication of the movable object and/or the mobile geo-fencing device.

Any other type of restriction, as described elsewhere herein, may be applied to a mobile geo-fencing device.

User Interface

Information about one or more geo-fencing devices may be shown on a display device. The device may be a user terminal viewable by the user. The user terminal may also function as a remote controller that may send one or more operational commands to a UAV. A remote controller may be configured to accept user inputs that effect operation of the UAV. Examples of operations of the UAV that may be controlled by the user may include flight, payload operation, payload positioning, carrier operation, sensor operation, wireless communication, navigation, power usage, item delivery, or any other operation of the UAV. For instance, a user may control flight of the UAV via the remote controller. The user terminal may receive data from the UAV. The UAV may capture data using one or more sensors, such as a camera. Images from the camera may be provided to the user terminal, or data from any other sensor may be provided to the user terminal. The user terminal may also function as a remote controller that may send one or more commands to a geo-fencing device or alter the function of a geo-fencing device. The device may be a display device on a geo-fencing device itself. The geo-fencing device may show information about the geo-fencing device and any surrounding geo-fencing devices. The device may be a display device of an operator (e.g., administrator) of an air control system. The device may be a display device of a jurisdictional entity user (e.g., government worker, employee of a government agency) and/or emergency services user (e.g., police officer, etc.). The device may be a display device that may be seen by any other individual involved in a UAV system.

The display device may include a screen or other type of display. The screen may be an LCD screen, CRT screen, plasma screen, LED screen, touchscreen, and/or may use any other technique to display information known or displayed later in the art.

Figure 35:
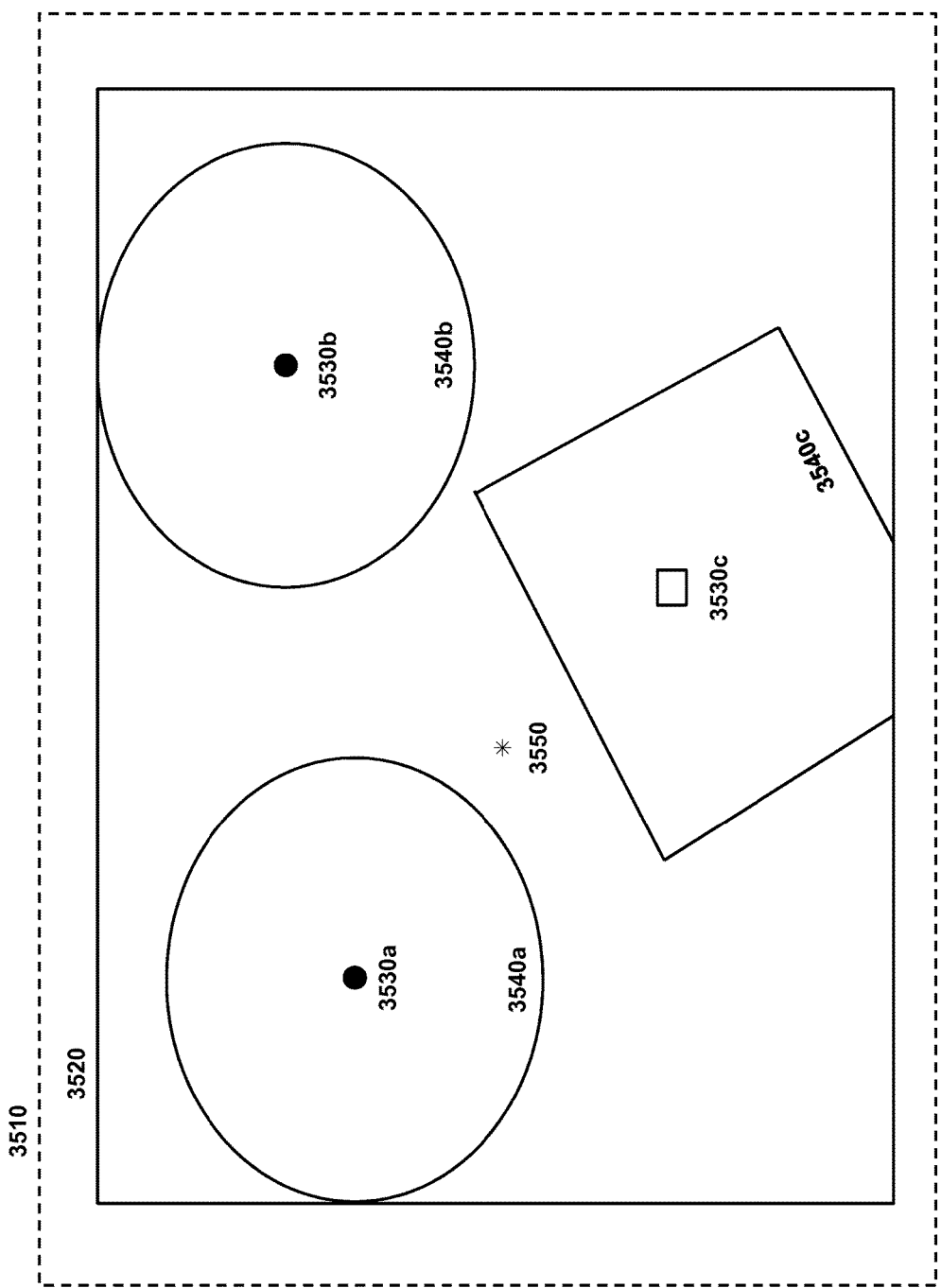
FIG. 35 shows an example of a user interface showing information about one or more geo-fencing devices, in accordance with an embodiment of the invention.

FIG. 35 shows an example of a user interface showing information about one or more geo-fencing devices, in accordance with an embodiment of the invention. A display device 3510 may have a screen or other portion that may show a user interface 3520 which may display information about one or more geo-fencing devices. In one example, a map of the geo-fencing devices 3530a, 3530b, 3530c may be displayed. The user interface may show the location of the geo-fencing devices relative to one another. The user interface may show corresponding boundaries 3540a, 3540b, 3540c for the geo-fencing devices. A location of a UAV 3550 relative to the geo-fencing devices may be displayed.

The display device may be a remote device may be used to permit a user to view geo-fencing device information. The information about the locations of the geo-fencing devices may be gathered from the one or more geo-fencing devices. The remote device may receive information directly from one or more geo-fencing devices. For example, geo-fencing devices may transmit a signal about the location of the geo-fencing device. Alternatively, the information from the one or more geo-fencing devices may be provided indirectly to the display device. In one example, an air control system, other part of an authentication system, or any other system may collect information about the geo-fencing devices. For example, an air control system may receive information about the location of the geo-fencing devices and may convey the information about the geo-fencing devices to the remote device.

The geo-fencing devices may transmit information about the geo-fencing boundaries to the remote device, or to another device or system, such as an air control system. An air control system may receive information about the geo-fencing boundaries from the geo-fencing devices and may transmit the information to the remote device. In other embodiments, the geo-fencing devices may only transmit the location information, and an air control system or other system may supply information about the boundaries. For example, a geo-fencing device may transmit a geo-fencing device location to the air control system, and the air control system may determine the boundaries for the geo-fencing device. The air control device may then send the information about the boundaries to the remote device, along with the location information. In some embodiments, an air control system or other system may generate the boundaries based on the location of the geo-fencing device. The location of the boundaries may be determined in relation to the location of the geo-fencing device. The air control system may take other factors into account when determining the geo-fencing boundaries, such as information about UAVs and/or users in the proximity of the geo-fencing device, environmental conditions, timing, and/or any other factors.

In some embodiments, the remote device may be a remote controller of a UAV. The UAV that is being controlled by the remote device may be within a proximity of one or more geo-fencing devices. The air control system or geo-fencing device may detect that the UAV is within a proximity of the geo-fencing device. The UAV may make a determination that it is within the proximity of the geo-fencing device. The geo-fencing boundaries may be generated based on information about the UAV or the user operating the UAV. The geo-fencing boundaries may be generated at the air control system, geo-fencing device, UAV, and/or remote controller. The remote device may display information about the boundaries of the geo-fencing devices, which may or may not be specifically tailored to the UAV.

In one example, the boundaries shown, the boundaries may be tailored to a remote device viewing the boundaries.

The boundaries may be tailored based on information about a UAV (e.g., UAV identifier, UAV type, activities of the UAV), which may be in communication with the remote device. One or more operations of the UAV may be controlled by commands from the remote device. The UAV may send information to the remote device about data collected by the UAV. For example, images captured by an image capturing device on-board the UAV may be sent down to the remote device.

When the boundaries are tailored to the remote device, other remote devices may or may not see the same boundaries as the remote device. For example, a first remote device may be in communication with a first UAV, which may be in the proximity of one or more geo-fencing devices. The first remote device may display information about the locations and/or boundaries of the geo-fencing devices. A location of the first UAV may be displayed in relation to the locations and/or boundaries of the geo-fencing devices. A second remote device may be in communication with a second UAV, which may be in the proximity of one or more geo-fencing devices. The second remote device may display information about the locations and/or boundaries of the geo-fencing devices. A location of the second UAV may be displayed in relation to the locations and/or boundaries of the geo-fencing devices. In some instances, information about the locations of the geo-fencing devices may be consistent between the first remote device and the second remote device. For instance, for the same geo-fencing device displayed on both the first and second remote devices, the same location may be provided. Information about the boundaries for the geo-fencing devices may or may not be consistent between the first remote device and the second remote device. For instance, the boundaries may show up as the same on the first and second remote devices. Alternatively, the boundaries may show up as different on the first and second remote devices. In some instances, the boundaries of the geo-fencing devices may change depending on an identity of a UAV. The boundaries of the geo-fencing device may change depending on a UAV type. Thus, the first remote device and the second remote device may show different boundaries for the same geo-fencing device. All of the geo-fencing devices, some of the geo-fencing devices, one of the geo-fencing devices, or none of the geo-fencing devices may show different boundaries between the first remote device and the second remote device.

The first remote device may show a location of the first UAV and a second remote device may show a location of the second UAV. The locations of the first and second UAVs may be different from one another. The first remote may or may not show a location of the second UAV. The second remote may or may not show the location of the first UAV. A remote device may show a location of a UAV that the remote device may correspond to. The remote device may or may not show locations of other UAVs.

An aspect of the invention is directed to a method of displaying geo-fencing information for a UAV, said method comprising: receiving geo-fencing device data comprising (1) a location of at least one geo-fencing device and (2) one or more geo-fencing boundaries of the at least one geo-fencing device; providing a display configured to display information to a user; and showing, on the display, a map with (1) the location of the at least one geo-fencing device and (2) the one or more geo-fencing boundaries of the at least one geo-fencing device. A display device may comprise: a communication unit configured to receive geo-fencing device data comprising (1) a location of at least one geo-fencing device and (2) one or more geo-fencing boundaries of the at least one geo-fencing device; a display configured to display information to the user, wherein the display shows a map with (1) the location of the at least one geo-fencing device and (2) the one or more geo-fencing boundaries of the at least one geo-fencing device.

Locations of objects shown on the remote display device may be updated in real-time. For example, a location of a UAV shown on the remote device may be updated in real-time. The location of the UAV may be shown in relation to at least one of the geo-fencing devices. The location of the UAV may be updated continuously, periodically (e.g., regular or irregular time intervals), in response to a schedule, or in response to a detected event or condition. In some instances, the location of a UAV on a screen may be updated within less than 15 minutes, 10 minutes, 5 minutes, 3 minutes, 2 minutes, 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of the UAV movement.

In some embodiments, the geo-fencing devices may be stationary. The locations of the geo-fencing devices need not be updated, or may be updated continuously, periodically, in accordance with a schedule, or in response to a detected event or condition. In some instances, a user may move a stationary geo-fencing device. For example, a user may pick up a geo-fencing device, and move it to another location. The updated location may be displayed on the remote device.

Alternatively, the geo-fencing devices may be mobile. The location of the geo-fencing device may change. A location of one or more geo-fencing devices shown on the remote display may be updated in real-time. The location of the one or more geo-fencing devices may be shown relative to one another and/or other features on a map. The location of the geo-fencing devices may be updated continuously, periodically (e.g., regular or irregular time intervals), in response to a schedule, or in response to a detected event or condition. In some instances, the location of a geo-fencing device on a screen may be updated within less than 15 minutes, 10 minutes, 5 minutes, 3 minutes, 2 minutes, 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of the geo-fencing device movement.

The boundaries of the geo-fencing devices may be substantially static. Display of substantially static geo-fencing device boundaries need not be updated. Alternatively, the boundaries may be updated continuously, periodically, in accordance with a schedule, or in response to a detected event or condition.

The boundaries of the geo-fencing devices may optionally change over time. A location of the boundaries shown on the remote display may be updated in real-time. The location of the one or more geo-fencing device boundaries may be shown relative to one another and/or other features on a map. The geo-fencing device boundaries may be updated continuously, periodically (e.g., regular or irregular time intervals), in response to a schedule, or in response to a detected event or condition. In some instances, the geo-fencing device boundaries shown on a screen may be updated within less than 15 minutes, 10 minutes, 5 minutes, 3 minutes, 2 minutes, 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of the geo-fencing device boundary change. The geo-fencing device boundaries may change in accordance with any number of factors, such as those described elsewhere herein.

For instance, the environmental conditions may cause a change in the boundaries. Other factors, such as UAV information, user information, or timing, may cause the change in the boundaries.

The user interface may optionally show a visual indicator of a type of flight regulation imposed by the at least one geo-fencing device. Different categories of flight regulations may be imposed by the geo-fencing device. Examples of categories may include, but are not limited to flight regulation, payload regulation, communication regulation, power usage/management regulation, regulations about carried items, navigation regulations, sensor regulation, or any other regulation. The visual indicators may visually distinguish different types or categories of flight regulation. Examples of types of visual indicators may include, but may not be limited to words, numbers, symbols, icons, size, images, colors, patterns, highlighting, or any other visual indicator that may help distinguish different types of flight regulations. For example, different colors may be provided for different types of flight regulations imposed by the at least one geo-fencing device. For example, a first geo-fencing device or boundary may have a first color (e.g., red) indicative of a first type of flight regulation (e.g., altitude ceiling), while a second geo-fencing device or boundary may have a second color (e.g., green) indicative of a second type of flight regulation (e.g., payload usage). In some instances, a single geo-fencing device may have multiple types of flight regulations. The visual indicators may be indicative of the multiple types covered (e.g., may show a red line and a green line on the boundary to indicate that both an altitude ceiling and payload usage restriction are in place). In some embodiments, a region within the boundaries to which the flight regulations apply may be shaded or may have a color indicative of flight regulation type. In some instances, if the regulations apply to one or more restrictions outside the boundaries, the area outside the boundaries may be shaded or colored. For example, a UAV may only be permitted to operate a payload within a set of boundaries of a geo-fencing device. Then the area outside the boundaries may be shaded indicating that the payload usage is restricted outside the boundaries of the geo-fencing device. Alternatively, the region within the boundaries may be shaded as indicating that the type of regulation is within the boundary and only permitting the operation within the boundary.

In some embodiments, a UAV may have a flight trajectory or direction. The trajectory or direction of the UAV may be shown on the user interface. For example, an arrow or vector may be pointed in the direction that the UAV is traveling. The visual indicator of UAV direction or trajectory may or may not be indicative of UAV speed or other movement factors. For example, the indicator may be able to visually distinguish whether the UAV is traveling at a higher velocity or lower velocity. In one example, a numerical velocity value may be displayed. In another example, a longer arrow or vector may correspond with a greater velocity than a shorter arrow or vector.

Information pertaining to a UAV flight path may be displayed on the user interface. Optionally, information about the past UAV flight path may be displayed. For example a dotted line or other indicator of a path may show where the UAV has already traveled. A map may display a line or other indicator of the path that the UAV has already traversed. In some instances, a future flight path may be displayed on a user interface. In some instances, a UAV may have a predetermined or semi-predetermined flight plan. The flight plan may include a projected future flight path. The projected flight path may be displayed on the user interface. For example, a line or other indicator of a path may be shown where the UAV is projected to travel. The future flight path may be altered or updated in real-time. The future flight path may be updated and/or displayed continuously, periodically (e.g., at regular or irregular intervals), in accordance with a schedule. In some instances, the future flight path shown on a screen may be updated within less than 15 minutes, 10 minutes, 5 minutes, 3 minutes, 2 minutes, 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of an alteration to the future flight path.

A priority level for the geo-fencing devices may be displayed on the user interface. A visual indicator may permit visual differentiation between different levels of priorities for the geo-fencing devices. For example, a size or shape of an icon may be indicative of a priority level for the geo-fencing device. A color of an icon may be indicative of a priority level for the geo-fencing device. A label, such as a word or numerical value may be provided by the geo-fencing device which may be indicative of the priority level of the geo-fencing device. In some instances, the priority level may normally not be visually displayed. However, when a user selects the geo-fencing device or brings a mouse over a geo-fencing device, the information may be displayed.

The remote display device may be configured to receive a user input. In one example, the display device may have a touchscreen that may register a user input when the user touches the screen, or swipes the screen. The device may have any other type user interactive component, such as a button, mouse, joystick, trackball, touchpad, pen, inertial sensors, image capturing device, motion capture device, or microphone.

The user input may affect operation of a UAV or a geo-fencing device. Examples of UAV operations that may be affected by a user input may include UAV powering on or off, UAV flight path, UAV take-off, UAV landing, UAV destination or waypoint, UAV flight mode (e.g., autonomous, semi-autonomous or manual; or along a predetermined path, semi-predetermined path, or real-time path).

The user input may affect operation of a geo-fencing device. The user input may affect location of the geo-fencing device and/or a boundary of the geo-fencing device. The user input may affect a set of flight regulations associated with the geo-fencing device. For instance, the user input may affect one or more restrictions imposed by the geo-fencing device. The user input may affect a priority level of the geo-fencing device.

An aspect of the invention is directed to a method of controlling a geo-fencing device, said method comprising: receiving data pertaining to at least one geo-fencing device; providing a display configured to show geo-fencing device information to a user based on the received data pertaining to the at least one geo-fencing device; receiving a user input that affects operation of the at least one geo-fencing device; and conveying, with aid of a transmitter, one or more signal that affects the operation of the at least one geo-fencing device in accordance with the user input. A display device may comprise: a receiver configured to receive data pertaining to at least one geo-fencing device; a display configured to show geo-fencing device information to a user based on the received data pertaining to the at least one geo-fencing device; one or more processors individually or collectively configured to receive a user input that affects operation of the at least one geo-fencing device; and a transmitter configured to convey one or more signal that affects the operation of the at least one geo-fencing device in accordance with the user input.

Figure 43:
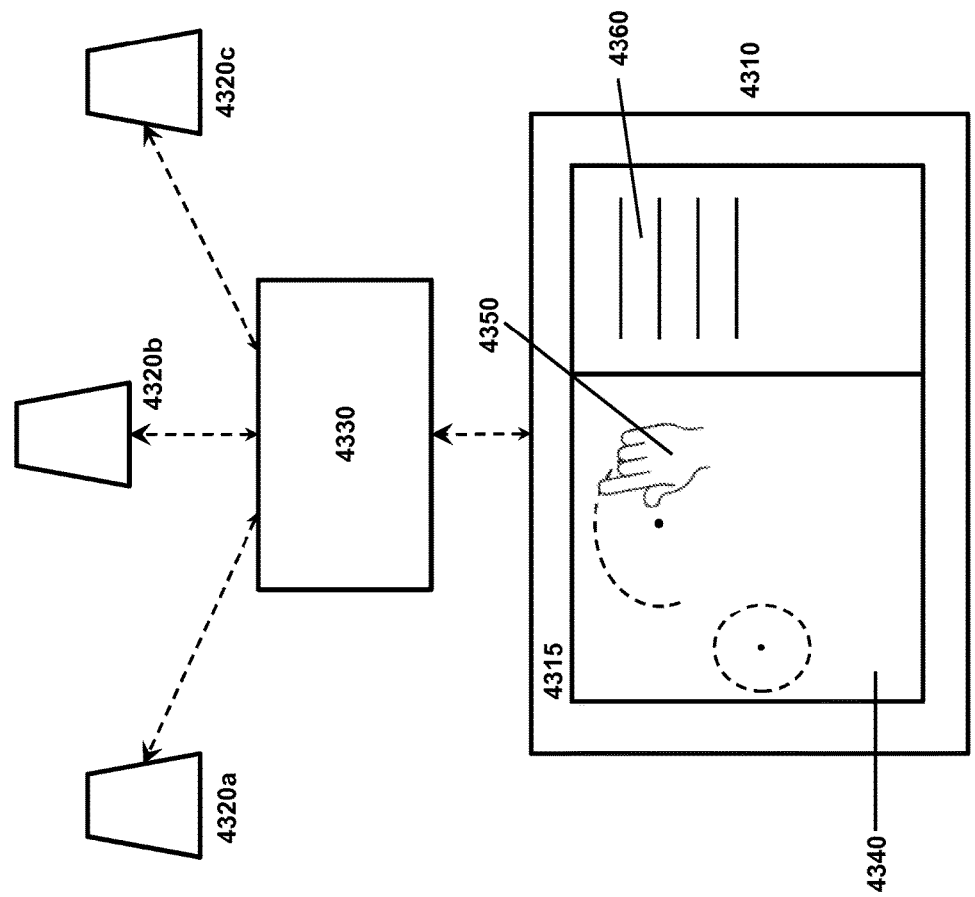

FIG. 43 provides an example of a device that may accept a user input to control one or more geo-fencing devices, in accordance with an embodiment of the invention. A system may comprise one or more remote device 4310. The system may also comprise one or more geo-fencing devices 4320a, 4320b, 4320c. The geo-fencing devices may optionally communicate with an air control system 4330, another part of an authentication system, or any other system or device. Alternatively, the geo-fencing devices may communicate directly with the remote device. The remote device may comprise a user interface on a display 4315. The user may interface may show information pertaining to the geo-fencing devices. In one example, a map 4340 may show information location information pertaining to the geo-fencing devices. Optionally a list format, chart format, or any other format may be provided of the invention. In some embodiments, one or more additional regions 4360 may be provided. The regions may include tools or options pertaining to control of the one or more geo-fencing devices. In some instances, a user may interact directly with the user interface 4350 to control the geo-fencing devices.

In some embodiments, one-way or two-way communications may be provided between geo-fencing devices and an air control system, or other system. For instance, the geo-fencing devices may provide location information or other information about the geo-fencing devices to the air control system. The air control system may relay one or more instructions to the geo-fencing devices (e.g., about whether to change location, change boundaries, change priorities, change flight restrictions, etc.). The air control system, or other system, may have one-way or two-way communications with the remote display device. Information about the geo-fencing devices (e.g., geo-fencing device location, boundary) may be transmitted from the air control system to the remote display device. In some embodiments, information about one or more user input to the display device may be provided to the air control system. For instance, the user may provide an input to affect the operation of the geo-fencing devices, which may be transmitted to the air control system, which may in turn transmit the instructions to the corresponding geo-fencing devices. In other embodiments, directly communications may be provided between the geo-fencing devices and the remote display device. The geo-fencing devices may directly provide information about the geo-fencing devices, at least some of which may be displayed on the remote display device. The remote display device may receive a user input that affects the operation of the at least one geo-fencing devices, and the instructions to affect the operation of the at least one geo-fencing device may be conveyed to the corresponding geo-fencing device.

The user input may affect operation of a geo-fencing device. The user input may affect location of the geo-fencing device. In some embodiments, a geo-fencing device may be a mobile geo-fencing device. The user may provide an input that may affect movement of the geo-fencing device. For instance, the user input may indicate that the mobile geo-fencing device is to move to a new location. The user input may affect a geo-fencing device that is currently not moving. Alternatively, the user input may affect a geo-fencing device while the geo-fencing device is in motion. The user input may be indicative of a destination or waypoint for the geo-fencing device. For example, a user may type out coordinates for a destination or waypoint for the geo-fencing device. In another example, a user may click and drag a geo-fencing device from a current location to a desired destination on a map. In another example, a user may use a fingerswipe to pick up and move the geo-fencing device to a new desired location the map. The user input may be indicative of a path for the geo-fencing device. A user may trace out a desired path for the geo-fencing device with the user's finger. The user may enter one or more parameters for the path of the geo-fencing device (e.g., specify that the geo-fencing device should take a shortest path possible to a desired destination etc., specify whether there are any constraints to the path, such as altitude restrictions, no fly zones, land or water-based infrastructure that the geo-fencing device should follow). The user input may set one or more parameters for movement of the geo-fencing device. For example, the user input may be indicative of translational velocity, angular velocity, translational acceleration, or angular acceleration of the geo-fencing device. A maximum or minimum velocity or acceleration of any form may be provided.

The user input may affect a boundary of the geo-fencing device. One or more geo-fencing boundaries of at least one geo-fencing device may be affected by a user input. The user input may affect size and/or shape of the geo-fencing device boundary. In one example, a user may typo out a set of coordinates and/or geometric parameters (e.g., radius) for the desired boundaries of the geo-fencing device. The user may trace out a desired geo-fencing device using the user's finger 4350 or a pointer. The traced out boundary may be free-handed or may use one or more shape templates. The user may select an existing boundary and drag and drop the boundary to alter the boundary's size. The user may drag and drop a portion of the boundary to stretch the boundary or alter the boundary's shape. The updated geo-fencing boundary information may be shown in real-time. For example, updated boundary information may be shown on the display based on the user input. In some instances, each geo-fencing device may have a default boundary. Alternatively, initially, a boundary may be undefined. A user may be able to alter a default boundary or enter in a new boundary for an undefined boundary.

The user input may affect a set of flight regulations associated with the geo-fencing device. For instance, the user input may affect one or more restrictions imposed by the geo-fencing device. In some instances, the user may interact with the map 4340 to enter or alter a flight restriction. In other instances, the user may interact with one or more other regions 4360 to enter or alter a flight restriction. A user may select a geo-fencing device for which the user wishes to enter or alter a flight restriction. In some instances, a user may select one or more flight restrictions from a plurality of available flight restrictions, for the selected geo-fencing device. The user may enter one or more values that may be specified for the flight restriction. For example, a user may select that the flight restriction for a geo-fencing device may include an altitude floor and a maximum velocity. The user may then enter a value for the altitude floor and a value for the maximum velocity. In other instances, the users may specify or generate the flight restrictions without selecting from pre-existing options. In some instances, each geo-fencing device may have a default associated flight restriction. Alternatively, initially, the set of flight restrictions may be undefined. A user may be able to alter a default set of flight restrictions or enter in new flight restrictions for an undefined device. Thus, a user may be able to program one or more sets of flight regulations for the geo-fencing device from a remote location. A user may be able to update a set of flight regulations for the geo-fencing device from a remote location. The user may be able to program in different sets of flight regulations for the geo-fencing device for different conditions. For example, a user may be able to specify that a first set of flight regulations are provided to UAVs of a first type while a second set of flight regulations are provided to UAVs of a second type when they encounter the geo-fencing device. The user may be able to program in that a first set of flight regulations will provided when a UAV encounters the geo-fencing device under a first set of environmental conditions, while a second set of flight regulations will be provided to a UAV that encounters the geo-fencing device under a second set of environmental conditions. A user may also program that a first set of flight regulations will provided when a UAV encounters the geo-fencing device at a first time, while a second set of flight regulations will be provided to a UAV that encounters the geo-fencing device at a second time. A user may be able to program any type of condition or combination of conditions that may yield various flight regulations.

The user input may affect a priority level of the geo-fencing device. For example, the user may specify that the geo-fencing device has a high priority, moderate priority, or low priority. The user may specify a priority level value for the device. Any other type of priority, as described elsewhere herein may be defined by the user. In some instances, the geo-fencing device may have a default priority level. Alternatively, initially, the priority level of the geo-fencing device may be undefined. A user may be able to alter a default priority level, or enter a new priority level for an undefined device. A user may be able to specify any available priority level for the geo-fencing device. Alternatively, a user may have limited flexibility or freedom to enter the priority level of the geo-fencing device. For instance, certain levels of priorities may be reserved for official government or emergency services geo-fencing devices. Regular private users may or may not be able to achieve the highest priority levels for private geo-fencing devices. In some instances, beyond a threshold priority, an air control system operator administrator may need to approve a higher priority. For instance, a private user may request a high level of priority. The air control system may approve or reject the request for the high level of priority. In some instances, a government entity, such as a government agency, may approve or reject the request for the high level of priority.

Thus, a user may advantageously provide input that may control operation of one or more geo-fencing devices. The user may provide input via a remote device. Thus, the user need not physically be in the geo-fencing device's presence to control the geo-fencing device. In some instances, the users may choose to be in the proximity of the geo-fencing device, or may choose to be away from the geo-fencing device. A user controlling operation of the geo-fencing device may be an owner or operator of the geo-fencing device. An individual operating a geo-fencing device may be separate from an individual controlling a UAV that may encounter the geo-fencing device, or may be the same user.

In other embodiments, the user may interact directly with the geo-fencing device. The user may provide a manual input to the geo-fencing device that may control operations of the geo-fencing device. The user input may also control operations of other geo-fencing devices in the vicinity of the geo-fencing device. For instance, a set of flight regulations for the geo-fencing device may be manually updated using a user interface on-board the geo-fencing device. Other operational features of the geo-fencing device, such as boundaries of the geo-fencing device, or priority level of the geo-fencing device may be updated manually using a user interface on-board the geo-fencing device.

Any functions described elsewhere herein for controlling operation of the geo-fencing device (e.g., via a remote controller) may also be applied to a user interface on-board the geo-fencing device. Any description herein of data shown by a user interface may also be applied to a user interface on-board the geo-fencing device. In one example, the geo-fencing device may have a screen and/or buttons that a user may interact with to control operation of the geo-fencing device and/or view local data.

Geo-Fencing Device Software Application

A user may have a device that performs various functions. The device may already be in existence in the user's possession. For instance, the device may be a computer (e.g., personal computer, laptop computer, server), mobile device (e.g., smartphone, cellular phone, tablet, personal digital assistant), or any other type of device. The device may be a network device capable of communicating over a network. The device comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein. For instance, the user may use the device to communicate (e.g., make phone calls, send or receive images, videos, or texts, send or receive emails). The device may have a browser that may permit a user to access the Internet or browse the web.

A device may become a geo-fencing device when the device provides a reference point for a set of boundaries associated with a set of flight regulations. In some instances, the device may be a geo-fencing device when a geo-fencing software or application is operating on the device that may provide the location of the device as a reference point for a set of boundaries associated with a set of flight regulations. The device may have a locator that may provide the location of the geo-fencing device. For instance, locations of smartphones, laptops, and/or tablets or other mobile devices may be determined. The device may be a relatively mobile device (e.g., smartphone, cell phone, tablet, personal digital assistant, laptop). Any description herein of a mobile device may apply to any other type of device.

A geo-fencing application may be downloaded to a mobile device. The mobile device may make a request for a mobile device from a system. In some instances, the system may be an air control system, another component of an authentication system, or any other system. The system may provide the mobile application to the mobile device. The geo-fencing application may collect the location of the mobile device from the locator of the mobile device. For example, if a smartphone already has a locator, the geo-fencing application may use the information from the smartphone locator to determine the location of the geo-fencing device. The application may provide the air control system (or any other system) with a location of the mobile device. The application may optionally provide a UAV with the location of the geo-fencing device. The mobile device may be converted to a geo-fencing device (which may have any of the qualities or characteristics of geo-fencing devices described elsewhere herein) by the geo-fencing application. In some instances, the geo-fencing application will be activated or running to have the mobile device function as the geo-fencing device.

Optionally, when the geo-fencing application is downloaded, the mobile device may be registered with a geo-fencing system. For instance, the mobile device may be registered as a geo-fencing device with an authentication system. The user may be able to specify a username and/or password, or other information that may be used to later authenticate the geo-fencing device or a user of the geo-fencing device. The mobile device may have a unique identifier that may distinguish the mobile device from other devices. The unique identifier may be received via the mobile application and/or generated by the mobile application. Any authentication procedures, as described elsewhere herein may be provided.

In some embodiments, a system may receive the location of the geo-fencing device. The system may be an air control system, or any other system. The system may be owned or operated by the same entity that may provide the geo-fencing mobile application to the mobile device. Alternatively, the system may be owned or operated by a different entity from the entity that may provide the geo-fencing application to the mobile device. Any description herein of an air control system may also apply to any other entity described elsewhere herein. The location of the mobile device may be known and may be used to determine boundaries that may be associated with a set of flight regulations. The location of the mobile device may provide a reference for the set of flight regulations. The location of the boundaries may use the location of the mobile device as a reference. For instance, if the mobile device were to move, the location of the boundaries may be updated accordingly to move with the mobile device. The locations of the mobile devices may be leveraged to provide a reference point as a geo-fencing device.

The set of flight regulations may be generated on-board the air control system. The set of flight regulations may be generated based on the location from the mobile device provided via the geo-fencing mobile application. The set of flight regulations may be generated when a UAV enters within a predetermined range of the mobile device. In some embodiments, the air control system may receive the location of the UAV. The location of the UAV may be compared with the location of the mobile device to determine whether the UAV has entered within the predetermined range. The set of flight regulations may be generated considering any factors or conditions, as described elsewhere herein (e.g., UAV information, user information, environmental conditions, timing). The mobile device may provide information that may function as a factor or condition, or other external data sources may be provided. For instance information collected using other mobile applications of the mobile device may be leveraged to determine the set of flight regulations. For example, the mobile device may have a weather app that may be operational and collecting information about weather local to the mobile device. Such information may be provided to determine a local environmental condition of the mobile device. In another example, the mobile device may have a local clock that may determine the time. Similarly, the mobile device may have access to a user's calendar. The mobile device user's calendar may be considered when determining the set of flight regulations.

The set of flight regulations may then be transmitted to a UAV. The set of flight regulations may be transmitted to the geo-fencing device which may then transmit the set of flight regulations to the UAV. The UAV may operate in accordance with the set of flight regulations.

In some embodiments, the set of flight regulations may be generated on-board the mobile device. The set of flight regulations may be generated leveraging information from the mobile device (e.g., location of the mobile device, information from other mobile applications of the mobile device). The mobile device may receive information when a UAV is within a predetermined range of the mobile device. For instance, the mobile device may communicate with the UAV and receive a location of the UAV. The mobile device may compare the location of the UAV with the location of the mobile device to determine when the UAV is within the predetermined range of the mobile device. In other instances, the mobile device may receive the UAV location from an air control system. The air control system may track locations of various UAVs and send information to the mobile device. The air control system may also send other information pertaining to the UAV or user of the UAV.

The mobile device may or may not send the set of flight regulations to the air control system. In some instances, the mobile device may send the set of flight regulations directly to the UAV. The mobile device may communicate with the air control system and/or the UAV via the mobile application. Any combinations of types of communications, as described elsewhere herein for geo-fencing devices, may be applied as well, when the geo-fencing device is a mobile device with a mobile application as described.

The mobile application may also show a user interface to a user of the device. The user may interact with the user interface. The user interface may show information about various geo-fencing devices and/or associated boundaries in the area as described elsewhere herein. The user interface may show a location of a UAV. The user interface may show a path taken or to be taken by the UAV or a travel trajectory. The user interface may show information about flight regulations associated with the geo-fencing devices. The mobile application user interface may show any in formation as described elsewhere herein.

The user may interact with the user interface provided by the mobile application to control operation of the geo-fencing device. Any type of operational input, as described elsewhere herein may be provided. For instance, the user may provide one or more parameters for a set of flight regulations. The user may provide boundaries for the set of flight regulations, relative to the location of the mobile device. The user may specify types of flight restrictions and/or values for various flight restriction metrics. The user may specify a priority of the geo-fencing mobile device. The parameters set by the user may be considered when generating the set of flight regulations. The set of flight regulations may be generated on-board the air control system or on-board the mobile device, and may be generated based on the parameters from the user. Thus, the mobile application which may be used to allow the mobile device to function as a geo-fencing device may also provide information about the geo-fencing device and/or other geo-fencing devices, and/or allow a user to control operation of the geo-fencing device.

Geo-Fencing Device Network

As previously discussed, geo-fencing devices may communicate with one another. In some embodiments, geo-fencing devices may communicate with one another via direct communications, or via indirect communications. Various types of communications, as described elsewhere herein, may be provided between geo-fencing devices.

In some embodiments, a geo-fencing device may have information on-board the geo-fencing device. The geo-fencing device information may include information about a location of the geo-fencing device, boundaries of the geo-fencing device, flight regulations associated with the geo-fencing device, priority level of the geo-fencing device, and/or identity information of the geo-fencing device (e.g., geo-fencing device type or geo-fencing device identifier). The geo-fencing device may collect data using one or more input element. The input element may be a communication module, a sensor, or any other type of element that may be capable of collecting information. For example, the input element may sense a UAV that may be within a predetermined geographic range of the geo-fencing device. Information about the UAV may be ascertained through the input element. For instance, the geo-fencing device may be able to determine a location of the UAV, movement of the UAV, identity information of the UAV (e.g., UAV type or UAV identifier), physical characteristics of the UAV, power level of the UAV, or any other information pertaining to the UAV. In another example, the input element may collect environmental conditions (e.g., environmental climate, environmental complexity, traffic, or population density). For instance, the input element may collect information about local wind speed and direction, and local air traffic.

Any information on-board the geo-fencing device may be shared with other geo-fencing devices. In some embodiments, the geo-fencing device may share the information about the geo-fencing device and/or any collected information. The geo-fencing devices may share with other geo-fencing devices that are within a physical range of the geo-fencing device. Alternatively, the geo-fencing device may share information with other geo-fencing devices without regard to the physical range of the other geo-fencing devices. In addition to sending information to the other geo-fencing devices, the geo-fencing device may receive information from the other geo-fencing devices. In some instances, the geo-fencing device may receive information from other geo-fencing devices within a physical range of the geo-fencing device. Alternatively, the geo-fencing device may receive information from other geo-fencing devices without regard to the physical range of the other geo-fencing devices. Geo-fencing devices may also share with other geo-fencing devices information that they received from other geo-fencing devices. For example, a first geo-fencing device may share with a second geo-fencing device, information that the first geo-fencing device received from a third geo-fencing device. Similarly, the first geo-fencing device may share with the third geo-fencing device, information that the first geo-fencing device received from the second geo-fencing device. Thus, information collected by various geo-fencing devices may be leveraged by other geo-fencing devices. The collective knowledge of multiple geo-fencing devices may be greater than the knowledge of individual geo-fencing devices separately.

Thus, geo-fencing devices may form a network that may share information with one another. Geo-fencing devices may create and/or store a local map of the geo-fencing device. The local map may include information about the location of the geo-fencing device. The local map may include information about the location of geo-fencing devices within a physical range of the geo-fencing device. The location of the other geo-fencing devices may be received by the geo-fencing device from the other geo-fencing devices. The location of the geo-fencing devices may be sensed using one or more input element on-board the geo-fencing device. The local map may include information about the location of one or more UAVs within a physical range of the geo-fencing device. The information about the UAVs may be collected using one or more input elements of the geo-fencing device or may be received from the UAVs or other geo-fencing devices. The local map may include environmental conditions within a physical range of the geo-fencing device. In some instances, each geo-fencing device of the geo-fencing device network may have a local map. In some embodiments, one or more of the geo-fencing devices may have a local map. The information of the local maps from multiple geo-fencing devices may be shared or combined to form a larger or more complete map.

The geo-fencing devices may share information. The geo-fencing devices may share information directly with one another (e.g., in a P2P fashion) or with aid of an additional entity. The additional entity may serve as a repository for the information. In some embodiments, a memory storage system and/or air control system may be used as a repository for information that may be shared between different geo-fencing devices.

In some embodiments, UAVs may share information with geo-fencing devices and vice versa. For example, UAVs may collect environmental condition information that they may share with other geo-fencing devices. For instance, the UAV may detect precipitation and information local geo-fencing devices. Similarly, geo-fencing devices may share information with UAVs. For instance, geo-fencing device may collect environmental condition information that they may share with the UAVs. The geo-fencing device may collect information about local air traffic that the geo-fencing device may share with the UAVs.

Geo-Fencing Examples

The following provide some examples of how a UAV system, including an authentication system and/or geo-fencing devices may be utilized. Such examples are some illustrations of how the system may be applied, and are not limiting.

Example 1: Geo-Fencing Device for Privacy

As the number of UAVs in the airspace increase, private individuals may wish to retain control over their own residences and retain some privacy. If a UAV with a camera flies above an individual's home, the UAV may be able to capture images of the home, which may include the user's private yard or roof. UAVs flying near the home may also create noise pollution. In some embodiments, when novice users are operating the UAVs, the UAVs risk crashing into an individual's home, or running into people at the user's home, risking injury or damage.

It may be desirable for the individuals to be able to prevent UAVs from entering a private space that they exert control over. For instance, the individuals may wish to exclude outside UAVs from their home or property. The individuals may wish to exclude the UAVs from a home they own, or that they are renting or subletting. Generally, it may be challenging to do so, as other people may be flying the UAVs, and may not even be aware of the wishes of the individuals, or may not have sufficient skill level to retain control over the UAVs to prevent them from wandering into an airspace over a private residence.

The individuals may be able to acquire geo-fencing devices that may prevent the UAVs from coming into their residential space. In some instances, an individual may purchase a geo-fencing device or receive it for free. The individual may place the geo-fencing device in the area where the individual wishes to exclude UAVs.

Figure 44:
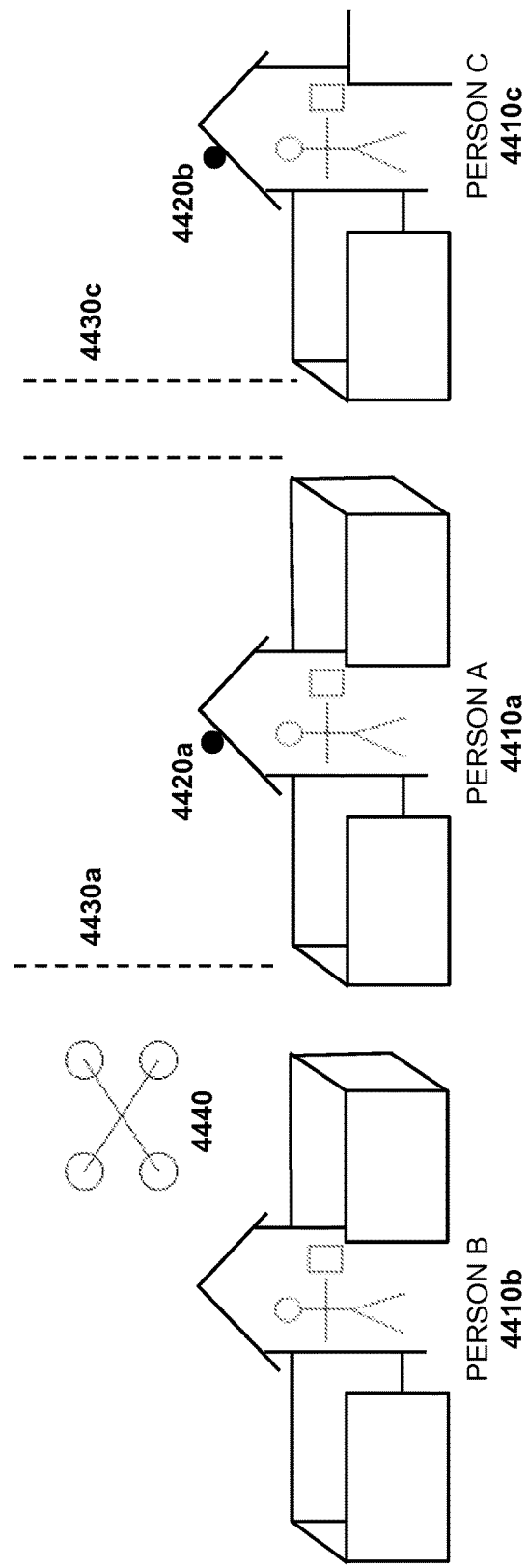
FIG. 44 provides an illustration of how geo-fencing devices may be used with private residence to restrict usage of UAVs, in accordance with an embodiment of the invention.

FIG. 44 provides an illustration of how geo-fencing devices may be used with private residence to restrict usage of UAVs. For example, Person A 4410*a* may purchase a geo-fencing device 4420*a*. Person A may place the geo-fencing device somewhere within Person A's property. For example, the geo-fencing device may be affixed to Person A's residence. The geo-fencing device may provide a geo-fencing boundary 4430*a* within which a UAV may not enter. The boundary may be within Person A's property. The boundary may be at Person A's property line. The boundary may be outside Person A's property. The boundary may prevent the UAV from entering Person A's property, or flying above Person A's property. The boundary may prevent all privately owned UAVs from entering Person A's airspace. Even if an operator of the UAV sends a command for the UAV to enter Person A's airspace, the UAV may not respond and may be prevented from entering Person A's airspace. A UAV flight path may automatically be altered to prevent the UAV from entering Person A's airspace. Thus, Person A may be able to enjoy Person A's residence without worrying about whether UAVs will be entering Person A's airspace.

Some individuals may not have a local geo-fencing device. For example Person B may not mind if UAVs enter Person B's airspace. Person B may not have a geo-fencing device. Person B may not have any boundaries that may prevent UAVs from passing. Thus, UAVs 4440 may be found in Person B's airspace.

Person C may be concerned about privacy but may not mind having air traffic above Person C's property. Person C may acquire a geo-fencing device 4420*c*. Person C may place the geo-fencing device somewhere within Person C's property. For example, the geo-fencing device may be affixed to Person C's residence. The geo-fencing device may provide a geo-fencing boundary 4430*c*. Person C's geo-fencing device may permit UAVs to fly within the boundaries, but may prevent operation of cameras within the boundaries. The boundary may be within Person C's property, may be at Person C's property line, or may be outside Person C's property. The boundary may prevent all privately owned UAVs from taking pictures while within Person C's airspace. Even if an operator of a UAV sends a command for the UAV to use an on-board camera to record information about Person C's residence, the camera of the UAV may be automatically powered off, or may not be permitted to store or stream any images. Thus, Person C may be able to enjoy Person C's residence without worrying about whether UAVs will be capturing images of Person C's property, or from within Person C's airspace.

A geo-fencing device may be programmable so that an individual that owns or operates the geo-fencing device may be able alter the restrictions associated with the geo-fencing device. If Person C later decides that Person C no longer wishes to permit UAVs to fly over Person C's property, Person C may update the geo-fencing device to no longer permit UAVs to fly over Person C's property, similar to Person A's device.

Any number of private individuals may be able to acquire geo-fencing devices to exert control over their residences. A resident may effectively be opting out from letting UAVs enter their airspace or perform certain functions within their airspace by providing a geo-fencing device. In one example, a geo-fencing device may be affixed to an individual's roof, wall, fence, ground, garage, or any other portion of the individual's residence. The geo-fencing device may be outside, or may be inside the residence. The geo-fencing device may be detectable by the UAV, may be able to detect the UAV when the UAV is nearing the individual's airspace, or may have a location that may be conveyed to an air control system. Control over UAVs within the region may be exerted that may prevent the UAVs from acting in contradiction to a set of flight regulations associated with the geo-fencing device.

Example 2: Geo Fencing Device for Containment

As an increasing number of novice UAV users attempt to fly UAVs the risk of UAV crashes or accidents may become higher. In some embodiments, novice UAV users may be concerned about the UAVs drifting out of controlling and crashing in a region where the users may not be able to recover the UAVs. For example, if a UAV is in a region near a body of water, the user may be worried about the UAV drifting over the body of water and being damaged when crashing into the body of water. In another example, the user may be worried about flying the UAV on the user's property and inadvertently causing the UAVs to fly into the neighbor's yard, or other area where the UAV may be inaccessible, and crashing.

It may be desirable for the users to be able to fly the UAV, but remain assured that the UAV will remain within a particular region. For instance, the individuals may wish to practice manually flying the UAV, but not permit the UAV to go too far, or out of sight. The user may wish to practice manually flying the UAV while reducing a risk that the UAV will be damaged or in an unrecoverable area.

The users may be able to acquire geo-fencing devices that may keep the UAV confined to a known region. In some instances, a user may purchase a geo-fencing device or receive it for free. The individual may place the geo-fencing device in the area where the user wishes to contain UAVs.

Figure 45:
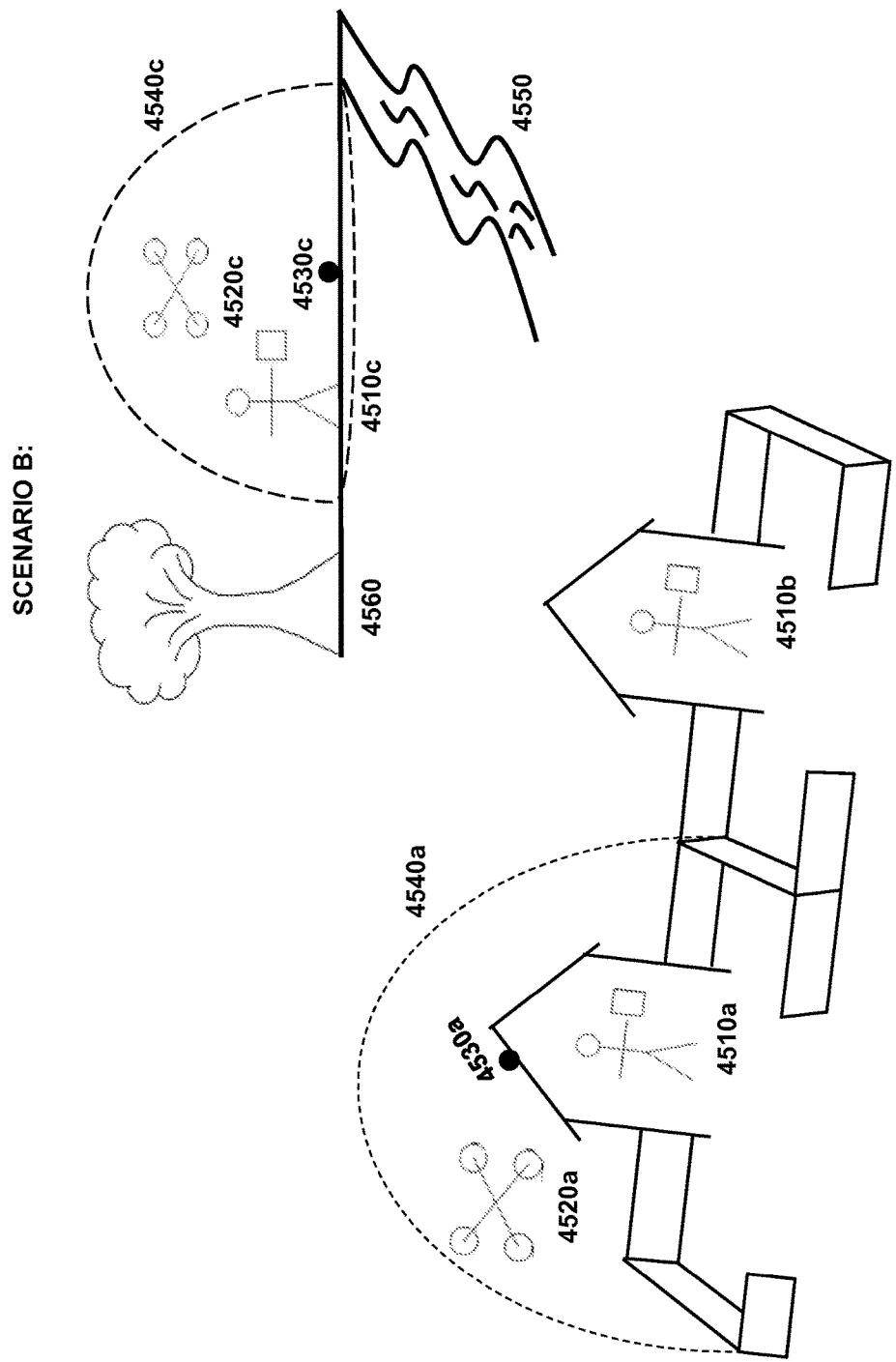
FIG. 45 provides illustrations of how geo-fencing devices may be used for containment of UAVs, in accordance with an embodiment of the invention.

FIG. 45 provides illustrations of how geo-fencing devices may be used for containment of UAVs. Scenario A illustrates a situation where a user 4510*a* of a UAV 4520*a* may be at the user's residence. A geo-fencing device 4530*a* may be provided at the user's residence. The geo-fencing device may have an associated boundary 4540*a*. The UAV may be restricted so that UAV is only permitted to fly within the boundaries. The user may be able to manually control flight of the UAV within the boundaries. When the UAV nears the boundaries, flight of the UAV may be taken over from the operator to prevent the UAV from exiting the region. The takeover may cause the UAV to hover until the user provides an input that brings the UAV away from the boundary, may cause the UAV to automatically turn around, may cause the UAV to land within the region, or return to a starting point. The boundaries may prevent the UAV from entering the property of a user's neighbor 4150*b*. Thus, the user does not need to worry about the UAV accidentally entering the neighbor's yard and having to disturb the neighbor to get the UAV, or worry about potentially damaging objects in the neighbor's yard or injuring the neighbor.

Scenario B illustrates a situation where a user 4510*c* may be flying a UAV 4520*c* in an outdoor environment. A geo-fencing device 4530*c* may be provided in the environment. An associated boundary 4540*c* may be provided around the geo-fencing device. In some instances, the geo-fencing device may be portable. For instance, a user may pick up the geo-fencing device from the user's home and take it to a local park where the user wishes to practice flying a UAV. The geo-fencing device may be positioned so that one or more possible traps or obstructions may be outside the boundary. For example, a body of water 4550 or a tree 4560 may be outside the boundary. Then, the user may be able to practice flying the UAV without worrying about the UAV hitting the tree or falling into the water.

In some embodiments, the geo-fencing device may be picked up and carried by a user from location to location. In another example, the user may wear the geo-fencing device or carry the geo-fencing device in the user's pocket. Thus, a user may operate the UAV so that the UAV remains within the boundary which may be around the user carrying the geo-fencing device. The user may walk around flying the UAV. The geo-fencing device may move with the user when worn by the user or carried in the user's pocket. Thus, the boundaries of the UAV may travel with the user as the user walks around. The UAV may remain within the proximity of the user, but may move with the user as the user walks around.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 36:
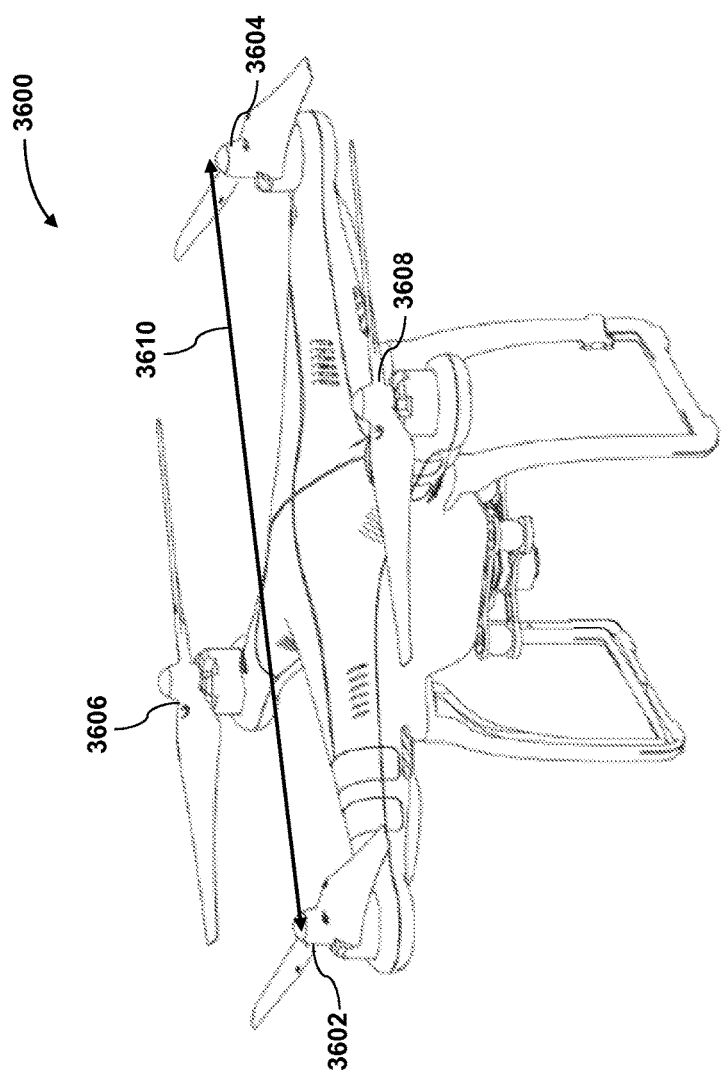
FIG. 36 illustrates a UAV, in accordance with an embodiment of the invention.

FIG. 36 illustrates an unmanned aerial vehicle (UAV) 3600, in accordance with embodiments of the present invention. The UAV may be an example of a movable object as described herein, to which the method and apparatus of discharging a battery assembly may be applied. The UAV 3600 can include a propulsion system having four rotors 3602, 3604, 3606, and 3608. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 3610. For example, the length 3610 can be less than or equal to 2 m, or less than equal to 5 m. In some embodiments, the length 3610 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 37:
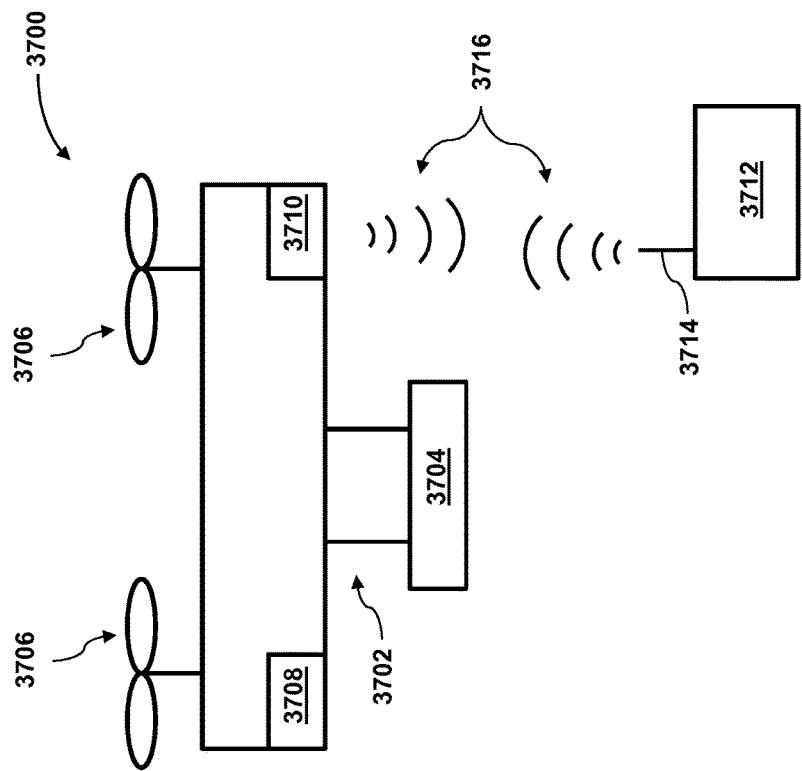
FIG. 37 illustrates a movable object including a carrier and a payload, in accordance with an embodiment of the invention.

FIG. 37 illustrates a movable object 3700 including a carrier 3702 and a payload 3704, in accordance with embodiments of the present invention. Although the movable object 3700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 3704 may be provided on the movable object 3700 without requiring the carrier 3702. The movable object 3700 may include propulsion mechanisms 3706, a sensing system 3708, and a communication system 3710.

The propulsion mechanisms 3706 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 3706 can be mounted on the movable object 3700 using any suitable means, such as a support element (e.g., a drive shaft) as described elsewhere herein. The propulsion mechanisms 3706 can be mounted on any suitable portion of the movable object 3700, such on the top, bottom, front, back, sides, or suitable combinations thereof.

In some embodiments, the propulsion mechanisms 3706 can enable the movable object 3700 to take off vertically from a surface or land vertically on a surface without requiring any horizontal movement of the movable object 3700 (e.g., without traveling down a runway). Optionally, the propulsion mechanisms 3706 can be operable to permit the movable object 3700 to hover in the air at a specified position and/or orientation. One or more of the propulsion mechanisms 3700 may be controlled independently of the other propulsion mechanisms. Alternatively, the propulsion mechanisms 3700 can be configured to be controlled simultaneously. For example, the movable object 3700 can have multiple horizontally oriented rotors that can provide lift and/or thrust to the movable object. The multiple horizontally oriented rotors can be actuated to provide vertical takeoff, vertical landing, and hovering capabilities to the movable object 3700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3700 (e.g., with respect to up to three degrees of translation and up to three degrees of rotation).

The sensing system 3708 can include one or more sensors that may sense the spatial disposition, velocity, and/or acceleration of the movable object 3700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 3708 can be used to control the spatial disposition, velocity, and/or orientation of the movable object 3700 (e.g., using a suitable processing unit and/or control module, as described below). Alternatively, the sensing system 3708 can be used to provide data regarding the environment surrounding the movable object, such as weather conditions, proximity to potential obstacles, location of geographical features, location of manmade structures, and the like.

The communication system 3710 enables communication with terminal 3712 having a communication system 3714 via wireless signals 3716. The communication systems 3710, 3714 may include any number of transmitters, receivers, and/or transceivers suitable for wireless communication. The communication may be one-way communication, such that data can be transmitted in only one direction. For example, one-way communication may involve only the movable object 3700 transmitting data to the terminal 3712, or vice-versa. The data may be transmitted from one or more transmitters of the communication system 3710 to one or more receivers of the communication system 3712, or vice-versa. Alternatively, the communication may be two-way communication, such that data can be transmitted in both directions between the movable object 3700 and the terminal 3712. The two-way communication can involve transmitting data from one or more transmitters of the communication system 3710 to one or more receivers of the communication system 3714, and vice-versa.

In some embodiments, the terminal 3712 can provide control data to one or more of the movable object 3700, carrier 3702, and payload 3704 and receive information from one or more of the movable object 3700, carrier 3702, and payload 3704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 3706), or a movement of the payload with respect to the movable object (e.g., via control of the carrier 3702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 3708 or of the payload 3704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 3712 can be configured to control a state of one or more of the movable object 3700, carrier 3702, or payload 3704. Alternatively or in combination, the carrier 3702 and payload 3704 can also each include a communication module configured to communicate with terminal 3712, such that the terminal can communicate with and control each of the movable object 3700, carrier 3702, and payload 3704 independently.

In some embodiments, the movable object 3700 can be configured to communicate with another remote device in addition to the terminal 3712, or instead of the terminal 3712. The terminal 3712 may also be configured to communicate with another remote device as well as the movable object 3700. For example, the movable object 3700 and/or terminal 3712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3700, receive data from the movable object 3700, transmit data to the terminal 3712, and/or receive data from the terminal 3712. Optionally, the remote device can be connected to the Internet or other telecommunications network, such that data received from the movable object 3700 and/or terminal 3712 can be uploaded to a website or server.

Figure 38:
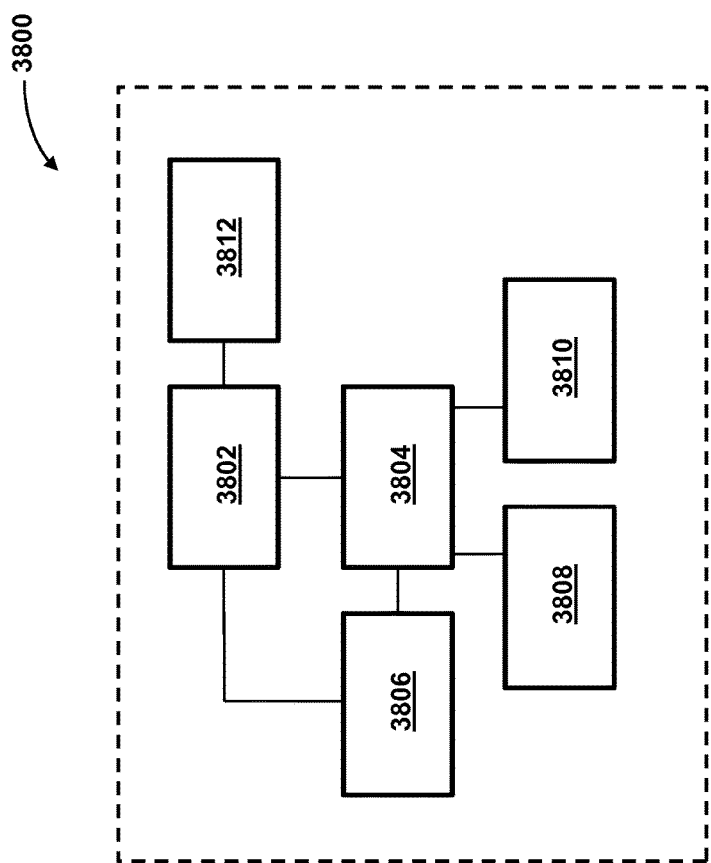
FIG. 38 illustrates a system for controlling a movable object, in accordance with an embodiment of the invention.

FIG. 38 is a schematic illustration by way of block diagram of a system 3800 for controlling a movable object, in accordance with embodiments of the present invention. The system 3800 can be used in combination with any suitable embodiment of the systems, devices, and methods disclosed herein. The system 3800 can include a sensing module 3802, processing unit 3804, non-transitory computer readable medium 3806, control module 3808, and communication module 3810.

The sensing module 3802 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 3802 can be operatively coupled to a processing unit 3804 having a plurality of processors. In some embodiments, the sensing module can be operatively coupled to a transmission module 3812 (e.g., a Wi-Fi image transmission module) configured to directly transmit sensing data to a suitable external device or system. For example, the transmission module 3812 can be used to transmit images captured by a camera of the sensing module 3802 to a remote terminal.

The processing unit 3804 can have one or more processors, such as a programmable processor (e.g., a central processing unit (CPU)). The processing unit 3804 can be operatively coupled to a non-transitory computer readable medium 3806. The non-transitory computer readable medium 3806 can store logic, code, and/or program instructions executable by the processing unit 3804 for performing one or more steps. The non-transitory computer readable medium can include one or more memory units (e.g., removable media or external storage such as an SD card or random access memory (RAM)). In some embodiments, data from the sensing module 3802 can be directly conveyed to and stored within the memory units of the non-transitory computer readable medium 3806. The memory units of the non-transitory computer readable medium 3806 can store logic, code and/or program instructions executable by the processing unit 3804 to perform any suitable embodiment of the methods described herein. For example, the processing unit 3804 can be configured to execute instructions causing one or more processors of the processing unit 3804 to analyze sensing data produced by the sensing module. The memory units can store sensing data from the sensing module to be processed by the processing unit 3804. In some embodiments, the memory units of the non-transitory computer readable medium 3806 can be used to store the processing results produced by the processing unit 3804.

In some embodiments, the processing unit 3804 can be operatively coupled to a control module 3808 configured to control a state of the movable object. For example, the control module 3808 can be configured to control the propulsion mechanisms of the movable object to adjust the spatial disposition, velocity, and/or acceleration of the movable object with respect to six degrees of freedom. Alternatively or in combination, the control module 3808 can control one or more of a state of a carrier, payload, or sensing module.

The processing unit 3804 can be operatively coupled to a communication module 3810 configured to transmit and/or receive data from one or more external devices (e.g., a terminal, display device, or other remote controller). Any suitable means of communication can be used, such as wired communication or wireless communication. For example, the communication module 3810 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 3810 can transmit and/or receive one or more of sensing data from the sensing module 3802, processing results produced by the processing unit 3804, predetermined control data, user commands from a terminal or remote controller, and the like.

The components of the system 3800 can be arranged in any suitable configuration. For example, one or more of the components of the system 3800 can be located on the movable object, carrier, payload, terminal, sensing system, or an additional external device in communication with one or more of the above. Additionally, although FIG. 38 depicts a single processing unit 3804 and a single non-transitory computer readable medium 3806, one of skill in the art would appreciate that this is not intended to be limiting, and that the system 3800 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 3800 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for operating an unmanned aerial vehicle (UAV), said system comprising:
   one or more communication units configured to:
      receive authentication of an identity of a UAV;
      receive authentication of an identity of a UAV user, wherein the authenticated UAV user is an owner and/or operator of the authenticated UAV; and
      receive information including a geographical location in which the authenticated UAV is, or to which the UAV is to fly; and
   a non-transitory computer readable medium storing an application that is configured to, with aid of one or more processors, generate a location-dependent payload usage parameter based on the geographical location that is received by the one or more communication units, wherein the one or more communication units are further configured to transmit said location-dependent payload usage parameter to the UAV and/or a payload on board the UAV based on (a) the received authentication of the identity of the UAV, and (b) the received authentication of the identity of the UAV user to effect operation of the payload onboard the UAV in compliance with the payload usage parameter.

2. A non-transitory computer readable medium containing program instructions that, when executed by one or more processors on an air control unit, cause the one or more processors to perform a method for operating an unmanned aerial vehicle (UAV), said method comprising:
at the air control unit:
receiving authentication of an identity of a UAV;
receiving authentication of an identity of a UAV user, wherein the authenticated UAV user is an owner and/or operator of the authenticated UAV;
receiving information including a geographical location in which the authenticated UAV is, or to which the UAV is to fly;
generating a location-dependent payload usage parameter based on the geographical location that is received by the air control unit; and
transmitting said location-dependent payload usage parameter to the UAV and/or a payload on board the UAV based on (a) the received authentication of the identity of the UAV, and (b) the received authentication of the identity of the UAV user to effect operation of the payload onboard the UAV in compliance with the payload usage parameter.

3. A method for operating an unmanned aerial vehicle (UAV) having a payload onboard, comprising:
at an air control unit:
receiving authentication of an identity of a UAV;
receiving authentication of an identity of a UAV user, wherein the authenticated UAV user is an owner and/or operator of the authenticated UAV;
receiving information including a geographical location in which the authenticated UAV is, or to which the UAV is to fly;
generating a location-dependent payload usage parameter based on the geographical location that is received by the air control unit; and
transmitting said location-dependent payload usage parameter to the UAV and/or a payload on board the UAV based on (a) the received authentication of the identity of the UAV, and (b) the received authentication of the identity of the UAV user to effect operation of the payload onboard the UAV in compliance with the payload usage parameter.

4. The method of claim 3, wherein effecting operation of the payload in compliance with the location-dependent payload usage parameter comprises rendering the payload inoperational.

5. The method of claim 4, wherein rendering the payload inoperational comprises powering off the payload.

6. The method of claim 3, wherein effecting operation of the payload in compliance with the location-dependent payload usage parameter comprises operating the payload without any restrictions.

7. The method of claim 3, wherein effecting operation of the payload in compliance with the location-dependent payload usage parameter comprises operating the payload with one or more restrictions.

8. The method of claim 7, wherein the one or more restrictions are generated in accordance with one or more regulations.

9. The method of claim 7, wherein the payload is an image capture device configured to capture static and/or dynamic images.

10. The method of claim 9, wherein the one or more restrictions comprise restricting at least one of: (i) recordation of one or more images and (ii) transmission of one or more images.

11. The method of claim 9, wherein the one or more restrictions comprise restricting at least one of: (i) a resolution at which the image capture device captures images, (ii) a zoom level of the image capture device, (iii) an aperture size of the image capture device, and (iv) a focus of the image capture device.

12. The method of claim 9, wherein the one or more restrictions comprise restricting the image capture device from using a flash.

13. The method of claim 9, the one or more restrictions comprise restricting a mode of the image capture device to at least one of: (i) a lighting mode, (ii) a color mode, and (iii) a static or dynamic image capture mode.

14. The method of claim 7, wherein the payload is an audio capture device.

15. The method of claim 14, wherein the one or more restrictions comprise restricting sound recordation.

16. The method of claim 14, wherein the one or more restrictions comprise restricting audio capture device sensitivity.

17. The method of claim 14, wherein the one or more restrictions comprise restricting sound capture to a predetermined decibel range.

18. The method of claim 14, wherein the one or more restrictions comprise restricting sound capture to a predetermined frequency range.

19. The method of claim 14, wherein the one or more restrictions comprise restricting a microphone directionality of the audio capture device.

20. The method of claim 7, wherein the payload is a light source, and the one or more restrictions comprise restricting the light source to operate below a threshold intensity.

21. The method of claim 7, wherein the payload is a speaker, and the one or more restrictions comprise restricting the speaker from transmitting sound.

22. The method of claim 3, wherein the UAV comprises:
one or more propulsion units that effect flight of the UAV;
a communication module configured to receive the location-dependent payload usage parameter; and
a flight control unit configured to generate flight control signals that are delivered to the one or more propulsion units, wherein the flight control signals are generated in accordance with the location-dependent payload usage parameter.

23. The method of claim 22, wherein the flight control signals cause the one or more propulsion units to effect flight of UAV, thereby causing the UAV to fly at a translational velocity that is at least one of:
greater than a predetermined minimum threshold velocity; and
less than a predetermined maximum threshold velocity.

24. The method of claim 22, wherein the flight control signals cause the one or more propulsion units to effect flight of UAV, thereby causing the UAV to fly at an altitude that is at least one of:

greater than a predetermined minimum threshold altitude; and less than a predetermined maximum threshold altitude.

25. The method of claim 22, further comprising determining at the air control unit that the geographical location is within a flight-restricted zone, wherein:
 the location-dependent payload usage parameter reflects said determination; and
 the flight control signals cause the one or more propulsion units to effect flight of the UAV, thereby causing the UAV to fly to a second geographical location outside the flight-restricted zone.

26. The method of claim 3, wherein the geographical location is within an allocated space comprising an allocated volume and/or an allocated region, and wherein one or more regulations apply within the allocated space.

27. The method of claim 26, wherein the geographical location is within a flight-restricted zone.

28. The method of claim 27, wherein the flight-restricted zone is within a predetermined distance from at least one of: an airport, a public gathering place, a government property, a military property, a school, a private residence, and a power plant.

29. The method of claim 3, further comprising receiving an authentication of an identity of a UAV remote controller.

30. The method of claim 3, wherein the authentication of the identity of the UAV provides information regarding whether the UAV has been tampered or not to the air control unit.

\* \* \* \* \*